(12) United States Patent
Park et al.

(10) Patent No.: US 11,223,985 B2
(45) Date of Patent: Jan. 11, 2022

(54) BEAM-BASED CONNECTION FAILURE REPORT

(71) Applicant: Ofinno, LLC, Reston, VA (US)

(72) Inventors: Kyungmin Park, Herndon, VA (US); Esmael Dinan, Herndon, VA (US); Alireza Babaei, Fairfax, VA (US); Hyoungsuk Jeon, Centreville, VA (US)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/972,032

(22) Filed: May 4, 2018

(65) Prior Publication Data

US 2019/0141592 A1 May 9, 2019

Related U.S. Application Data

(60) Provisional application No. 62/501,413, filed on May 4, 2017, provisional application No. 62/501,428, filed
(Continued)

(51) Int. Cl.
*H04W 36/00* (2009.01)
*H04W 36/08* (2009.01)
(Continued)

(52) U.S. Cl.
CPC .......... *H04W 36/08* (2013.01); *H04B 17/309* (2015.01); *H04W 16/28* (2013.01);
(Continued)

(58) Field of Classification Search
CPC . H04W 72/0413; H04W 16/28; H04W 28/08; H04W 36/0069; H04W 36/04; H04W 76/15; H04W 76/19; H04W 76/32
(Continued)

(56) References Cited

U.S. PATENT DOCUMENTS 9,949,298 B1 * 4/2018 Akoum ............... H04W 74/006
10,009,952 B2 6/2018 Kim
(Continued)

OTHER PUBLICATIONS

R2-1703683; 3GPP TSG-RAN WG2 Meeting #97bis; Spokane, USA, Apr. 3-7, 2017; Agenda Item: 10.2.3.3; Source: LG Electronics Inc.; Title: SCG Re-establishment in EN-DC; Document for: Discussion and Decision.
(Continued)

*Primary Examiner* — Joseph Arevalo
(74) *Attorney, Agent, or Firm* — Arch & Lake LLP

(57) ABSTRACT

A first wireless device receives from a first base station, configuration parameters of one or more beams of a first cell of the first base station. The first wireless device determines a connection failure with the first cell based on considering at least one criterion during a period of time in which the first wireless device employs at least a first beam of the one or more beams. The first wireless device selects a second cell of a second base station in response to the connection failure. The first wireless device transmits to the second base station, a first message comprising a radio link failure report. The radio link failure report comprises: a first beam identifier of the first beam; and a first cell identifier of the first cell.

18 Claims, 70 Drawing Sheets

Related U.S. Application Data on May 4, 2017, provisional application No. 62/501,454, filed on May 4, 2017, provisional application No. 62/501,471, filed on May 4, 2017, provisional application No. 62/516,372, filed on Jun. 7, 2017, provisional application No. 62/516,375, filed on Jun. 7, 2017, provisional application No. 62/516,382, filed on Jun. 7, 2017.

(51) Int. Cl.
*H04B 17/309* (2015.01)
*H04W 16/28* (2009.01)
*H04W 36/30* (2009.01)
*H04W 76/19* (2018.01)
*H04W 76/18* (2018.01)
*H04W 76/27* (2018.01)
*H04W 24/10* (2009.01)

(52) U.S. Cl.
CPC ....... *H04W 24/10* (2013.01); *H04W 36/0079* (2018.08); *H04W 36/0094* (2013.01); *H04W 36/00835* (2018.08); *H04W 36/30* (2013.01); *H04W 76/18* (2018.02); *H04W 76/19* (2018.02); *H04W 76/27* (2018.02)

(58) Field of Classification Search
USPC ................ 455/436, 423, 444, 424, 418, 522
See application file for complete search history.

(56) References Cited

U.S. PATENT DOCUMENTS

| | | | |
|---|---|---|---|
| 10,285,106 B2 | 5/2019 | Han et al. | |
| 10,609,610 B2 | 3/2020 | Park et al. | |
| 10,609,611 B2 | 3/2020 | Park et al. | |
| 2007/0072610 A1 | 3/2007 | Qiao et al. | |
| 2010/0173626 A1* | 7/2010 | Catovic | H04W 24/02 455/423 |
| 2011/0053588 A1* | 3/2011 | Al-Khudairi | H04W 36/30 455/424 |
| 2011/0212720 A1* | 9/2011 | Hamalainen | H04W 24/02 455/423 |
| 2012/0039181 A1* | 2/2012 | Aziz | H04W 36/245 370/241 |
| 2013/0095839 A1 | 4/2013 | Venkatraman et al. | |
| 2013/0247117 A1* | 9/2013 | Yamada | G08C 17/02 725/93 |
| 2013/0303114 A1 | 11/2013 | Ahmad et al. | |
| 2014/0080484 A1 | 3/2014 | Centonza et al. | |
| 2014/0092866 A1 | 4/2014 | Teyeb et al. | |
| 2014/0128075 A1 | 5/2014 | Da Silva et al. | |
| 2014/0206361 A1 | 7/2014 | Centonza et al. | |
| 2014/0293958 A1 | 10/2014 | Teyeb et al. | |
| 2015/0043422 A1 | 2/2015 | Fujishiro et al. | |
| 2015/0045028 A1* | 2/2015 | Singh | H04W 36/0094 455/436 |
| 2015/0271861 A1* | 9/2015 | Li | H04W 56/001 455/426.1 |
| 2015/0350968 A1 | 12/2015 | Da Silva et al. | |
| 2015/0351135 A1* | 12/2015 | Schmidt | H04W 76/10 455/450 |
| 2015/0358887 A1 | 12/2015 | Xu et al. | |
| 2016/0150435 A1* | 5/2016 | Baek | H04W 16/28 370/252 |
| 2016/0183135 A1* | 6/2016 | Kang | H04W 76/15 455/444 |
| 2016/0183234 A1 | 6/2016 | Sung et al. | |
| 2016/0219475 A1* | 7/2016 | Kim | H04L 5/00 |
| 2016/0330643 A1 | 11/2016 | Sahin et al. | |
| 2016/0360464 A1 | 12/2016 | Han et al. | |
| 2016/0366007 A1* | 12/2016 | Hwang | H04L 27/3809 |
| 2017/0048772 A1 | 2/2017 | Gheorghiu et al. | |
| 2017/0171784 A1 | 6/2017 | Mitsui et al. | |
| 2017/0195027 A1 | 7/2017 | Baek et al. | |
| 2017/0208494 A1 | 7/2017 | Moon et al. | |
| 2017/0251409 A1 | 8/2017 | Wegmann et al. | |
| 2017/0302355 A1* | 10/2017 | Islam | H04B 7/0639 |
| 2017/0374637 A1 | 12/2017 | Akkarakaran et al. | |
| 2018/0007603 A1 | 1/2018 | Miranda et al. | |
| 2018/0048375 A1 | 2/2018 | Guo et al. | |
| 2018/0054749 A1 | 2/2018 | Kim et al. | |
| 2018/0084473 A1 | 3/2018 | Nagaraja et al. | |
| 2018/0176801 A1* | 6/2018 | Rune | H04B 7/0695 |
| 2018/0199328 A1 | 7/2018 | Sang et al. | |
| 2018/0227805 A1 | 8/2018 | Jang et al. | |
| 2018/0242340 A1 | 8/2018 | Pu et al. | |
| 2018/0249453 A1* | 8/2018 | Nagaraja | H04W 36/0072 |
| 2018/0279186 A1 | 9/2018 | Park et al. | |
| 2018/0279284 A1 | 9/2018 | Wang et al. | |
| 2018/0288756 A1 | 10/2018 | Xia et al. | |
| 2018/0331794 A1* | 11/2018 | Nagaraja | H04B 7/0695 |
| 2018/0352453 A1* | 12/2018 | Gunnarsson | H04W 24/08 |
| 2018/0367374 A1* | 12/2018 | Liu | H04W 76/18 |
| 2019/0075496 A1 | 3/2019 | Huang et al. | |
| 2019/0098520 A1 | 3/2019 | Kim | |
| 2019/0104549 A1* | 4/2019 | Deng | H04B 7/0617 |
| 2019/0132777 A1 | 5/2019 | Park et al. | |
| 2019/0132778 A1 | 5/2019 | Park et al. | |
| 2019/0141592 A1 | 5/2019 | Park et al. | |
| 2019/0150010 A1 | 5/2019 | Kwon et al. | |
| 2019/0174358 A1 | 6/2019 | Gao et al. | |
| 2019/0200249 A1* | 6/2019 | Yoon | H04W 24/08 |
| 2019/0229776 A1* | 7/2019 | Cao | H04B 7/088 |
| 2019/0239131 A1 | 8/2019 | Yang et al. | |
| 2019/0246322 A1 | 8/2019 | Ronkainen et al. | |
| 2019/0280756 A1 | 9/2019 | Fan et al. | |
| 2020/0068457 A1* | 2/2020 | You | H04W 56/005 |
| 2020/0092785 A1 | 3/2020 | Yang | |
| 2020/0099437 A1 | 3/2020 | Harada et al. | |
| 2020/0127883 A1 | 4/2020 | Liu et al. | |
| 2020/0229057 A1 | 7/2020 | Park et al. | |
| 2020/0322813 A1 | 10/2020 | Jia et al. | |

OTHER PUBLICATIONS

R2-1703711; 3GPP TSG RAN WG2 #97bis; Spokane, USA, Apr. 3 to 7, 2017; Agenda Item: 10.2.3.3; Souce Samsung; Title: RLF and Its Recovery Procedures in NR; Document for: Discussion/Decision.

R2-1703712; 3GPP TSG-RAN WG2 2017 RAN2#97bis Meeting; Spokane, USA, Apr. 3-7, 2017; Agenda item: 10.2.3.4; Source: Samsung; Title: NR beam recovery procedure; Document for: Discussion & Decision.

R2-1704092; 3GPP TSG-RAN WG2 Meeting #98; Hangzhou, China, May 15-19, 2017; Source: Ericsson; Title: Reading SSB time index from PBCH; Agenda Item: 10.4.1.4; Document for: Discussion and Decision.

R2-1704100; 3GPP TSG-RAN WG2 #98; Hangzhou, P R. of China, May 15-19, 2017; Agenda Item: 10.4.1.4; Source: Ericsson; Title: Measurement model in NR; Document for: Discussion, Decision.

R2-1704101; 3GPP TSG-RAN WG2 #98; Hangzhou, P R. of China, May 15-19, 2017; Agenda Item: 10.4.1.4; Source: Ericsson; Title: Details of cell quality derivation; Document for: Discussion, Decision.

R2-1704105; 3GPP TSG-RAN WG2 #98; Hangzhou, P R. of China, May 15-19, 2017; Agenda Item: 10.4.1.4; Source: Ericsson; Title: Trade-off between HO failure and HO ping-pong rates; Document for: Discussion, Decision.

R2-1704106; 3GPP TSG-RAN WG2 #98; Hangzhou, P R. of China, May 15-19, 2017; Agenda Item: 10.4.1.4; Source: Ericsson; Title: Measurement report content; Document for: Discussion, Decision.

R2-1704235; 3GPP TSG-RAN WG2 Meeting #98; Hangzhou, China, May 15-19, 2017; Source: CATT; Title: Open issues on cell quality derivation; Agenda Item: 10.4.1.4; Document for: Discussion and Decision.

R2-1704287; 3GPP TSG-RAN WG2 Meeting #98; Hangzhou, China, May 15-19, 2017; Agenda item: 10.2.7; Source: Nokia,

(56) References Cited

OTHER PUBLICATIONS

Alcatel-Lucent Shanghai Bell; Title: PBCH and measurements; WID/SID: NR_newRAT-Core—Release 15; Document for: Discussion and Decision.
R2-1704288; 3GPP TSG-RAN WG2 Meeting #98; Hangzhou, China, May 15-19, 2017; Title: Draft LS on PBCH reception for measurement purposesRelease: Rel-15; Work Item: NR newRAT-Core; Source: [To Be RAN2] To: RAN1; CC: RAN4.
R2-1 704289; 3GPP TSG-RAN WG2 Meeting #98; Hangzhou, China, May 15-19, 2017; Agenda item: 10.4.1.4; Source: Nokia, Alcatel-Lucent Shanghai Bell; Title: RRM and beam reporting; WID/SID: NR_newRAT-Core—Release 15; Document for: Discussion and Decision.
R2-1704524; 3GPP TSG-RAN WG2 Meeting #98; Hangzhou, China, May 15-19, 2017; Agenda Item: 10.4.1.4; Source: MediaTek Inc.; Title: Measurement Model for NR; Document for: Discussion and decision.
R2-1704526; 3GPP TSG-RAN WG2 Meeting #98; Hangzhou, China, May 15-19, 2017; Agenda Item: 10.4.1.4; Source: MediaTek Inc.; Title: Cell Quality Derivation for RRM Measurements in NR; Document for: Discussion and decision.
R2-1704527; 3GPP TSG-RAN WG2 Meeting #98; Hangzhou, China, May 15-19, 2017; Agenda Item: 10.4.1.4; Source: MediaTek Inc.; Title: Beam-based Measurement Reporting for NR; Document for: Discussion and decision.
R2-1704641; 3GPP TSG-RAN WG2 Meeting #98; Hangzhou, China, May 15-19, 2017; Agenda item: 10.4.1.4; Source: ZTE; Title: Discussion on cell quality derivation from N beams; WID/SID: NR_newRAT-Core; Document for Discussion and Decision.
R2-1704643; 3GPP TSG-RAN WG2 Meeting #98; Hangzhou, China, May 15-19, 2017; Agenda item: 10.4.1.4; Source: ZTE; Title: Discussion on the measurement report; Document for: Discussion and Decision.
R2-1704765; 3GPP TSG RAN WG2 Meeting #98; Hangzhou, China, May 15-19, 2017; Agenda item: 10.4.1.4; Source: Intel Corporation; Title: Remaining issues on consolidation beams to cell quality; Document for: Discussion and Decision.
R2-1704766; 3GPP TSG RAN WG2 Meeting #98; Hangzhou, China, May 15-19, 2017; Agenda item: 10.4.1.4; Source: Intel Corporation; Title: SS block identifier reporting; Document for: Discussion and Decision.
R2-1704770; 3GPP TSG RAN WG2 Meeting #98; Hangzhou, China, May 15-19, 2017; Agenda item: 10.4.1.4; Source: Intel Corporation; Title: Issue on reading PBCH for SS block identifier reporting; Document for: Discussion and Decision.
R2-1704832; 3GPP TSG RAN WG2 Meeting #98; Hangzhou, China, May 15-19, 2017; Agenda Item: 10.4.1.3; Source: Sony; Title: RRM Measurements open issues; Document for: Discussion.
R2-1704870; 3GPP TSG-RAN WG2#98 ; Hangzhou, China, May 15-19, 2017; Agenda Item: 10.4.1.3; Source: Huawei, HiSilicon; Title: Time index indication receiving from PBCH; Document for: Discussion and decision.
R2-1704871; 3GPP TSG-RAN WG2#98; Hangzhou, China, May 15-19, 2017; Title: draft reply LS on NR Initial access; Response to: LS on NR Initial access (R2-1703926/R1-1706707); Release: Rel-15; Study Item: NR_newRAT-Core; Source: RAN WG2; To: RAN WG 1, RAN WG4.
R2-1704874; 3GPP TSG-RAN WG2#98 ; Hangzhou, China, May 15-19, 2017; Source: Huawei, HiSilicon; Title: Measurement configuration for idle RS; Agenda Item: 10.4 1.3; Document for: Discussion.
R2-1704876; 3GPP TSG-RAN WG2 Meeting #98; Hangzhou, China, USA, May 15-19, 2017; Agenda Item: 10.4.1.4; Source: Huawei, HiSilicon; Title: Measurement reporting for Idle mode RS and CSI-RS; Document for: Discussion and Decision.
R2-1704877; 3GPP TSG-RAN WG2#98; Hangzhou, China, May 15-19, 2017; Agenda Item: 10.4.1.4; Source: Huawei, HiSilicon; Title: Cell quality derivation from multiple beams; Document for: Discussion and decision.
R2-1705092; 3GPP TSG-RAN WG2 Meeting #98; Hangzhou, China, May 15-19, 2017; Agenda item: 10.4.1.4; Source: Qualcomm IncorporatedTitle: DL mobility above 6 GHz; WID/SID: NR_newRAT-Core—Release 15; Document for: Discussion and Decision.
R2-1705096; 3GPP TSG-RAN WG2 Meeting #98; Hangzhou, China, May 15-19, 2017; Agenda item: 10.4.1.4; Source: Qualcomm IncorporatedTitle: Considerations on NR beam identifier; WID/SID: NR_newRAT-Core—Release 15; Document for: Discussion and Decision.
R2-1705107; 3GPP TSG-RAN WG2 Meeting #98; Hangzhou, China, May 15-19, 2017; Agenda item: 10.4.1.4; Source: ITRI; Title: Remaining Issues of RRM Measurements; Document for: Discussion and Decision.
R2-1705241; 3GPP TSG-RAN WG2 Meeting #98; Hangzhou, China, May 15-19, 2017; Agenda item: 10.4.1.3; Source: LG Electronics Inc.; Title: Cell quality derivation in IDLE/INACTIVE; Document for: Discussion.
R2-1705381; 3GPP TSG-RAN WG2 Meeting #98; Hangzhou, China, May 15-19, 2017; Agenda item: 10.2; Source: Samsung, ITL, VIVO; Title: UE requirements before and during handover; Document for: Discussion.
R2-1705383; 3GPP TSG-RAN WG2 Meeting #98; Hangzhou, China, May 15-19, 2017; Title: [Draft] Reply LS on NR Initial access; Response to: R2-1703926 [R1-1706707]; Release: Rel-15; Work Item: NR_newRAT-Core; Source: Samsung (to be replaced by RAN2); To: RAN1; Cc: RAN4.
R2-1705396; 3GPP TSG-RAN WG2 Meeting #98; Hangzhou, China, May 15-19, 2017 (Revision of R2-1703163); Agenda item: 10.4.1.4; Source: Nokia, Alcatel-Lucent Shanghai Bell; Title: Mobility Measurements in Connected Mode; WID/SID: NR_newRAT-Core—Release 15; Document for: Discussion and Decision.
R2-1705526; 3GPP TSG-RAN2 Meeting #98; Hangzhou, China, May 15-19, 2017; Agenda item: 10.4.1.4; Source: Huawei, HiSilicon; Title: Mobility Measurement Models Considering Beamforming; Document for: Discussion and decision.
R2-1705596; 3GPP TSG RAN WG2 #98; Hangzhou, China, May 15 to 19, 2017; Agenda Item: 10.4.1.4; Souce: Samsung; Title: RRM Measurement: Is Additional Filtering Needed for L3 Moiblity?; Document for: Discussion/Decisior.
R2-1705736; 3GPP TSG RAN WG2 #98; Hangzhou, China, May 15 to 19, 2017; Agenda Item: 10.4.1.4; Souce: Samsung, NEC; Title: Way Forward for Cell Quality Derivation; Document for: Discussion/Decision.
R2-1705753; 3GPP TSG RAN WG2 #98; Hangzhou, China, May 15-19, 2017; Agenda Item: 10.4.1.4; Source: Panasonic; Title: To distinguish the NR-SS and CSI-RS in the measurement report; Document for: Discussion, Decision.
R2-1705785; 3GPP TSG-RAN WG2 Meeting #98; Hangzhou, China, May 15-19, 2017; Agenda item: 10.4.1.4; Source: CMCC; Title: Considerations on threshold for deriving cell quality; Document for: Discussion.
R2-1705792; 3GPP TSG-RAN WG2 Meeting #98; Hangzhou, China, May 15-19, 2017; Agenda Item: 10.4.1.4; Source: CMCC; Title: On the Content of Measurement Report; Document for: Discussion, Decision.
R2-1705793; 3GPP TSG-RAN WG2 Meeting #98; Hangzhou, China, May 15-19, 2017; Agenda Item: 10.4.1.4; Source: CMCC; Title: On the Numer of Beams to Derive Cell Quality; Document for: Discussion, Decision.
R2-1706054; 3GPP TSG RAN WG2 Meeting #98; Hangzhou, P R. China May 15-19, 2017; Title: draft Response LS on reading time index indication for RRM measurements; Response to: LS R1-1706707 (R2-1703926) on NR Initial access; Release: Rel-15; Work Item: NR_newRAT-Core; Source: RAN2; To: RAN1.
R2-1706145; 3GPP TSG RAN WG2 Meeting #98; Hangzhou, P R. China May 15-19, 2017; Title: draft Response LS on reading time index indication for RRM measurements; Response to: Ls R1-1706707 (R2-1703926) on NR Initial access; Release: Rel-15; Work Item: NR_newRAT-Core; Source: RAN2; To: RAN1.
R2-17xxxx; 3GPP TSG-RAN WG2 Meeting #97bis; Spokane, USA, Apr. 3-7, 2017; Agenda item: 10.3.1.4; Source: Qualcomm

(56) References Cited

OTHER PUBLICATIONS

Incorporated; Title: Prioritized random access for multiple services in NR; WID/SID: NR_newRAT-Core—Release 15; Document for: Discussion and Decision.
3GPP TS 36.331 V14.1.0 (Dec. 2016); 3rd Generation Partnership Project; Technical Specification Group Radio Access Network; Evolved Universal Terrestrial Radio Access (E-UTRA); Radio Resource Control (RRC); Protocol specification; (Release 14).
3GPP TS 36.423 V14.2.0 (Mar. 2017); 3rd Generation Partnership Project; Technical Specification Group Radio Access Network; Evolved Universal Terrestrial Radio Access Network (E-UTRAN); X2 application protocol (X2AP); (Release 14).
R2-166923; 3GPP TSG-RAN WG2 #95bis; Kaohsiung, Taiwan, Oct. 10-14, 2016; Agenda Item: 9.3.1.1; Source: Ericsson; Title: RRM measurements and mobility control in RRC Connected; Document for: Discussion, Decision.
R2-166925; 3GPP TSG-RAN WG2 Meeting #95bis; Kaohsiung, Taiwan, Oct. 10-14, 2016; Agenda Item: 9.3.1.1; Source: Ericsson; Title: Identifiers for idle mode signals 'xSS' and connected mode signals 'RS'; Document for Discussion.
R2-17003281; 3GPP TSG RAN WG2 Meeting #97bis; Spokane, USA, Apr. 3-7, 2017; (resubmission of R2-1701508); Agenda Item: 10.2 3.3; Source: Sony; Title: Fallback beam and RLF; Document for: Discussion.
R2-1702542; 3GPP TSG-RAN2 #97bis; Spokane, USA, Apr. 3-7, 2017; Agenda Item: 10.3.1.4; Source: OPPO; Title: Consideration on Random Access in NR; Document for: Discussion and Decision.
R2-1702599; 3GPP TSG-RAN WG2 Meeting #97bis; Spokane, Washington, USA, Apr. 3-7, 2017; Source: Huawei, HiSilicon; Title: Considerations on RACH procedure; Agenda Item: 10.3.1.4; Document for: Discussion and decision.
R2-1702601; 3GPP TSG-RAN WG2 #97bis; Spokane, US, Apr. 3-7, 2017; Agenda item: 10.3.1.4; Source: Huawei, HiSilicon; Title: Analysis of RACH Procedural Steps; Document for: Discussion and decision.
R2-1702655; 3GPP TSG-RAN WG2 #97bis; Spokane, USA, Apr. 3-7, 2017; Agenda Item: 10.3.1.4; Source: Ericsson; Title: Random Access in NR; Document for: Discussion, Decision.
R2-1702656; 3GPP TSG-RAN WG2 #97bis; Spokane, USA, Apr. 3-7, 2017; Agenda Item: 10.3.1.4; Source: Ericsson; Title: Indicating Message 3 size in NR Random Access; Document for: Discussion, Decision.
R2-1702657; 3GPP TSG-RAN WG2 #97bis; Spokane, USA, Apr. 3-7, 2017; Agenda Item: 10.3.1.4; Source: Ericsson; Title: Random Access Enhancements; Document for: Discussion, Decision.
R2-1702672; 3GPP TSG-RAN WG2 Meeting #97bis; Spokane, USA, Apr. 3-7, 2017; Agenda Item: 10.2.3.2; Source: Ericsson; Title: Further details of handover execution in NR; Document for: Discussion, Decision.
R2-1702673; 3GPP TSG-RAN WG2 #97bis; Spokane, USA, Apr. 3-7, 2017; Agenda Item: 10.2.3.2; Source: Ericsson; Title: Handover command and CSI-RS configuration of target; Document for: Discussion, Decision.
R2-1702677; 3GPP TSG-RAN WG2 #97bis; Spokane, USA Apr. 3-7, 2017; Agenda Item: 10.2.3.3; Source: Ericsson; Title: RLM and RLF in NR; Document for: Discussion, Decision.
R2-1702770; 3GPP TSG-RAN WG2 Meeting 97bis; Spokane, USA, Apr. 3-7, 2017; (Revision of R2-1700898); Agenda Item: 10.2.3.3; Source: MediaTek Inc.; Title: RLM and RLF in HF NR; Document for: Discussion and decision.
R2-1702791; 3GPP TSG-RAN2#97Bis Meeting; Spokane, US, Apr. 3-7, 2017; Agenda Item: 10.3.1 4; Source: MediaTek Inc.; Title: NR RACH; Document for: Discussion, Decision.
R2-1702795; 3GPP TSG-RAN WG2 #97bis; Spokane, USA, Apr. 3-7, 2017 (Update of R-1700881); Agenda Item: 10.3.1.4; Source: Ericsson; Title: Higher layer implications of beamforming during random access; Document for: Discussion.

R2-1702796; 3GPP TSG-RAN WG2 #97bis; Spokane, USA, Apr. 3-7, 2017; Agenda Item: 10.4.1.3; Source: Ericsson; Title: Measurement model and cell quality derivation in NR; Document for: Discussion, Decision.
R2-1702798; 3GPP TSG-RAN WG2 #97bis; Spokane, USA, Apr. 3-7, 2017; Agenda Item: 10.4.1.3; Source: Ericsson; Title: Report triggering for A1-A6 events; Document for: Discussion, Decision.
R2-1702799; 3GPP TSG-RAN WG2 #97bis; Spokane, USA, Apr. 3-7, 2017; Agenda Item: 10.4.1.3; Source: Ericsson; Title: Measurement report content for A1-A6 events; Document for: Discussion, Decision.
R2-1702840; 3GPP TSG RAN WG2 #97bis Meeting; Spokane, USA, Jan. 3-7, 2017; Source: ZTE, ZTE Microelectronics; Title: Consideration on the RACH procedure; Agenda Item: 10.3.1.4; Document for: Discussion and Decision.
R2-1702846; 3GPP TSG-RAN WG2 Meeting #97bis; Spokane, USA, Apr. 3-7, 2017; Agenda Item: 10.2.3.3; Source: AT&T; Title: Beam Failure (BF) and Radio Link Interruption (RLI); Document for: Discussion/Approval.
R2-1702869; 3GPP TSG-RAN WG2 Meeting #97bis; Spokane, USA, Apr. 3-7, 2017; Agenda Item: 10.3.1.4; Source: InterDigital Communications; Title: Random Access Procedure in NR; Document for: Discussion, Decision.
R2-1702875; 3GPP TSG-RAN WG2 #97bis; Spokane, USA, Apr. 3-7, 2017; Agenda Item: 10.2.3.3; Source: InterDigital Communications; Title: RLM for NR; Document for: Discussion, Decision.
R2-1702876; 3GPP TSG-RAN WG2 #97bis; Spokane, USA, Apr. 3-7, 2017; Agenda Item: 10.2.3.3; Source: InterDigital Communications; Title: RLF and Recovery Procedures for NR; Document for: Discussion, Decision.
R2-1702889; 3GPP TSG-RAN WG2 Meeting #97bis; Spokane, USA, Apr. 3-7, 2017; Agenda item: 10.3.1.4; Source: Samsung; Title: Beamformed Random Access Procedure—Access Delay Aspects; Document for: Discussion & Decision.
R2-1702890; 3GPP TSG-RAN WG2 Meeting #97bis; Spokane, USA, Apr. 3-7, 2017; Agenda item: 10.3.1.4; Source: Samsung; Title: Random Access in NR—Flexible UE Bandwidth Aspects; Document for: Discussion & Decision.
R2-1703083; 3GPP TSG-RAN WG2 #97bis; Spokane, USA, Apr. 3-7, 2017; Agenda Item: 10.2.3.2; Source: KT Corp.; Title: Discussion on UE based autonomous handover; Document for: Discussion and Decision.
R2-1703097; 3GPP TSG-RAN WG2 Meeting #97bis; Spokane, USA, Apr. 3-7, 2017; Source: CATT; Title: Beam and NR HO; Agenda Item: 10.2 3.2; Document for: Discussion and Decision.
R2-1703100; TSG-RAN WG2 Meeting #97bis; Spokane, USA, Apr. 3-7, 2017; Source: CATT; Title: Radio link failure in NR; Agenda Item: 10.2 3.3; Document for: Discussion and Decision.
R2-1703139; 3GPP TSG-RAN WG2 Meeting #97bis; Spokane, USA, Apr. 3-7, 2017; Agenda Item: 10.2.3.5; Source: ASUSTeK; Title: Control of UE beamforming in RRC_CONNECTED; Document for: Discussion and Decision.
R2-1703163; 3GPP TSG-RAN WG2 Meeting #97bis; Spokane, USA, Apr. 3-7, 2017; Agenda item: 10.4.1 .3; Source: Nokia, Alcatel-Lucent Shanghai Bell; Title: Mobility Measurements in Connected Mode; WID/SID: NR_newRAT—Release 15; Document for: Discussion and Decision.
R2-1703231; 3GPP TSG-RAN WG2 Meeting #97bis; Spokane, USA, Apr. 3-7, 2017; Agenda Item: 10.2.3.3; Source: Fujitsu; Title: Considerations on radio link failure; Document for: Discussion.
R2-1 703288; 3GPP TSG-RAN WG2 2017 RAN2#97bis Meeting; Spokane, USA, Apr. 3-7, 2017; Agenda item: 10.2.3.3; Source: Samsung; Title: RLF framework in High Frequency NR systems; Document for: Discussion & Decision.
R2-1703289; 3GPP TSG-RAN WG2 2017 RAN2#97bis Meeting; Spokane, USA, Apr. 3-7, 2017; Agenda item: 10.2.3.3; Source: Samsung; Title: RLF timer operation for High Frequency NR systems; Document for: Discussion & Decision.
R2-1703290; 3GPP TSG-RAN WG2 2017 RAN2#97bis Meeting; Spokane, USA, Apr. 3-7, 2017; Agenda item: 10.2.3.3; Source: Samsung; Title: Radio Link Monitoring in mmW systems; Document for: Discussion & Decision.

(56) References Cited

OTHER PUBLICATIONS

R2-1703377; 3GPP TSG-RAN WG2#97bis; Spokane, USA, Apr. 3-7, 2017; Source: Huawei, HiSilicon; Title: RLF for NR; Agenda Item: 10 2.3 3; Document for: Discussion and decision.
R2-1703387; 3GPP TSG-RAN WG2 Meeting #97bis; Spokane, Washington, USA, Apr. 3-7, 2017; Agenda Item: 10.4.1.3; Source: Huawei, HiSilicon; Title: Measurement configuration and reporting considering additional RS; Document for: Discussion and Decision.
R2-1703418; 3GPP TSG RAN WG2 Meeting #97bis; Spokane, USA Apr. 3-7, 2017; Agenda item: 10.4.1.3; Source Intel Corporation; Title: Measurement events and reporting for NR; Document for: Discussion and Decision.
R2-1703421; 3GPP TSG RAN WG2 Meeting #97bis; Spokane, USA Apr. 3-7, 2017; Agenda item: 10.2.3.2; Source: Intel Corporation; Title: Dedicated RACH during handover in NR; Document for: Discussion and Decision.
R2-1703423; 3GPP TSG RAN WG2#97bis; Spokane, USA, Apr. 3-7, 2017; Agenda item: 10.2.3.3; Source: Intel Corporation; Title: Radio link monitoring, beam failure and radio link failure; Document for: Discussion and decision.
R2-1703445; 3GPP TSG-RAN WG2 97bis meeting; Spokane, Washington, USA, Apr. 3-7, 2017; Agenda item: 10.3.1.4; Source: Intel Corporation; Title: Considerations of random access procedure in multiple and single beam scenarios; Document for: Discussion and Decision.
R2-1703533; 3GPP TSG-RAN WG2 Meeting #97bis; Spokane, USA, Apr. 3-7, 2017; Agenda Item: 10.3.1.4; Source: MediaTek Inc.; Title: Access Backoff; Document for: Discussion and decision.
R2-1703553; 3GPP TSG-RAN WG2 Meeting #97bis; Spokane, USA, Apr. 3-7, 2017; Agenda item: 10.3.1.4; Source: Nokia, Alcatel-Lucent Shanghai Bell; Title: RACH in Multibeam System; WID/SID: NR_newRAT—Release 15 Document for: Discussion and Decision.
R2-1703554; 3GPP TSG-RAN WG2 Meeting #97bis; Spokane, USA, Apr. 3-7, 2017; Agenda item: 10.2.3.3; Source: Nokia, Alcatel-Lucent Shanghai Bell; Title: Radio Link Monitoring and Beam Recovery in NR; WID/SID: NR_newRAT—Release 15; Document for: Discussion and Decision.
R2-1703563; 3GPP TSG-RAN WG2 Meeting #97bis; Spokane, USA, Apr. 3-7, 2017; Agenda item: 10.2.3.3; Source: Qualcomm IncorporatedTitle: Considerations of RLM and RLF in NR; WID/SID: NR_newRAT-Core—Release 15; Document for: Discussion and Decision.
R2-1703565; 3GPP TSG-RAN WG2 Meeting #97bis; Spokane, USA, Apr. 3-7, 2017; Agenda item: 10.2.3.2; Source: Qualcomm Incorporated; Title: Beam-aware Intra-NR mobility with RRC involvement; WID/SID: NR_newRAT-Core—Release 15; Document for: Discussion and Decision.
R2-1703569; 3GPP TSG-RAN WG2 Meeting #97bis; Spokane, USA, Apr. 3-7, 2017; Agenda item: 10.2.3.3; Source: Qualcomm Incorporated; Title: SCG-RLF handling in EN-DC; WID/SID: NR_newRAT-Core—Release 15; Document for: Discussion and Decision.
R2-1703570; 3GPP TSG-RAN WG2 Meeting 97bis; Spokane, USA, Apr. 3-7, 2017; Agenda item: 10.3.1.4; Source: Qualcomm Incorporated; Title: Considerations on RA procedure in NR; WID/SID: NR_newRAT-Core—Release 15; Document for: Discussion and Decision.
R2-1703630; 3GPP TSG-RAN2 Meeting #97bis; Spokane, U.S.A., Apr. 3-7, 2017 (Resubmission of R2-1700513) Agenda item: 10.2 3.3; Source: LG Electronics Inc.; Title: RLM and RLF; Document for: Discussion and Decision.
International Search Report in the international application No. PCT/US2018/031216, dated Aug. 29, 2018.
English Translation of the Written Opinion of the International Search Authority in the international application No. PCT/US2018/031216, dated Aug. 29, 2018.
Non-Final Office Action after RCE of the U.S. Appl. No. 15/972,034, dated Oct. 27, 2020.

Non-Final Office Action of the U.S. Appl. No. 15/972,026, dated Jun. 27, 2019.
Notice of Allowance of the U.S. Appl. No. 15/972,026, dated Nov. 20, 2019.
Non-Final Office Action of the U.S. Appl. No. 16/832,730, dated Sep. 17, 2020.
Non-Final Office Action of the U.S. Appl. No. 15/972,024, dated Jun. 28, 2019.
Notice of Allowance of the U.S. Appl. No. 15/972,024, dated Nov. 18, 2019.
Non-Final Office Action of the U.S. Appl. No. 16/832,689, dated Oct. 5, 2020.
R2-1 800086 Issues and Corrections for Beam Failure Recovery Request Procedure; 3GPP TSG-RAN2 AH-1801R2-1800086; Vancouver, Canada, Jan. 22-Jan. 26, 2018; Agenda item:10.3.1.4.2; Source: Samsung; Title: Issues/Corrections: Beam Failure Recovery Request Procedure.
R2-1800095 Draft CR Corrections for Beam Failure Recovery Request Procedure; 3GPP TSG-RAN WG2 AH-1801R2-1800095; Vancouver, Canada, Jan. 22-Jan. 26, 2018; CR-Form-v11.2; Change Request.
R2-1800146; 3GPP TSG-RAN WG2 NR Ad hoc 0118; Vancouver, Canada, Jan. 22-Jan. 26, 2018; Title: Draft Reply LS to RAN1 on beam recovery failure; Response to; Release: Rel-15.
R2-1800160; 3GPP TSG-RAN WG2 NR Ad hoc 0118; Vancouver, Canada, Jan. 22-Jan. 26, 2018; Source: CATT; Title: BWP for Beam Failure Recovery; Agenda Item: 10.3.1.4.2.
R2-1800206 Further consideration on RLF indication; 3GPP TSG-RAN WG2 Ad HocR2-1800206 Vancouver, Canada,Jan. 22-Jan. 26, 2018Resubmission of R2-1712734; Agenda item:10.3.2.3; Source: Huawei, HiSilicon; Title: Further consideration on RLF indication.
R2-1800236 Random access failure consideration for SUL; 3GPP TSG-RAN2 NR AH-1801 R2-1800236 Vancouver, Canada, Jan. 22-26, 2018; Agenda Item: 10.2.8; Source: Xiaomi.
R2-1800274 Discussions on the IS and OOS counting procedure; 3GPP TSG-RAN WG NR Ad hoc 0118R2-1800274 Vancouver, Canada, Jan. 22-Jan. 26, 2018; Agenda item:10.2.8; Source: Spreadtrum Communications; Title: Discussions on the IS and OOS counting procedure.
R2-1800314 RLF; 3GPP TSG-RAN WG2 NR Ad hoc 1801 R2-1800314 Vancouver, Canada, Jan. 22-Jan. 26, 2018; Agenda Item: 10.2 8; Source: Fujitsu; Title: Link reconfiguration and RLM/RLF; Document for: Decision.
R2-1800513; 3GPP TSG-RAN WG2# AH-1801; Vancouver, Canada, Jan. 22-26, 2018; Source: Huawei, HiSilicon; Titte: RLF with beam failure recovery; Agenda Item:10.2 8.
R2-1800592-Beam recovery impact to RLF triggering, 3GPP TSG-RAN WG2 NR AH#3Tdoc R2-1800592 Vancouver, Canada, Jan. 22-26, 2018 (Update of R2-1713588); Agenda Item:10.2.8 Mobility-RLM, RLF; Source: Ericsson; Title: Beam recovery impact to RLF triggering.
3GPP TSG-RAN WG2 Ad Hoc; R2-1800632; Vancouver, Canada, Jan. 22-Jan. 26, 2018.
R2-1800646 RLM RLF Considering Beam Failure Recovery; 3GPP TSG-RAN WG2 Meeting AH-1801R2-1800646 Vancouver, Canada, Jan. 22-26, 2018(Revision of R2-1710881); Agenda Item: 10.2.8; Source: MediaTek Inc., Qualcomm Incorporated.
R2-1800652 Further Clarification on Beam Failure Recovery Procedure; 3GPP TSG-RAN WG2 Meeting AH-1801R2-1800652; Vancouver, Canada, Jan. 22-26, 2018; Agenda Item: 10.3.1.4.2; Source: MediaTek Inc; Title: Further Clarification on Beam Failure Recovery Procedure.
R2-1800660 Draft CR for Beam Failure Recovery Procedure; 3GPP TSG-RAN WG2 Meeting AH-1801R2-1800660 Vancouver, Canada, Jan. 22-26, 2018; CR-Form-v11.2, Change Request.
R2-1800780 Prioritized random access for beam failure recovery; 3GPP TSG-RAN WG2 Meeting NR AH 1801R2-1800780; Vancouver, Canada, Jan. 22-26, 2018; Agenda item: 10.3.1.4.3; Source: Lenovo, Motorola Mobility.
R2-1800865_RLM RLF in NR; 3GPP TSG-RAN WG2 NR Ad hoc 1801R2-1800865; Vancouver, Canada, Jan. 22-26, 2018(Revision of R2-1712753); Source: vivo; Title: RLM/RLF in NR; Agenda Item: 10.2.8.

(56) References Cited

OTHER PUBLICATIONS

R2-1800866_RACH configuration for beam recovery; 3GPP TSG-RAN WG2 NR Ad hoc 1801 R2-1800866 Vancouver, Canada, Jan. 22-26, 2018(Resubmission of R2-1712754); Source: vivo; Title: RACH configuration or beam recovery, Agenda Item: 10.3.1.4.2.

R2-1800867_Clarification on beam failure recovery and text proposal; 3GPP TSG-RAN WG2 NR Ad hoc 1801R2-1800867; Vancouver, Canada, Jan. 22-26, 2018; Source: vivo; Title: Clarification on beam failure recovery and text proposal; Agenda Item: 10.3.1.4.3.

R2-1800887_Clarification on the measurement used for the beam selection; 3GPP TSG-RAN WG2 Meeting #100R2-1 800887; Reno, USA, Nov. 27-Dec. 1, 2017; Source: vivo; Title: Clarification on the measurement used for the beam selection; Agenda Item: 10.3.1 .4.2.

R2-1800895; 3GPP TSG-RAN WG2 NR Ad hoc 1801; R2-1800895; Vancouver, Canada, Jan. 22-26, 2018; Source: vivo; Title: Discussion on the impact on beam failure recovery; Agenda Item: 10.3.1.4.3.

R2-1800963 Clarifications to beam recovery procedure; 3GPP TSG-RAN WG2 NR Ad hoc 1801R2-1800963 Vancouver, Canada, Jan. 22-26, 2018; Agenda item: 10 3.1.4.2; Source: Nokia, Nokia Shanghai Bell.

R2-1800964 Draft CR to 38.321 on Beam recovery procedure; 3GPP TSG-RAN WG2 NR Ad hoc 1801R2-1800964 Vancouver, Canada, Jan. 22-26, 2018; CR-Form-V11.2; Draft Change Request.

R2-1800974 On SR Procedure in the case of beam failure; 3GPP TSG-RAN WG2 NR Ad hoc 0118R2-1800974 Vancouver, Canada, Jan. 22-Jan. 26, 2018; Agenda item: 10.3.1.5; Source: Huawei, HiSilicon; Title: On SR procedure in the case of beam failure.

R2-1800992 correction for beam failure recovery response reception; 3GPP TSG-RAN WG2#AH-1801R2-1800992 Vancouver, Canada, Jan. 22-26, 2018; CR-Form-v11.1; Change Request.

R2-1800993 Remaining issues in RA with multiple beam operations: 3GPP TSG-RAN2 Meeting #AHR2-1800993 Vancouver, Canada, Jan. 22-26, 2018; Agenda Item:10.3.1.4.2; Source: Huawei, HiSilicon; Title: Remaining issues in RA with multi-beam operations; Document for: Discussion and decision.

R2-1800994 Corrections for RA procedure with multi-beam operation; 3GPP TSG-RAN WG2 Meeting #AH1801R2-1800994; Vancouver, Canada, Jan. 22-26, 2018; CR-Form-V11.1; Change Request.

R2-1801009 General consideration on the RA procedure for beam failure recovery; 3GPP TSG-RAN2 Meeting #AH-1801R2-1801009; Vancouver, Canada, Jan. 22-26, 2018; Agenda Item:10.3.1.4.3; Source: Huawei, HiSilicon; Title: General consideration on RA procedure for beam failure recovery; Document for: Discussion and decision.

R2-1801027 Impact of Beam Failure Recovery on RLF related actions; 3GPP TSG-RAN WG2 NR Ad hoc 1801R2-1801027; Vancouver, Canada, Jan. 22-26, 2018; Agenda item: 10.2.8.; Source: Nokia, Nokia Shanghai Bell.

R2-1801028 CR for impact of Beam Failure Recovery on RLF related actions; 3GPP TSG-RAN WG2 NR Ad hoc 1801 R2-1801028, Vancouver, Canada, Jan. 22-26, 2018; CR-Form-v11.2; Draft Change Request.

R2-1801049 non-contention based random access for beam failure recovery; 3GPP TSG-RAN WG2#AH-1801R2-1801049; Vancouver, Canada, Jan. 22-26, 2018; Source: Huawei, HiSilicon; Title: non-contention based random access for beam failure recovery in CA; Agenda Item:10.3.1.4.3.

R2-1801050 CR on non-contention based random access for beam failure recovery; 3GPP TSG-RAN WG2#AH-1801R2-1801050; Vancouver, Canada, Jan. 22-26, 2018; CR-Form-v111; Change Request.

R2-1801215-Beam Failure and RLM; 3GPP TSG-RAN WG2 NR Ad hoc 1801 R2-1801215 Vancouver, Canada, Jan. 22-Jan. 26, 2018; Source: AT&T; Title: Impact of beam failure and recovery on RLM procedures; Agenda Item: 10.2.8.

R2-1801255-Measurement reporting and beam refinement during RACH; 3GPP TSG-RAN WG2 Meeting Ad-hocR2-1801255; Vancouver, Canada, Jan. 22-26, 2018 (Revision of R2-1711350); Agenda item: 10.3.1.4.2; Source: Qualcomm Incorporated; Title: Measurement reporting and beam refinement during RACH.

R2-1801269-Beam refinement after beam recovery or scheduling request; 3GPP TSG-RAN WG2 Meeting #100R2-1801269; Vancouver, Canada, Jan. 22-26, 2018 (Resubmission of R2-1713894); Agenda item:10.3.1.4.2; Source: Qualcomm Incorporated; Title: Beam refinement after beam recovery or scheduling request.

R2-1801278-Value range of RLF timer, 3GPP TSG-RAN WG2 Meeting #100R2-1801278 Vancouver, Canada, Jan. 22-26, 2018; Agenda item:10 4.1 4.1; Source: Qualcomm Incorporated; Title: Value range of RLF timer.

R2-1801300 RLF considering Beam Recovery Failure; 3GPP TSG-RAN WG2 NR Ad HocR2-1801300 Vancouver, Canada, Jan. 22-26, 2018 Revision of R2-1711417; Agenda Item: 10.2.8; Source: LG Electronics Inc.; Title: RLF considering Beam Recovery Failure.

R2-1801404 Beam failure recovery_r4; 3GPP TSG-RAN WG2 NR Ad hoc 1801 R2-1801404 Vancouver, Canada, Jan. 22-Jan. 26, 2018; Source: NTT DoCoMo, Inc.; Title: Discussion on Beam failure recovery; Document for: Discussion and decisions, Agenda Item: 10.3.1.4.3.

R2-1801405 Draft CR to 38.321 on Clarification on beam failure recovery r1; 3GPP TSG-RAN WG2 NR Ad hoc 1801R2-1801405; Vancouver, Canada, Jan. 22-Jan. 26, 2018; CR-Form-v11.2; Change Request.

R2-1801413; Regarding aperiodic indications from beam failure recovery to assist RLF; 3GPP TSG-RAN WG2 2018 RAN2 Ad-hoc Meeting R2-1801413; Vancouver, Canada, Jan. 21-25, 2018(Revision of R2-1713792); Agenda Item: 10.2.8; Source: Samsung.

R2-1801443 CR on random access resource selection for beam failure recovery; 3GPP TSG-RAN WG2 Meeting NR ad-hoc #1R2-1801443; Vancouver, Canada, Jan. 22-26, 2018; CR-Form-v11.2; Change Request.

R2-1801476 MAC and PHY operation for beam failure recovery request; 3GPP TSG-RAN WG2 NR Ad hoc 1801R2-1801476; Vancouver, Canada, Jan. 22-Jan. 26, 2018; Agenda Item: 10.3.1.4.2 (NR_newRAT-Core); Source: LG Electronics Inc.

Notice of Allowance of the U.S. Appl. No. 16/832,689, dated Apr. 16, 2021, (28p).

Notice of Allowance of the U.S. Appl. No. 16/832,730, dated Apr. 20, 2021, (28).

Notice of Allowance of the U.S. Appl. No. 16/277,062, dated Apr. 28, 2021, (27p).

3GPP TSG-RAN WG2 NR Ad hoc 0118 R2-1800255; Vancouver, Canada, Jan. 22-Jan. 26, 2018.

3GPP TSG-RAN WG2 NR Ad Hoc R2-1801513; Vancouver, Canada, Jan. 22-26, 2018.

3GPP TSG-RAN WG2 NR Ad Hoc #3 R2-1801477; Vancouver, Canada, Jan. 22-26, 2018.

3GPP TS 38.321 V15.0.0 (Dec. 2017) Technical Specification 3rd Generation Partnership Project; Technical Specification Group Radio Access Network; NR; Medium Access Control (MAC) protocol specification (Release 15).

Non-Final Office Action of the U.S. Appl. No. 16/277,062, dated May 5, 2020.

Final Office Action of the U.S. Appl. No. 16/277,062, dated Dec. 31, 2020.

Non-Final Office Action of the U.S. Appl. No. 15/972,034, dated Oct. 16, 2019.

Final Office Action of the U.S. Appl. No. 15/972,034. dated May 28, 2020.

Notice of Advisory Action of the U.S. Appl. No. 15/972,034, dated Aug. 11, 2020.

Notice of Advisory Action of the U.S. Appl. No. 15/972,034, dated Sep. 11, 2020.

* cited by examiner

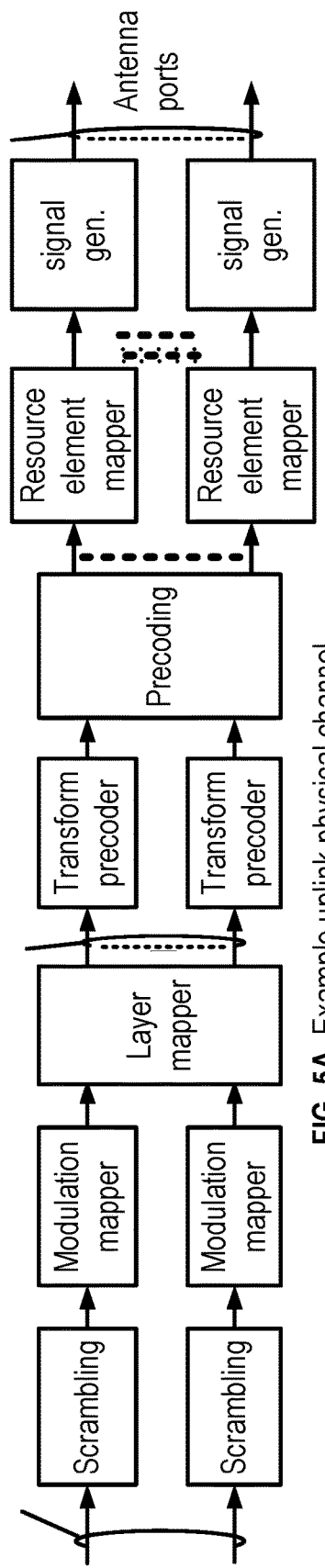
FIG. 5A Example uplink physical channel
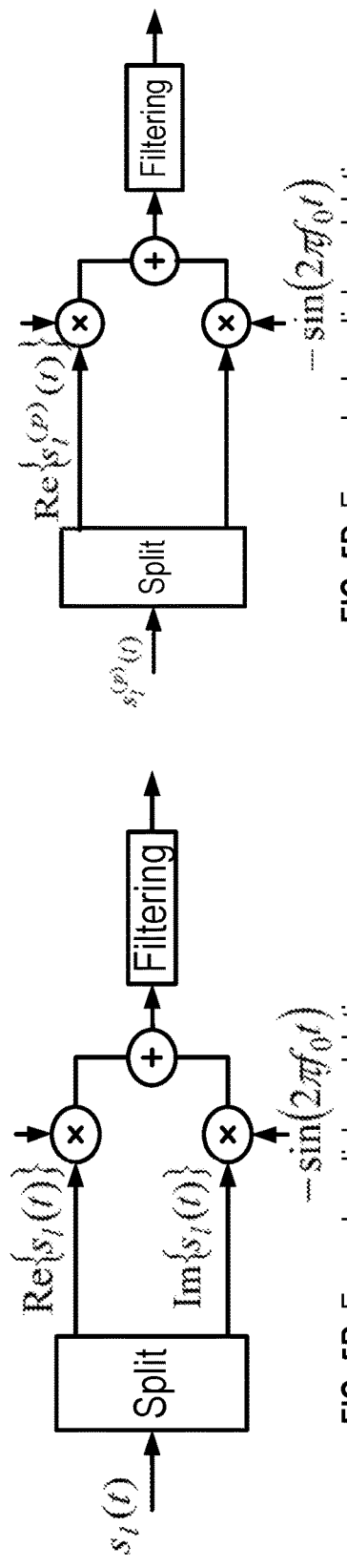
FIG. 5B Example uplink modulation
FIG. 5D Example downlink modulation
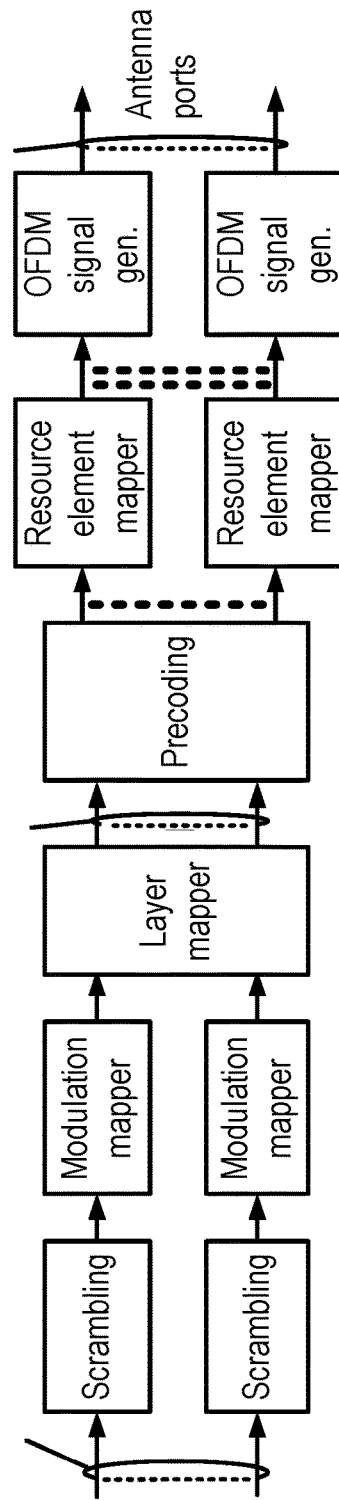
FIG. 5C Example downlink physical channel FIG. 7 Dual-Connectivity- two MAC entities at UE side Example 1: 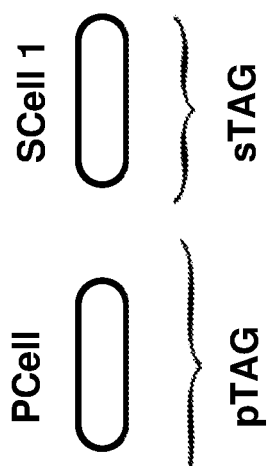
Example 2: 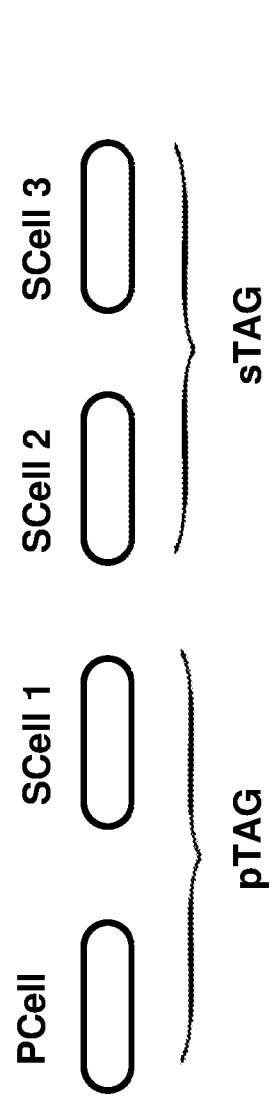
Example 3: 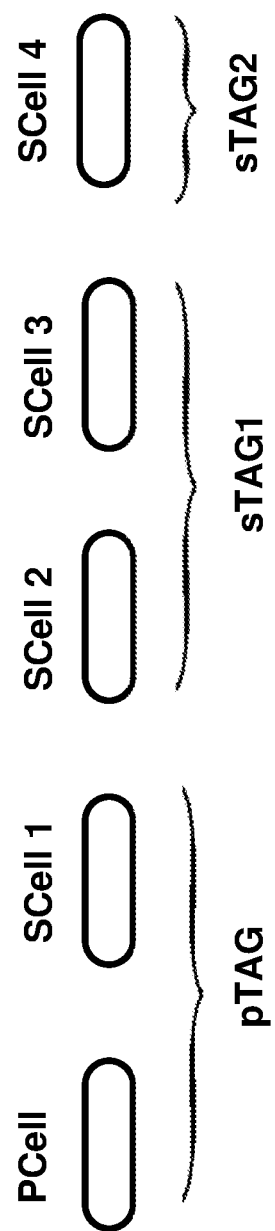
FIG. 8 gNB connected to NGC eLTE eNB connected to NGC

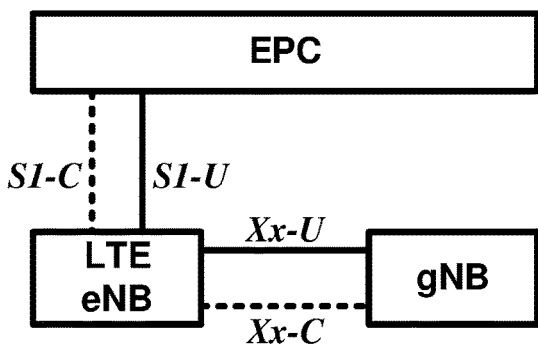

LTE eNB connected to EPC with non-standalone gNB.
gNB user plane connected to EPC via LTE eNB.

FIG. 11A

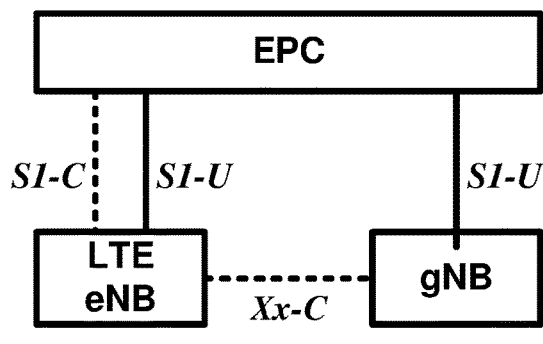

LTE eNB connected to EPC with non-standalone gNB.
gNB user plane connected to EPC directly.

FIG. 11B

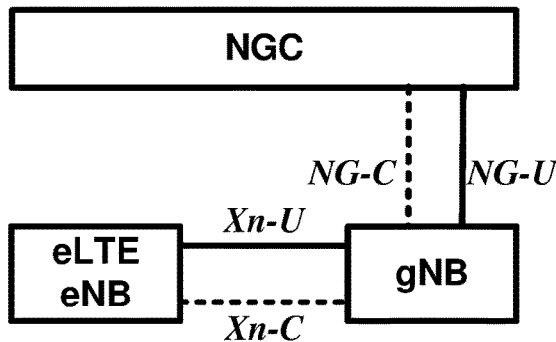

gNB connected to NGC with non-standalone eLTE eNB.
eLTE eNB user plane connected to NGC via gNB.

FIG. 11C

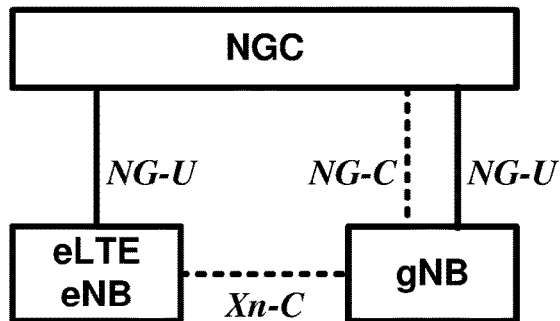

gNB connected to NGC with non-standalone eLTE eNB.
eLTE eNB user plane connected to NGC directly.

FIG. 11D

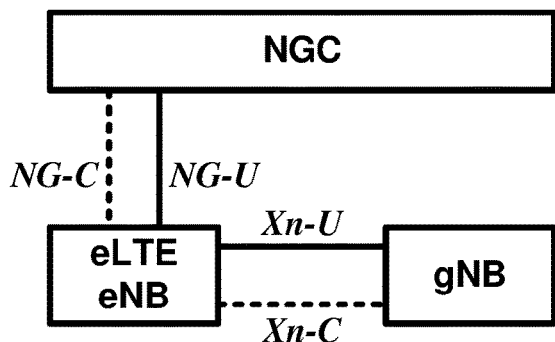

eLTE eNB connected to NGC with non-standalone gNB.
gNB user plane connected to NGC via eLTE eNB.

FIG. 11E

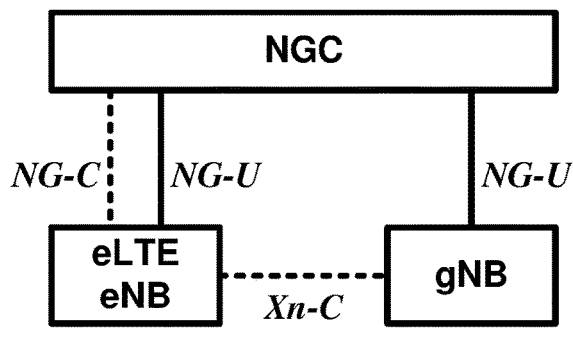

eLTE eNB connected to NGC with non-standalone gNB.
gNB user plane connected to NGC directly.

FIG. 11F

Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

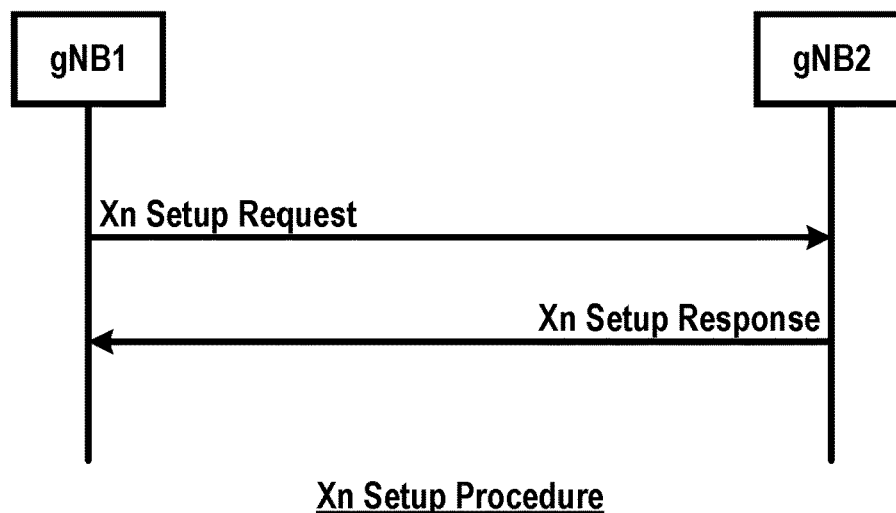
Xn Setup Procedure
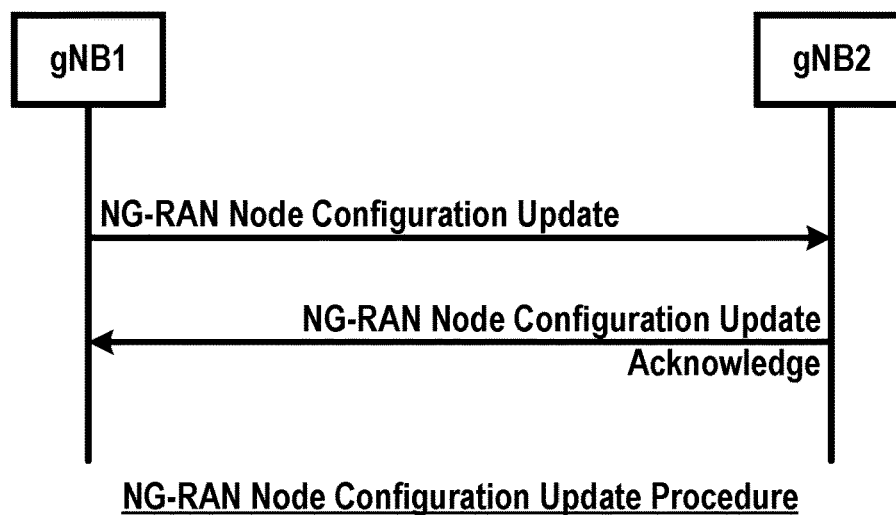
NG-RAN Node Configuration Update Procedure
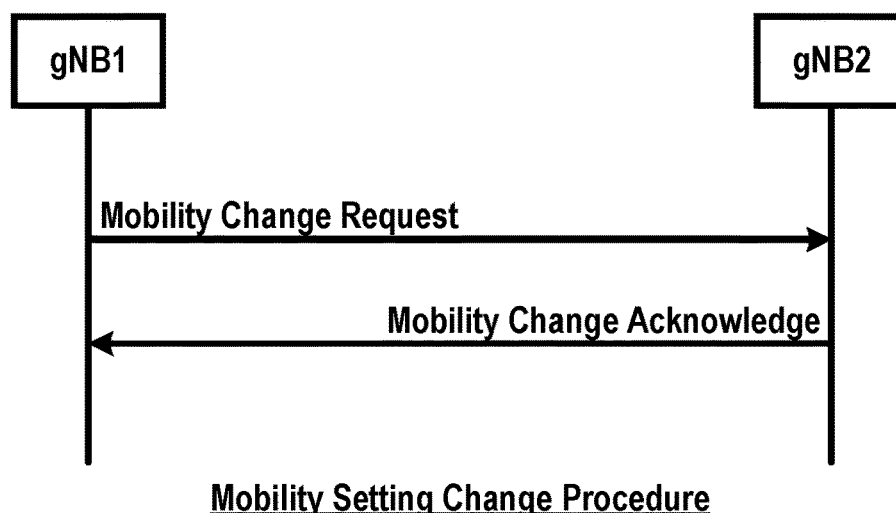
Mobility Setting Change Procedure
FIG. 17

Receive, by a 1st base station from a 2nd base station, a 1st
message comprising configuration information indicating a 1st
number of a 1st quantity of beams for measuring a quality of a 1st
cell of the 2nd base station
6110

Transmit, by the 1st base station to a wireless device, a 2nd
message comprising measurement configuration parameters
indicating the 1st number of the 1st quantity of beams for
measuring the quality of the 1st cell by the wireless device
6120

Receive, by the 1st base station from the wireless device, a
measurement report indicating the quality of the 1st cell measured
based on the 1st number of beams
6130

FIG. 61

Receive, by a wireless device from a 1st base station, measurement configuration parameters of a measurement of the wireless device, the measurement configuration parameters comprising: 1st beam identifiers of 1st beam(s); 2nd beam identifiers of 2nd beam(s); and a 1st measurement event indicating that a 2nd combined reference signal measurement value of the 2nd beam(s) exceeds a 1st combined reference signal measurement value of the 1st beam(s) by more than a 1st offset value
6210

Monitor, by the wireless device, the 1st beam(s) and the 2nd beam(s) to determine an occurrence of the 1st measurement event
6220

Transmit, by the wireless device to the 1st base station, a measurement report in response to the occurrence of the 1st measurement event, the measurement report comprising: the 1st combined reference signal measurement value of the 1st beam(s); and the 2nd combined reference signal measurement value of the second beam(s)
6230

FIG. 62

Transmit, by a 1st base station to a wireless device, measurement configuration parameters of a measurement of the wireless device, the measurement configuration parameters comprising: 1st beam identifiers of 1st beam(s); 2nd beam identifiers of 2nd beam(s); and a 1st measurement event indicating that a 2nd combined reference signal measurement value of the 2nd beam(s) exceeds a 1st combined reference signal measurement value of the 1st beam(s) by more than a 1st offset value
6310

Receive, by the 1st base station to the wireless device, a measurement report in response to an occurrence of the 1st measurement event based on monitoring, by the wireless device, the 1st beam(s) and the 2nd beam(s), where the measurement report comprises: the 1st combined reference signal measurement value of the 1st beam(s); and the 2nd combined reference signal measurement value of the 2nd beam(s)
6320

FIG. 63

Receive, by a 2nd base station from a 1st base station, a 1st message comprising neighbor beam information of a 1st cell of the 1st base station, where the neighbor beam information comprises: a neighbor cell identifier of a neighbor cell of the 1st cell; a 1st beam index of a 1st beam of the 1st cell; and neighbor beam index(es) of neighbor beam(s) of the 1st beam of the 1st cell, where the neighbor beam(s) are associated with a 3rd base station
6610

Make, by the 2nd base station, a handover decision for a wireless device towards the 1st cell based on the neighbor beam information
6620

Transmit, by the 2nd base station to the 1st base station, a handover request for the wireless device in response to the handover decision
6630

FIG. 66

Send, by a 1st base station from a 2nd base station, a 1st message comprising neighbor beam information of a 1st cell of the 1st base station, where the neighbor beam information comprises: a neighbor cell identifier of a neighbor cell of the 1st cell; a 1st beam index of a 1st beam of the 1st cell; and neighbor beam index(es) of neighbor beam(s) of the 1st beam of the 1st cell, where the neighbor beam(s) are associated with a 3rd base station
6710

Receive, by the 1st base station from the 2nd base station, a 2nd message indicating a response to the 1st message
6720

Receive, by the 1st base station from the 2nd base station, a handover request for a handover of a wireless device towards the 1st cell based on the neighbor beam information
6730

FIG. 67

Receive, by a 2nd base station from a 1st base station, a 1st message comprising neighbor beam information of a 1st cell of the 1st base station, where the neighbor beam information comprises: a neighbor cell identifier of a neighbor cell of the 1st cell; a 1st beam index of a 1st beam of the 1st cell; and neighbor beam index(es) of neighbor beam(s) of the 1st beam of the 1st cell, where the neighbor beam(s) are associated with a 3rd base station
6810

Make, by the 2nd base station, a handover decision for a wireless device towards the1st cell based on the 1st message
6820

Transmit, by the 2nd base station to the 1st base station, a handover request for the wireless device in response to the handover decision
6830

FIG. 68

Receive, by a 2nd base station from a 1st base station, a 1st message comprising neighbor beam information of a 1st cell of the 1st base station, where the neighbor beam information comprises: a neighbor cell identifier of a neighbor cell of the 1st cell; a 1st beam index of a 1st beam of the 1st cell; and neighbor beam index(es) of neighbor beam(s) of the 1st beam of the 1st cell
6910

Make, by the 2nd base station, a handover decision for a wireless device towards the1st cell based on the neighbor beam information
6920

Transmit, by the 2nd base station to the 1st base station, a handover request for the wireless device in response to the handover decision
6930

FIG. 69

BEAM-BASED CONNECTION FAILURE REPORT

This application claims the benefit of Provisional Application No. 62/501,413, filed May 4, 2017, Provisional Application No. 62/501,428, filed May 4, 2017, Provisional Application No. 62/501,454, filed May 4, 2017, Provisional Application No. 62/501,471, filed May 4, 2017, Provisional Application No. 62/516,372, filed Jun. 7, 2017, Provisional Application No. 62/516,375, filed Jun. 7, 2017, and Provisional Application No. 62/516,382, filed Jun. 7, 2017, which are hereby incorporated by reference in its entirety

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 17 is an example diagram as per an aspect of an embodiment of the present disclosure.

FIG. 61 is a flow diagram of an aspect of an embodiment of the present disclosure.

FIG. 62 is a flow diagram of an aspect of an embodiment of the present disclosure.

FIG. 63 is a flow diagram of an aspect of an embodiment of the present disclosure.

FIG. 66 is a flow diagram of an aspect of an embodiment of the present disclosure.

FIG. 67 is a flow diagram of an aspect of an embodiment of the present disclosure.

FIG. 68 is a flow diagram of an aspect of an embodiment of the present disclosure.

FIG. 69 is a flow diagram of an aspect of an embodiment of the present disclosure.

DETAILED DESCRIPTION OF EMBODIMENTS

Figure 1:
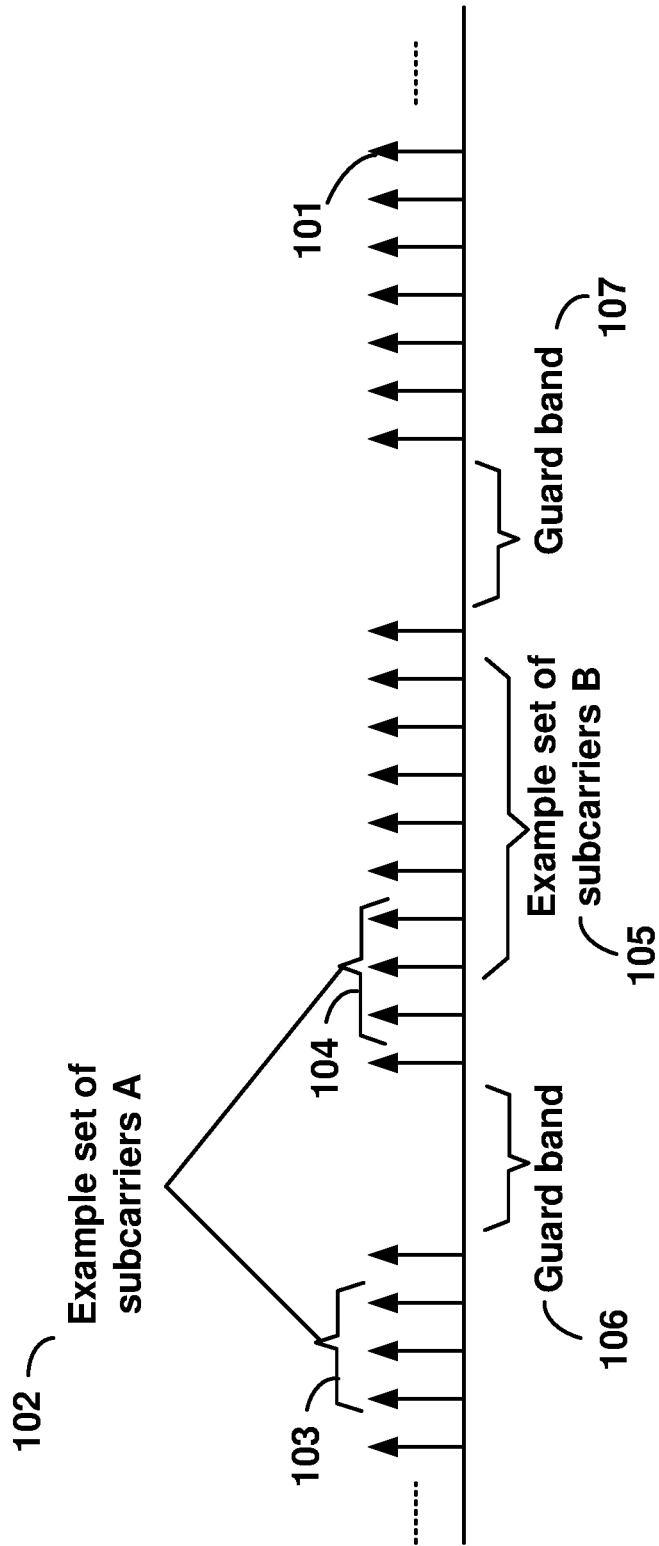
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
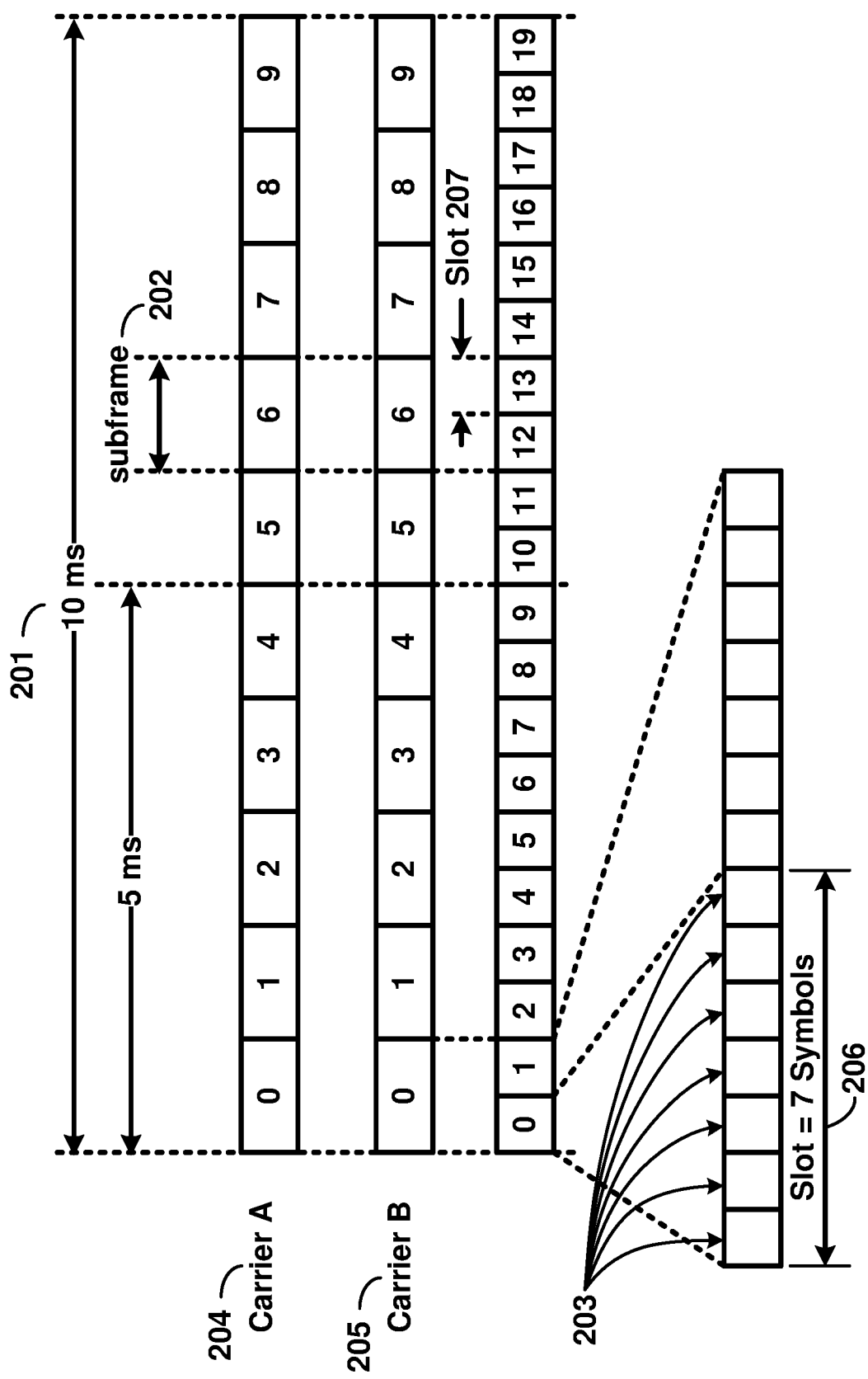
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
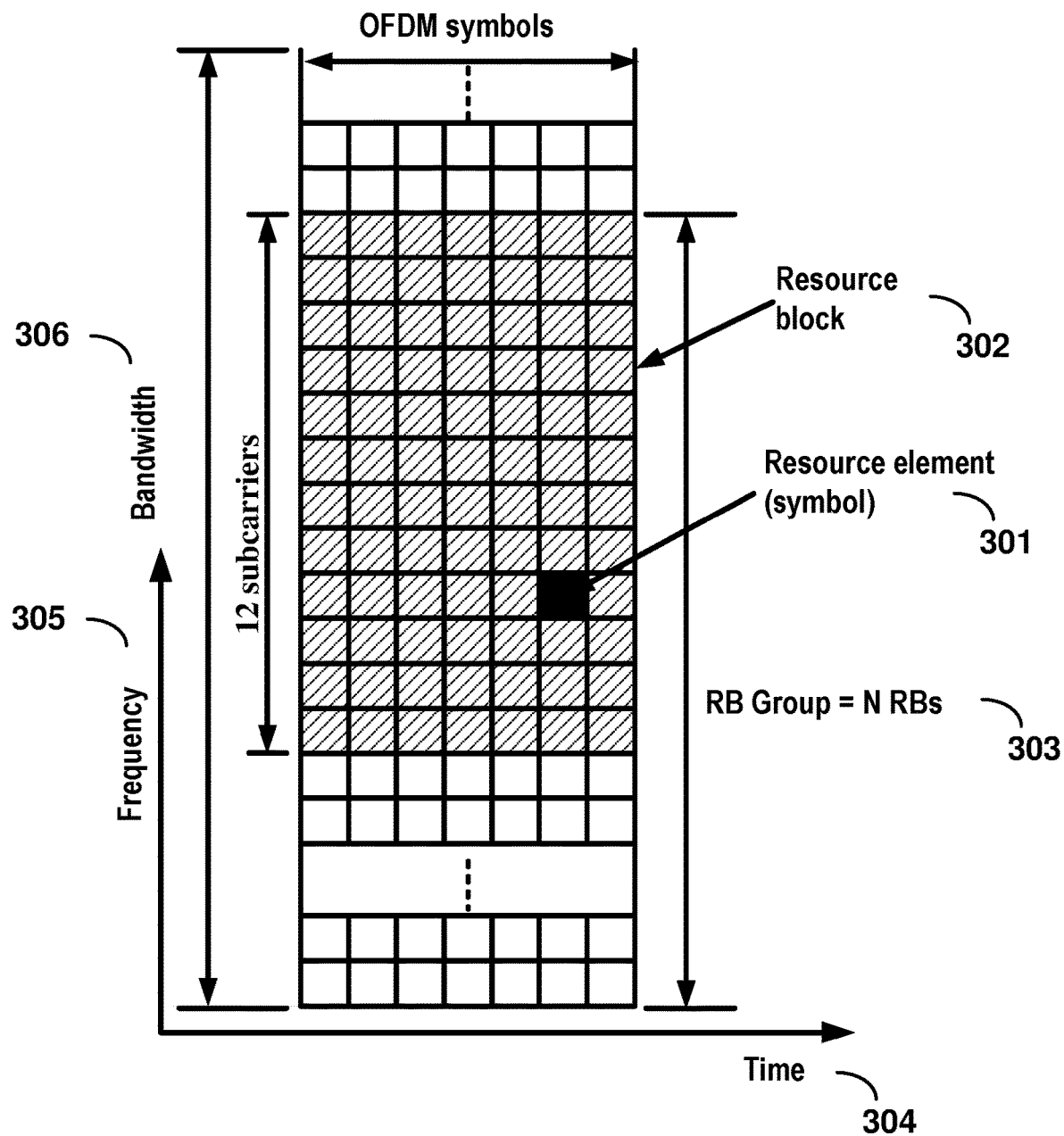
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
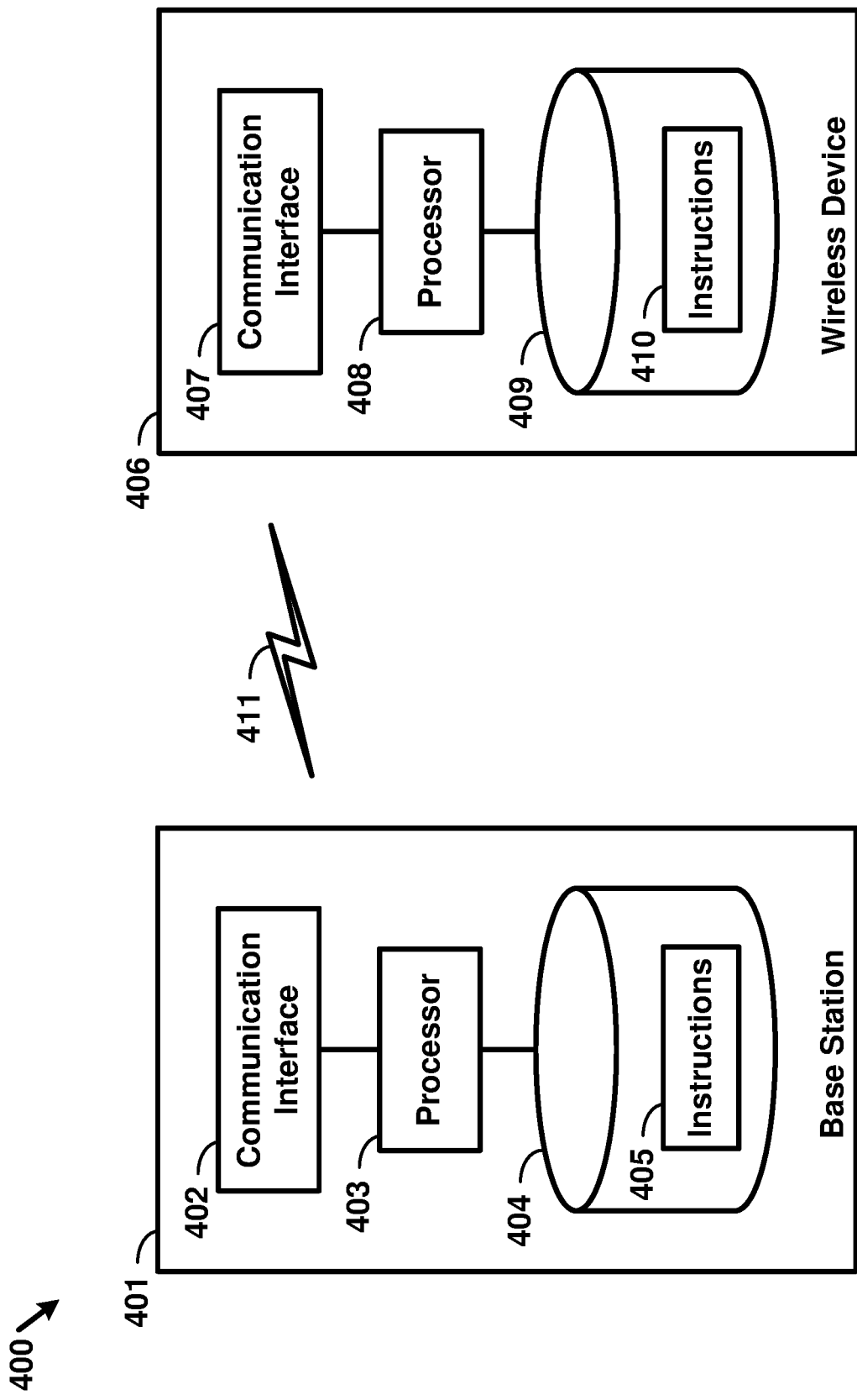
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
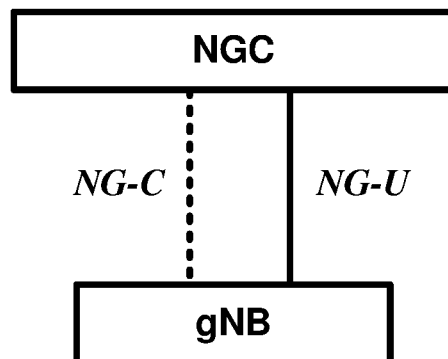
FIG. 10A and FIG. 10B are example diagrams for interfaces between a 5G core network (e.g. NGC) and base stations (e.g. gNB and eLTE eNB) as per an aspect of an embodiment of the present invention.
Figure 10B:
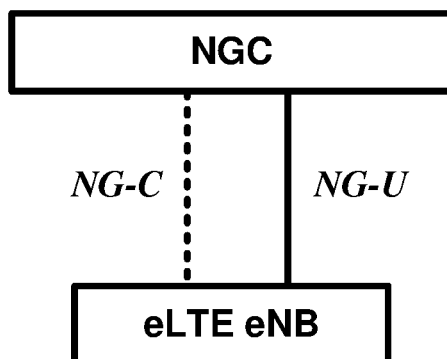

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

CA and Multi-Connectivity

Figure 6:
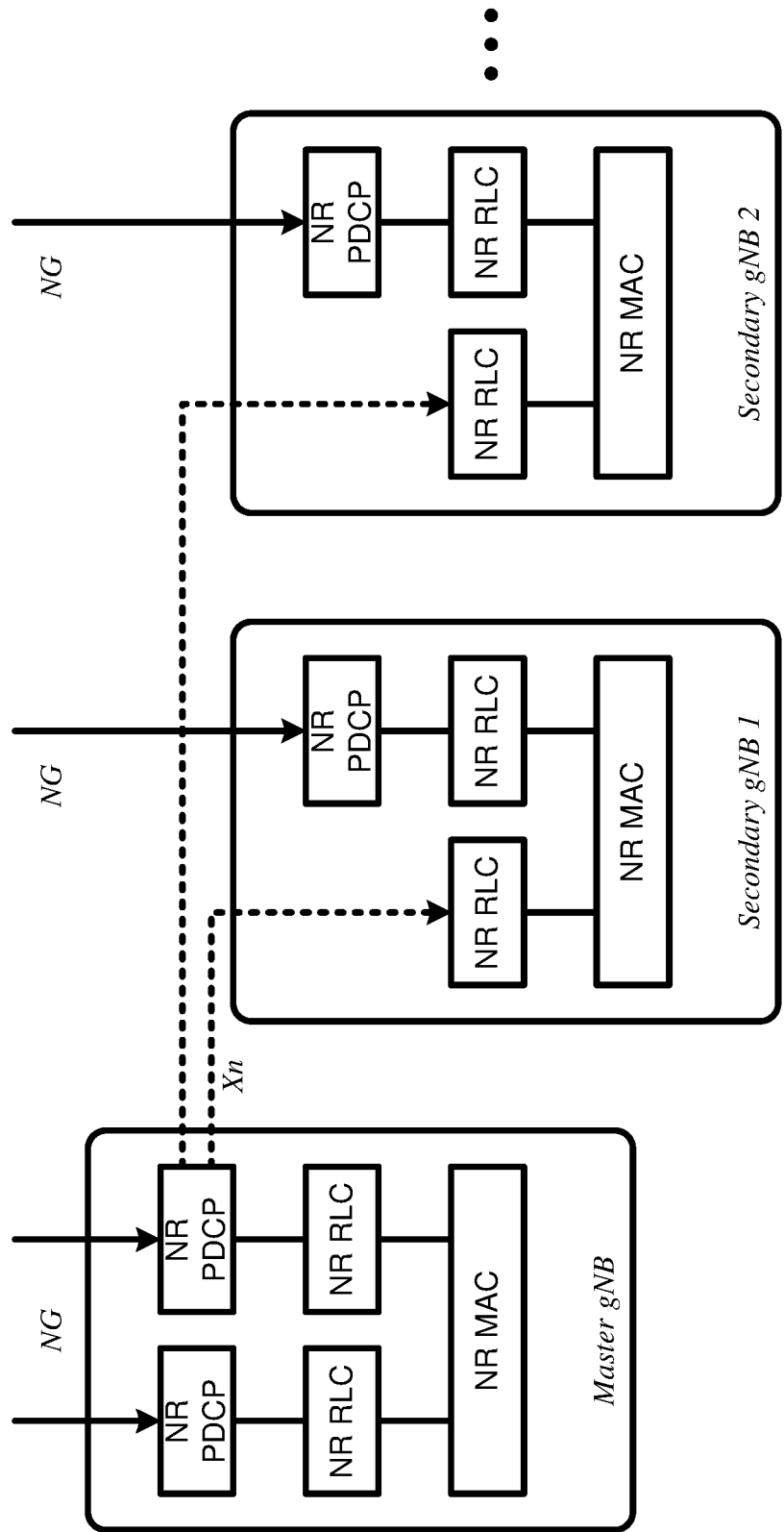
FIG. 6 is an example diagram for a protocol structure with multi-connectivity as per an aspect of an embodiment of the present invention.
Figure 7:
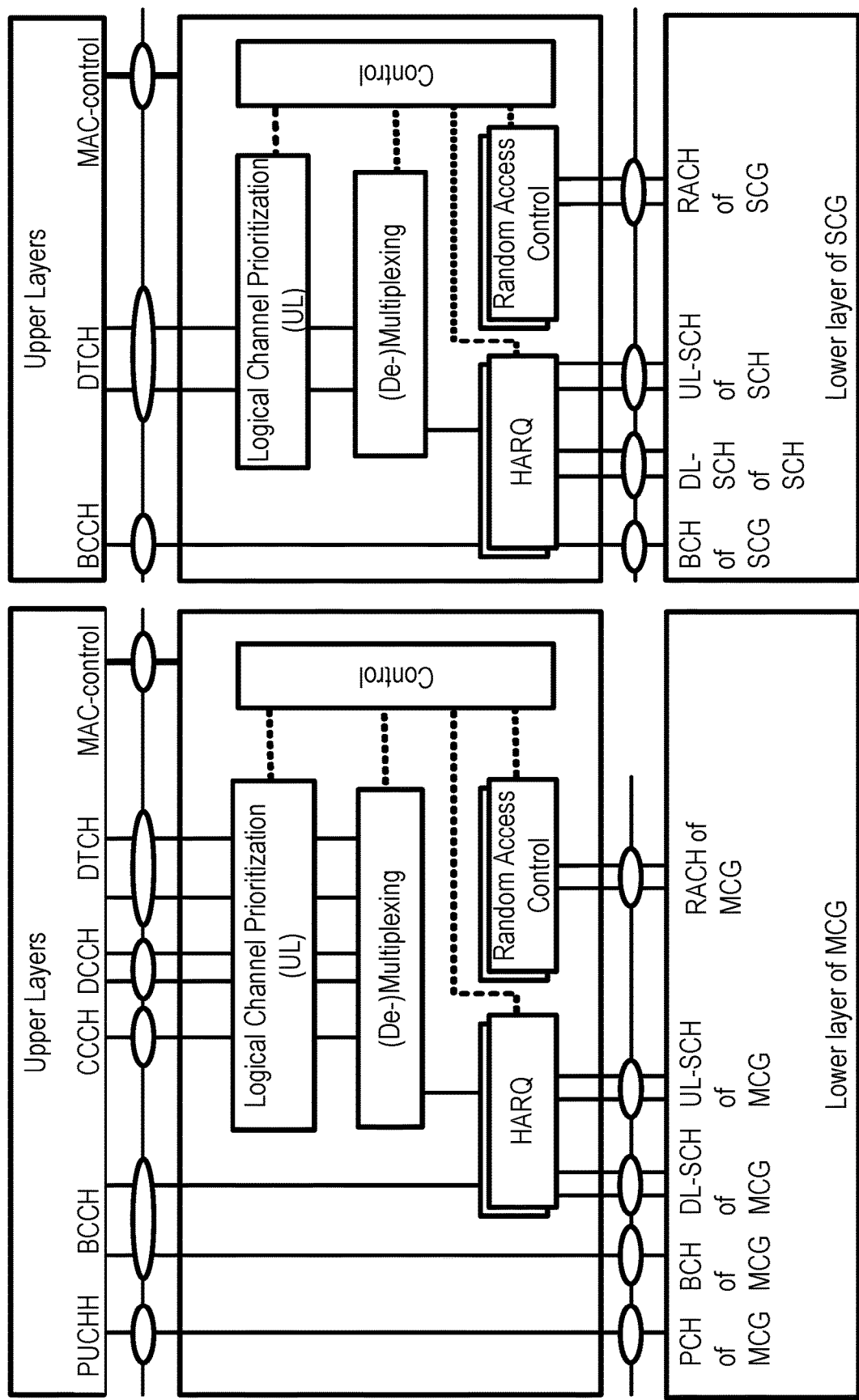
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference.

For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
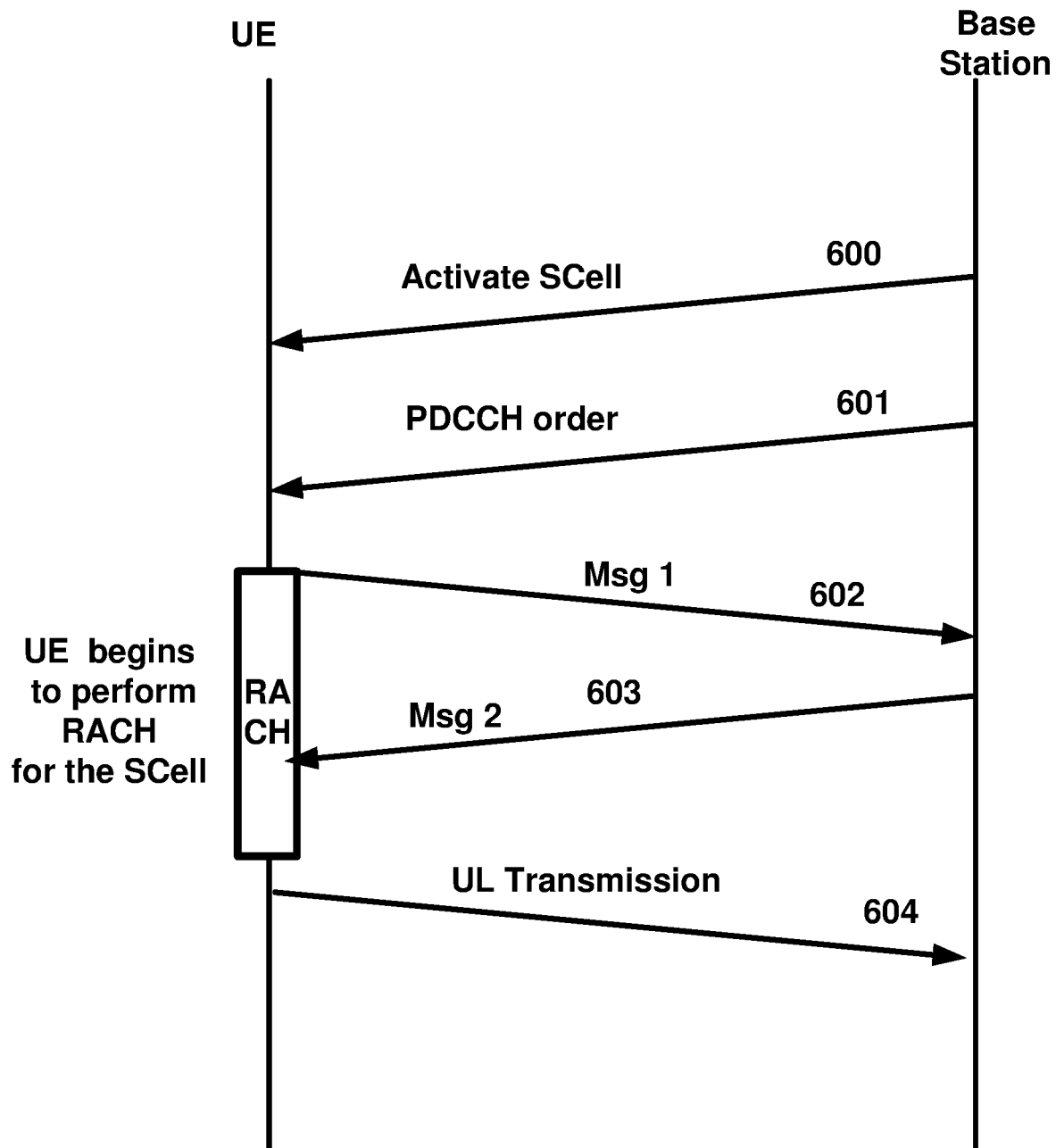
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

Tight Interworking

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC-_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
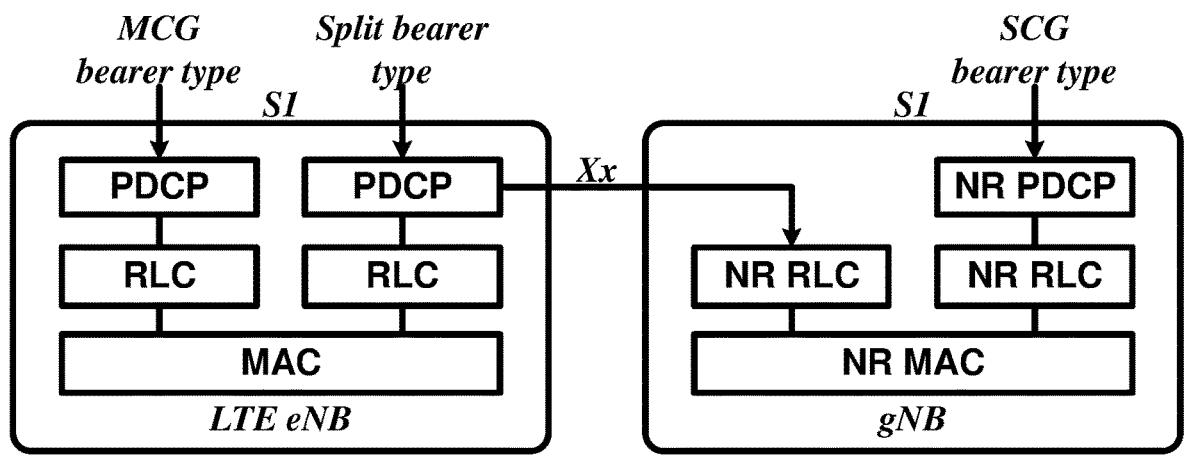
FIG. 12A, FIG. 12B, and FIG. 12C are example diagrams for radio protocol structures of tight interworking bearers as per an aspect of an embodiment of the present invention.
Figure 12B:
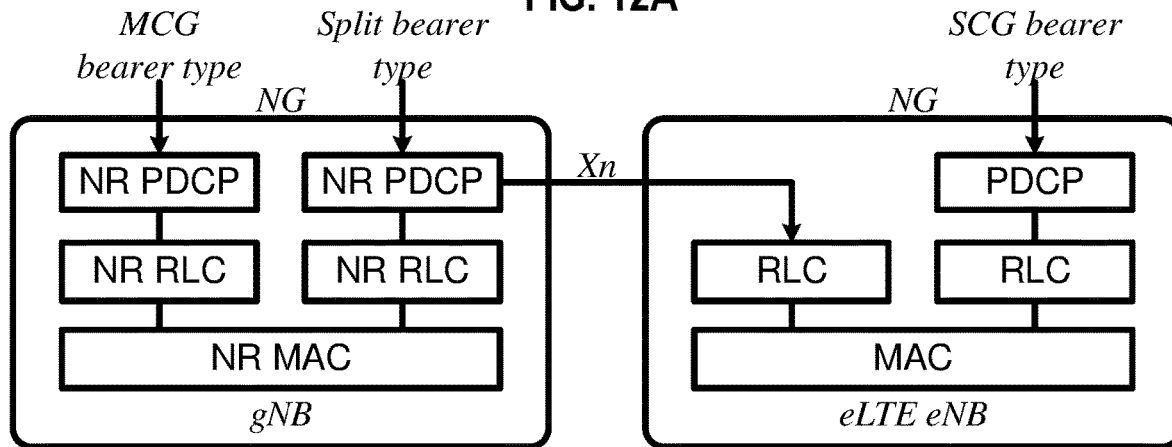
Figure 12C:
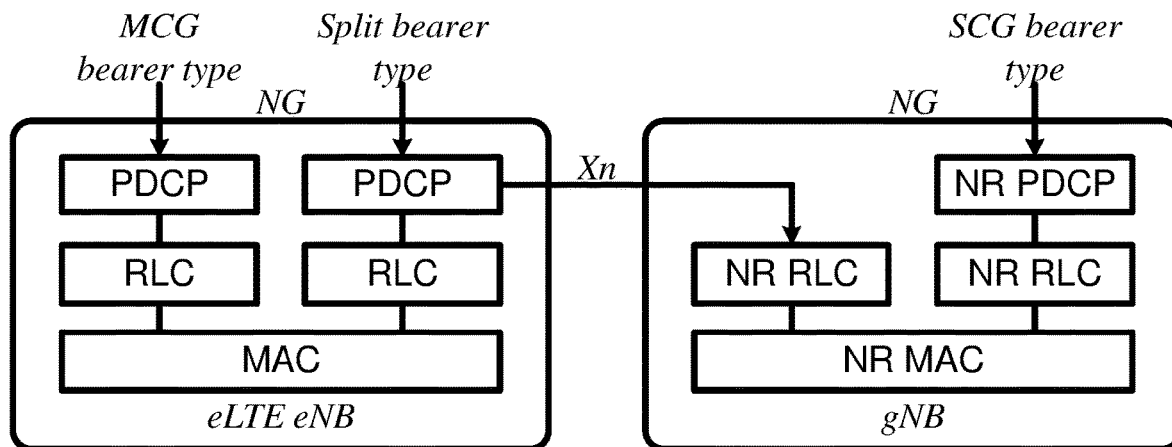

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Functional Split

Figure 13A:
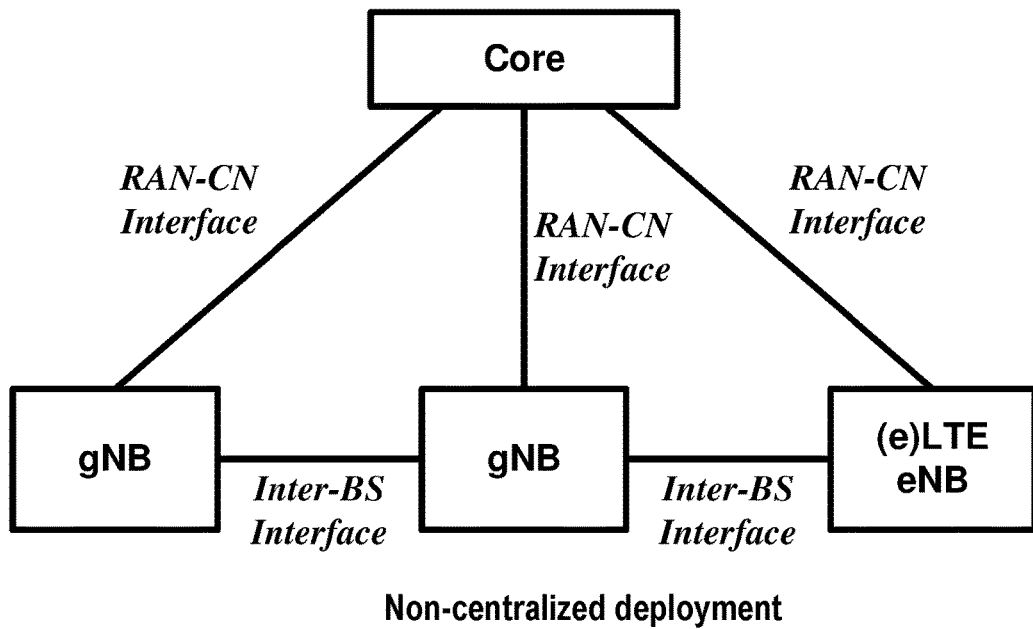
FIG. 13A and FIG. 13B are example diagrams for gNB deployment scenarios as per an aspect of an embodiment of the present invention.
Figure 13B:
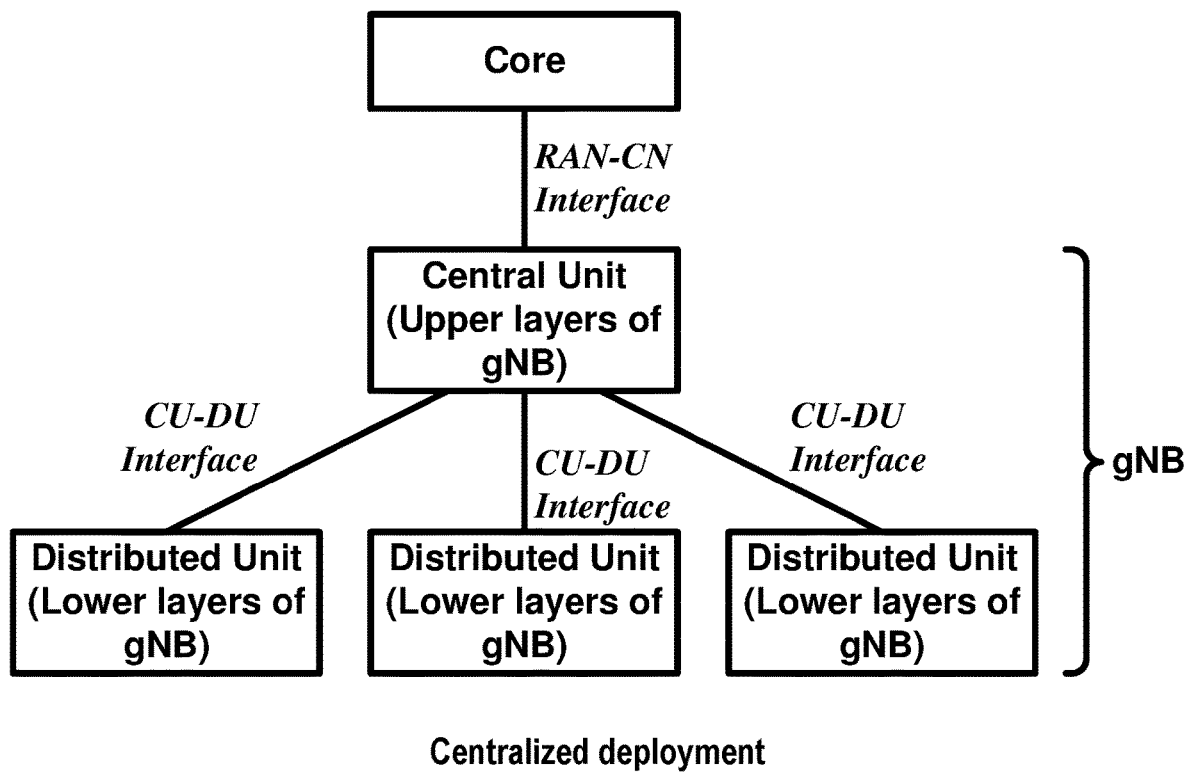

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
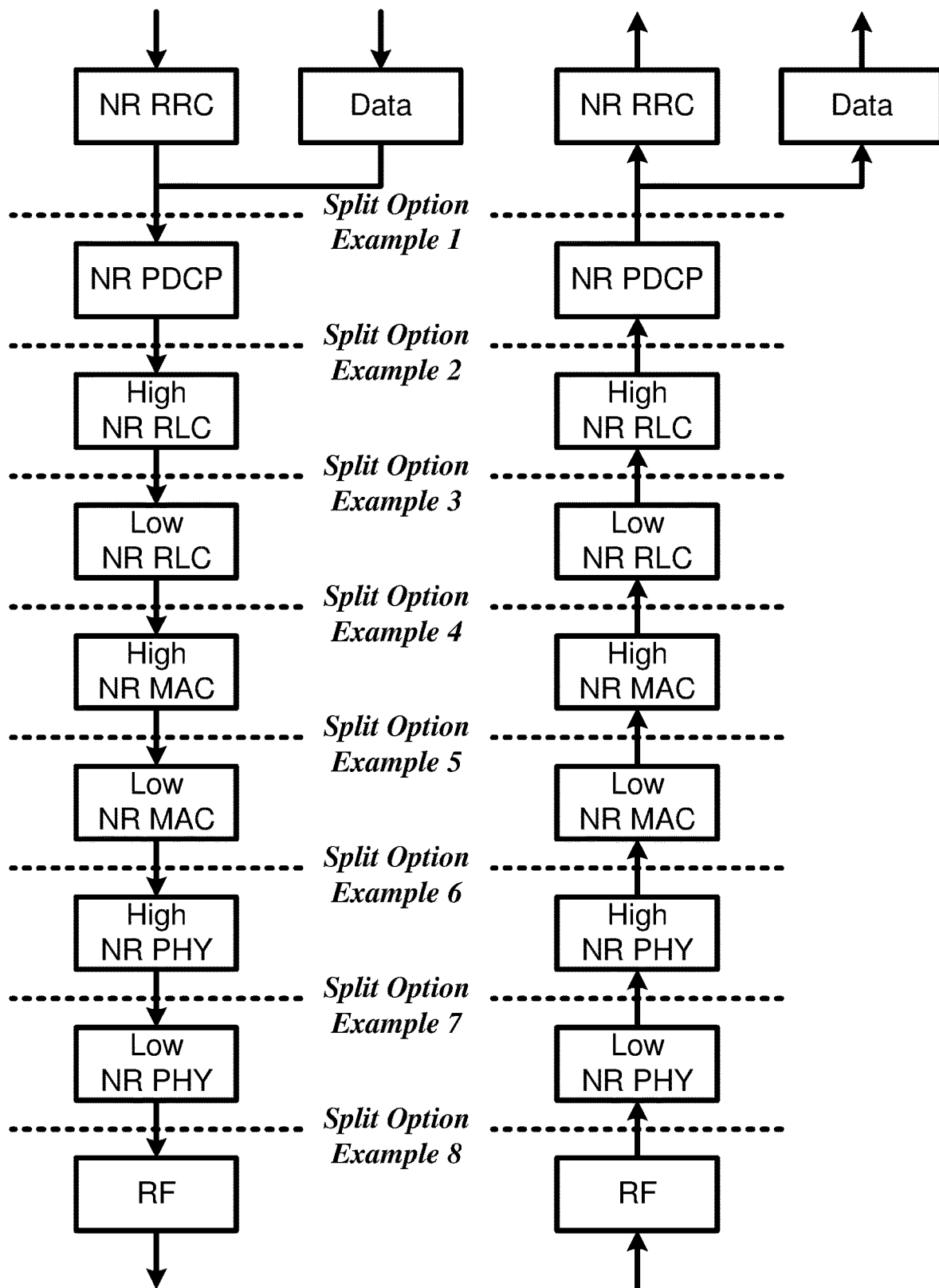
FIG. 14 is a diagram of an example functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

Network Slice

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

LAA

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Beam Management

In an example, one or more beams may be managed via a set of L1/L2 procedures to acquire and maintain a set of TRP(s)(Transmission Reception Point) and/or UE beams that may be used for DL and UL transmission/reception, which may include at least following aspects: Beam determination (for TRP(s) or UE to select of its own Tx/Rx beam(s)), Beam measurement (for TRP(s) or UE to measure characteristics of received beamformed signals), Beam reporting (for UE to report information of beamformed signal(s) based on beam measurement), and/or Beam sweeping (operation of covering a spatial area, with beams transmitted and/or received during a time interval in a predetermined way).

In an example, the followings may be defined as Tx/Rx beam correspondence at TRP and UE. Tx/Rx beam correspondence at TRP holds if at least one of the following is satisfied: TRP may be able to determine a TRP Rx beam for the uplink reception based on UE's downlink measurement on TRP's one or more Tx beams; and/or TRP may be able to determine a TRP Tx beam for the downlink transmission based on TRP's uplink measurement on TRP's one or more Rx beams. Tx/Rx beam correspondence at UE may hold if at least one of the following is satisfied: UE may be able to determine a UE Tx beam for the uplink transmission based on UE's downlink measurement on UE's one or more Rx beams; UE may be able to determine a UE Rx beam for the downlink reception based on TRP's indication based on uplink measurement on UE's one or more Tx beams; and/or capability indication of UE beam correspondence related information to TRP may be supported.

In an example, the following DL L1/L2 beam management procedures (e.g. P-1, P-2, and P-3) may be supported within one or multiple TRPs. P-1 may be used to enable UE measurement on different TRP Tx beams to support selection of TRP Tx beams/UE Rx beam(s). For beamforming at TRP, it typically may include a intra/inter-TRP Tx beam sweep from a set of different beams. For beamforming at UE, it may include a UE Rx beam sweep from a set of different beams. P-2 may be used to enable UE measurement on different TRP Tx beams to possibly change inter/intra-TRP Tx beam(s). From a possibly smaller set of beams for beam refinement than in P-1. P-2 may be a special case of P-1. P-3 may be used to enable UE measurement on the same TRP Tx beam to change UE Rx beam in the case UE uses beamforming. At least network triggered aperiodic beam reporting may be supported under P-1, P-2, and P-3 related operations.

In an example, UE measurement based on RS for beam management (at least CSI-RS) may be composed of K (=total number of configured beams) beams, and/or UE may report measurement results of N selected Tx beams, where N may not be necessarily fixed number. The procedure based on RS for mobility purpose may be not precluded. Reporting information may at least include measurement quantities for N beam (s) and information indicating N DL Tx beam(s), if N<K. Specifically, when a UE is configured with K'>1 non-zero power (NZP) CSI-RS resources, a UE may report N' CRIs (CSI-RS Resource Indicator). A UE may be configured with the following high layer parameters for beam management. N≥1 reporting settings, M≥1 resource settings: the links between reporting settings and resource settings may be configured in the agreed CSI measurement setting; CSI-RS based P-1 & P-2 may be supported with resource and reporting settings; and/or P-3 may be supported with or without reporting setting. A reporting setting at least including: information indicating selected beam(s); L1 measurement reporting; time-domain behavior, e.g. aperiodic, periodic, semi-persistent; and/or frequency-granularity if multiple frequency granularities are supported. A resource setting at least including: time-domain behavior, e.g. aperiodic, periodic, semi-persistent; RS type, e.g. NZP CSI-RS at least; at least one CSI-RS resource set, with each CSI-RS resource set having K≥1 CSI-RS resources (Some parameters of K CSI-RS resources may be the same, e.g. port number, time-domain behavior, density and periodicity if any).

In an example, a beam reporting may be supported at least based on an alternative 1 as follow. UE may report information about TRP Tx Beam(s) that may be received using selected UE Rx beam set(s) where a Rx beam set may refer to a set of UE Rx beams that may be used for receiving a DL signal. It may be UE implementation issues on how to construct the Rx beam set. One example may be that each of Rx beam in a UE Rx beam set may correspond to a selected Rx beam in each panel. For UEs with more than one UE Rx beam sets, the UE may report TRP Tx Beam(s) and an identifier of the associated UE Rx beam set per reported TX beam(s). Different TRP Tx beams reported for the same Rx beam set may be received simultaneously at the UE. Different TRP TX beams reported for different UE Rx beam set may not be possible to be received simultaneously at the UE.

In an example, a beam reporting may be supported at least based on an alternative 2 as follow. UE may report information about TRP Tx Beam(s) per UE antenna group basis where UE antenna group may refer to receive UE antenna panel or subarray. For UEs with more than one UE antenna group, the UE may report TRP Tx Beam(s) and an identifier of the associated UE antenna group per reported TX beam. Different TX beams reported for different antenna groups may be received simultaneously at the UE. Different TX beams reported for the same UE antenna group may not be possible to be received simultaneously at the UE.

In an example, NR may support the following beam reporting considering L groups where L>=1 and/or each group may refer to a Rx beam set (alternative 1) or a UE antenna group (alternative 2) depending on which alternative may be adopted. For each group L, UE may report at least the following information: information indicating group at least for some cases; measurement quantities for N_L beam(s), which may support L1 RSRP and CSI report (when CSI-RS is for CSI acquisition); and/or information indicating N_L DL Tx beam(s) when applicable. This group based beam reporting may be configurable per UE basis. This group based beam reporting may be turned off per UE basis, e.g. when L=1 or N_L=1. Group identifier may not be reported when it is turned off.

In an example, NR (New Radio) may support that UE may be able to trigger mechanism to recover from beam failure. Beam failure event may occur when the quality of beam pair link(s) of an associated control channel falls low enough (e.g. comparison with a threshold, time-out of an associated timer). Mechanism to recover from beam failure may be triggered when beam failure occurs. The beam pair link may be used for convenience, and may or may not be used in specification. Network may configure to UE with resources for UL transmission of signals for recovery purpose. Configurations of resources may be supported where the base station may be listening from all or partial directions, e.g. random access region. The UL transmission/resources to report beam failure may be located in the same time instance as PRACH (resources orthogonal to PRACH resources) and/or at a time instance (configurable for a UE) different from PRACH. Transmission of DL signal may be supported for allowing the UE to monitor the beams for identifying new potential beams.

In an example, NR may support beam management with and without beam-related indication. When beam-related indication is provided, information pertaining to UE-side beamforming/receiving procedure used for CSI-RS-based measurement may be indicated through QCL (Quasi Co- Location) to UE. NR may support using the same or different beams on control channel and the corresponding data channel transmissions.

In an example, for NR-PDCCH transmission supporting robustness against beam pair link blocking, UE may be configured to monitor NR-PDCCH on M beam pair links simultaneously, where M≥1 and the maximum value of M may depend at least on UE capability. UE may be configured to monitor NR-PDCCH on different beam pair link(s) in different NR-PDCCH OFDM symbols. Parameters related to UE Rx beam setting for monitoring NR-PDCCH on multiple beam pair links may be configured by higher layer signaling or MAC CE and/or considered in the search space design. At least, NR may support indication of spatial QCL assumption between an DL RS antenna port(s), and DL RS antenna port(s) for demodulation of DL control channel. Candidate signaling methods for beam indication for a NR-PDCCH (i.e. configuration method to monitor NR-PDCCH) may be MAC CE signaling, RRC signaling, DCI signaling, specification-transparent and/or implicit method, and combination of these signaling methods. Indication may not be needed for some cases.

In an example, for reception of unicast DL data channel, NR may support indication of spatial QCL assumption between DL RS antenna port(s) and DMRS antenna port(s) of DL data channel. Information indicating the RS antenna port(s) may be indicated via DCI (downlink grants). The information may indicate the RS antenna port(s) which may be QCL-ed with DMRS antenna port(s). Different set of DMRS antenna port(s) for the DL data channel may be indicated as QCL with different set of RS antenna port(s). Indication may not be needed for some cases.

ANR

In an example, the Automatic Neighbour(neighbor) Relation (ANR) function may relieve the operator from the burden of manually managing Neighbour Relations (NRs). The ANR function may reside in the eNB and/or manage the conceptual Neighbour Relation Table (NRT). Located within ANR, the Neighbour Detection Function may find new neighbours and/or add them to the NRT. ANR may comprise the Neighbour Removal Function which may remove outdated NRs.

A Neighbour cell Relation (NR) in the context of ANR may be defined as follows:

An existing Neighbour Relation from a source cell to a target cell may mean that eNB (gNB) controlling the source cell: a) may know the ECGI (e-utran cell global identifier, global cell identifier)/CGI (cell global identifier) and PCI (physical cell identifier) of the target cell; b) may have an entry in the Neighbour Relation Table for the source cell identifying the target cell; c) may have the attributes in this Neighbour Relation Table entry defined, either by O&M and/or set to default values.

In an example, for each cell that the eNB (gNB) may have, the eNB (gNB) may keep a NRT. For each NR (neighbor relation), the NRT may contain the Target Cell Identifier (TCI), which may identify the target cell. The TCI may correspond to a global cell identifier, the E-UTRAN Cell Global Identifier (ECGI) and/or Physical Cell Identifier (PCI) of the target cell. Furthermore, each NR may have three attributes, the NoRemove, the NoHO and/or the NoX2 (NoXn) attribute. These attributes may have the following definitions: No Remove (If checked, the eNB (gNB) may not remove the Neighbour cell Relation from the NRT), No HO (If checked, the Neighbour cell Relation may not be used by the eNB (gNB) for handover reasons), No X2 (Xn) (If checked, the Neighbour Relation may not use an X2 (Xn) interface in order to initiate procedures towards the eNB (gNB) parenting the target cell).

In an example, Neighbour Relations may be cell-to-cell relations, cell-to-beam relations, beam-to-cell relations, and/or beam-to-beam relations, while an X2 (Xn) link may be set up between two eNBs (gNBs). Neighbour cell Relations may be unidirectional, while an X2 (Xn) link may be bidirectional. The neighbour information exchange, which may occur during the Xn Setup procedure or in the gNB Configuration Update procedure, may be used for ANR purpose. The ANR function may allow O&M to manage the NRT. O&M may add and delete NRs, and/or may change the attributes of the NRT. The O&M system may be informed about changes in the NRT.

In an example, the ANR (Automatic Neighbour Relation) function may rely on cells broadcasting their identity on global level, a global cell identifier and/or E-UTRAN Cell Global Identifier (ECGI). The function may work as follows:

The eNB (gNB) serving cell A may have an ANR function. As a part of the normal call procedure, the eNB (gNB) may instruct each UE to perform measurements on neighbour cells. The eNB (gNB) may use different policies for instructing the UE to do measurements, and when to report them to the eNB (gNB). The UE may send a measurement report regarding cell B. This report may contain Cell B's PCI, but maybe not its ECGI (global cell identifier). When the eNB (gNB) receives a UE measurement report containing the PCI, the following sequence may be used. The eNB (gNB) may instruct the UE, using the newly discovered PCI as parameter, to read the ECGI (global cell identifier), the TAC and available PLMN ID(s) of the related neighbour cell. To do so, the eNB (gNB) may need to schedule appropriate idle periods to allow the UE to read the ECGI (global cell identifier) from the broadcast channel of the detected neighbour cell. When the UE has found out the new cell's ECGI (global cell identifier), the UE may report the detected ECGI (global cell identifier) to the serving cell eNB (gNB). In addition, the UE may report the tracking area code and all PLMN IDs that may have been detected. If the detected cell is a CSG or hybrid cell, the UE may report the CSG ID to the serving cell eNB (gNB).

In an example, the eNB (gNB) may decide to add this neighbour relation, and may use PCI and ECGI (global cell identifier) to: lookup a transport layer address to the new eNB; update the Neighbour Relation List; and/or if needed, setup a new X2 (Xn) interface towards this eNB (gNB). The eNB (gNB) may differentiate the open access HeNB (HgNB) from the other types of (H)eNB ((H)gNB) by the PCI configuration or ECGI (global cell identifier) configuration.

In an example, for Inter-RAT and Inter-Frequency ANR, each cell may contain an Inter Frequency Search list. This list may contain one or more frequencies that may be searched. For Inter-RAT cells, the NoX2 (NoXn) attribute in the NRT may be absent, as X2 (Xn) may be only defined for E-UTRAN (NR, new radio access network).

The eNB (gNB) serving cell A may have an ANR function. During connected mode, the eNB (gNB) may instruct a UE to perform measurements and detect cells on other RATs/frequencies. The eNB (gNB) may use different policies for instructing the UE to do measurements, and when to report them to the eNB (gNB). The eNB (gNB) may instruct a UE to look for neighbour cells in the target RATs/frequencies. To do so the eNB (gNB) may need to schedule appropriate idle periods to allow the UE to scan all cells in the target RATs/frequencies. The UE may report the PCI of the detected cells in the target RATs/frequencies. The PCI may be defined by the carrier frequency and the Primary Scrambling Code (PSC) in case of UTRAN FDD cell, by the carrier frequency and the cell parameter ID in case of UTRAN TDD cell, by the Band Indicator+BSIC+BCCH ARFCN in case of GERAN cell and by the PN Offset in case of CDMA2000 cell. When the eNB (gNB) receives UE reports containing PCIs of cell(s) the following sequence may be used.

The eNB (gNB) may instruct the UE, using the newly discovered PCI as parameter, to read the CGI (global cell identifier) and/or the RAC of the detected neighbour cell in case of GERAN detected cells, CGI, LAC, RAC and all broadcasted PLMN-ID(s) in case of UTRAN detected cells and CGI in case of CDMA2000 detected cells. For the Interfrequency case, the eNB (gNB) may instruct the UE, using the newly discovered PCI as parameter, to read the ECGI (global cell indentifier), TAC and all available PLMN ID(s) of the inter-frequency detected cell. The UE may ignore transmissions from the serving cell while finding the requested information transmitted in the broadcast channel of the detected inter-system/inter-frequency neighbour cell. To do so, the eNB (gNB) may need to schedule appropriate idle periods to allow the UE to read the requested information from the broadcast channel of the detected inter-RAT/inter-frequency neighbour cell.

After the UE read the requested information in the new cell, it may report the detected CGI (global cell identifier) and/or RAC (in case of GERAN detected cells) or CGI (global cell identifier), LAC, RAC and all broadcasted PLMN-ID(s) (in case of UTRAN detected cells) or CGI (global cell identifier) (in case of CDMA2000 detected cells) to the serving cell eNB (gNB). In the inter-frequency case, the UE may report the ECGI (global cell identifier), a tracking area code and one or more PLMN-ID(s) that may have been detected. If the detected cell is a CSG or hybrid cell, the UE may report the CSG ID to the serving cell eNB (gNB). The eNB (gNB) may update its inter-RAT/inter-frequency Neighbour Relation Table. In the inter-frequency case and if needed, the eNB may use the PCI and ECGI (global cell identifier) for a new X2 (Xn) interface setup towards this eNB (gNB). The eNB (gNB) may differentiate the open access HeNB (HgNB) from the other types of (H)eNB ((H)gNB) by the PCI configuration or ECGI (global cell identifier) configuration.

Mobility Setting Change: Beam Configuration

In an example beam based cellular network system, a cell area may be formed with multiple beams (e.g. SS beams and/or CSI-RS beams). In an example, each beam covering partial area is swept over a cell coverage area, and different beam coverage areas may have different radio conditions. Proper handover triggering parameters may be different depending on which beams are facing from neighboring cells. In an example, when determining mobility parameters for handover between cell1 and cell2, appropriate handover parameters for handover between beam-A of cell1 and beam-B of cell2 may be different from preferable handover parameters for handover between beam-C of cell1 and beam-D of cell2. Implementation of existing cell-based mobility setting change procedures may increase handover failure rate and/or handover ping-pong issues when multiple beams serve a cell coverage area. The existing technology may increase call dropping rate and packet transmission delay during a handover procedure. The increased call dropping rate and the increased packet transmission delay may decrease communication reliability.

Example embodiments enhance mobility information exchange mechanism between base stations that configure multiple beams to cover their serving cell area by supporting beam level mobility parameter exchanges. Example embodiments may reduce handover failure rate and/or handover ping-pong issues by enabling base stations to negotiate beam level handover parameters with their neighboring base stations. Example embodiments may improve communication reliability by supporting beam specific handover parameter configurations between neighboring base stations.

In an example embodiment, a base station may request a mobility parameter setting change to a neighboring base station with a beam information, which may comprise one or more beam identifiers of one or more beams employed by a first cell of the base station and a second cell of the neighboring base station. The neighboring base station may comply the mobility parameter setting change associated with the one or more beams, and/or may employ updated mobility parameters when making a decision of a wireless device handover from the second cell to the first cell. In an example, base stations exchange mobility parameter setting change associated with one or more beams and control and/or negotiate mobility parameters for a wireless device mobility between beams and/or between groups of beams and improve handover process.

In an example, a base station may request a mobility parameter setting change associated with a beam information at least when the base station requires to control a handover failure between two or more beams of different cells, to reduce ping-pong events between two or more beams of different cells, and/or to control a traffic load between two or more beams of different cells.

In an example, a cell may be operated with one or more beams employing a multi-antenna system. A beam may have a spatial direction, and/or may cover a part of a cell coverage area. A combination of one or more beam spatial areas may form a cell coverages. In an example, a beam transmitting a synchronization signal and/or receiving a signal from a wireless device may be swept over a cell coverage area in a predetermined way. A synchronization signal scheduling information and/or a synchronization signal sequence may be used to identify a swept beam. A swept beam may broadcast one or more control information comprising at least one of a system information, a master information, a PDCCH, a PRACH resource, a random access preamble information, a synchronization signal, a reference signal, and et cetera. In an example, a beam may transmit a reference signal (e.g. CSI-RS).

In an example embodiment, a first base station may transmit, to a second base station, a cell information of one or more cells served by the first base station and/or a beam related information of one or more beams associated with at least one of the one or more cells. The cell information and/or the beam related information may be transmitted during an Xn interface setup procedure and/or a gNB configuration update procedure as shown in FIG. 17. An Xn interface setup request, an Xn interface setup response, and/or a gNB configuration update message (e.g. NG-RAN node configuration update) may comprise the cell information and/or the beam related information. The cell information may comprise one or more cell identifiers of one or more cells served by the first base station. In an example, the beam related information may comprise a beam identifier, a synchronization signal scheduling information, a synchronization signal sequence information, a reference signal scheduling information, a reference signal sequence information, and/or a beam configuration information for one or more beams associated with one or more cells served by the first base station.

Figure 15:
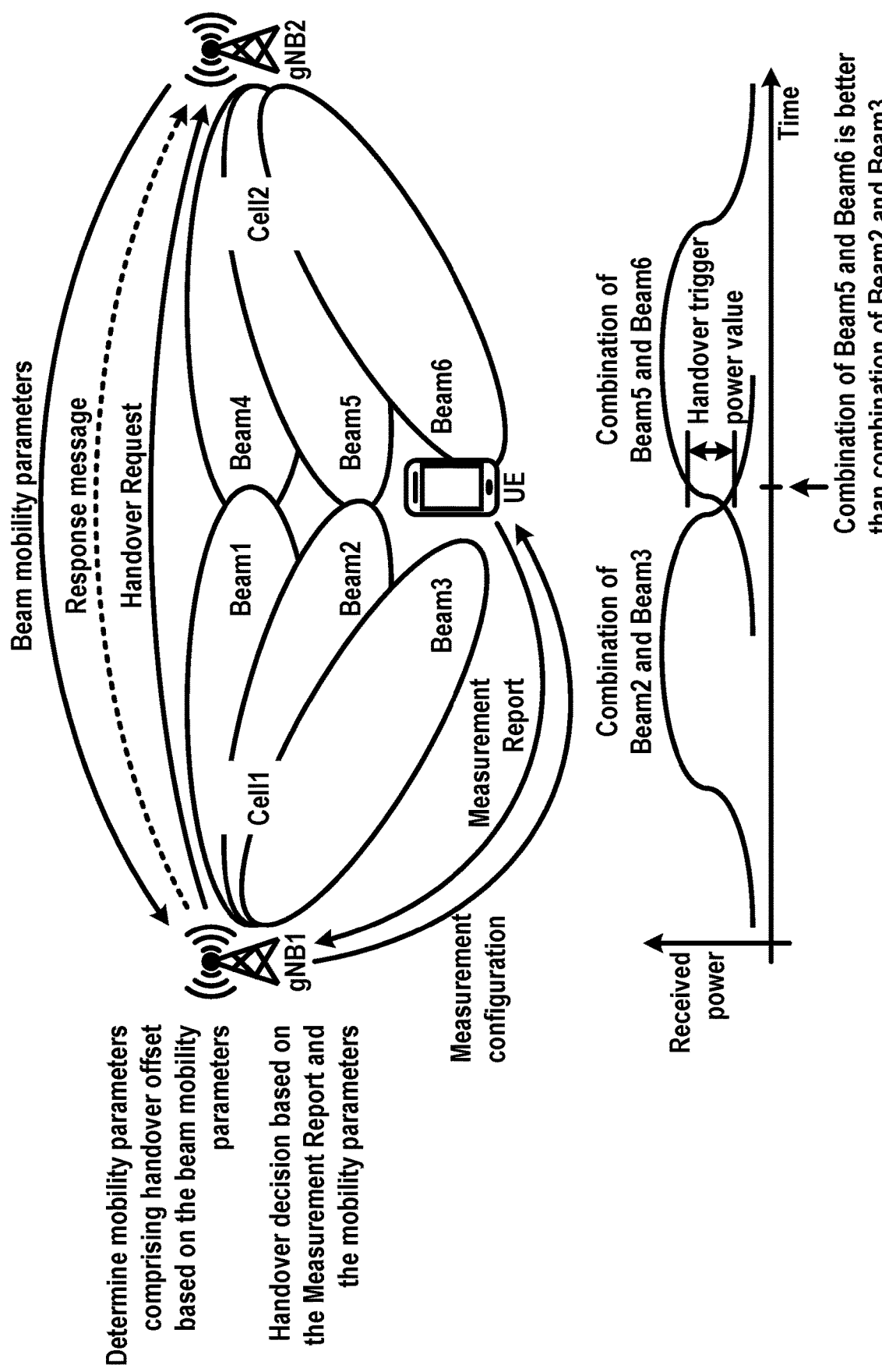
FIG. 15 is an example diagram as per an aspect of an embodiment of the present disclosure.
Figure 16:
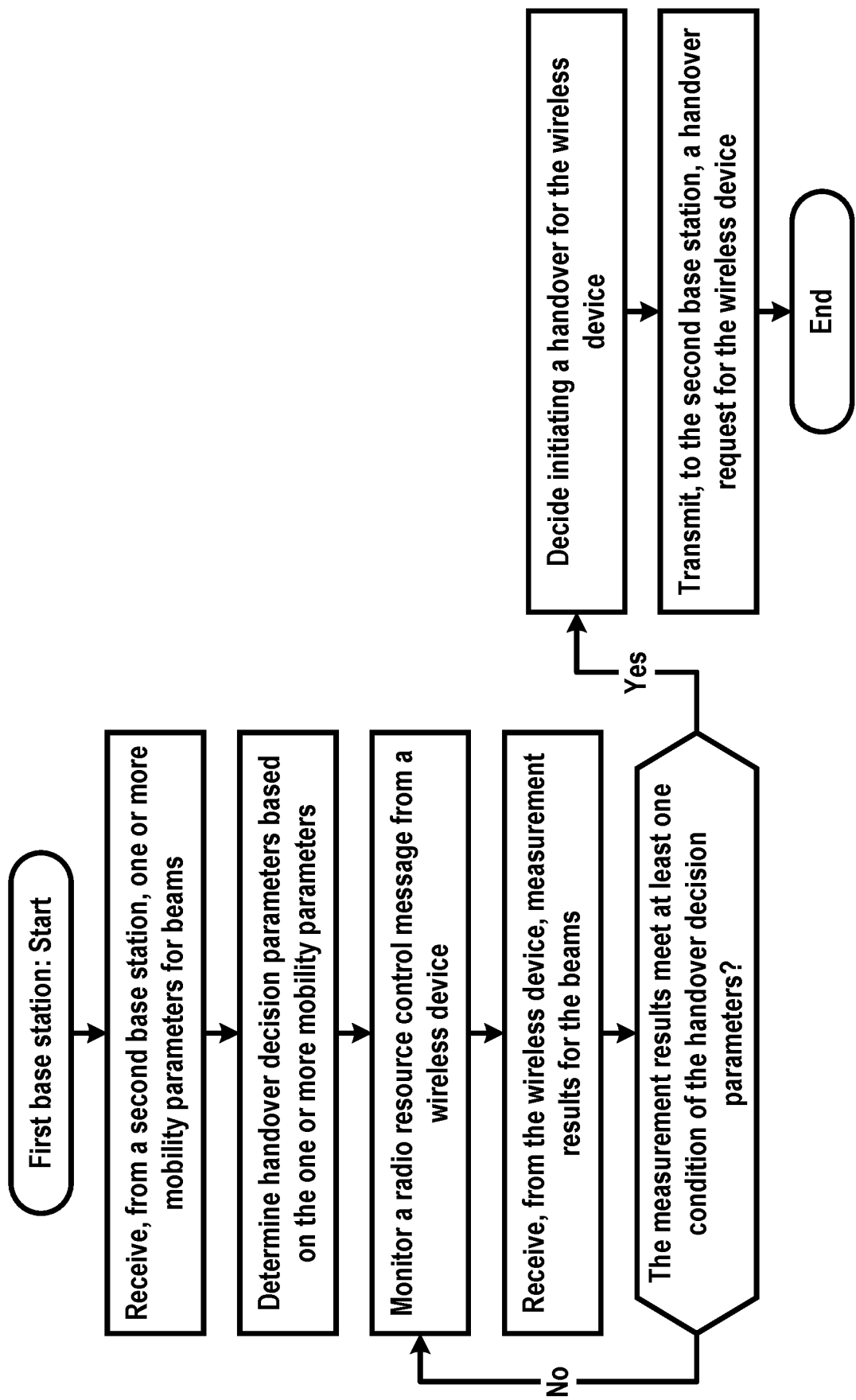
FIG. 16 is an example diagram as per an aspect of an embodiment of the present disclosure.

In an example, as shown in FIG. 15 and FIG. 16, a second base station receiving from a first base station a cell information of one or more cells and/or a beam related information of one or more beams associated with at least one of the one or more cells may configure one or more mobility parameters for a wireless device handover from a second cell served by the second base station to a first cell served by the first base station at least based on the cell information and/or the beam related information. The one or more mobility parameters may comprise a handover offset value (e.g. for a received power comparison, for a received power handover threshold, and/or the like), a handover time threshold to trigger, and/or the like. The one or more mobility parameter may be configured for a handover from one or more second beams of the second cell to one or more first beams of the first cell. In an example, the second base station may initiate a handover of a wireless device from the one or more second beams to the one or more first beams at least based on the one or more mobility parameters and/or a measurement report received from the wireless device. The measurement report may comprise a reference signal received power (RSRP) and/or a reference signal received quality (RSRQ) for one or more beams. The measurement report may comprise a combined reference signal received power for one or more beams (e.g. an average RSRP for one or more beams, a sum of RSRQs of one or more beam) and/or a combined reference signal received quality for one or more beams (e.g. an average RSRQ for one or more beams, a sum of RSRQs of one or more beams).

In an example, a first base station may receive a cell information and/or a beam related information from a second base station during an Xn interface setup procedure and/or a gNB configuration update procedure. The first base station may configure one or more mobility parameters for a wireless device handover from a first cell served by the first base station to a second cell served by the second base station at least based on the cell information and/or the beam related information. The one or more mobility parameter may be configured for a handover from one or more first beams of the first cell to one or more second beams of the second cell. In an example the first base station may initiate a handover of a wireless device from the one or more first beams to the one or more second beams at least based on the one or more mobility parameters and/or a measurement report received from the wireless device.

In an example, a first base station may receive from a second base station a first message. The first message may comprise a mobility parameter update information (e.g. information of a handover trigger change), a first cell identifier of a first cell served by the first base station, a second cell identifier of a second cell served by the second base station, and/or one or more beam parameters. The first message may be a mobility change request message of a mobility setting change procedure as shown in FIG. 17. In an example, the one or more beam parameters may comprise a beam related information of at least one of the first cell and/or the second cell. The first base station may update one or more elements of one or more mobility parameters comprising at least one of a handover offset value (e.g. for a received power comparison, for a received power handover threshold, and/or the like), a handover time threshold to trigger, and/or the like at least based on one or more elements of the first message.

In an example, the mobility parameter update information of the first message may comprise one or more handover trigger change values for a handover from one or more first beams of the first cell served by the first base station to one or more second beams of the second cell served by the second base station and/or from one or more second beams of the second cell to one or more first beams of the first cell. The one or more handover trigger change values may comprise at least one of a handover threshold to trigger a handover and/or a change amount of a handover threshold to trigger a handover. The one or more handover trigger change values may indicate dB scale absolute received power values and/or dB scale power change values.

In an example, the one or more beam parameters of the first message may comprise a beam identifier, a synchronization signal scheduling information, a synchronization signal sequence information, a reference signal scheduling information, a reference signal sequence information, and/or a beam configuration information for one or more beams associated with the first cell of the first base station and/or the second cell of the second base station.

In an example, the first base station may update one or more mobility parameters for a wireless device handover from the first cell to the second cell at least based on one or more elements of the mobility parameter update information and/or the one or more beam parameters. The first base station may update one or more mobility parameters for a wireless device handover from one or more first beams of the first cell to one or more second beams of the second cell at least based on one or more elements of the mobility parameter update information and/or the one or more beam parameters.

In an example, the first base station may initiate a handover of a wireless device at least based on the updated one or more mobility parameters and/or one or more elements of a measurement report received from the wireless device. The first base station may make a decision of the handover at least based on a reference signal received power (RSRP) and/or a reference signal received quality (RSRQ) for one or more beams received via the measurement report. The first base station may make a decision of the handover at least based on a combined reference signal received power for one or more beams (e.g. an average RSRP for one or more beams) and/or a combined reference signal received quality for one or more beams (e.g. an average RSRQ for one or more beams) received via the measurement report. The first base station may make a decision of the handover at least by combining one or more reference signal received powers (RSRP) and/or one or more reference signal received qualities (RSRQ) for one or more beams received via the measurement report.

In an example, the first base station may transmit a second message to the second base station in response to the handover decision for the wireless device. The second message may be a handover request message. The first message may be configured to request a handover of the wireless device from the first cell served by the first base station to the second cell served by the second base station and/or from one or more first beams of the first cell to one or more second beams of the second cell. In an example, the first message may comprise a wireless device identifier of the wireless device, a first cell identifier of the first cell, a second cell identifier of the second cell, one or more first beam information (e.g. a beam identifier, a beam scheduling information, a synchronization signal scheduling information, a synchronization signal sequence information, a reference signal scheduling information, a reference signal configuration information, and/or et cetera) of the one or more first beams, one or more second beam information of the one or more second beams, one or more packet flow information for the wireless device, and/or the like. The second message may be transmitted to the second base station through a direct interface between the first base station and the second base station (e.g. an Xn interface) and/or through an indirect interface (e.g. an NG interface) via a core network entity (e.g. AMF—Access and Mobility Management Function).

In an example, the first base station may not accept one or more elements of the first message. The first base station may reject one or more elements of the mobility parameter update information for at least one of the one or more beam parameters. The first base station may transmit a third message comprising an acknowledgement for the first message. The acknowledgement may indicate whether the first base station accepts one or more elements of the first message. The third message may comprise one or more beam identifier of one or more beams that the first base station accepted one or more elements of the mobility parament update information for. The third message may comprise one or more beam identifier of one or more beams that the first base station rejected one or more elements of the mobility parament update information for. The third message may comprise one or more mobility parameters modification ranges for one or more beams. The one or more mobility parameters modification rages may indicate one or more handover trigger change lower limits and/or one or more handover trigger change upper limits for one or more beams.

In an example, the first base station may transmit to a wireless device an RRC message comprising a measurement configuration at least based on one or more elements of the first message. The measurement configuration may comprise one or more elements of the one or more beam parameters and/or one or more beam individual offset values associated with the one or more elements of the one or more beam parameters. The one or more beam individual offset values may be employed to compare one or more beam qualities of one or more beams and/or to compare one or more cell qualities of one or more cells. The wireless device may report a measurement result for one or more beams and/or one or more cells at least based on one or more elements of the measurement configuration.

Example

In an example, a first base station may receive, from a second base station, a first message comprising a mobility parameter update information, a first cell identifier of a first cell served by the first base station, a second cell identifier of a second cell served by the second base station, and/or one or more beam parameters, wherein the one or more beam parameters comprises a beam related information of at least one of the first cell and the second cell. The first base station may configure one or more mobility parameters at least based on one or more elements of the first message. The first base station may transmit, to the second base station, a second message configured to request a handover for a wireless device employing at least one or more elements of the first message.

In an example, the mobility parameter update information may further comprise one or more mobility parameter change values for a wireless device handover between one or more first beams of the first cell and/or one or more second beams of the second cell, the one or more mobility parameter change values may comprise at least one of a handover threshold and/or a change amount of a handover threshold. The mobility parameter update information may be associated with one or more elements of the one or more beam parameters. In an example, the one or more beam parameters may comprise at least one of a beam identifier, a synchronization signal scheduling information, a synchronization signal sequence information, a reference signal scheduling information, a reference signal sequence information, and/or a beam configuration information.

In an example, the first base station may transmit, to the second base station, a third message comprising an acknowledgement of the first message, the acknowledgement indicating whether the first base station complies one or more elements of the mobility parameter update information. The second base station may transmit the first message to the first base station at least based on one or more elements of the one or more beam parameters, the one or more elements of the one or more beam parameters received by the second base station from the first base station.

In an example, the first base station may transmit a handover message to the second base station for a wireless device towards a cell of one or more beams of the beam information of the first message at least based on the one or more mobility parameters.

In an example, the first base station may transmit, to a wireless device, an RRC message comprising a measurement configuration at least based on the mobility parameter update information.

Mobility Setting Change: Beam Number

In a beam based cellular network system, a cell area may be formed with multiple beams (e.g. SS beams and/or CSI-RS beams). In an example, each beam covering partial area may be swept over a cell coverage area, and different beam coverage areas may have different radio conditions. When measuring a cell quality (e.g. reference signal received power (RSRP) and/or reference signal received quality (RSRQ), a wireless device may combine (e.g. sum, average, etc.) qualities (e.g. RSRP and/or RSRQ) of a certain number of beams. A base station may configure, for a wireless device, the certain number for cell quality measurement. The certain number may be configured different at different base stations or different cells. Depending on how many beams are taken into account when measuring a cell quality, measurement results may have different values.

For example, to measure cell1 of a first base station and cell2 of a second base station, the first base station may configure N beams for cell1 and M beams for cell2 respectively, and the second base station may configure K beams for cell1 and L beams for cell2. This may cause that measurement results of cell1 and cell2 at the first base station are different from measurement results of cell1 and cell2 at the second base station. For handover between cell1 and cell2 the first base station and the second base station may have different triggering point each other. When a wireless device stays at fixed location, the first base station may conclude that cell2 is better than cell1 for the wireless device and the second base station may conclude that cell1 is better than cell2. Implementation of existing cell-based mobility information exchange mechanisms may cause unnecessary handovers (e.g. ping-pong handover issue) when actual radio conditions of a wireless device does not change. There is a need to align cell measurement configurations between neighboring base stations.

The existing mobility setting change procedure may increase handover ping-pong issues and/or handover failure rate when multiple beams serve a cell coverage area. An implementation of existing technologies may increase call dropping rate and packet transmission delay during a handover procedure. The increased call dropping rate and the increased packet transmission delay may decrease communication reliability.

Example embodiments enhance mobility information exchange mechanism between base stations that configure multiple beams to cover their serving cell area by supporting an exchange, between base stations, of a beam number to measure a cell quality. Example embodiments may reduce handover failure rate and/or handover ping-pong issues by enabling base stations to share beam numbers for cell measurements with their neighboring base stations. Example embodiments may improve communication reliability by supporting beam related handover parameter configurations between neighboring base stations.

In an example embodiment, a base station may transmit a measurement configuration information to a neighboring base station. The measurement configuration information may comprise a first number of beams to determine a cell quality of one or more first cells served by the base station and/or a second number of beams to determine a cell quality of one or more second cells of the neighboring base station. This information may be employed to enhance the handover process. In an example, the neighboring base station may comply one or more elements of the measurement configuration information for determining a cell quality of one or more cells. The neighboring base station may consider an updated number of beams when determining a cell quality of one or more cells, wherein the updated number of beams is updated at least based on the measurement configuration information. In an example, the neighboring base station may transmit the updated number of beams to a wireless device, and/or the wireless device may employ the updated number of beams when measuring a cell quality of one or more cells. In an example, the neighboring base station may make a handover decision at least based on a cell quality employing the updated number of beams.

In an example, by exchanging a measurement configuration information comprising a number of beams to be considered for determining a cell quality, base stations may align mobility controls (e.g. to avoid handover ping-pong events, to enhance mobility reliability and/or efficiency, to manage network configurations, and/or the like).

In an example, a cell may be operated with one or more beams employing a multi-antenna system. A beam may have a spatial direction, and/or may cover a part of a cell coverage area. A combination of one or more beam spatial areas may form a cell coverage. In an example, a beam transmitting a synchronization signal and/or receiving a signal from a wireless device may be swept over a cell coverage area in a predetermined way. A synchronization signal index, a synchronization signal scheduling information, and/or a synchronization signal sequence information may be used to identify a swept beam. A swept beam may broadcast one or more control information comprising at least one of a system information, a master information, a PDCCH, a PRACH resource, a random access preamble information, a synchronization signal, a reference signal, and et cetera. In an example, a beam may transmit a reference signal (e.g. CSI-RS). A beam may be also identified by a reference signal (e.g. CSI-RS, DM-RS, and the like) index, a reference signal scheduling information, and/or a reference signal sequence information.

Measurement

In an example, a UE (wireless device) may report measurement information in accordance with the measurement configuration as provided by E-UTRAN (base station). E-UTRAN may provide the measurement configuration applicable for a UE in RRC_CONNECTED by means of dedicated signalling, e.g. using the RRCConnectionReconfiguration or RRCConnectionResume message.

The UE may be requested to perform the following types of measurements: Intra-frequency measurements (measurements at the downlink carrier frequency(ies) of the serving cell(s)); Inter-frequency measurements (measurements at frequencies that differ from any of the downlink carrier frequency(ies) of the serving cell(s)); Inter-RAT measurements of UTRA frequencies; Inter-RAT measurements of GERAN frequencies; Inter-RAT measurements of CDMA2000 HRPD or CDMA2000 1×RTT or WLAN frequencies; and/or CBR measurements.

The measurement configuration may include the following parameters:

Measurement objects (The objects on which the UE shall perform the measurements): For intra-frequency and inter-frequency measurements a measurement object may be a single E-UTRA carrier frequency. Associated with this carrier frequency, E-UTRAN may configure a list of cell specific offsets, a list of 'blacklisted' cells and a list of 'whitelisted' cells. Blacklisted cells may not be considered in event evaluation or measurement reporting. For inter-RAT UTRA measurements a measurement object may be a set of cells on a single UTRA carrier frequency. For inter-RAT GERAN measurements a measurement object may be a set of GERAN carrier frequencies. For inter-RAT CDMA2000 measurements a measurement object may be a set of cells on a single (HRPD or 1×RTT) carrier frequency. For inter-RAT WLAN measurements a measurement object may be a set of WLAN identifiers and optionally a set of WLAN frequencies. For CBR measurements a measurement object may be a set of transmission resource pools for V2X sidelink communication. Some measurements using the above mentioned measurement objects, may concern a single cell, e.g. measurements used to report neighbouring cell system information, PCell UE Rx-Tx time difference, or a pair of cells, e.g. SSTD measurements between the PCell and the PSCell.

Reporting configurations (A list of reporting configurations where each reporting configuration consists of the following): Reporting criterion (The criterion that triggers the UE to send a measurement report. This can either be periodical or a single event description); and/or Reporting format (The quantities that the UE includes in the measurement report and associated information (e.g. number of cells to report)).

Measurement identities: A list of measurement identities where each measurement identity links one measurement object with one reporting configuration. By configuring multiple measurement identities it may be possible to link more than one measurement object to the same reporting configuration, as well as to link more than one reporting configuration to the same measurement object. The measurement identity may be used as a reference number in the measurement report.

Quantity configurations: One quantity configuration may be configured per RAT type. The quantity configuration may define the measurement quantities and associated filtering used for all event evaluation and related reporting of that measurement type. One filter may be configured per measurement quantity.

Measurement gaps: Periods that the UE may use to perform measurements, i.e. no (UL, DL) transmissions may be scheduled.

E-UTRAN may configure a single measurement object for a given frequency (except for WLAN and except for CBR measurements), i.e. it may not be possible to configure two or more measurement objects for the same frequency with different associated parameters, e.g. different offsets and/or blacklists. E-UTRAN may configure multiple instances of the same event e.g. by configuring two reporting configurations with different thresholds. NR (new radio, 5G) may configure multiple measurement object for a given frequency.

The UE may maintain a single measurement object list, a single reporting configuration list, and/or a single measurement identities list. The measurement object list may include measurement objects, that may be specified per RAT type, possibly including intra-frequency object(s) (i.e. the object(s) corresponding to the serving frequency(ies)), inter-frequency object(s) and/or inter-RAT objects. Similarly, the reporting configuration list may include E-UTRA and/or inter-RAT reporting configurations. Any measurement object may be linked to any reporting configuration of the same RAT type. Some reporting configurations may not be linked to a measurement object. Likewise, some measurement objects may not be linked to a reporting configuration.

The measurement procedures may distinguish the following types of cells: The serving cell(s)—these may be the PCell and one or more SCells, if configured for a UE supporting CA. Listed cells—these may be cells listed within the measurement object(s) or, for inter-RAT WLAN, the WLANs matching the WLAN identifiers configured in the measurement object or the WLAN the UE is connected to. Detected cells—these may be cells that may not be listed within the measurement object(s) but may be detected by the UE on the carrier frequency(ies) indicated by the measurement object(s).

For E-UTRA, the UE may measure and/or report on the serving cell(s), listed cells, detected cells, transmission resource pools for V2X sidelink communication, and, for RSSI and channel occupancy measurements, the UE may measure and/or report on any reception on the indicated frequency. For inter-RAT UTRA, the UE may measure and/or report on listed cells and optionally on cells that may be within a range for which reporting is allowed by E-UTRAN. For inter-RAT GERAN, the UE may measure and/or report on detected cells. For inter-RAT CDMA2000, the UE may measure and/or report on listed cells. For inter-RAT WLAN, the UE may measure and/or report on listed cells. For inter-RAT UTRA and CDMA2000, the UE may measure and/or report also on detected cells for the purpose of SON. There may be the assumption that typically CSG cells of home deployment type may not be indicated within the neighbour list. Furthermore, the assumption may be that for non-home deployments, the physical cell identity may be unique within the area of a large macro cell (i.e. as for UTRAN).

E-UTRAN may applies the procedure as follows for measurement configuration: may ensure that, when the UE has a measConfig, it may include a measObject for serving frequency; may configure one or more measurement identities using a reporting configuration with the purpose set to reportCGI; for serving frequencies, may set the EARFCN within the corresponding measObject according to the band as used for reception/transmission; may configure at most one measurement identity using a reporting configuration with ul-DelayConfig.

For measurements, except for UE Rx-Tx time difference measurements, RSSI, UL PDCP Packet Delay per QCI measurement, channel occupancy measurements, CBR measurement, and except for WLAN measurements of Band, Carrier Info, Available Admission Capacity, Backhaul Bandwidth, Channel Utilization, and Station Count, the UE may applie the layer 3 filtering, before using the measured results for evaluation of reporting criteria or for measurement reporting.

UE may trigger a measurement report for: Event A1 (Serving becomes better than threshold), Event A2 (Serving becomes worse than threshold), Event A3 (Neighbour becomes offset better than PCell/PSCell), Event A4 (Neighbour becomes better than threshold), Event A5 (PCell/PSCell becomes worse than threshold1 and neighbour becomes better than threshold2), Event A6 (Neighbour becomes offset better than SCell), Event B1 (Inter RAT neighbour becomes better than threshold), Event B2 (PCell becomes worse than threshold1 and inter RAT neighbour becomes better than threshold2), Event C1 (CSI-RS resource becomes better than threshold), Event C2 (CSI-RS resource becomes offset better than reference CSI-RS resource), Event W1 (WLAN becomes better than a threshold), Event W2 (All WLAN inside WLAN mobility set becomes worse than threshold1 and a WLAN outside WLAN mobility set becomes better than threshold2), Event W3 (All WLAN inside WLAN mobility set becomes worse than a threshold), and/or Event V1 (The channel busy ratio is above a threshold), Event V2 (The channel busy ratio is below a threshold). UE may transmit, to the base station (E-UTRAN), one or more measured results. The UE may initiate this procedure only after successful security activation.

Figure 18:
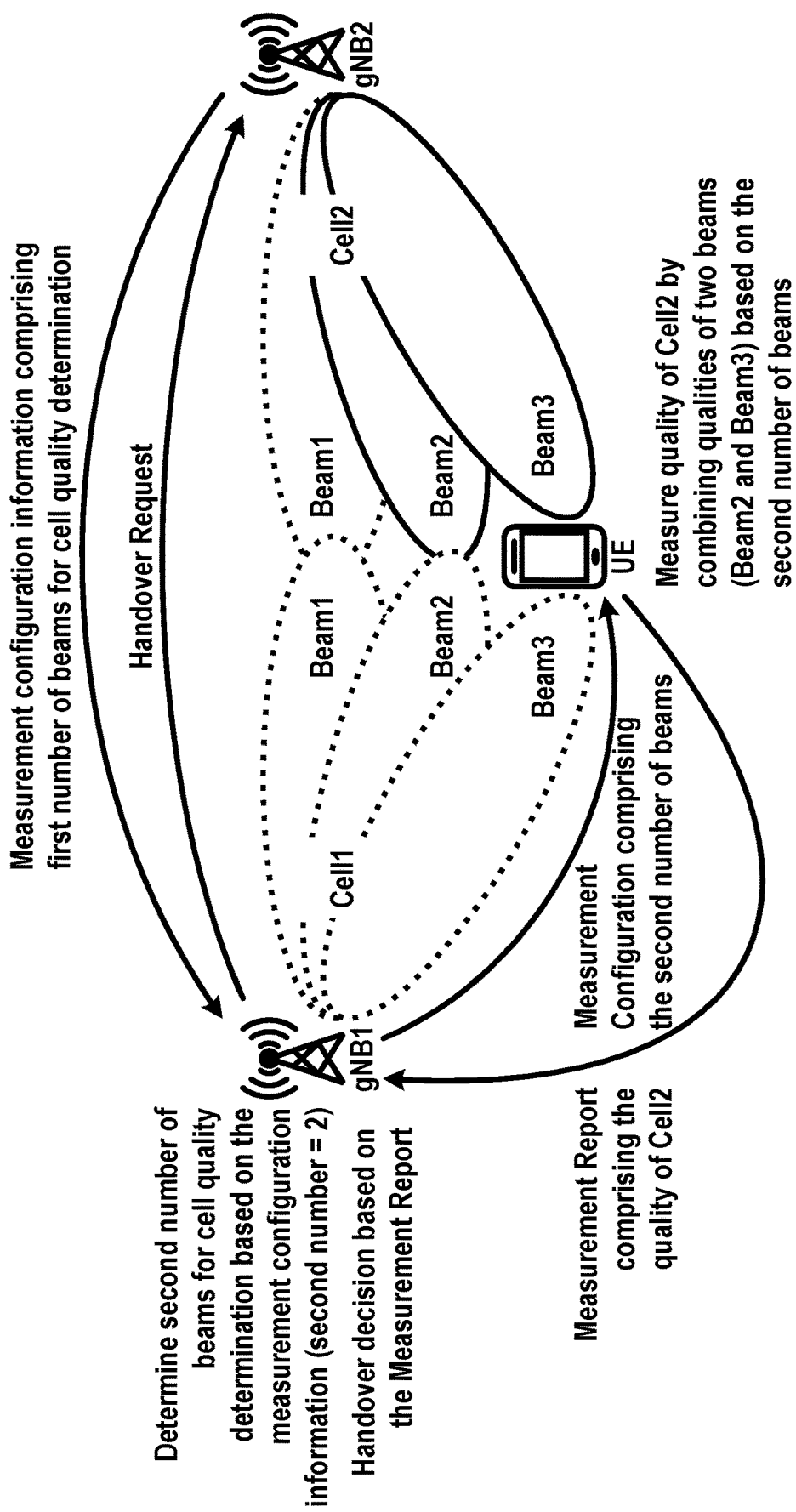
FIG. 18 is an example diagram as per an aspect of an embodiment of the present disclosure.
Figure 19:
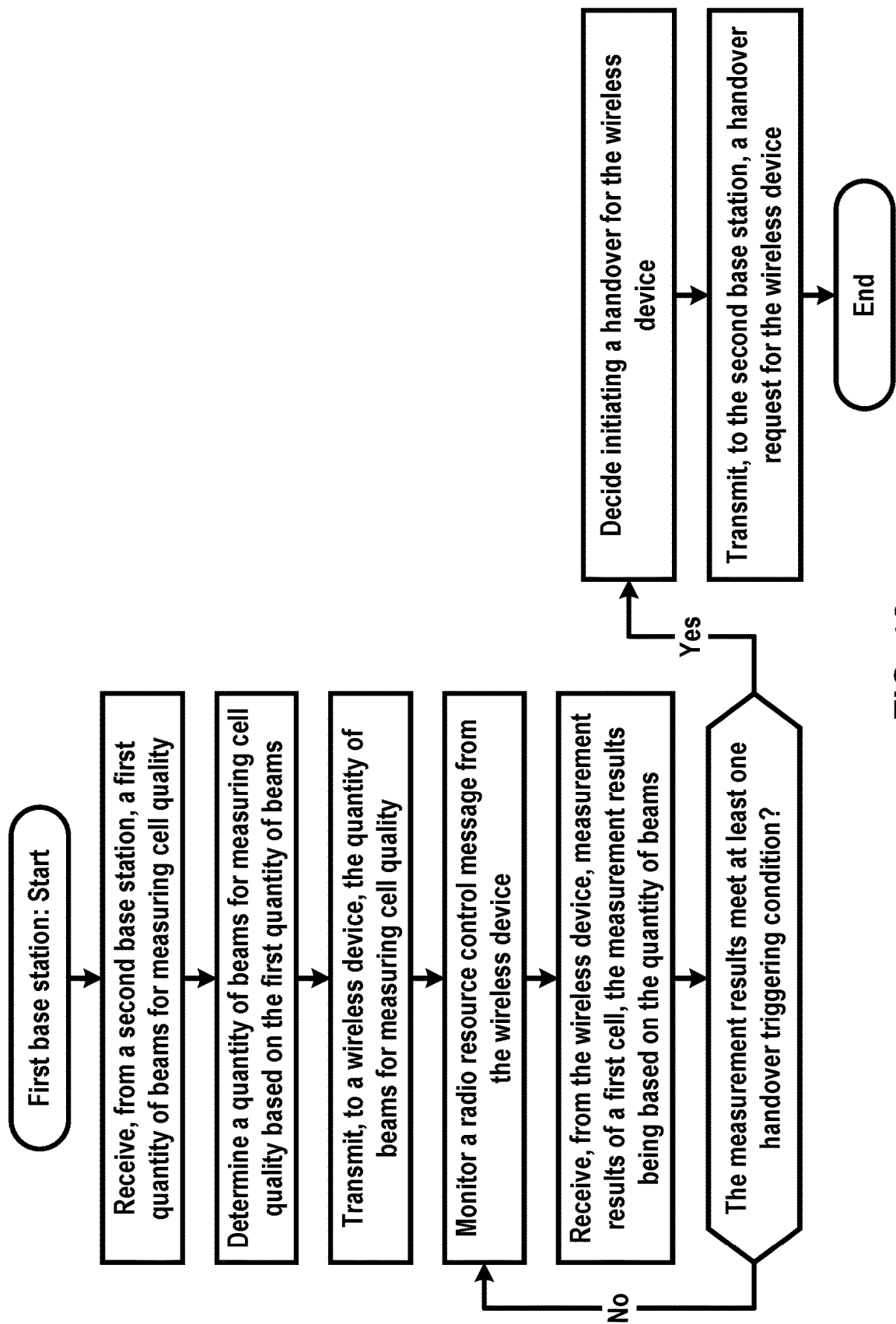
FIG. 19 is an example diagram as per an aspect of an embodiment of the present disclosure.

In an example embodiment, as shown in FIG. 18 and FIG. 19, a first base station may receive, from a second base station, a first message comprising a measurement configuration information. The first message may be a direct interface setup request message (e.g. Xn interface setup request), a direct interface setup response message (e.g. Xn interface setup response), a base station configuration update message (e.g. gNB configuration update), a base station configuration update response message (e.g. gNB configuration update response/acknowledge/failure), a mobility configuration change request message (e.g. mobility change request), a mobility configuration change response message (e.g. mobility change response/acknowledge/failure), and/or the like as shown in FIG. 17. In an example, the measurement configuration information may be associated with at least one of a first cell of the first base station and/or a second cell of the second base station. In an example, the measurement configuration information may comprise at least one of a first number of beams (e.g. first quantity of beams) and/or a second number of beams (e.g. second quantity of beams). The first number of beams and/or the second number of beams may be an integer value. The first number of beams may be employed to determine a cell quality of the first cell. The second number of beams may be employed to determine a cell quality of the second cell.

In an example, if the first cell of the first base station is a long-term-evolution (LTE) cell, the first number of beams transmitted via the first message may comprise no information, "0", and/or "1". The first base station receiving the first number of beams and/or a wireless device of the first base station may determine a cell quality of the first cell by measuring a reference signal received power and/or a reference signal received quality received via the first cell.

In an example, if the second cell of the second base station is a long term evolution (LTE) cell, the second number of beams transmitted via the first message may comprise no information, "0", and/or "1". The first base station receiving the second number of beams and/or a wireless device of the first base station may determine a cell quality of the second cell by measuring a reference signal received power and/or a reference signal received quality received via the second cell.

In an example, the first base station receiving the first message with the measurement configuration information may determine a third number of beams at least based on one or more elements of the first message. The third number of beams may be employed to determine a cell quality of the first cell and/or the second cell, e.g. one or more serving or neighboring cells. A number of beams for determining a cell quality of the first cell may be different from a number of beams for determining a cell quality of the second cell. In an example, the first base station may transmit, to a wireless device, a second message comprising the third number (e.g. quantity) of beams. The wireless device may employ the third number of beams to determine a cell quality of one or more cells (e.g. the first cell and/or the second cell). In an example, the second message may be an RRCConnectionReconfiguration message, an RRCConnectionResume message, an RRCConnectionReestablishment message, an RRCConnectionSetup message, and/or the like.

In an example, the wireless device may determine a cell quality by combining (e.g. averaging or summing) at least the third number of beam qualities of at least the third number of beams. In an example, if the third number of beams is N, the wireless device may combine at least N beam qualities of at least N beams of a cell to determine a cell quality of the cell. In an example, if the third number of beams is N, the wireless device may combine N beam qualities of N beams of a cell to determine a cell quality of the cell.

In an example, the wireless device may average at least the third number of beam qualities of at least the third number of beams to determine a cell quality. In an example, if the third number of beams is N, the wireless device may average at least N beam qualities of at least N beams of a cell to determine a cell quality of the cell. In an example, if the third number of beams is N, the wireless device may average N beam qualities of N beams of a cell to determine a cell quality of the cell. In an example, the wireless device may determine a beam quality at least based on a reference signal received power (RSRP) and/or a reference signal received quality (RSRQ) of a beam.

In an example, the measurement configuration information of the first message may comprise at least one of a first absolute threshold value and/or a second absolute threshold value. The first absolute threshold value may be for determining a cell quality of the first cell. The second absolute threshold value may be for determining a cell quality of the second cell. In an example, the first base station may transmit, to the wireless device, a third absolute threshold value determined based on at least one of the first absolute threshold value and the second absolute threshold value. The wireless device may determine a cell quality of a cell by combining one or more beam qualities of one or more beams of the cell, wherein the one or more beams may have higher (and/or same) beam qualities than (and/or to) the third absolute threshold value. In an example, the wireless device may transmit, to the first base station, the cell quality of the cell determined at least based on the third absolute threshold value.

In an example, the first base station may transmit, to the second base station, a third message in response to the first message. The third message may be transmitted to acknowledge that the first base station complies one or more elements of the measurement configuration information. In an example, the third message may be a direct interface setup response message (e.g. Xn interface setup response), a base station configuration update message (e.g. gNB configuration update), a base station configuration update response message (e.g. gNB configuration update response/acknowledge/failure), a mobility configuration change request message (e.g. mobility change request), a mobility configuration change response message (e.g. mobility change response/acknowledge/failure), and/or the like. In an example, the third message may comprise a list of one or more accepted elements from the first message. The third message may comprise an indication indicating whether the first base station accepts the first number of beams and/or whether the first base station accepts the second number of beams. The third message may comprise an indication indicating whether the first base station accepts the first absolute threshold value and/or whether the first base station accepts the second absolute threshold value.

In an example, the first base station may transmit, to the second base station, a fourth message in response to the first message. The fourth message may be to indicate that the first base station rejects one or more elements of the measurement configuration information. In an example, the third message may be a direct interface setup response message (e.g. Xn interface setup response), a base station configuration update message (e.g. gNB configuration update), a base station configuration update response message (e.g. gNB configuration update response/acknowledge/failure), a mobility configuration change request message (e.g. mobility change request), a mobility configuration change response message (e.g. mobility change response/acknowledge/failure), and/or the like. In an example, the fourth message may comprise a list of one or more accepted elements from the first message. The fourth message may comprise an indication indicating whether the first base station rejects the first number of beams and/or whether the first base station rejects the second number of beams. The fourth message may comprise an indication indicating whether the first base station rejects the first absolute threshold value and/or whether the first base station rejects the second absolute threshold value.

In an example, the fourth message may comprise at least one of: a range of a number of beams to determine a cell quality of at least one of the first cell and/or the second cell; a range of an absolute threshold value to determine a cell quality of at least one of the first cell and/or the second cell; a cause of rejecting the one or more elements of the measurement configuration information; and/or one or more updated elements from one or more elements of the measurement configuration information.

In an example, the range of a number of beams to determine a cell quality may comprise a maximum number of beams to determine a cell quality of at least one of the first cell and/or the second cell, and/or a minimum number of beams to determine a cell quality of at least one of the first cell and/or the second cell. In an example, the range of an absolute threshold value to determine a cell quality may comprise a maximum absolute threshold value to determine a cell quality of at least one of the first cell and/or the second cell, and/or a minimum absolute threshold value to determine a cell quality of at least one of the first cell and/or the second cell. In an example, the cause of rejecting the one or more elements of the measurement configuration information may comprise at least one of a beam configuration change, an out of range for a number of beams to determent a cell quality, a beam configuration reset, no operating beam, a consistency with other cells, and/or the like.

In an example, the wireless device may transmit, to the first base station, a fifth message comprising a cell quality information for one or more cells (e.g. the first cell and/or the second cell). In an example, the wireless device may determine a cell quality of the cell quality information at least based on the third number of beams received via the second message. In an example, the fifth message may be a MeasurementReport message, a UEInformationResponse message, and/or the like. In an example, the cell quality information may be determined at least based on the third absolute threshold value received from the first base station.

In an example, the first base station may make a decision for the wireless device at least based on one or more elements of the fifth message. In an example, the decision may be at least one of a handover initiation, a multi connectivity initiation (e.g. a dual connectivity initiation), a multi connectivity modification (e.g. a dual connectivity modification), a dual connectivity change initiation (e.g. SgNB change initiation by an SgNB), a secondary cell addition, a secondary cell modification, a secondary cell release, and/or the like. In an example, the handover initiation may be for a handover of the wireless device from the first cell to the second cell. In an example, in response to the decision for the wireless device, the first base station may transmit, to the second base station, a sixth message. In an example, the sixth message may be configured to request a handover of the wireless device from the first cell to the second cell, a multi connectivity initiation (e.g. dual connectivity initiation) for the wireless device employing the second cell, a multi connectivity modification (e.g. dual connectivity modification), a dual connectivity change initiation (e.g. SgNB change initiation, wherein a source SgNB may be the first base station and/or a target SgNB may be the second base station), and/or the like.

Example

In an example, the first base station may receive, from a second base station, a first message comprising a measurement configuration information associated with at least one of a first cell of the first base station and/or a second cell of the second base station. The measurement configuration information may comprise at least one of: a first number of beams for determining a cell quality of the first cell, and/or a second number of beams for determining a cell quality of the second cell. The first base station may transmit, to a wireless device, a second message comprising a third number of beams, wherein the third number of beams may be determined employing at least one or more elements of the first message. The first base station may transmit, to the second base station, a third message configured to indicate accepting one or more elements of the measurement configuration information. The first base station may transmit, to the second base station, a fourth message configured to indicate rejecting one or more elements of the measurement configuration information. The fourth message may comprise at least one of: a range of a number of beams to calculate a cell quality of at least one of the first cell and the second cell; a cause of rejecting the one or more elements of the measurement configuration information; and/or one or more updated elements from one or more elements of the measurement configuration information.

In an example, the first base station may receive, from the wireless device, a fifth message comprising a cell quality of one or more cells determined at least based on the third number of beams. The first base station may transmit, to the second base station at least based on one or more elements of the fifth message, a sixth message configured to request at least one of: a handover from the first cell to the second cell; an initiation of a multi connectivity employing the second cell; a modification of a multi connectivity employing the second cell; and/or a secondary base station change initiation for a dual connectivity employing the second cell.

The wireless device may determine a cell quality by combining one or more beam qualities of one or more beams of a cell. The one or more beam qualities may comprise at least one of a reference signal received power and/or a reference signal received quality measured based on at least one of a synchronization signal and/or a reference signal via the one or more beams. The measurement configuration information may further comprise at least one of a first absolute threshold value and/or a second absolute threshold value, wherein the first absolute threshold value may be for determining a cell quality of the first cell, and/or the second absolute threshold value may be for determining a cell quality of the second cell.

In an example, the first base station may transmit, to the wireless device, a third absolute threshold value determined based on at least one of the first absolute threshold value and/or the second absolute threshold value. The first base station may receive, from the wireless device, a cell quality of one or more cells determined at least based on the third absolute threshold value. The wireless device may determine the cell quality by combining one or more beam qualities of one or more beams that may have higher (or same) beam qualities than (or to) the third absolute threshold value.

Measurement Configuration

In a beam based cellular network system, a cell area may be formed with multiple beams (e.g. SS beams and/or CSI-RS beams). In an example, each beam covering partial area may be swept over a cell coverage area, and different beam coverage areas may have different radio conditions. A base station needs to consider beam level measurement results and to recognize when a beam level radio quality change occurs to a wireless device. In an example, when a wireless device moves from cell1 area to cell2 area, sets of considered beams of cell1 and cell2 may affect a handover decision of a base station. A handover decision for mobility from beam set-A of cell1 to beam set-B of cell2 may be based on different policies from a handover from beam set-C of cell1 to beam set-D of cell2 for one or more reasons (e.g. each beam set is served by different transmission-reception-points (TRPs); a cell area of certain beam set has significant interferences or is in high traffic load state; etc.). Implementation of existing measurement events defined at a cell level or a single CSI-RS level may not be efficient. The existing technology may decrease mobility performance of wireless devices when multiple beams are configured for cells. The existing technology may increase call dropping rate and packet transmission delay when a wireless device moves. The increased call dropping rate and the increased packet transmission delay may decrease communication reliability.

Example embodiments enhance measurement configuration mechanisms for a wireless device when multiple beams are configured to cover serving cell area, by supporting measurement events and measurement reports based on a set of beams. Example embodiments may reduce connection failure rate and/or radio quality degradation issues by enabling base stations to configure beam level measurement events. Example embodiments may improve communication reliability by supporting beam specific measurement report triggers of a wireless device.

In an example, for single cell scenarios, a cell may have remote radio heads aka transmission points, which may share same cell ID. A transmission point may be reflected by a CSI-RS and/or SS which may have different scrambling sequence from a cell ID. One TRP may have several CSI-RSs and/or SSs which may represent different beams. There may be a need to be able to identify and report TRP quality in addition to cell quality and/or existing measurement events are not able to distinguish a TRP.

In an example, a use case for CSI-RS based triggering and reporting may be large single TRP cells, where signal strength conditions may vary largely at cell border between different geographical locations. For example, a street corner may make a beam fade rapidly for a user whereas on other side of the cell, RSRP quality change between two cells may be much smoother. A deep fade of beam at street corner may be an issue for NR where cell is formed of beams. With proper network planning, there may be beams covering other side of corner. A CSI-RS based mobility event may enable a base station to set more aggressive triggering for certain beams which are on both sides of a street corner which may enable timely HO to other cell. If this aggressive setting is applied for CSI-RS beams, or sets of beams, measurement reports may be sent accordingly on other sides of the cell edge.

In an example, a wireless device may be configured to measure signal quality of associated CSI-RS, and/or may be configured with event C1 (CSI-RS resource becomes better than threshold) and/or event C2 (CSI-RS resource becomes offset better than reference CSI-RS resource). These events may be configured with individual offsets, hysteresis, and/or thresholds.

One challenge due to beam based report triggering may be potentially excessive signaling since per-beam report triggering and narrow beams may give numerous beam transitions over a short time window. A solution may be to use set of beams in measurement event triggering conditions. In an example, an event triggering condition may be that a set of CSI-RS becomes better than a threshold. In an example, relative comparisons for event triggering may be generalized to group of beams. In an example, existing C2 event may be generalized to consider CSI-RS groups of one or more CSI-RSs.

In an example embodiment, a wireless device may transmit to a base station a measurement report, which may comprise a measurement result for one or more beams and/or one or more cells. The transmitting of a measurement report may be triggered at least based on one or more conditions and/or one or more measurement configurations. The one or more conditions and/or the one or more measurement configurations may be configured by a base station and/or pre-configured for a wireless device. In an example embodiment, one or more conditions and/or one or more measurement configurations may support a measurement report from a wireless device to a base station for one or more beams and/or one or more cells.

In an example, a cell may be operated with one or more beams employing a multi-antenna system. A beam may have a spatial direction, and/or may cover a part of a cell coverage area. A combination of one or more beam spatial areas may form cell coverages. In an example, a beam transmitting a synchronization signal and/or receiving a signal from a wireless device may be swept over a cell coverage area in a predetermined way. A synchronization signal scheduling information and/or a synchronization signal sequence may be used to identify a swept beam. A swept beam may broadcast one or more control information comprising at least one of a system information, a master information, a PDCCH, a PRACH resource, a random access preamble information, a synchronization signal, a reference signal, and et cetera. In an example, a beam may transmit a reference signal (e.g. CSI-RS).

Figure 20:
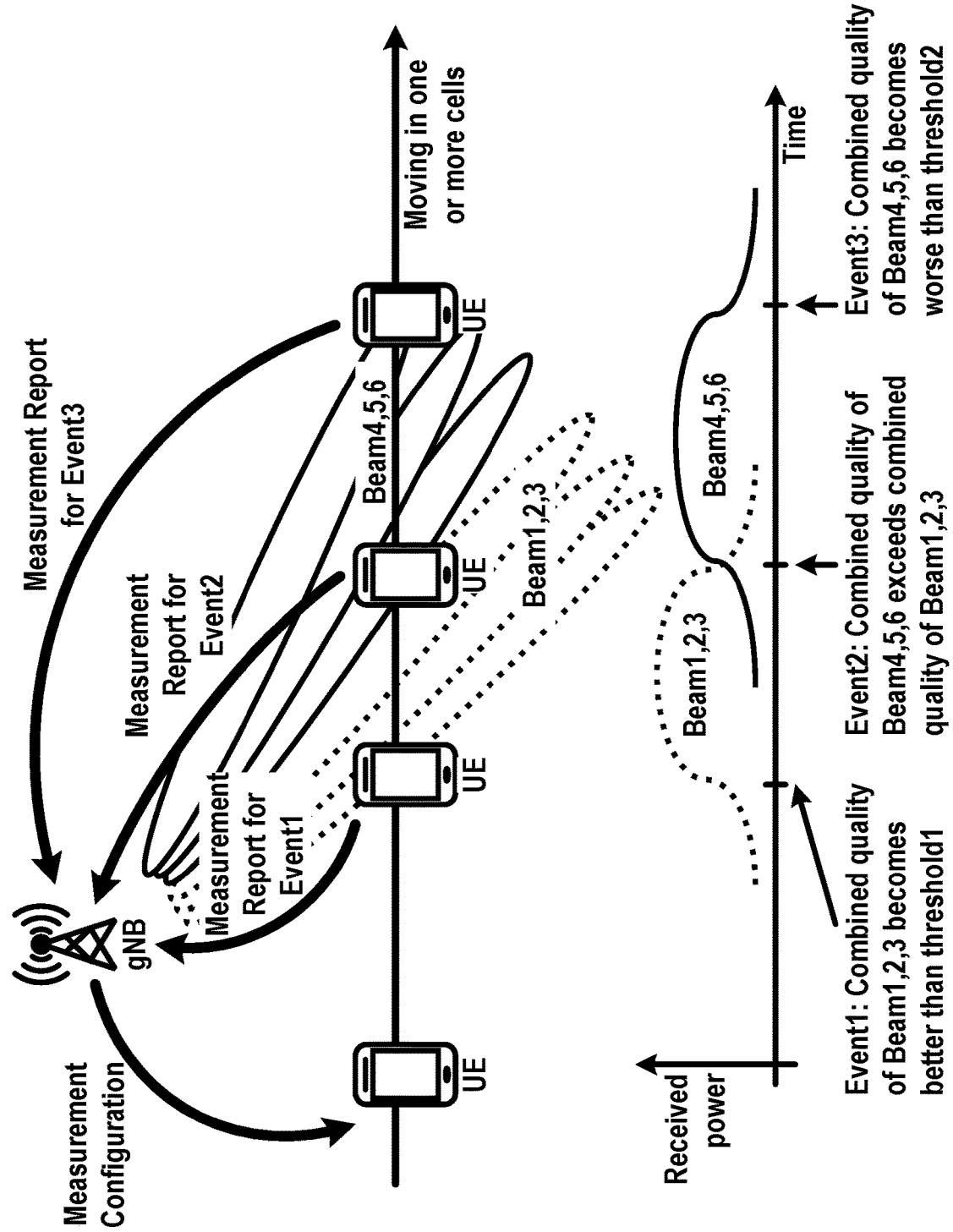
FIG. 20 is an example diagram as per an aspect of an embodiment of the present disclosure.
Figure 21:
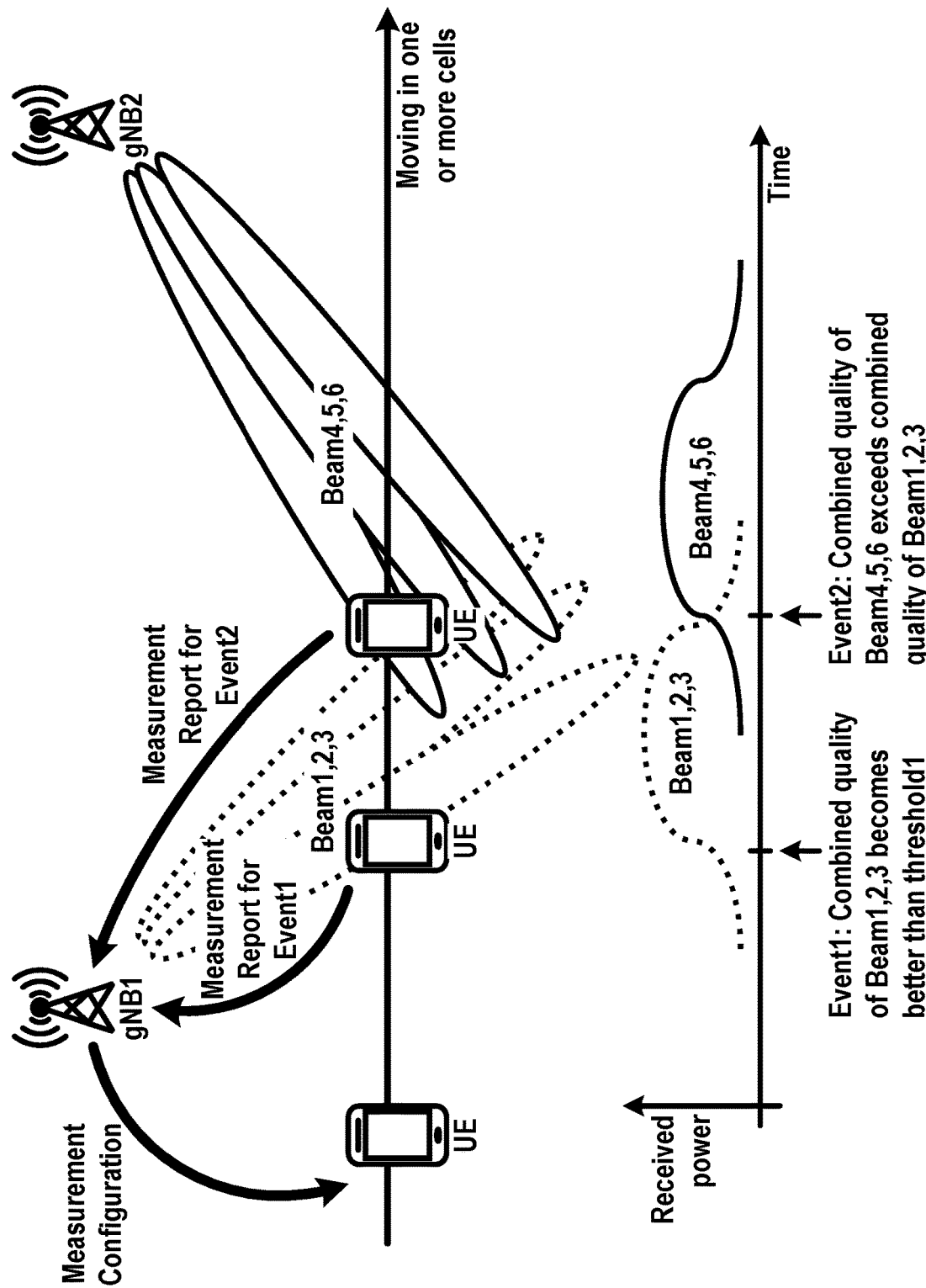
FIG. 21 is an example diagram as per an aspect of an embodiment of the present disclosure.

In an example, as shown in FIG. 20 and FIG. 21, a wireless device may receive from a first base station a measurement configuration comprising one or more first cell identifiers of one or more first cells, one or more first beam information of one or more first beams, a beam individual offset value for one or more of the one or more first beams, a first number of first beams to be measured for measuring a cell quality, a second number of second beams to be reported, a carrier frequency information, a first timer value, an offset value for a comparison between a synchronization signal and a reference signal, an offset value for combining measurement results based on synchronization signals and/or reference signals, and/or the like. The wireless device may perform a measurement of one or more reference signal received powers (RSRP) and/or one or more reference signal received qualities (RSRQ) of one or more of the one or more first cells and/or one or more of the one or more first beams (e.g. multiple beams) at least based on one or more elements of the measurement configuration. The wireless device may measure the RSRP and/or the RSRQ at least based on one or more synchronization signals (e.g. SS block) and/or one or more reference signals (e.g. CSI-RS, DM-RS, CRS, and/or the like) received through one or more cells and/or one or more beams.

In an example, the one or more first cell identifiers may comprise a physical cell identifier, a global cell identifier, a temporary cell identifier, and/or the like. The wireless device may identify one of the one or more first cell at least based one or more elements of the one or more first cell identifiers and/or one or more information broadcasted through the one of the one or more first beams.

In an example, the one or more first beam information may comprise a beam identifier (e.g. beam index), a beam scheduling information, a beam configuration information, a synchronization signal scheduling information, a synchronization signal sequence information, a synchronization signal block identifier, a reference signal scheduling information, a reference signal configuration information, a reference signal block identifier, and/or the like. The wireless device may identify one of the one or more first beam at least based one or more elements of the one or more first beam information and/or one or more information broadcasted through the one of the one or more first beams.

In an example, the wireless device may employ the beam individual offset value to compare one or more beams associated with the beam individual offset value to one or more another beams, one or more cells, and/or one or more thresholds (e.g. one or more configured power values). In an example, the wireless device may determine whether reporting a measurement result to the first base station at least based on the comparison result that the beam individual offset value is applied for. The beam individual offset value may be defined in a dB scale.

In an example, the first number of first beams to be measured for measuring a cell quality may be an integer value indicating a number of beams that the wireless device may need to consider to derive a cell quality of a serving cell and/or a neighboring cell. A cell quality may be measured by combining one or more reference signal received powers (RSRPs) of one or more beams of a cell being measured. A cell quality may be measured by combining one or more reference signal received qualities (RSRQs) of one or more beams of a cell being measured. In an example, the second number of second beams to be reported may be an integer value indicating a number of beams that the wireless device may need to report for a measurement report. The second number of second beams to be reported may be configured for one or more serving cell and/or one or more neighboring cells.

In an example, the first timer value may indicate one or more time durations that one or more measurement report conditions may need to be satisfied for to initiate a measurement report. In an example, the offset value for a comparison between a synchronization signal and a reference signal may indicate an offset amount that may need to be considered when the wireless device compares a first beam quality (e.g. RSRP and/or RSRQ) based on a synchronization signal (e.g. SS block) and a second beam quality based on a reference signal (e.g. CSI-RS, DM-RS). In an example, the offset value for combining measurement results based on a synchronization signal and/or a reference signal may indicate an offset amount that may need to be considered when the wireless device combines a first beam quality (e.g. RSRP and/or RSRQ) based on a synchronization signal (e.g. SS block) and a second beam quality based on a reference signal (e.g. CSI-RS, DM-RS).

Figure 22:
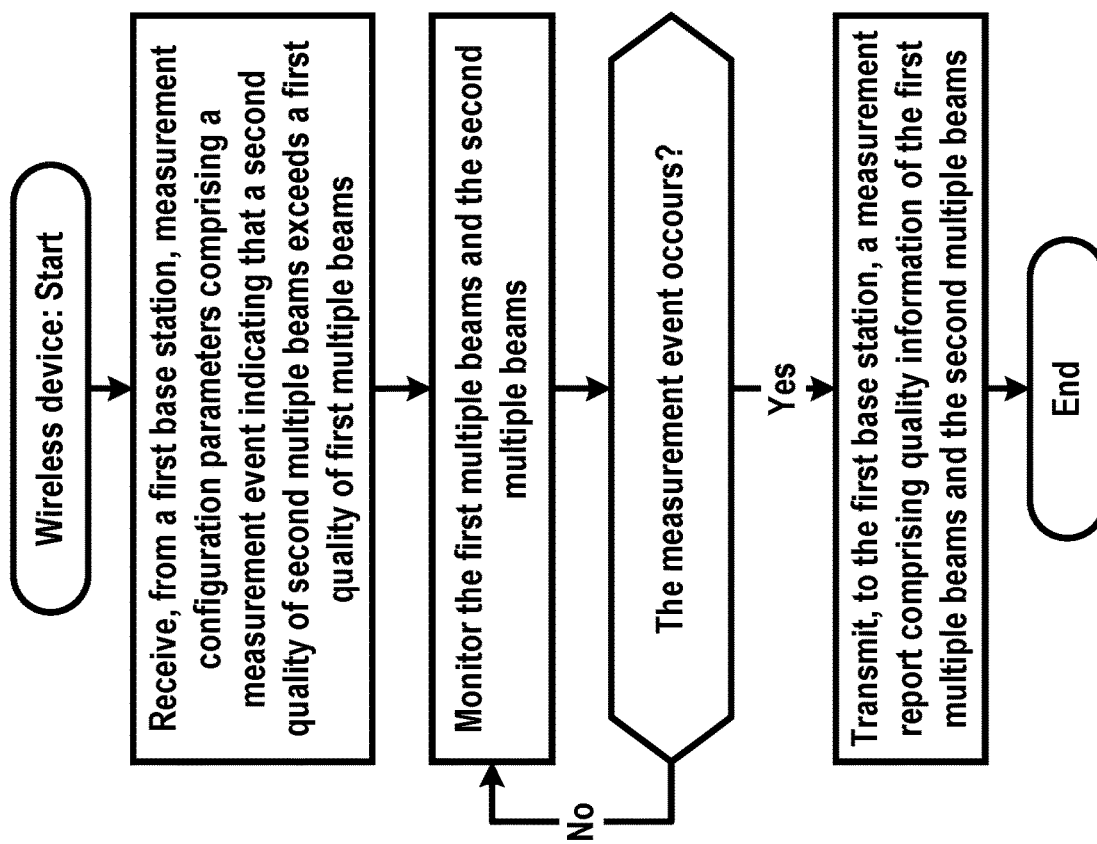
FIG. 22 is an example diagram as per an aspect of an embodiment of the present disclosure.

In an example embodiment, as shown in FIG. 22, the wireless device may determine whether to report a measurement result to the first base station at least based on one or more measurement report conditions. The one or more measurement report conditions may be pre-configured to the wireless device. The one or more measurement report conditions may comprise: a measurement result (e.g. a reference signal received power and/or a reference signal received quality) of a first serving beam is better and/or worse than a measurement result (e.g. a reference signal received power and/or a reference signal received quality) of a second serving beam by more than a first offset value (e.g. the first offset value may be calculated at least based on one or more beam individual offset values); a measurement result (e.g. a reference signal received power and/or a reference signal received quality) of a serving beam is better and/or worse than a measurement result (e.g. a reference signal received power and/or a reference signal received quality) of a non-serving beam by more than a second offset value (e.g. the second offset value may be calculated at least based on one or more beam individual offset values); and/or a combined (e.g. averaged or summed) measurement result (e.g. a combined reference signal received power and/or a combined reference signal received quality) of one or more beams (e.g. multiple beams) of a serving cell is better and/or worse than a combined (e.g. averaged or summed) measurement result (e.g. a combined reference signal received power and/or a combined reference signal received quality) of one or more beams (e.g. multiple beams) of a non-serving cell and/or a serving cell by more than a third offset value (e.g. the third offset value may be calculated at least based on one or more beam individual offset values).

The one or more measurement report conditions may further comprise: a measurement result (e.g. a reference signal received power and/or a reference signal received quality) of a beam is better and/or worse than a first threshold by more than a fourth offset value (e.g. the fourth offset value may be calculated at least based on one or more beam individual offset values); a combined (e.g. averaged or summed) measurement result (e.g. a combined reference signal received power and/or a combined reference signal received quality) of one or more beams (e.g. multiple beams) is better and/or worse than a second threshold by more than a fifth offset value (e.g. the fifth offset value may be determined/calculated at least based on one or more beam individual offset values) (e.g. power value).

The one or more measurement report conditions may further comprise: a measurement result (e.g. a reference signal received power and/or a reference signal received quality) of a first serving beam is better and/or worse than a measurement result (e.g. a reference signal received power and/or a reference signal received quality) of a serving cell by more than a offset value (e.g. the offset value may be calculated at least based on one or more beam individual offset values and/or one or more cell individual offset values); a measurement result (e.g. a reference signal received power and/or a reference signal received quality) of a serving beam is better and/or worse than a measurement result (e.g. a reference signal received power and/or a reference signal received quality) of a non-serving cell by more than a offset value (e.g. the offset value may be calculated at least based on one or more beam individual offset values and/or one or more cell individual offset values); and/or a combined (e.g. averaged or summed) measurement result (e.g. a combined reference signal received power and/or a combined reference signal received quality) of one or more beams (e.g. multiple beams) of a serving cell is better and/or worse than a measurement result (e.g. a combined reference signal received power and/or a combined reference signal received quality) of a non-serving cell and/or a serving cell by more than a offset value (e.g. the offset value may be calculated at least based on one or more beam individual offset values and/or one or more cell individual offset values).

The one or more measurement report conditions may further comprise: a measurement result (e.g. a reference signal received power and/or a reference signal received quality) of a beam is better and/or worse than a measurement result (e.g. a reference signal received power and/or a reference signal received quality) of a cell by more than a offset value (e.g. the offset value may be calculated at least based on one or more beam individual offset values and/or one or more cell individual offset values); and/or a combined measurement result (e.g. a combined reference signal received power and/or a combined reference signal received quality) of one or more beams is better and/or worse than a measurement result (e.g. a combined reference signal received power and/or a combined reference signal received quality) of a cell by more than a offset value (e.g. the offset value may be calculated at least based on one or more beam individual offset values and/or one or more cell individual offset values).

In an example, in response to determining whether to report a measurement result, the wireless device may transmit one or more elements of a measurement result to the first base station. The measurement result may comprise a reference signal received powers and/or a reference signal received qualities of one or more beams, a combined reference signal received powers and/or a combined reference signal received qualities of one or more beams, a number of beams considered to calculate a combined reference signal received powers and/or a combined reference signal received qualities, one or more elements of the beam information of one or more beams, a reference signal received powers and/or a reference signal received qualities of one or more cells, and/or one or more cell identifiers of one or more cells. The measurement result may further comprise an indication of whether a (combined) reference signal received powers and/or a (combined) reference signal received qualities of one or more beams were measured based on a synchronization signal (e.g. SS block) or based on a reference signal (e.g. CSI-RS, DM-RS).

Figure 23:
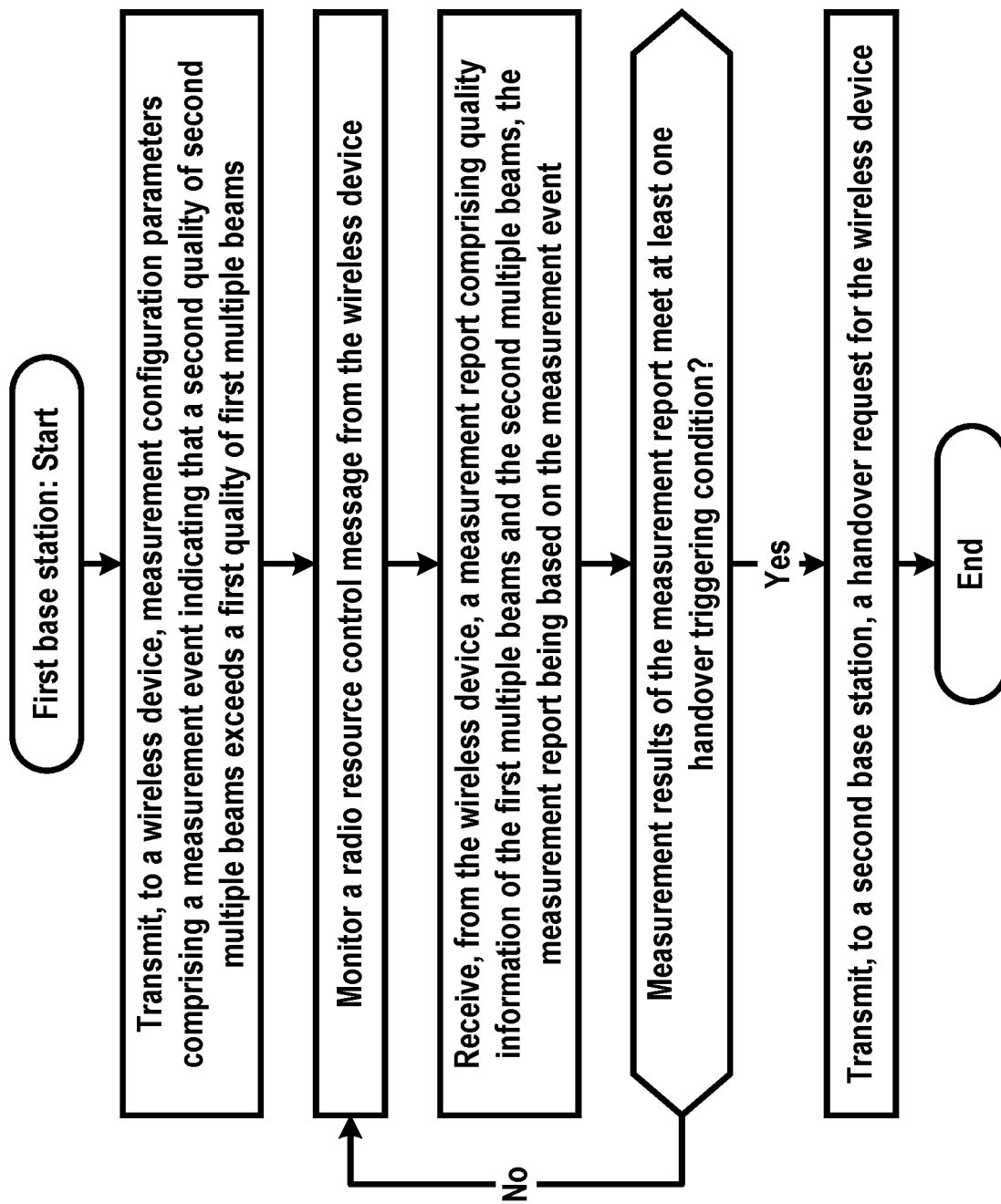
FIG. 23 is an example diagram as per an aspect of an embodiment of the present disclosure.

In an example, as shown in FIG. 23, the first base station may initiate a handover, a multi connectivity, and/or a multi connectivity modification for the wireless device at least based on one or more of the one or more elements of the measurement result. In an example, if the measurement result meets a handover triggering condition to a handover target cell, the first base station may transmit a handover request message to a base station serving the target cell. The handover request message may comprise one or more elements of the measurement result of the wireless device, a wireless device identifier of the wireless device, a cell identifier of the target cell, and/or the like.

Example

Figure 24:
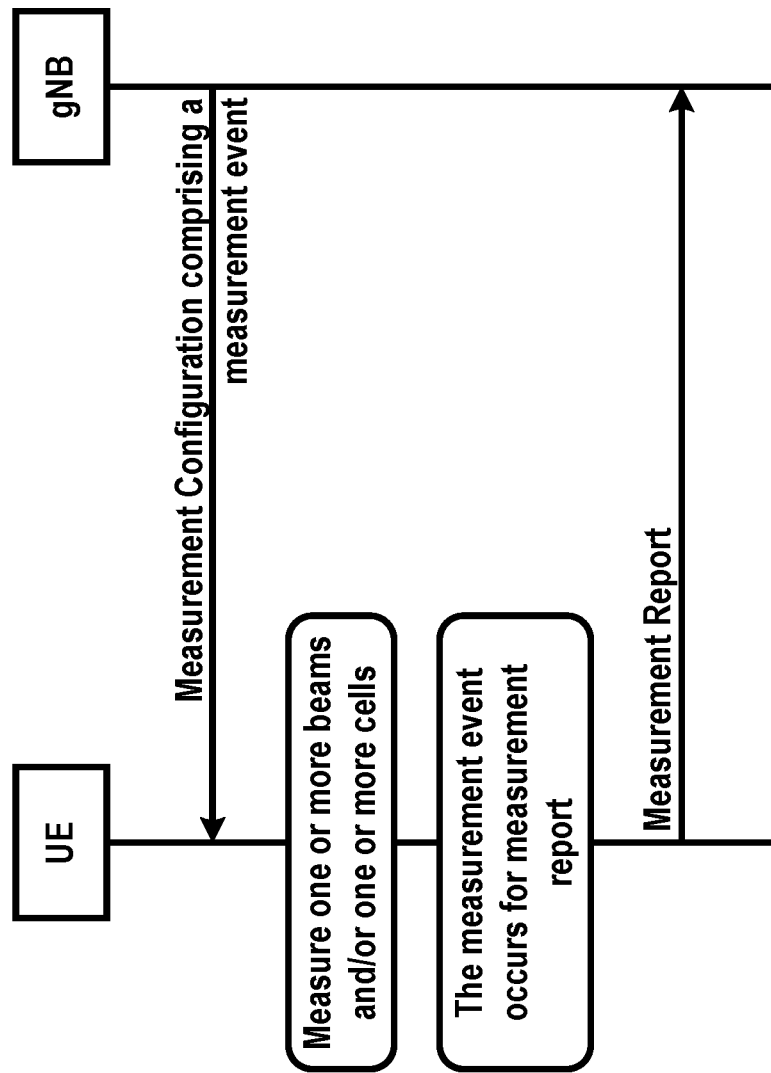
FIG. 24 is an example diagram as per an aspect of an embodiment of the present disclosure.

In an example, as shown in FIG. 24, a wireless device may receive, from a first base station, a measurement configuration configured to initiate a measurement by the wireless device. The wireless device may perform the measurement of at least one of one or more reference signal received powers and/or one or more reference signal received qualities of at least one of one or more cells and one or more beams. The wireless device may make a determination of whether at least one of one or more conditions are satisfied at least based on a measurement result of the measurement. The wireless device may transmit, to the first base station, a measurement report at least based on the determination, the measurement report comprising one or more elements of the measurement result. In an example, the measurement configuration may further comprise a beam individual offset value for a measurement report.

In an example, the one or more conditions may be at least one of: a reference signal received power of a first serving beam is better and/or worse than a reference signal received power of a second serving beam by more than a first offset value; a reference signal received power of a serving beam is better and/or worse than a reference signal received power of a non-serving beam by more than a second offset value; and/or a combined reference signal received power of a first number of beams of a serving cell is better and/or worse than a (combined) reference signal received power of a second number of beams of a non-serving cell and/or a serving cell by more than a third offset value.

In an example, the measurement result may further comprise at least one of: a reference signal received power of a beam; a reference signal received quality of a beam; a combined reference signal received power of one or more beams; a combined reference signal received quality of one or more beams; and/or an indication of whether a reference signal received powers and/or a reference signal received qualities of one or more beams were measured based on a synchronization signal or based on a reference signal.

Connection Failure Report

In a beam based cellular network system, a cell area may be formed with multiple beams (e.g. SS beams and/or CSI-RS beams). In an example, each beam covering partial area is swept over a cell coverage area, and different beam coverage areas may have different radio conditions. Radio signaling quality of a wireless device may depends on location of a wireless device and which beam a wireless device is employing. For example, if beam1 of a cell is more interfered by neighboring cells than beam2 of the cell, a first wireless device served via beam1 may have worse radio quality than a second wireless device served via beam2. If a wireless device experiences a connection failure at a cell, a base station may fix a problem causing the connection failure, e.g. beam configurations causing the connection failure. An implementation of existing technologies supports cell-level connection failure report of a wireless device. For example, if a wireless device experiences a connection failure, the wireless device reports, to a network, connection failure (e.g. radio link failure, handover failure) information such as cell identifiers and or cell quality information. Based on cell-level connection failure information, a base station may be difficult to figure out which beam has a problem that causes a connection failure of a wireless device. The existing technology may decrease service reliability of wireless devices when multiple beams are configured for cells. The existing technology may increase call dropping rate and packet transmission delay. The increased call dropping rate and the increased packet transmission delay may decrease communication reliability.

Example embodiments enhance connection failure report mechanisms for a wireless device when multiple beams are configured to cover serving cell area, by supporting connection failure report (e.g. RLF report, HOF report) at a beam level (e.g. beam indexes and/or beam qualities of last serving beam, neighboring beam, beam failure recovery attempted beam, and/or the like). Example embodiments may reduce connection failure rate and/or radio quality degradation issues by enabling base stations to recognize and fix beam level radio configuration issues. Example embodiments may improve communication reliability by supporting beam specific connection failure reports of a wireless device.

In an example embodiment, a wireless device that experiences a radio link failure may try to make a radio resource control connection to a new cell. If the wireless device establishes a radio resource control connection to the new cell, the wireless device may transmit a radio link failure report to a base station serving the new cell. The base station may report the radio link failure of the wireless device to an old base station where the wireless device experienced the radio link failure and/or where a mobility procedure that caused the radio link failure was initiated. The old base station receiving the radio link failure report for the wireless device may analysis a reason of the radio link failure and/or may reconfigure mobility settings initiating a handover.

Example embodiment may enable the base station to analyze the radio link failure and/or to reconfigure mobility settings with respect to one or more beams by enabling a wireless device to report a radio link failure information with a beam information of one or more beams. In an example embodiment, a wireless device that experiences a radio link failure may transmit a beam information to a new base station, and/or the new base station may transmit one or more elements of the beam information to an old base station. The old base station may analyze the radio link failure at least based on the beam information, and/or may reconfigure one or more mobility settings and/or one or more system parameters for one or more beams at least based on one or more elements of the beam information.

In an example, a cell may be operated with one or more beams employing a multi-antenna system. A beam may have a spatial direction, and/or may cover a part of a cell coverage area. A combination of one or more beam spatial areas may form a cell coverage. In an example, a beam transmitting a synchronization signal and/or receiving a signal from a wireless device may be swept over a cell coverage area in a predetermined way. A synchronization signal scheduling information and/or a synchronization signal sequence may be used to identify a swept beam. A swept beam may broadcast one or more control information comprising at least one of a system information, a master information, a PDCCH, a PRACH resource, a random-access preamble information, a synchronization signal, a reference signal, and the like. In an example, a beam may transmit a reference signal (e.g. CSI-RS).

Figure 25:
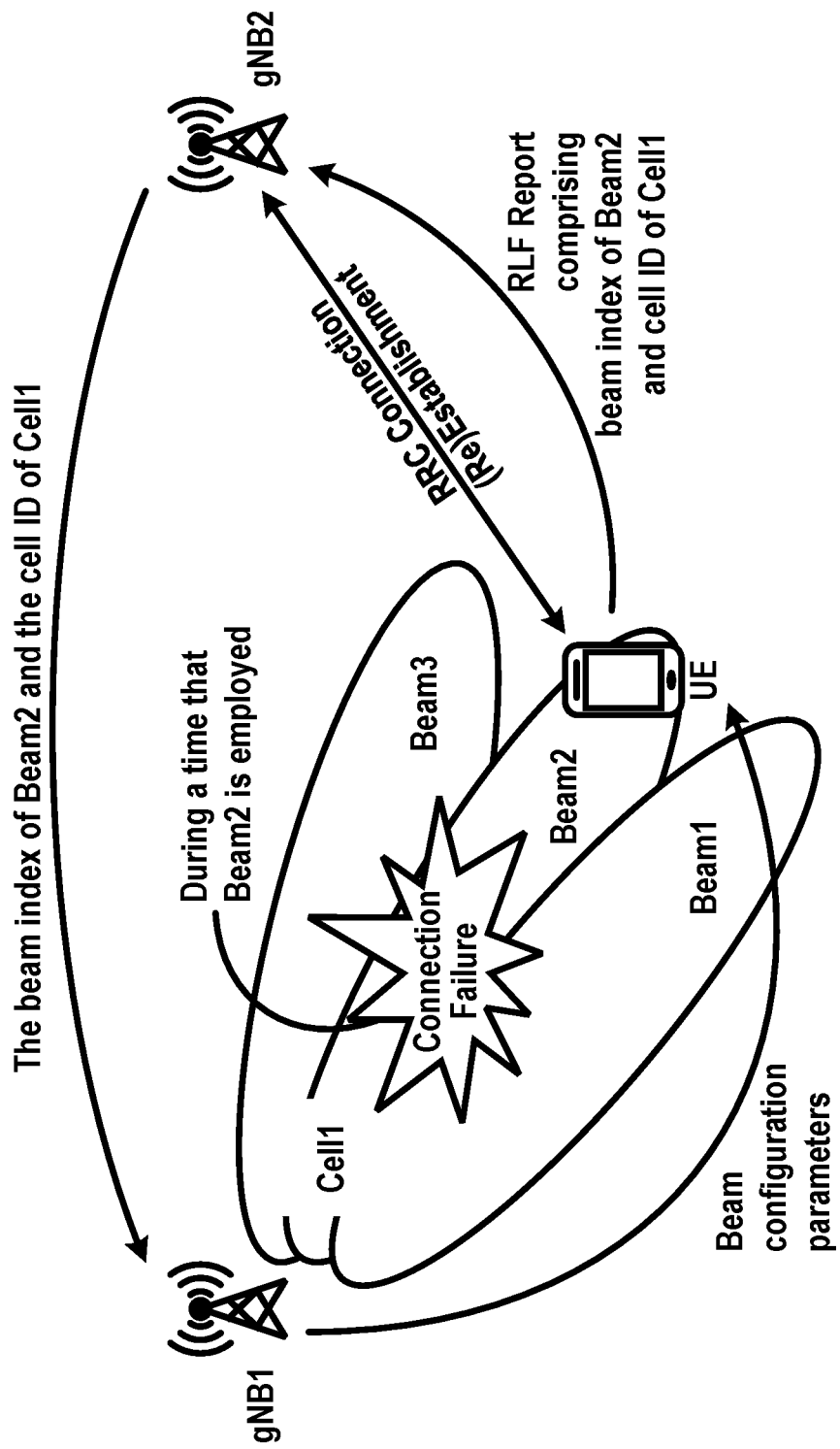
FIG. 25 is an example diagram as per an aspect of an embodiment of the present disclosure.
Figure 26:
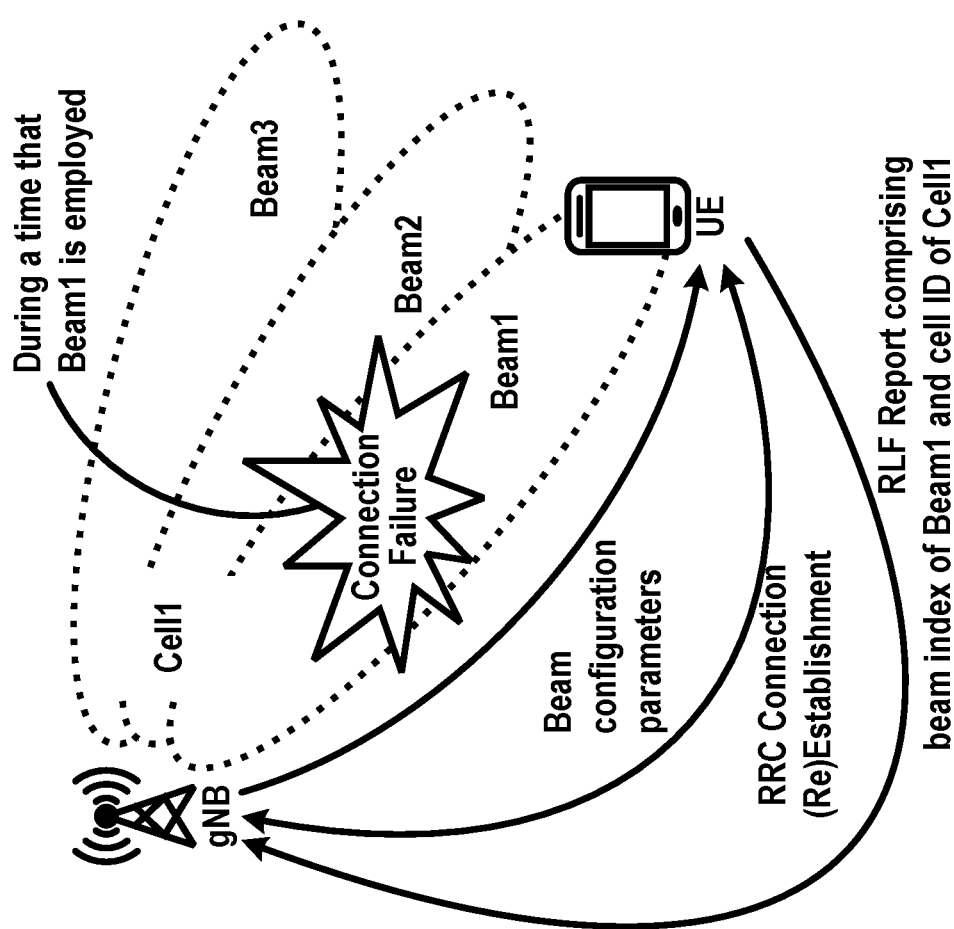
FIG. 26 is an example diagram as per an aspect of an embodiment of the present disclosure.

In an example embodiment, as shown in FIG. 25 and FIG. 26, a wireless device may receive, from a first base station, a beam information of a first cell served by the first base station. One or more elements of the beam information may be transmitted, from the first base station to the wireless device, via one or more broadcasted messages, one or more radio resource control (RRC) messages, one or more physical layer signals, and/or the like. In an example, one or more elements of the beam information may be recognized by the wireless device at least based on one or more synchronization signals (e.g. SS block) and/or one or more reference signals (e.g. CSI-RS, DM-RS). The beam information may comprise a beam identifier, a beam scheduling information, a beam configuration information, a synchronization signal scheduling information, a synchronization signal sequence information, a synchronization signal block identifier, a reference signal scheduling information, a reference signal configuration information, a reference signal block identifier, and/or the like.

In an example, at least based on one or more elements of the beam information, the wireless device may receive one or more radio resource control messages via one or more first beams of the first cell, the one or more first beams associated with one or more elements of the beam information. The wireless device may transmit and/or receive one or more radio resource control messages and/or one or more data packets at least based on one or more of the one or more radio resource control messages via one or more of the one or more first beams. The wireless device may be in a radio resource control connected state (RRC connected state). The wireless device may have a radio resource control connection with the first base station via the first cell and/or one or more of the one or more first beams of the first cell.

Figure 27:
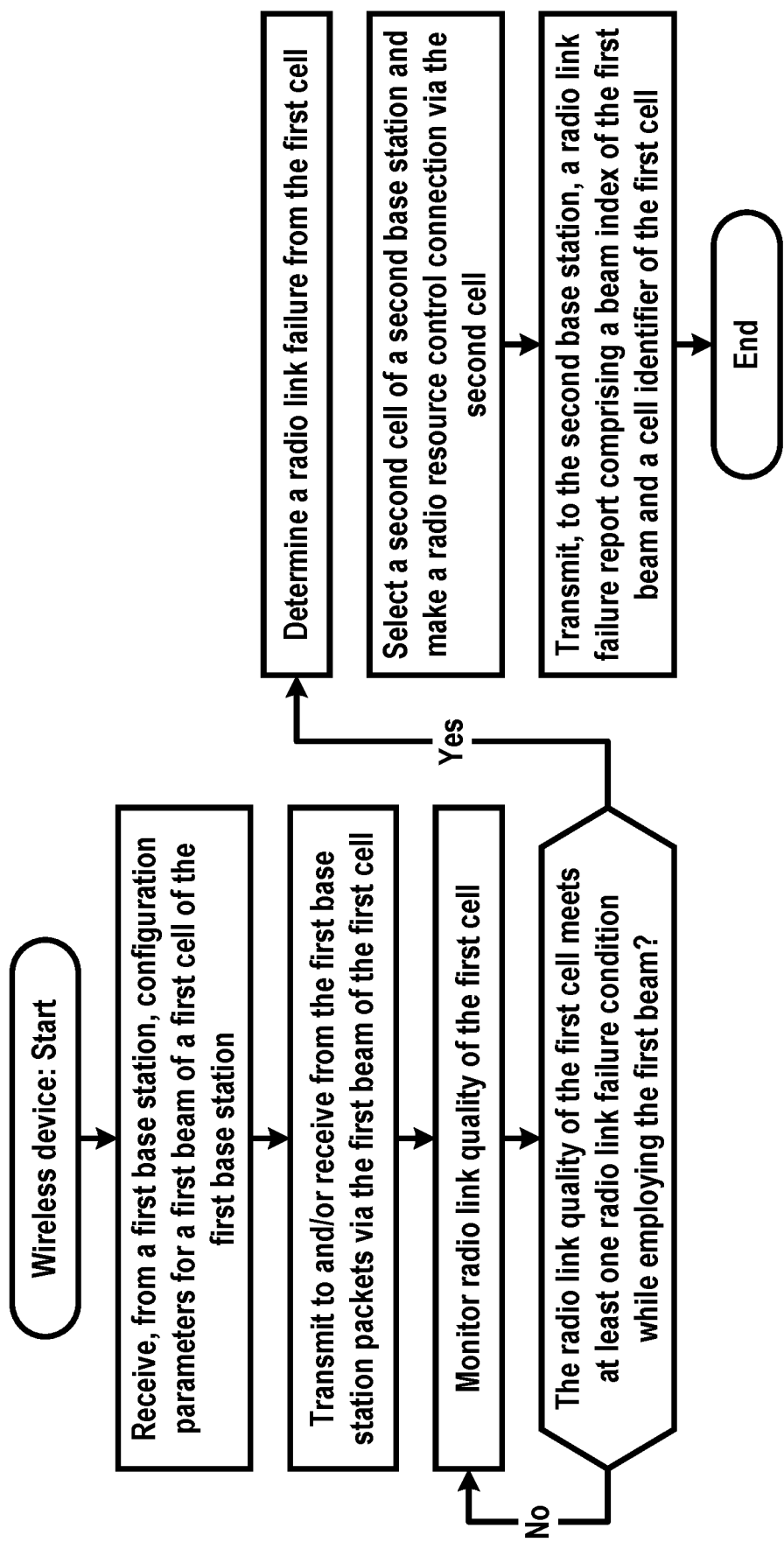
FIG. 27 is an example diagram as per an aspect of an embodiment of the present disclosure.

In an example, as shown in FIG. 27, the wireless device in the radio resource control connected state may detect a radio link failure from the first cell. The wireless device may determine the radio link failure at least based on one or more failure events of an out-of-sync detection of a physical layer, one or more random access failures, a plurality of retransmissions of a radio link control layer (RLC layer) (e.g. the plurality of retransmissions of a RLC layer exceed a certain number), one or more timer expirations, and/or the like. The one or more failure events may occur in the first cell and/or one or more of the one or more first beams. The radio link failure may be determined in consideration of the one or more failure events occurred in each beam of the one or more first beams separately. The radio link failure may be determined in consideration of the one or more failure events occurred in multiple beams of the one or more first beams totally. For example, if the wireless device detects an out-of-sync in one beam and has an in-sync connection via another beam, the wireless device may not determine a radio link failure. For example, a number of random access failure and/or a number of retransmission in an RLC layer may be counted for each beam separately and/or for multiple beams totally. For example, a timer expiration may be determined by considering one beam and/or by considering multiple beams.

In an example, in response to detecting the radio link failure, the wireless device may select a second cell served by a second base station (or served by the first base station).

In an example, the second base station may be the first base station, and/or the second cell may be the first cell. Through one or more random access procedures, the wireless device may establish a radio resource control connection with the second base station via the second cell. The wireless device may establish a radio resource control connection at least via a radio resource control reconfiguration procedure, a radio resource control reestablishment procedure, and/or a radio resource control setup procedure. In an example, the second base station may request a radio link failure report to the wireless device connected to the second base station via the second cell.

In an example, the wireless device may transmit, to the second base station, a first message comprising a radio link failure report (RLF report), e.g., through the second cell. The radio link failure report may comprise one or more elements of the beam information received from the first base station via the first cell. In an example, the radio link failure report further comprises at least one of one or more elements of the beam information, a reference signal received power (RSRP), a reference signal received quality (RSRQ), a combined (e.g. averaged or summed) reference signal received power, and/or a combined (e.g. averaged or summed) reference signal received quality of at least one of the followings: a beam that the wireless device lastly connected to in the first cell (e.g. a last serving beam), one or more beams that the wireless device established a beam pair link with in the first cell, one or more beams that the wireless device attempted to recover a beam pair link with (e.g. that the wireless device attempted a beam recovery procedure), one or more beams that the first base station assigned to the wireless device, one or more beams that the wireless device attempted a random access via, one or more neighboring beams, and/or the like. In an example, the first message may further comprise one or more network slice identifiers of one or more network slices that the wireless was served from the first base station.

In an example, the combined reference signal received power may be calculated by combining one or more reference signal received powers of one or more beams (e.g. averaging one or more RSRPs of one or more beams). In an example, the combined reference signal received quality may be calculated by combining one or more reference signal received qualities of one or more beams (e.g. averaging one or more RSRQs of one or more beams).

In an example, the radio link failure report may further comprise a radio link failure cause (e.g. one or more timer expiration, t310-Expiry, t312-Expiry, a random access problem, a maximum number of RLC layer retransmissions, and/or the like), a failed primary cell identifier, a last serving cell RSRQ type, a last serving beam RSRQ type, one or more measurement result for one or more beams and/or one or more cells, a reestablishment cell identifier, one or more beam information of one or more beams of a reestablishment cell, a previous primary cell identifier, and/or the like. In an example, the radio link failure report may further comprise an information of whether an RSRP and/or an RSRQ of one or more beams and/or one or more cells was measured based on a synchronization signal (e.g. SS block) or based on a reference signal (e.g. CSI-RS, DM-RS). In an example, the radio link failure report may further comprise a cell quality information of a lastly connected cell, a last serving cell, a failed primary cell, and/or one or more neighboring cells. The cell quality information may be calculated by combining one or more RSRPs of one or more beams and/or by combining one or more RSRQs of one or more beams. The radio link failure report may further comprise a number of beams considered to determine a cell quality of the first cell, one or more other last serving cells, and/or one or more last neighboring cells.

In an example, the radio link failure report may further comprise an information of whether one or more failed random access attempts was a 2-stage random access or a 4-stage random access. In an example, the radio link failure report may further comprise an information of whether one or more failed random access attempts was a contention free random access or a contention based random access. In an example, the radio link failure report may further comprise a number of beams that the wireless device attempted a random access via.

In an example, the radio link failure report may further comprise one or more elements of beam information of one or more target beams for a handover failed, one or more elements of beam information of one or more serving beams when initiating a handover failed, one or more elements of beam information of one or more last connected beams of a last connected cell during a handover failed, and/or one or more elements of beam information of one or more neighboring beams of a neighbor cell when initiating a handover failed. The radio link failure report may further comprise a reference signal received power (RSRP) and/or a reference signal received quality (RSRQ) of a target beam of a target cell for a handover failed, and/or a combined reference signal received power and/or a combined reference signal received quality of one or more target beams of a target cell for a handover failed. The radio link failure report may further comprise a reference signal received power (RSRP) and/or a reference signal received quality (RSRQ) of a neighboring beam of a neighboring cell when initiating a handover failed, and/or a combined reference signal received power and/or a combined reference signal received quality of one or more neighboring beams of a neighboring cell when initiating a handover failed.

The radio link failure report may further comprise a reference signal received power (RSRP) and/or a reference signal received quality (RSRQ) of a serving beam when initiating a handover failed, and/or a combined reference signal received power and/or a combined reference signal received quality of one or more serving beams when initiating a handover failed. The radio link failure report may further comprise a reference signal received power (RSRP) and/or a reference signal received quality (RSRQ) of a last connected beam of a last connected cell when during a handover failed, and/or a combined reference signal received power and/or a combined reference signal received quality of one or more last connected beams of a last connected cell when during a handover failed.

Figure 28:
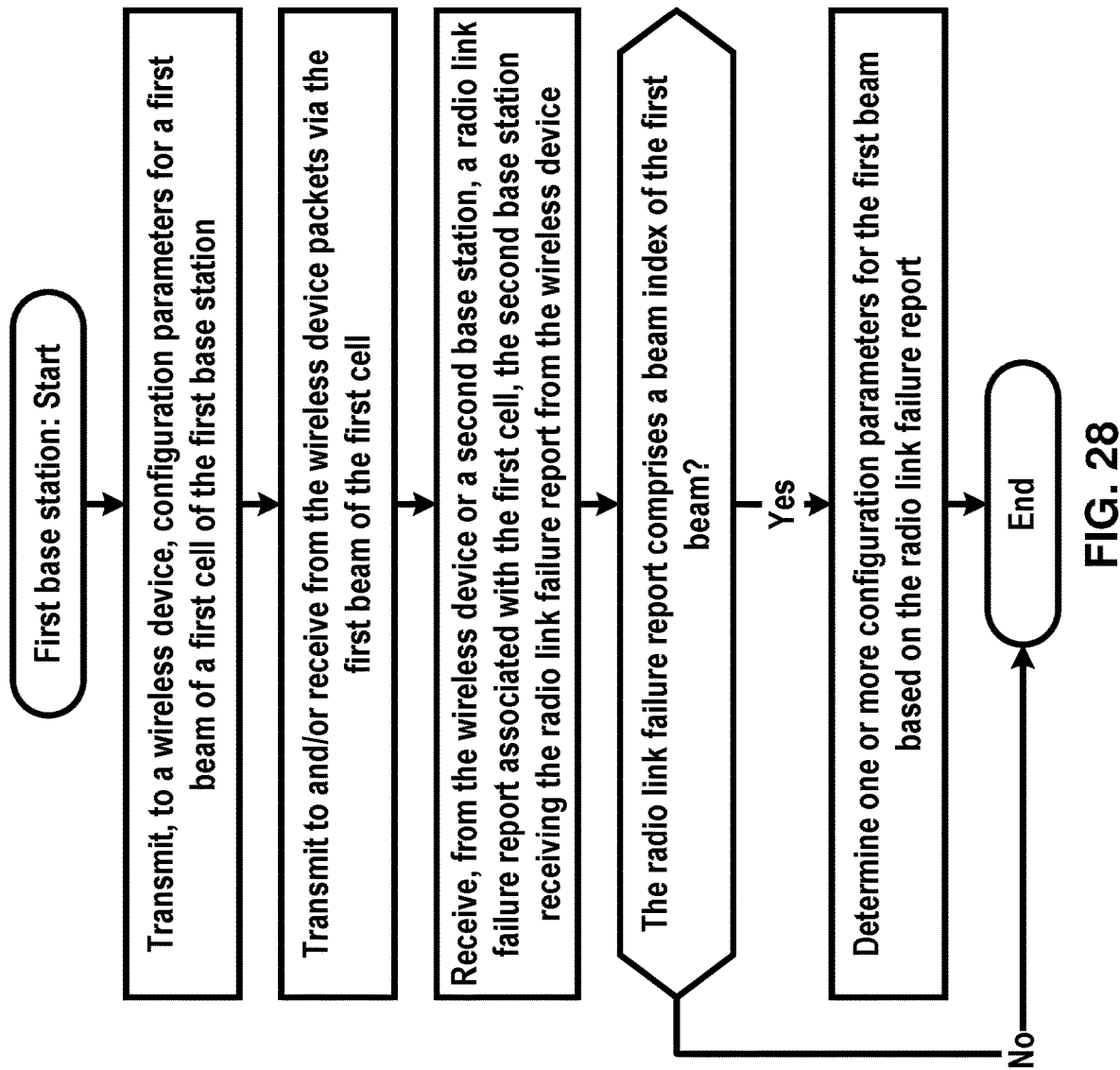
FIG. 28 is an example diagram as per an aspect of an embodiment of the present disclosure.

In an example, the second base station that receives the first message from the wireless device may transmit one or more elements of the first message to the first base station. In response to receiving the radio link failure report and/or the one or more elements of the first message, as shown in FIG. 28, the first base station may configure one or more system control parameters at least based on the radio link failure report and/or the one or more elements of the first message. The one or more system control parameters may comprise one or more beam configuration parameters, one or more radio resource power parameters, one or more random access resource parameters, one or more mobility parameters, a radio signal received quality threshold for a handover initiation, a radio signal received power threshold for a handover initiation, and/or the like. The first base station may initiate one or more wireless devices' handover at least based on the one or more system control parameters configured at least based on the one or more elements of the first message. In an example, the first base station may configure one or more mobility parameters for one or more wireless device with one or more network slices at least based on the one or more elements of the first message and/or the radio link failure report.

Example

Figure 29:
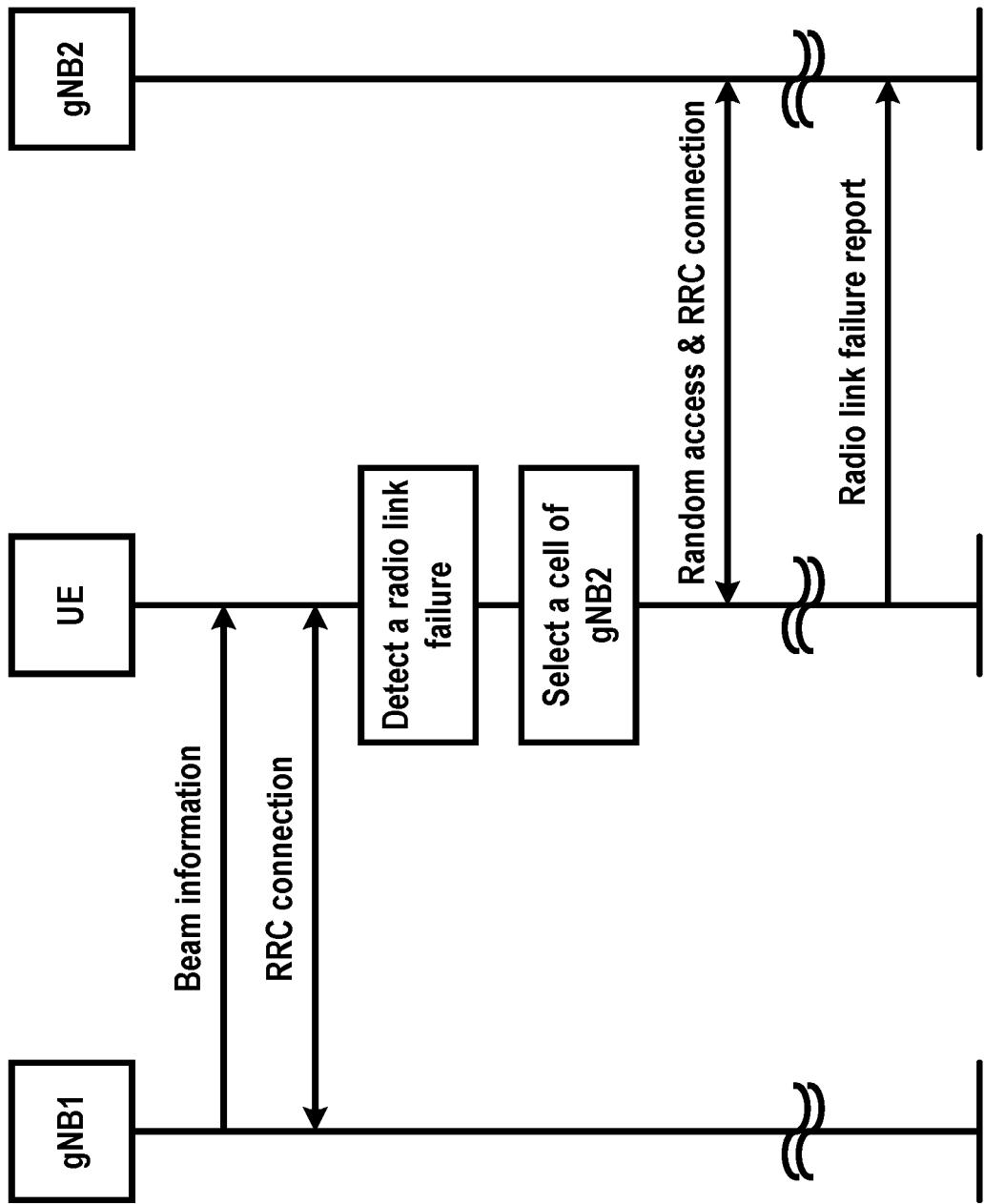
FIG. 29 is an example diagram as per an aspect of an embodiment of the present disclosure.

In an example, as shown in FIG. 29, a first wireless device may receive, from a first base station, a beam information of a first cell served by the first base station. The first wireless device may further receive, from the first base station, one or more radio resource control messages through the first cell at least based on one or more elements of the beam information. The first wireless device may detect a radio link failure from the first cell. The first wireless device may select a second cell served by a second base station in response to the radio link failure. The first wireless device may transmit, to the second base station, a first message comprising a radio link failure report through the second cell, wherein the radio link failure report may comprise one or more elements of the beam information. In an example, the first base station may be the second base station. In an example, the first cell may be the second cell.

In an example, the beam information may further comprise at least one of a cell identifier, a beam identifier, a synchronization signal scheduling information, a synchronization signal sequence information, a reference signal scheduling information, a reference signal sequence information, a beam scheduling information, a preamble configuration information, and/or a beam configuration information.

In an example, the detection of the radio link failure may be based on at least one of an out-of-sync detection, one or more random access failures, a plurality of retransmissions, one or more timer expiration, and/or the like. In an example, the radio link failure report may further comprise at least one of one or more elements of the beam information, a reference signal received power, a reference signal received quality, a combined reference signal received power, and/or a combined reference signal received quality of at least one of: a first beam that the wireless device lastly connected to; one or more second beams that the wireless device established a beam pair link with; one or more third beams that the wireless device attempted to recover a beam pair link with; and/or one or more neighboring beams. In an example, the first message may further comprise one or more network slice identifiers.

In an example, the first base station may receive, from the second base station, one or more elements of the first message. The first base station may configure one or more control parameters at least based on the one or more elements of the first message.

In an example, the first base station may initiate a handover of a second wireless device at least based on the one or more control parameters. In an example, the one or more control parameters may comprise at least one of a radio signal received quality threshold and a radio signal received power threshold for a handover initiation. The one or more control parameters may comprise one or more beam configuration parameters.

Random Access Report

In a beam based cellular network system, a cell area may be formed with multiple beams (e.g. SS beams and/or CSI-RS beams). In an example, each beam covering partial area is swept over a cell coverage area, and different beam coverage areas may have different radio conditions. Radio signaling quality of a wireless device may depends on location of a wireless device and which beam a wireless device is employing. For example, if beam1 of a cell is more interfered by neighboring cells than beam2 of the cell, a first wireless device served via beam1 may have worse radio quality than a second wireless device served via beam2. If a wireless device transmits multiple random-access preambles (e.g. failed preamble transmissions and/or successful preamble transmission) for a random-access procedure at a cell, a base station may configure beam parameters and beam-based random-access parameters to increase random-access reliability (e.g. to reduce random access failures). An implementation of existing technologies supports cell-level random-access report of a wireless device. For example, if a wireless device transmits multiple random-access preambles including failed preamble transmissions for a random-access procedure, the wireless device may report, to a base station, random-access information such as a number of random-access preamble transmissions at a cell. Based on cell-level random-access information, a base station may be difficult to figure out which beam has a problem that causes random-access preamble transmission failures of a wireless device. The existing technology may decrease random-access reliability and/or service reliability of wireless devices when multiple beams are configured for cells. The existing technology may increase call dropping rate and packet transmission delay. The increased call dropping rate and the increased packet transmission delay may decrease communication performance.

Example embodiments enhance random-access report mechanisms for a wireless device when multiple beams are configured to cover serving cell area, by supporting random-access report at a beam level, for example, beam indexes via which a wireless device attempts random-access preamble transmissions, a number of random-access preamble transmissions via each beam for a random-access procedure, and/or the like. Example embodiments may reduce random-access failure rate and/or radio quality degradation issues by enabling base stations to recognize and fix beam-level radio configuration issues and beam-level random-access configuration issues. Example embodiments may improve communication reliability by supporting beam specific random-access reports of a wireless device.

In an example embodiment, a wireless device may attempt one or more random access to a first cell served by a first base station, via one or more beams of the first cell. The wireless device may report a random access attempt information to the first base station with an information of the one or more beams. The first base station may analyze a random access environment associated with the one or more beams at least based on one or more information received from the wireless device.

In an example, if a wireless device fails in a connection establishment to a first cell served by a first base station, via one or more beams of the first cell, the wireless device may report a connection establishment failure information to the first base station with an information of the one or more beams. The connection establishment failure information may comprise a random access attempt information associated with one or more of the one or more beams and/or other connection establishment procedure related information. The first base station may analyze a connection establishment process environment associated with the one or more beams at least based on one or more information received from the wireless device.

In an example, a base station may request a mobility parameter setting change associated with a beam information at least when the base station requires to control a handover failure between two or more beams of different cells, to reduce pingpong events between two or more beams of different cells, and/or to control a traffic load between two or more beams of different cells.

In an example, a cell may be operated with one or more beams employing a multi-antenna system. A beam may have a spatial direction, and/or may cover a part of a cell coverage area. A combination of one or more beam spatial areas may form a cell coverages. In an example, a beam transmitting a synchronization signal and/or receiving a signal from a wireless device may be swept over a cell coverage area in a predetermined way. A synchronization signal scheduling information and/or a synchronization signal sequence may be used to identify a swept beam. A swept beam may broadcast one or more control information comprising at least one of a system information, a master information, a PDCCH, a PRACH resource, a random access preamble information, a synchronization signal, a reference signal, and the like. In an example, a beam may transmit a reference signal (e.g. CSI-RS).

Figure 30:
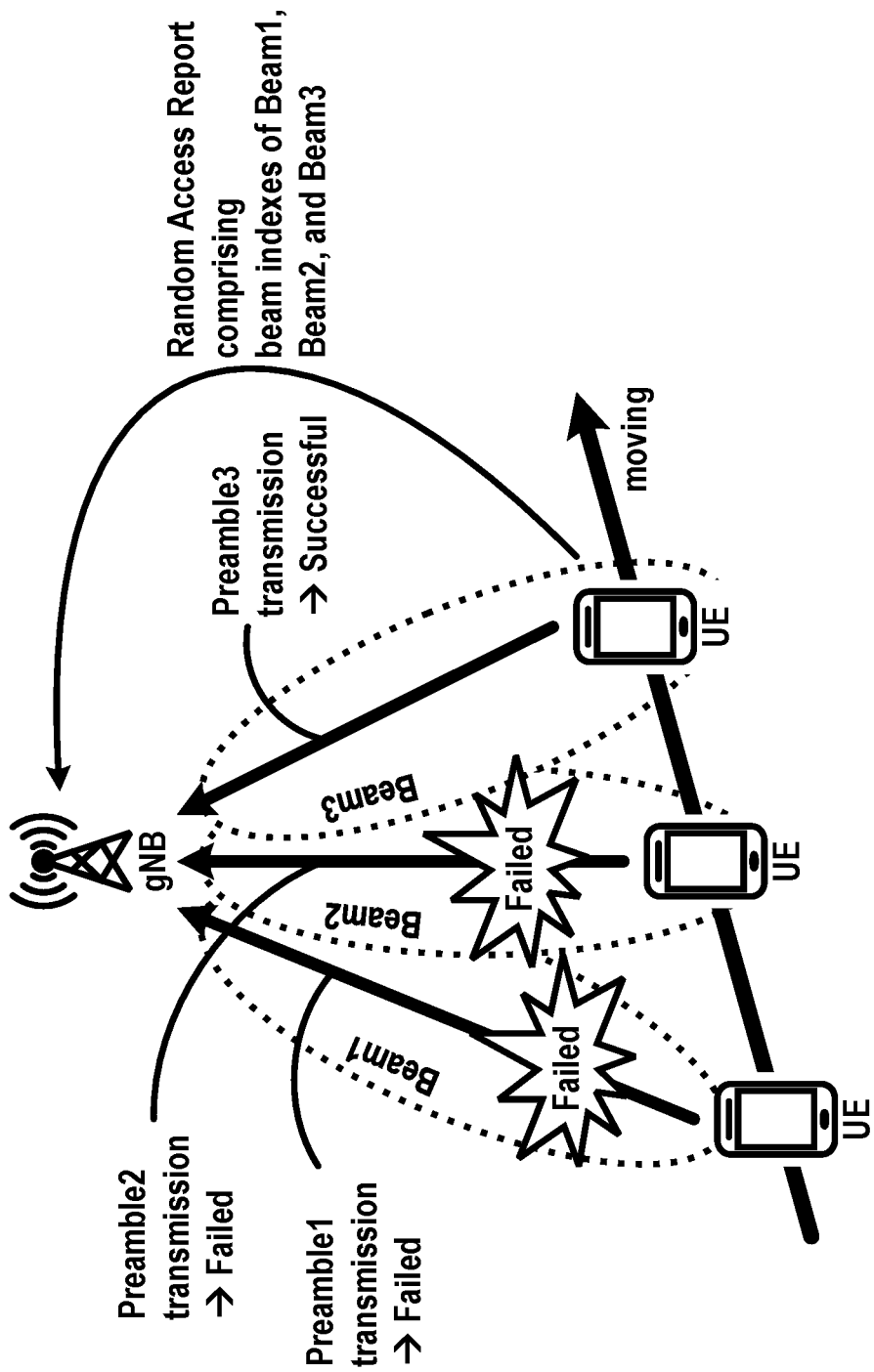
FIG. 30 is an example diagram as per an aspect of an embodiment of the present disclosure.
Figure 31:
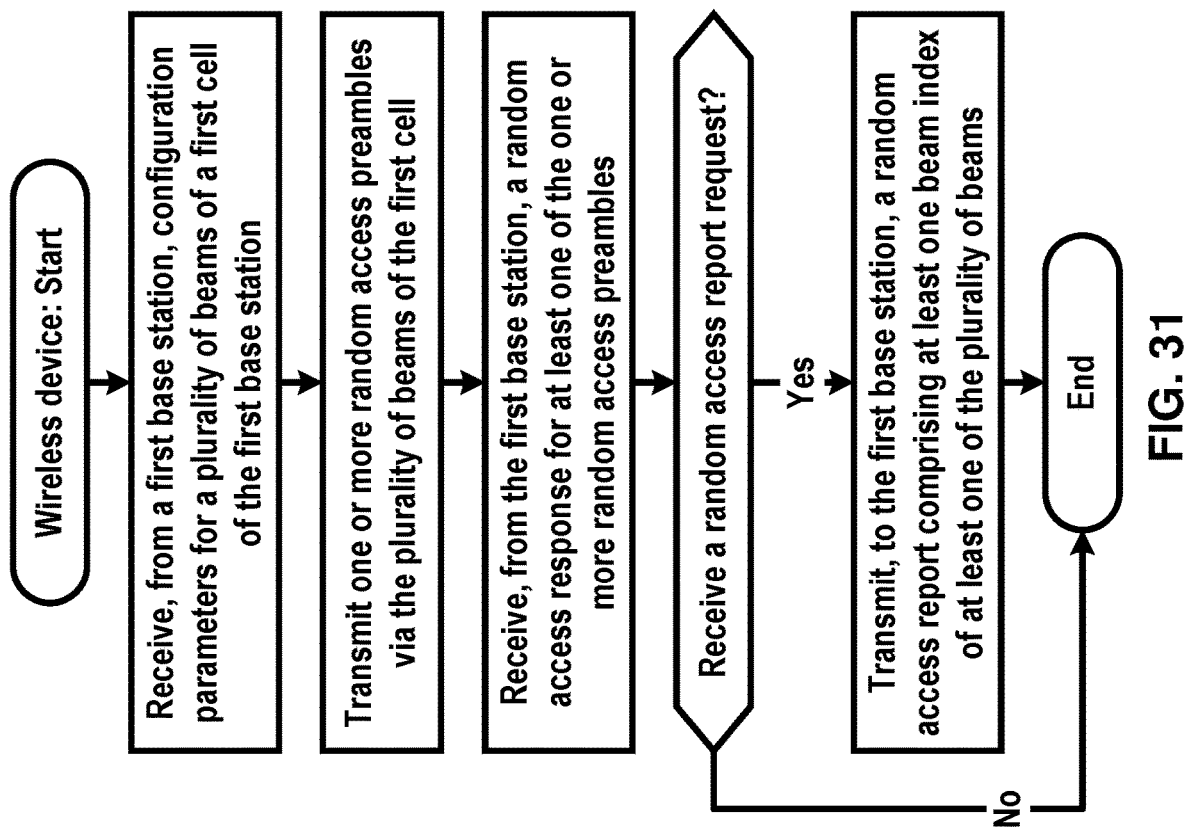
FIG. 31 is an example diagram as per an aspect of an embodiment of the present disclosure.

In an example embodiment, as shown in FIG. 30 and FIG. 31, a wireless device may receive, from a first base station, a preamble configuration information for one or more first beams of a first cell. The preamble configuration information may be obtained by the wireless device at least based on a synchronization signal configured to identify a preamble configuration information, a reference signal configured to identify a preamble configuration information, one or more broadcasted message from the first cell, one or more radio resource control message from the first cell, and/or the like. The wireless device may initiate a random access by transmitting, to the first base station, one or more first preambles through the one or more first beams at least based on one or more elements of the preamble configuration information. The wireless device may initiate the random access to achieve at least one of an uplink resource grant, a radio resource control connection establishment, a radio resource control connection reestablishment, a handover, a secondary cell addition, a secondary cell modification, a downlink data reception, an uplink data transmission, a positioning purpose, a time alignment establishment, and/or the like. The wirelesss device may receive at least one random access response (RAR) from the first base station in response to at least one of the one or more first preambles.

In an example, the first base station may transmit a first message to the wireless device, the first message configured to request at least one of a random access report and/or a connection establishment failure report. The first message may be a radio resource control (RRC) message. The first message may be a UE information request message. In an example, in response to the first message, the wireless device may transmit, to the first base station, a second message comprising at least one of a beam information for one or more of the one or more first beams (e.g. SS beams, CSI-RS beams), a random access report associated with at least one of the one or more first beams and/or a connection establishment failure report for one or more cells associated with at least one of the one or more first beams.

Figure 32:
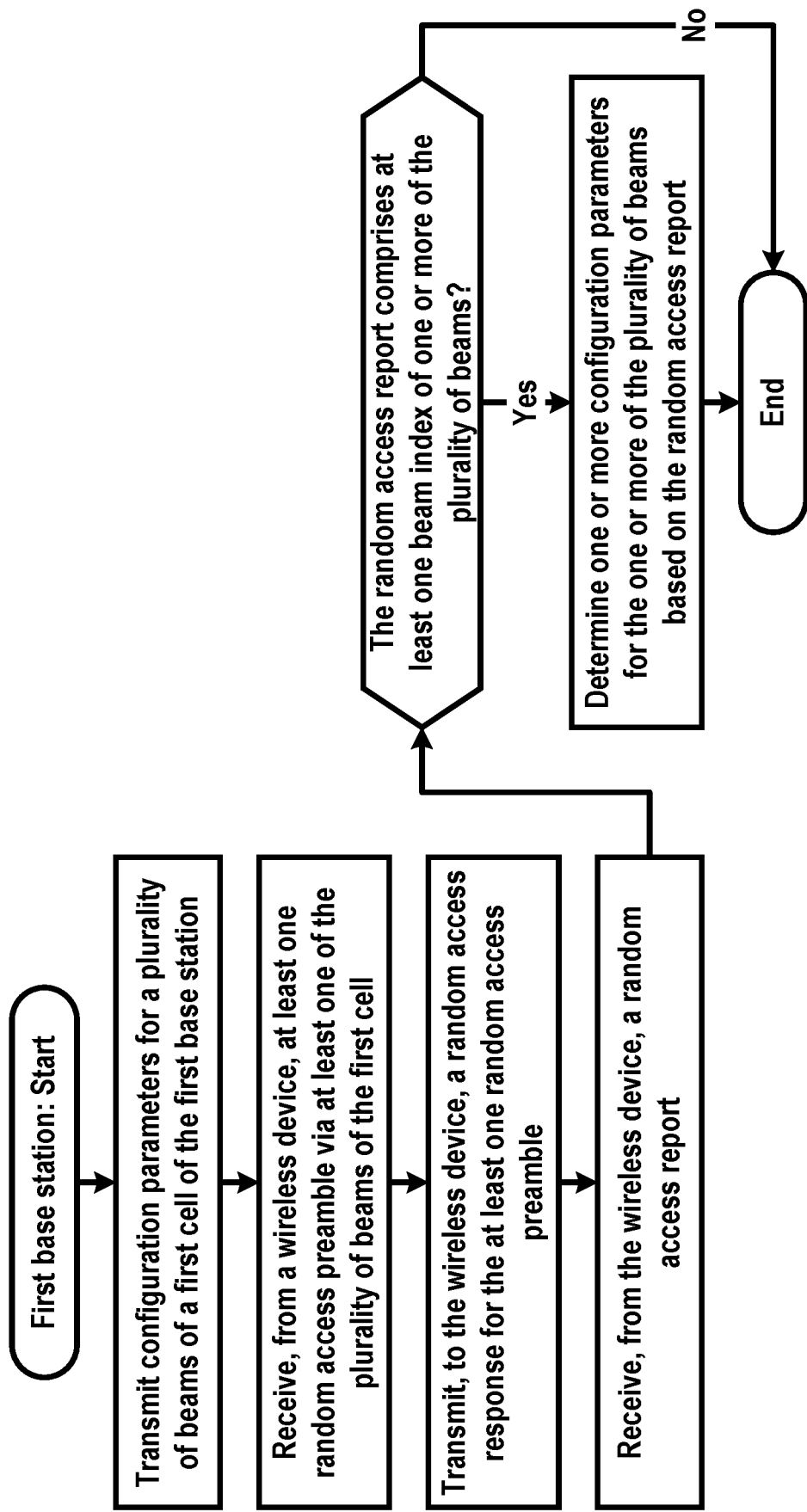
FIG. 32 is an example diagram as per an aspect of an embodiment of the present disclosure.

In an example, as shown in the FIG. 32, the first base station may configure one or more random access resource, one or more random access configuration, one or more load control parameters, and/or one or more system configurations at least based on one or more elements of the second message. In an example, the first base station may configure one or more system configuration parameters for one or more beams, a 2-stage random access, a 4-stage random access, a contention free random access, and/or a contention based random access at least based on one or more elements of the second message.

In an example, the beam information may comprise a beam identifier (e.g. beam index), a beam scheduling information, a beam configuration information, a synchronization signal scheduling information, a synchronization signal sequence information, a synchronization signal block identifier, a reference signal scheduling information, a reference signal configuration information, a reference signal block identifier, and/or the like.

In an example, the random access report may comprise: one or more elements of beam information of one or more beams, a number of preambles sent via the first cell, one or more beams, and/or each beam of one or more of the one or more first beams; an indication of whether a contention was detected during the random access procedure via the first cell, one or more beams, and/or each beam of one or more of the one or more first beams; and/or a maximum transmission power reached for the transmission of the one or more first preambles during the random access procedure via the first cell, one or more beams, and/or each beam of one or more of the one or more first beams. The first base station may configure one or more system configuration parameters for one or more beams at least based on one or more elements of the random access report.

In an example, the random access report may further comprise one or more beam identifiers of one or more beams (e.g. the one or more first beams) employed for the random access procedure of the wireless device. In an example, the random access report may further comprise an information of whether the random access procedure was a 2-stage random access or a 4-stage random access. In an example, the random access report may further comprise an information of whether the random access procedure was a contention free random access or a contention based random access.

In an example, the connection establishment failure report may comprise one or more elements of beam information of one or more beams, a report about a connection establishment procedure failed before the wireless device establishes the current radio resource control connection. The first base station may configure one or more system configuration parameters for one or more beams at least based on one or more elements of the connection establishment failure report. The connection establishment failure report may comprise: a number of preambles sent via the a cell, one or more beams, and/or each beam of the one or more beams for the connection establishment procedure failed; an indication of whether a contention was detected during a random access procedure via a cell, one or more beams, and/or each beam of the one or more beams for the connection establishment procedure failed; a maximum transmission power reached for the transmission of the one or more first preambles during the random access procedure via a cell, one or more beams, and/or each beam of one or more beams for the connection establishment procedure failed; a failed beam RSRQ type for the connection establishment procedure failed; an indication of whether a reference signal received quality (RSRQ) and/or a reference signal received power (RSRP) for a beam was measured based on a synchronization signal (e.g. SS block) or based on a reference signal (e.g. CSI-RS, DM-RS); and/or the like.

In an example, the connection establishment failure report may further comprise a reference signal received power of a beam employed for the connection establishment procedure failed, a reference signal received quality of a beam employed for the connection establishment procedure failed, a combined reference signal received power (e.g. average reference signal received power) of one or more beams employed for the connection establishment procedure failed, and/or a combined reference signal received quality (e.g. average reference signal received quality) of one or more beams employed for the connection establishment procedure failed.

In an example, the connection establishment failure report may further comprise one or more beam identifiers of one or more beams employed for the connection establishment procedure failed of the wireless device. In an example, the connection establishment failure report may further comprise an information of whether the random access procedure for the connection establishment procedure failed was a 2-stage random access or a 4-stage random access. In an example, the connection establishment failure report may further comprise an information of whether the random access procedure for the connection establishment procedure failed was a contention free random access or a contention based random access.

Example

Figure 33:
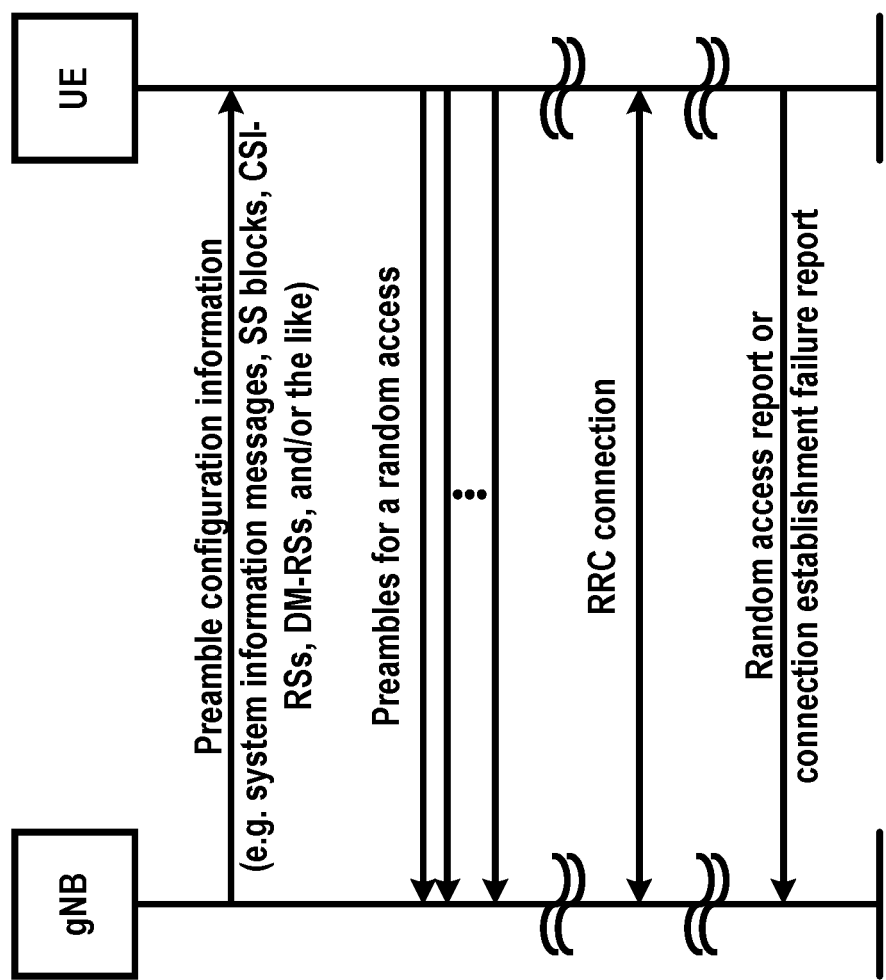
FIG. 33 is an example diagram as per an aspect of an embodiment of the present disclosure.

In an example, as shown in FIG. 33, a first wireless device may receive, from a first base station, a preamble configuration information for one or more first beams of a first cell. The first wireless device may transmit, to the first base station, one or more first preambles through the one or more first beams at least based on the preamble configuration information. The first wireless device may receive, from the first base station, a first message configured to request for at least one of a random access report and/or a connection establishment failure report. The first wireless device may transmit, to the first base station, a second message comprising the random access channel report comprising at least one of: a random access report for at least one of the one or more first beams comprising a beam information and/or a connection establishment failure report for one or more cells and/or for one or more beams.

In an example, the first wireless device may transmit the one or more first preamble for at least one of an uplink resource grant, a radio resource control connection establishment, a radio resource control connection reestablishment, a handover, a secondary cell addition, a secondary cell modification, a downlink data reception, an uplink data transmission, a positioning purpose, a time alignment establishment, and/or the like. In an example, the beam information may comprise at least one of a cell identifier, a beam identifier, a beam scheduling information, a beam configuration information, a synchronization signal scheduling information, a synchronization signal sequence information, a synchronization signal block identifier, a reference signal scheduling information, a reference signal configuration information, a reference signal block identifier, and/or a beam configuration information.

In an example, the random access report may comprise at least one of followings for (at least) one of one or more first beams: one or more elements of the beam information, a number of preambles sent, an indication of whether a contention was detected, and/or a maximum transmission power reached for a random access preamble transmission.

In an example, the connection establishment failure report may comprise at least one of one or more elements of the beam information, a number of preambles sent, an indication of whether a contention was detected, a maximum transmission power reached for a random access preamble transmission, a reference signal received power, a reference signal received quality, a combined reference signal received power, a combined reference signal received quality, a reference signal received quality type for at least one of: at least one of one or more second beams of the first cell; at least one of one or more third beams of a second cell where the wireless devices failed in a connection establishment; and/or at least one of one or more fourth beams of a neighboring cell.

In an example, the first base station may configure one or more control parameters at least based on one or more elements of the second message.

Neighbor Beam Relation

Figure 37:
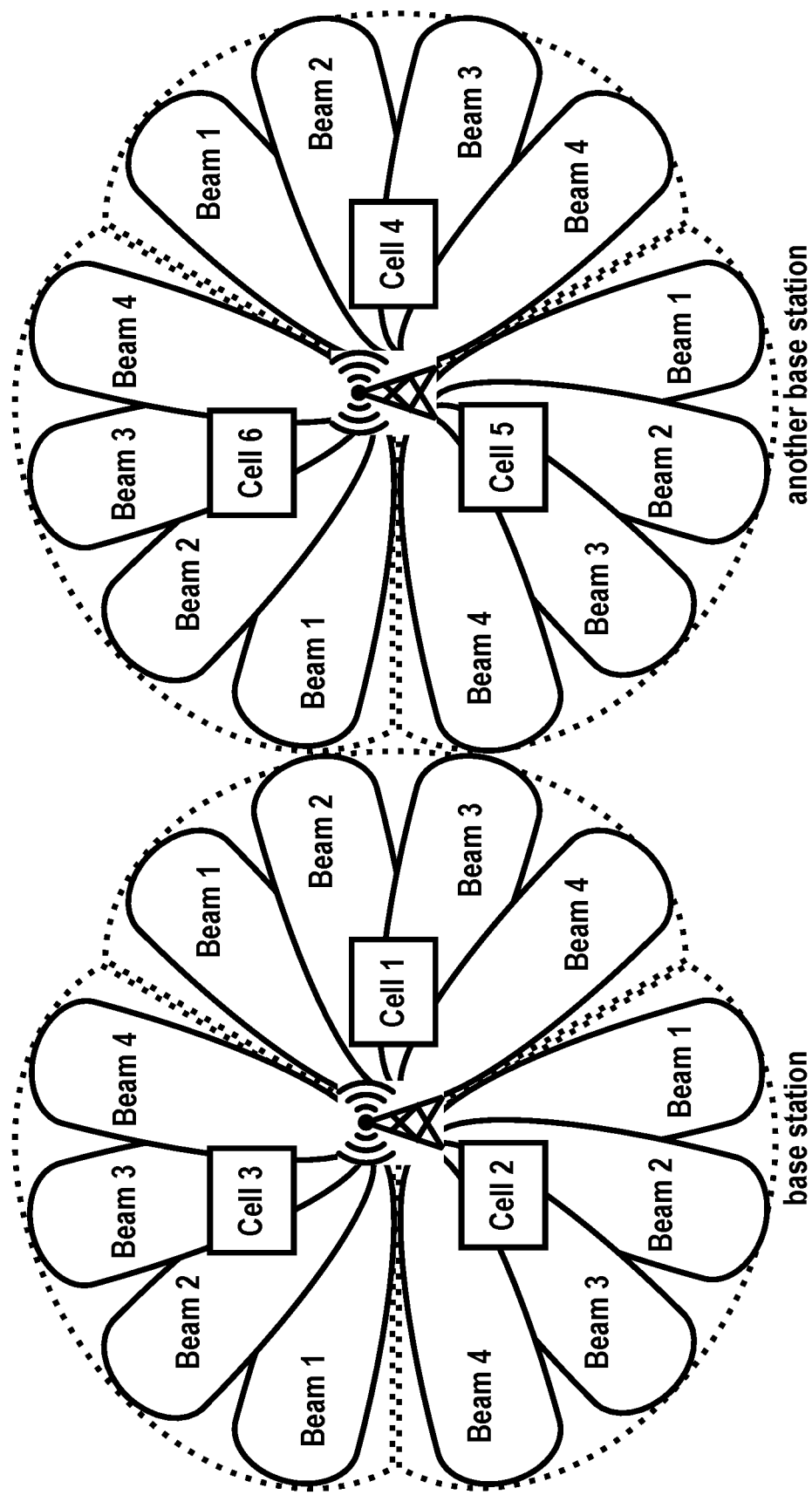
FIG. 37 is an example diagram as per an aspect of an embodiment of the present disclosure.
Figure 38:
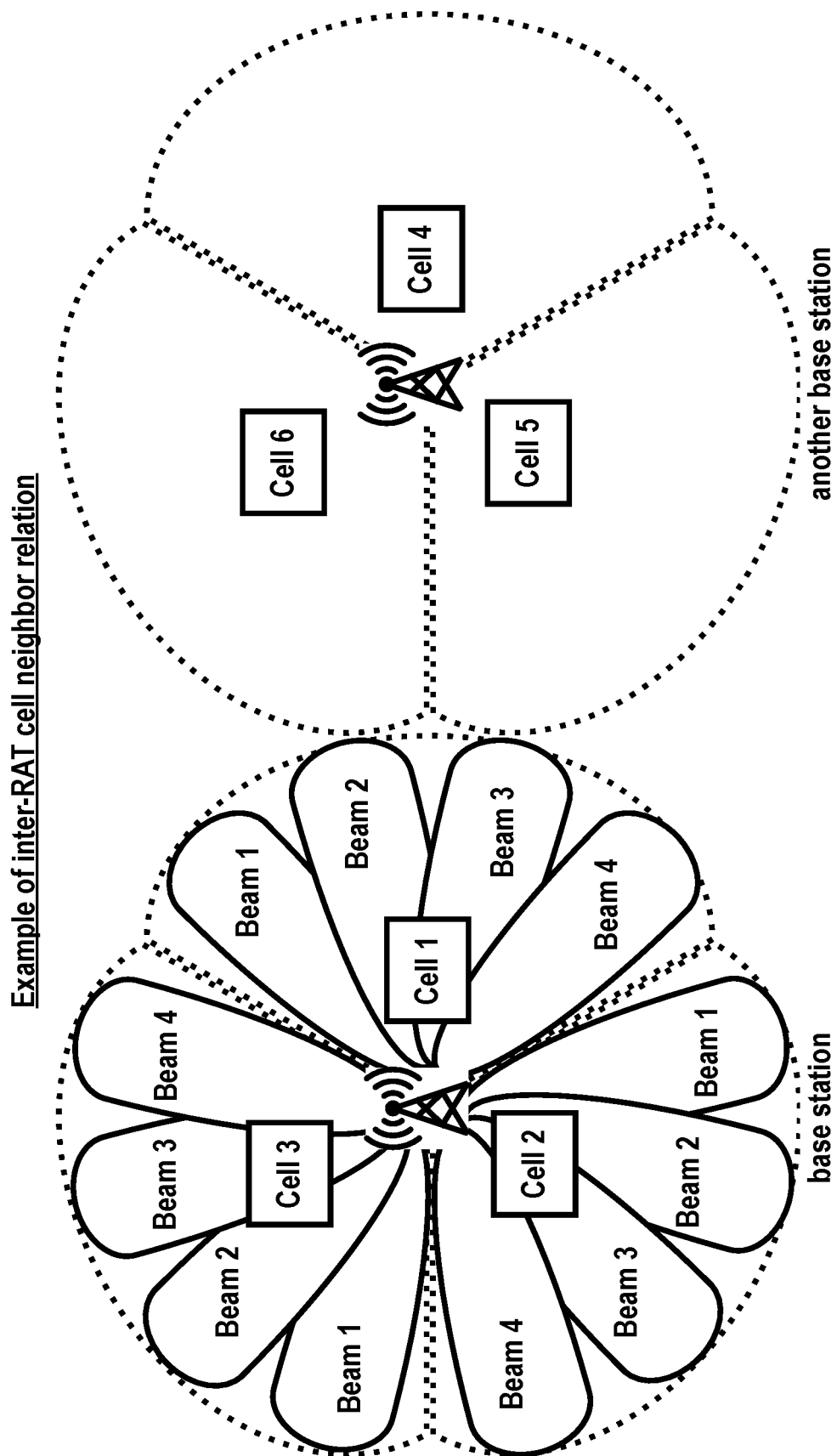
FIG. 38 is an example diagram as per an aspect of an embodiment of the present disclosure.

In an example beam based cellular network system, as shown in FIG. 37 and FIG. 38, a cell area may be formed with multiple beams (e.g. SS beams and/or CSI-RS beams). In an example, each beam covering partial area is swept over a cell coverage area, and different beam coverage areas may have different radio conditions. Proper handover configuration parameters and/or handover policies may be different depending on which beams are facing from neighboring cells. For example, when determining mobility policies for handover between cell1 and cell2, appropriate handover parameters for handover between beam-A of cell1 and beam-B of cell2 may be different from preferable handover parameters for handover between beam-A of cell1 and beam-C of cell2 if beam-B and beam-C are facing different beams from each other. In an example, if beam-B is adjacent to beam-D in high-load status and beam-C is adjacent to beam-E in low-load status, a base station may prefer to handover a wireless device towards beam-C. In an example, configurations of each beam may affect to beams of neighbor cells. To increase beam deployment performance and reliability, a network may consider overall beam deployment topology of each cell. Implementation of existing cell-based neighbor information exchange procedures may increase unpreferable handovers, handover failure rate, and/or handover ping-pong issues when multiple beams serve a cell coverage area. The existing technology may increase service quality degradation, call dropping rate and packet transmission delay during a handover procedure. The increased call dropping rate and the increased packet transmission delay may decrease communication reliability.

Example embodiments enhance neighbor information exchange mechanism between base stations that configure multiple beams to cover their serving cell area by supporting beam level neighbor information exchanges. Example embodiments may reduce unpreferable handovers, handover failure rate, and/or handover ping-pong issues by enabling base stations to obtain beam level neighbor information of neighboring cells from their neighboring base stations. Based on example embodiments a network may determine beam-level neighbor relations. Example embodiments may improve communication reliability by supporting beam specific neighbor relation recognition between neighboring base stations.

In an example embodiment, neighbor information exchanged between base stations may comprise beam related information of a cell. In an example, the beam related information may comprise beams and cells deployment/neighboring information as shown in FIG. 37 and FIG. 38. By increasing a granularity of neighbor information, finer network system management and/or optimization may be enabled compared to exchanging only cell level neighbor information between base stations. In an example, a base station may transmit, to another base station, a neighbor beam information and/or a neighbor cell information of a serving cell and/or a beam of a serving cell operated by the base station. The another base station receiving the neighbor beam information and/or the neighbor cell information may update a neighbor relation table at least based on the received information, and/or may transmit the neighbor relation table to an operation and maintenance (O&M) entity. In an example, the another base station may determine a plurality of network control configurations at least based on the received information, wherein, for example, the network control configurations may be at least one of handover decision making, mobility parameter settings, multi connectivity managements, interference managements, CoMP operation managements, MBMS service managements, direct communication controls, and/or the like.

In an example, a base station may transmit, to another base station, neighbor information comprising an LTE (Long Term Evolution) neighbor cell information of a serving cell and/or a beam of a serving cell operated by the base station. The LTE neighbor cell information may comprise a neighbor cell information and/or an indication indicating whether a cell associated with the LTE neighbor cell information is an LTE cell. The indication may be an explicit indication value and/or an implicit indication such as a cell identifier format. In an example, a 5G (i.e. NR, New Radio) cell may use a cell identifier format different from an LTE cell identifier format. The another base station receiving the neighbor information with the LTE neighbor cell information may determine whether a cell associated with the LTE neighbor cell information is an LTE cell or a 5G cell at least based on an explicit indication value and/or an implicit indication such as a cell identifier format. The another base station may update a neighbor relation table at least based on the received neighbor information, and may transmit the neighbor relation table to an operation and maintenance (O&M) entity. In an example, the another base station may determine a plurality of network control configurations at least based on the received neighbor information, wherein, for example, the network control configurations may be at least one of handover decision making, mobility parameter settings, multi connectivity managements, interference managements, CoMP operation managements, MBMS service managements, direct communication controls, and/or the like.

In an example, a cell may be operated with one or more beams employing a multi-antenna system. A beam may have a spatial direction, and/or may cover a part of a cell coverage area. A combination of one or more beam spatial areas may form a cell coverage. In an example, a beam transmitting a synchronization signal and/or receiving a signal from a wireless device may be swept over a cell coverage area in a predetermined way. A synchronization signal index, a synchronization signal scheduling information, and/or a synchronization signal sequence information may be used to identify a swept beam. A swept beam may broadcast one or more control information comprising at least one of a system information, a master information, a PDCCH, a PRACH resource, a random access preamble information, a synchronization signal, a reference signal, and et cetera. In an example, a beam may transmit a reference signal (e.g. CSI-RS). A beam may be also identified by a reference signal (e.g. CSI-RS, DM-RS, and the like) index, a reference signal scheduling information, and/or a reference signal sequence information.

Figure 34:
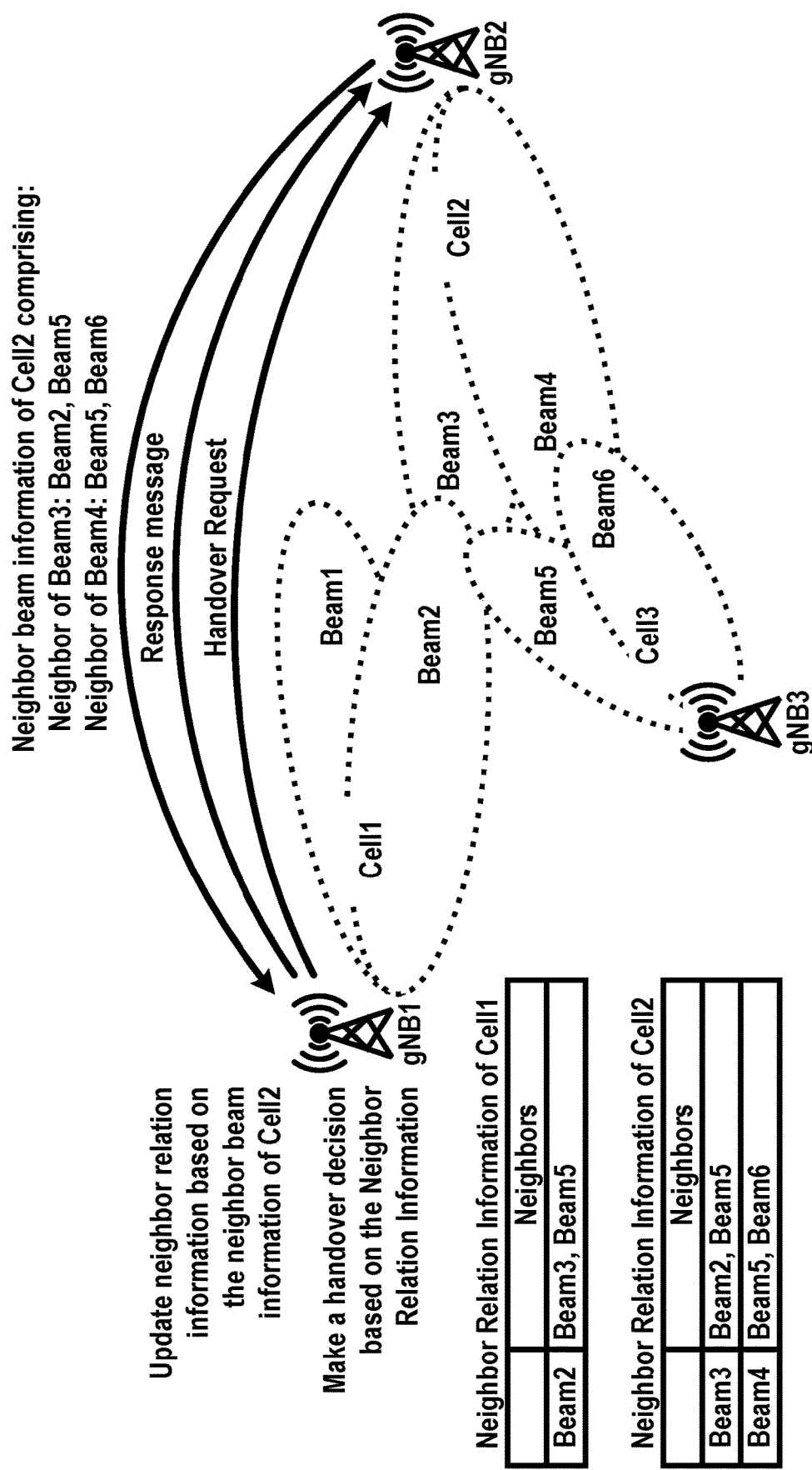
FIG. 34 is an example diagram as per an aspect of an embodiment of the present disclosure.
Figure 35:
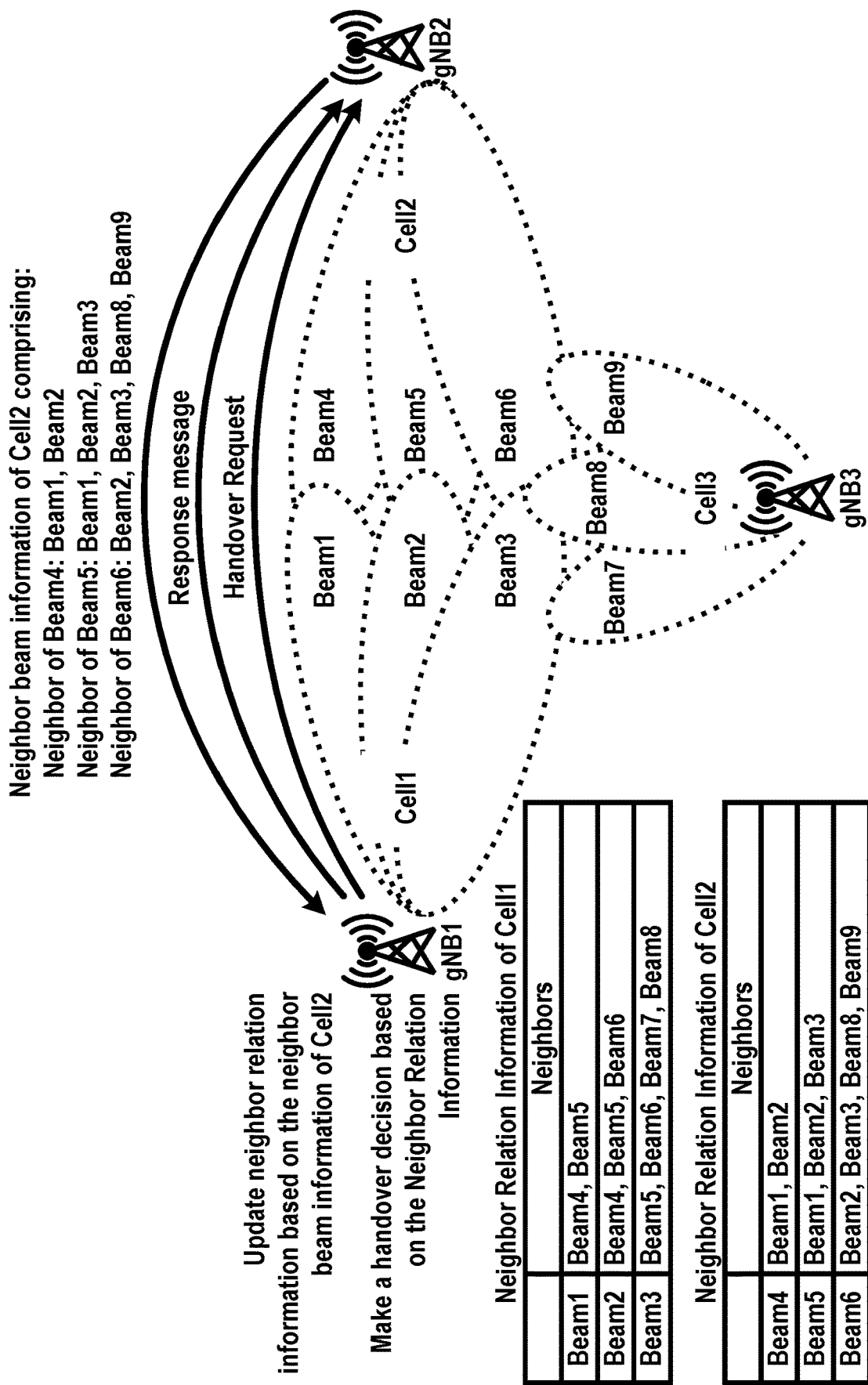
FIG. 35 is an example diagram as per an aspect of an embodiment of the present disclosure.

In an example, as shown in FIG. 34 and FIG. 35, a first base station may receive a first message from a second base station. The first message may comprise a neighbor information of a first serving cell and/or a first serving beam of the second base station. In an example, the first message may be a direct interface setup request message (e.g. Xn setup request), a direct interface setup response message (e.g. Xn setup response), a base station configuration update message (e.g. gNB configuration update), a base station configuration update acknowledge/failure message (e.g. gNB configuration update acknowledge/failure), and/or the like. The first serving cell may be operated by the second base station. The first serving beam may be a beam supporting a cell of the second base station. In an example, the neighbor information may comprise at least one of: one or more cell identifiers of one or more cells neighboring with the first serving cell; one or more cell identifiers of one or more cells neighboring with the first serving beam; one or more beam identifiers of one or more beams neighboring with the first serving cell; and/or one or more beam identifiers of one or more beams neighboring with the first serving beam.

In an example, the neighbor information may comprise a first serving cell identifier of the first serving cell and/or one or more beam identifiers of one or more beams of the first serving cell. The neighbor information may further comprise one or more neighboring cell identifiers of one or more neighboring cells of the first serving cell and/or one or more second beam identifiers of one or more second beams of the one or more neighboring cells. In the example figure (Example of NR cell neighbor relation), the neighbor information, transmitted by the second base station to the first base station, may comprise a serving cell identifier (Cell 1), beam identifiers (Beam 1, Beam 2, Beam 3, and/or Beam 4 of Cell 1) of Cell1, cell identifiers (Cell 5 and/or Cell 6) of cells neighboring to Cell 1, beam identifiers (Beam 1, Beam 2, Beam 3, and/or Beam 4 of Cell 5) of beams of Cell 5, and/or beam identifiers (Beam 1, Beam 2, Beam 3, and/or Beam 4 of Cell 6) of beams of Cell 6.

In an example, the neighbor information may comprise a first serving cell identifier of the first serving cell and/or one or more beam identifiers of one or more beams of the first serving cell. The neighbor information may further comprise one or more neighboring cell identifiers of one or more neighboring cells of the one or more beams of the first serving cell and/or one or more second beam identifiers of one or more second beams of the one or more neighboring cells. In the example figure (Example of NR cell neighbor relation), the neighbor information, transmitted by the second base station to the first base station, may comprise a serving beam identifier (Beam 3 of Cell 1), cell identifier (Cell 1) of Beam 3 of Cell 1, cell identifiers (Cell 5 and/or Cell 6) of cells neighboring to Beam 3 of Cell 1, beam identifiers (Beam 1, Beam 2, Beam 3, and/or Beam 4 of Cell 5) of beams of Cell 5, and/or beam identifiers (Beam 1, Beam 2, Beam 3, and/or Beam 4 of Cell 6) of beams of Cell 6.

In an example, the neighbor information may comprise a first serving cell identifier of the first serving cell and/or one or more beam identifiers of one or more beams of the first serving cell. The neighbor information may further comprise one or more neighboring beam identifiers of one or more neighboring beams of the first serving cell and/or one or more cell identifiers of one or more cells of the one or more neighboring beams. In the example figure (Example of NR cell neighbor relation), the neighbor information, transmitted by the second base station to the first base station, may comprise a serving cell identifier (Cell 1), beam identifiers (Beam 1, Beam 2, Beam 3, and/or Beam 4 of Cell 1) of Cell1, beam identifiers (Beam 3 of Cell 5, Beam 4 of Cell 5, and/or Beam 1 of Cell 6, and/or Beam 2 of Cell 6) of beams neighboring to Cell 1, cell identifier (Cell 5) of Beam 3 and Beam 4 of Cell 5, and/or cell identifier (Cell 6) of Beam 1 and Beam 2 of Cell 6.

In an example, the neighbor information may comprise a first serving cell identifier of the first serving cell and/or one or more beam identifiers of one or more beams of the first serving cell. The neighbor information may further comprise one or more neighboring beam identifiers of one or more neighboring beams of the one or more beams of the first serving cell and/or one or more cell identifiers of one or more cells of the one or more neighboring beams. In the example figure (Example of NR cell neighbor relation), the neighbor information, transmitted by the second base station to the first base station, may comprise a serving beam identifier (Beam 3 of Cell 1), cell identifier (Cell 1) of Beam 3 of Cell 1, beam identifiers (Beam 3 of Cell 5, Beam 4 of Cell 5, and/or Beam 1 of Cell 6) of beams neighboring to Beam 3 of Cell 1, cell identifier (Cell 5) of Beam 3 and Beam 4 of Cell 5, and/or cell identifier (Cell 6) of Beam 1 of Cell 6.

In an example, the second base station may receive one or more elements of the neighbor information from at least one of: one or more wireless devices via one or more radio resource control (RRC) messages (e.g. measurement report message, UE information response message, and/or the like), one or more base stations via one or more inter-node interface messages (e.g. Xn interface messages, Xn setup request/response message, Xn configuration update/acknowledge/failure message, and/or the like), a core network entity (e.g. AMF, MME) via one or more inter-node interface messages (e.g. NG interface messages, S1 interface messages, and/or the like), and/or an operation and maintenance entity (e.g. O&M, OAM, and/or the like).

In an example, the first base station may transmit, to the second base station, a second message to confirm that the first base station received the first message. The second message may comprise a second neighbor information of a second serving cell and/or a second serving beam of the first base station. In an example, the second message may be a direct interface setup response message (e.g. Xn setup response), a base station configuration update message (e.g. gNB configuration update), a base station configuration update acknowledge/failure message (e.g. gNB configuration update acknowledge/failure), and/or the like.

In an example, the first base station may update a neighbor relation table at least based on one or more elements of the first message. The neighbor relation table may comprise one or more cell identifiers and/or one or more beam identifiers. The neighbor relation table may further comprise a neighbor relation: between one or more cells and one or more another cells, between one or more cells and one or more beams, between one or more beams and one or more cells, between one or more beams and one or more another beams, and/or the like. In an example, the neighbor relation table may be defined for a cell of the first base station. The neighbor relation table defined for a cell may comprise one or more target cell identifiers of one or more target cells and/or one or more target beam identifiers of one or more target beams. In an example, the neighbor relation table may be defined for a beam of a serving cell of the first base station. The neighbor relation table defined for a beam may comprise one or more target cell identifiers of one or more target cells and/or one or more target beam identifiers of one or more target beams.

In an example, the neighbor relation table may further comprise no remove attribute, no handover attribute, no Xn attribute for a neighbor cell and/or a neighbor beam. If the no remove attribute is checked, the first base station may not remove the neighbor relation for the neighbor relation table. If the no handover attribute is checked, the neighbor relation may not be used by the first base station for handover reasons, and/or the first base station may not initiate handover the neighbor cell and/or the neighbor beam. If the no Xn attribute is checked, the first base station may not use, for the neighbor relation, an Xn interface to initiate procedures towards a base station parenting the neighbor cell and/or the neighbor beam.

In an example, the first base station may transmit, to an operation and maintenance entity (OAM, O&M), one or more elements of the neighbor relation table. The operation and maintenance entity may employ the one or more elements of the neighbor relation table to manage one or more network configurations. The operation and maintenance entity may update one or more elements of the neighbor relation table at least based on a second neighbor relation table received from one or more another base stations and/or one or more updates of network configurations. The operation and maintenance entity may transmit the updated one or more elements of the neighbor relation table to the first base station.

Figure 36:
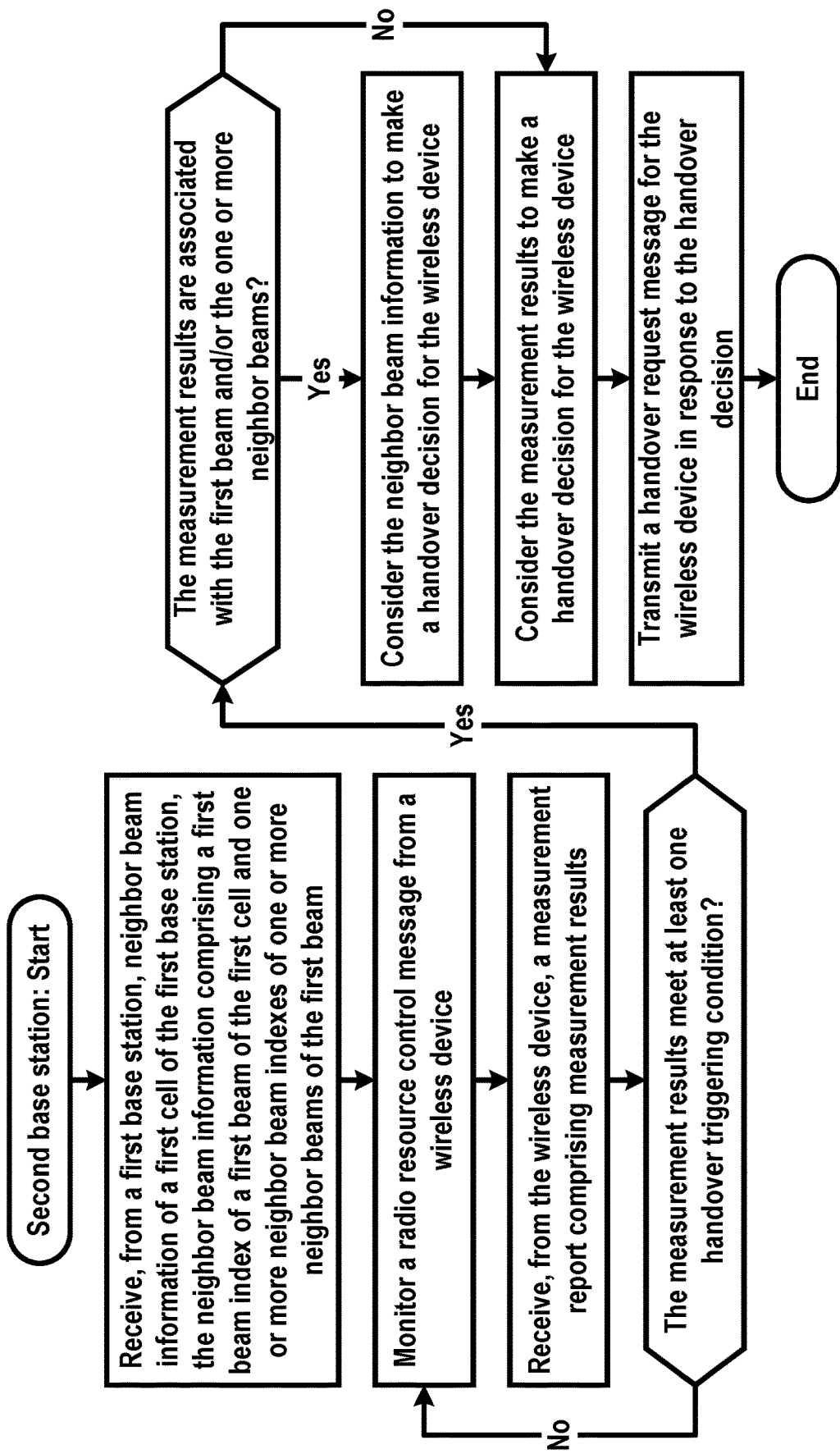
FIG. 36 is an example diagram as per an aspect of an embodiment of the present disclosure.

In an example, as shown in FIG. 36, the first base station (e.g. the second base station in FIG. 36) may transmit, to a third base station, a third message at least based on or more elements of the first message. The third message may be configured to request at least one of a handover towards a cell and/or a beam of the third base station, a multi connectivity initiation (e.g. dual connectivity initiation), a direct interface setup/modification (e.g. Xn interface setup/modification), a dual connectivity change initiation (e.g. SgNB initiated SgNB change procedure), a mobility setting change request for a cell and/or a beam of the third base station, an interference management (e.g. by transmitting a load information message and/or an interference information message), a load-balancing (e.g. by transmitting a resource status request/response/update message), and/or the like. In an example, the first base station may employ the one or more elements of the neighbor relation table to manage one or more network configurations. In an example, the third message may be based on measurement results received from a wireless device. The measurement result may comprise cell or beam quality information (e.g. RSRP, RSRQ, combined RSRP, combined RSRQ) of one or more cells or one or more beams of the third base station, the first base station, the second base station, and/or other base stations. In an example, the third base station may be the second base station.

In an example, the one or more cell identifiers may comprise a global cell identifier (e.g. ECGI, CGI, 5G global cell identifier, and/or the like) and/or a physical cell identifier. In an example, the one or more beam identifiers may comprise a synchronization signal block index, a synchronization signal scheduling information (e.g. synchronization signal frequency and/or timing information, and/or synchronization signal frequency and/or timing offset information), a synchronization signal sequence information, a reference signal index, a reference signal scheduling information (e.g. reference signal frequency and/or timing information, and/or reference signal frequency and/or timing offset information), a reference signal sequence information, and/or a beam configuration information. In an example, the reference signal may comprise a CSI-RS, a DM-RS, and/or the like.

Example

In an example, a first base station may receive, from a second base station, a first message comprising a neighbor information of at least one of a first serving cell and/or a first serving beam of the second base station, wherein the neighbor information may comprise at least one of: one or more cell identifiers of one or more cells neighboring with the first serving cell; one or more cell identifiers of one or more cells neighboring with the first serving beam; one or more beam identifiers of one or more beams neighboring with the first serving cell; and/or one or more beam identifiers of one or more beams neighboring with the first serving beam. The first base station may transmit, to the second base station, a second message confirming a receipt of the first messages. The first base station may update a neighbor relation table at least based on one or more elements of the first message, wherein the neighbor relation table may comprise at least one of one or more cell identifiers and/or one or more beam identifiers.

In an example, the second base station may receive one or more elements of the neighbor information from at least one of: one or more wireless devices; one or more base stations; a core network entity; and/or an operation and maintenance entity. The first base station may transmit, to an operation and maintenance entity, one or more elements of the neighbor relation table. The first base station may transmit, to a third base station, a third message at least based on one or more elements of the first message. The third message may be configured to request at least one of: a handover towards a cell of the third base station; a multi connectivity initiation; a secondary base station change initiation; a direct interface setup/modification; and/or a mobility setting change.

In an example, the third base station may be the second base station. The one or more cell identifiers may comprise at least one of a global cell identifier and/or a physical cell identifier. The one or more beam identifiers may comprise at least one of a synchronization signal block index, a synchronization signal scheduling information, a synchronization signal sequence information, a reference signal index, a reference signal scheduling information, a reference signal sequence information, and/or a beam configuration information.

Neighbor Cell Relation

In an example beam based cellular network system, a cell area may be formed with multiple beams (e.g. SS beams and/or CSI-RS beams). In an example, each beam covering partial area is swept over a cell coverage area, and different beam coverage areas may have different radio conditions. Proper handover configuration parameters and/or handover policies may be different depending on which type of cells a beam of a neighboring cell is facing. For example, when determining mobility policies for handover between cell1 and cell2, appropriate handover parameters for handover between beam-A of cell1 and beam-B of cell2 may be different from preferable handover parameters for handover between beam-A of cell1 and beam-C of cell2 if beam-B and beam-C are facing different types of cells from each other. In an example, if beam-B is adjacent to 5G cells and beam-C is adjacent to LTE cells, a base station may prefer to handover a wireless device towards beam-B for continuous 5G services. In an example, configurations of each beam may affect to beams of neighbor cells and different type of neighbor cells. To increase beam deployment performance and reliability, a network may consider overall beam deployment topology of each cell and/or different cell type topologies. Implementation of existing cell-based neighbor information exchange procedures may increase unpreferable handovers, handover failure rate, and/or handover ping-pong issues when multiple beams serve a cell coverage area. The existing technology may increase service quality degradation, call dropping rate and packet transmission delay during a handover procedure. The increased call dropping rate and the increased packet transmission delay may decrease communication reliability.

Example embodiments enhance neighbor information exchange mechanism between base stations that configure multiple beams to cover their serving cell area by supporting beam level neighbor information exchanges and cell type specific neighbor information exchanges. Example embodiments may reduce unpreferable handovers, handover failure rate, and/or handover ping-pong issues by enabling base stations to obtain beam level and/or cell type specific neighbor information of neighboring cells from their neighboring base stations. Based on example embodiments a network may determine beam-level and/or cell type based neighbor relations. Example embodiments may improve communication reliability by supporting beam specific neighbor relation recognition between neighboring base stations.

In an example embodiment, neighbor information exchanged between base stations may comprise beam related information of a cell. By increasing a granularity of neighbor information, finer network system management and/or optimization may be enabled compared to exchanging only cell level neighbor information between base stations. In an example, a base station may transmit, to another base station, a neighbor beam information and/or a neighbor cell information of a serving cell and/or a beam of a serving cell operated by the base station. The another base station receiving the neighbor beam information and/or the neighbor cell information may update a neighbor relation table at least based on the received information, and/or may transmit the neighbor relation table to an operation and maintenance (O&M) entity. In an example, the another base station may determine a plurality of network control configurations at least based on the received information, wherein, for example, the network control configurations may be at least one of handover decision making, mobility parameter settings, multi connectivity managements, interference managements, CoMP operation managements, MBMS service managements, direct communication controls, and/or the like.

In an example, a base station may transmit, to another base station, neighbor information comprising an LTE (Long Term Evolution) neighbor cell information of a serving cell and/or a beam of a serving cell operated by the base station. The LTE neighbor cell information may comprise a neighbor cell information and/or an indication indicating whether a cell associated with the LTE neighbor cell information is an LTE cell. The indication may be an explicit indication value and/or an implicit indication such as a cell identifier format. In an example, a 5G (i.e. NR, New Radio) cell may use a cell identifier format different from an LTE cell identifier format. The another base station receiving the neighbor information with the LTE neighbor cell information may determine whether a cell associated with the LTE neighbor cell information is an LTE cell or a 5G cell at least based on an explicit indication value and/or an implicit indication such as a cell identifier format. The another base station may update a neighbor relation table at least based on the received neighbor information, and may transmit the neighbor relation table to an operation and maintenance (O&M) entity. In an example, the another base station may determine a plurality of network control configurations at least based on the received neighbor information, wherein, for example, the network control configurations may be at least one of handover decision making, mobility parameter settings, multi connectivity managements, interference managements, CoMP operation managements, MBMS service managements, direct communication controls, and/or the like.

In an example, a cell may be operated with one or more beams employing a multi-antenna system. A beam may have a spatial direction, and/or may cover a part of a cell coverage area. A combination of one or more beam spatial areas may form a cell coverages. In an example, a beam transmitting a synchronization signal and/or receiving a signal from a wireless device may be swept over a cell coverage area in a predetermined way. A synchronization signal index, a synchronization signal scheduling information, and/or a synchronization signal sequence information may be used to identify a swept beam. A swept beam may broadcast one or more control information comprising at least one of a system information, a master information, a PDCCH, a PRACH resource, a random access preamble information, a synchronization signal, a reference signal, and et cetera. In an example, a beam may transmit a reference signal (e.g. CSI-RS). A beam may be also identified by a reference signal (e.g. CSI-RS, DM-RS, and the like) index, a reference signal scheduling information, and/or a reference signal sequence information.

Figure 39:
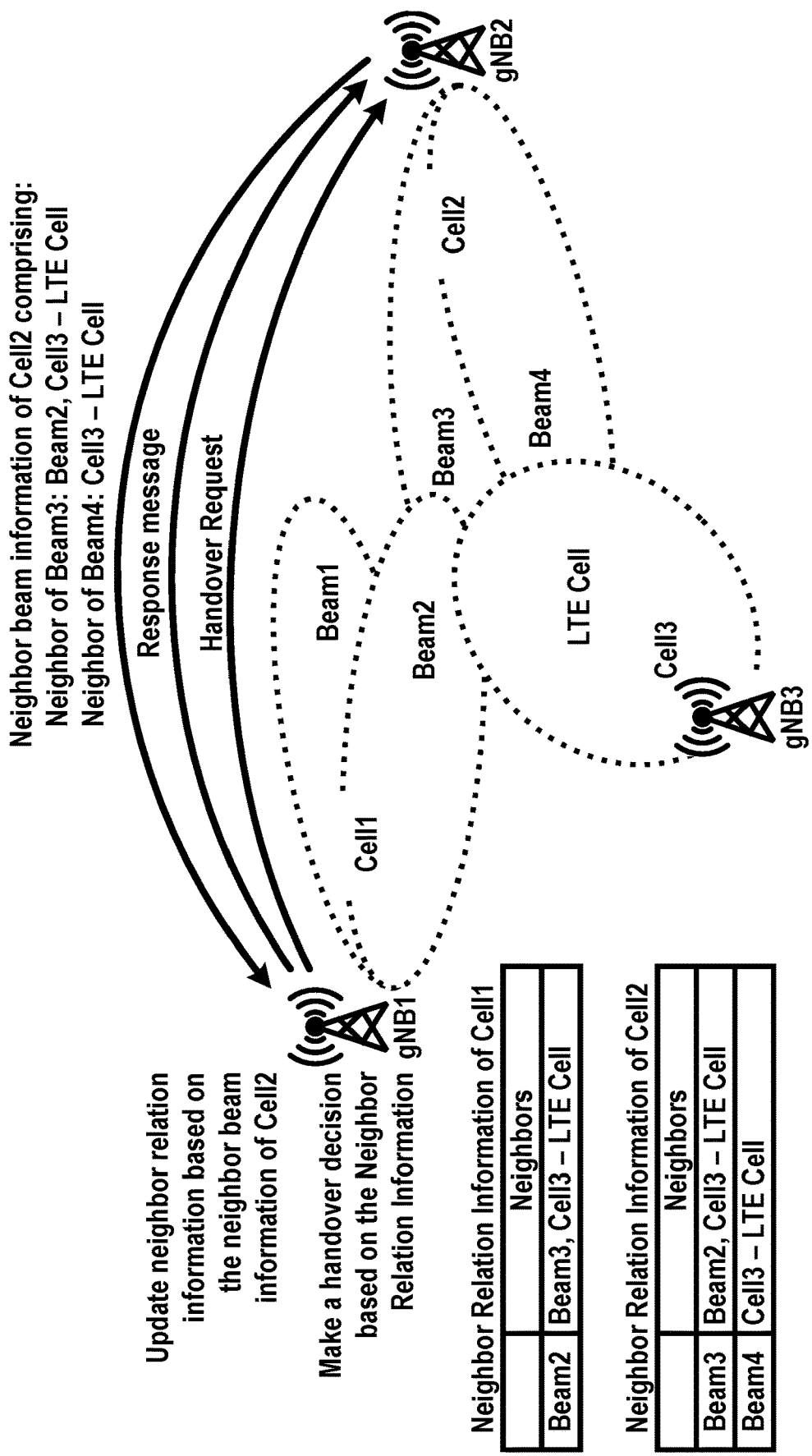
FIG. 39 is an example diagram as per an aspect of an embodiment of the present disclosure.

In an example, as shown in FIG. 39, a first base station may receive a first message from a second base station. The first message may comprise a neighbor information of a first serving cell and/or a first serving beam of the second base station. In an example, the first message may be a direct interface setup request message (e.g. Xn setup request), a direct interface setup response message (e.g. Xn setup response), a base station configuration update message (e.g. gNB configuration update), a base station configuration update acknowledge/failure message (e.g. gNB configuration update acknowledge/failure), and/or the like. The first serving cell may be operated by the second base station. The first serving beam may be a beam supporting a cell of the second base station. In an example, the neighbor information may comprise at least one of: one or more cell identifiers of one or more cells neighboring with the first serving cell; one or more cell identifiers of one or more cells neighboring with the first serving beam; one or more beam identifiers of one or more beams neighboring with the first serving cell; and/or one or more beam identifiers of one or more beams neighboring with the first serving beam. In an example, the neighbor information may further comprise an indication indicating that the one or more cells neighboring with the first serving cell and/or the first serving beam are an LTE (4G) cell. In an example, the indication may be an implicit indication (e.g. a cell identifier format for an LTE cell different from a cell identifier format for a 5G (NR) cell), and/or an explicit indication (e.g. an LTE cell indication).

In an example, the neighbor information may comprise a first serving cell identifier of the first serving cell and/or one or more beam identifiers of one or more beams of the first serving cell. The neighbor information may further comprise one or more neighboring cell identifiers of one or more neighboring cells of the first serving cell and/or one or more second beam identifiers of one or more second beams of the one or more neighboring cells. In the example figure (Example of NR cell neighbor relation), the neighbor information, transmitted by the second base station to the first base station, may comprise a serving cell identifier (Cell 1), beam identifiers (Beam 1, Beam 2, Beam 3, and/or Beam 4 of Cell 1) of Cell1, cell identifiers (Cell 5 and/or Cell 6) of cells neighboring to Cell 1, beam identifiers (Beam 1, Beam 2, Beam 3, and/or Beam 4 of Cell 5) of beams of Cell 5, and/or beam identifiers (Beam 1, Beam 2, Beam 3, and/or Beam 4 of Cell 6) of beams of Cell 6.

In an example, the neighbor information may comprise a first serving cell identifier of the first serving cell and/or one or more beam identifiers of one or more beams of the first serving cell. The neighbor information may further comprise one or more neighboring cell identifiers of one or more neighboring cells of the one or more beams of the first serving cell and/or one or more second beam identifiers of one or more second beams of the one or more neighboring cells. In the example figure (Example of NR cell neighbor relation), the neighbor information, transmitted by the second base station to the first base station, may comprise a serving beam identifier (Beam 3 of Cell 1), cell identifier (Cell 1) of Beam 3 of Cell 1, cell identifiers (Cell 5 and/or Cell 6) of cells neighboring to Beam 3 of Cell 1, beam identifiers (Beam 1, Beam 2, Beam 3, and/or Beam 4 of Cell 5) of beams of Cell 5, and/or beam identifiers (Beam 1, Beam 2, Beam 3, and/or Beam 4 of Cell 6) of beams of Cell 6.

In an example, the neighbor information may comprise a first serving cell identifier of the first serving cell and/or one or more beam identifiers of one or more beams of the first serving cell. The neighbor information may further comprise one or more neighboring beam identifiers of one or more neighboring beams of the first serving cell and/or one or more cell identifiers of one or more cells of the one or more neighboring beams. In the example figure (Example of NR cell neighbor relation), the neighbor information, transmitted by the second base station to the first base station, may comprise a serving cell identifier (Cell 1), beam identifiers (Beam 1, Beam 2, Beam 3, and/or Beam 4 of Cell 1) of Cell1, beam identifiers (Beam 3 of Cell 5, Beam 4 of Cell 5, Beam 1 of Cell 6, and/or Beam 2 of Cell 6) of beams neighboring to Cell 1, cell identifier (Cell 5) of Beam 3 and Beam 4 of Cell 5, and/or cell identifier (Cell 6) of Beam 1 and Beam 2 of Cell 6.

In an example, the neighbor information may comprise a first serving cell identifier of the first serving cell and/or one or more beam identifiers of one or more beams of the first serving cell. The neighbor information may further comprise one or more neighboring beam identifiers of one or more neighboring beams of the one or more beams of the first serving cell and/or one or more cell identifiers of one or more cells of the one or more neighboring beams. In the example figure (Example of NR cell neighbor relation), the neighbor information, transmitted by the second base station to the first base station, may comprise a serving beam identifier (Beam 3 of Cell 1), cell identifier (Cell 1) of Beam 3 of Cell 1, beam identifiers (Beam 3 of Cell 5, Beam 4 of Cell 5, and/or Beam 1 of Cell 6) of beams neighboring to Beam 3 of Cell 1, cell identifier (Cell 5) of Beam 3 and Beam 4 of Cell 5, and/or cell identifier (Cell 6) of Beam 1 of Cell 6.

In an example, the neighbor information may comprise a first serving cell identifier of the first serving cell and/or one or more beam identifiers of one or more beams of the first serving cell. The neighbor information may further comprise one or more neighboring cell identifiers of one or more neighboring cells of the first serving cell with an indication indicating that the one or more neighboring cells are an LTE (4G) cell. In the example figure (Example of inter-RAT cell neighbor relation), the neighbor information, transmitted by the second base station to the first base station, may comprise a serving cell identifier (Cell 1), beam identifiers (Beam 1, Beam 2, Beam 3, and/or Beam 4 of Cell 1) of Cell1, and/or cell identifiers (Cell 5 and/or Cell 6) of cells neighboring to Cell 1.

In an example, the neighbor information may comprise a first serving cell identifier of the first serving cell and/or one or more beam identifiers of one or more beams of the first serving cell. The neighbor information may further comprise one or more neighboring cell identifiers of one or more neighboring cells of the one or more beams of the first serving cell with an indication indicating that the one or more neighboring cells are an LTE (4G) cell. In the example figure (Example of inter-RAT cell neighbor relation), the neighbor information, transmitted by the second base station to the first base station, may comprise a serving beam identifier (Beam 3 of Cell 1), cell identifier (Cell 1) of Beam 3 of Cell 1, and/or cell identifiers (Cell 5 and/or Cell 6) of cells neighboring to Beam 3 of Cell 1.

In an example, the second base station may receive one or more elements of the neighbor information from at least one of: one or more wireless devices via one or more radio resource control (RRC) messages (e.g. measurement report message, UE information response message, and/or the like), one or more base stations via one or more inter-node interface messages (e.g. Xn interface messages, Xn setup request/response message, Xn configuration update/acknowledge/failure message, and/or the like), a core network entity (e.g. AMF, MME) via one or more inter-node interface messages (e.g. NG interface messages, S1 interface messages, and/or the like), and/or an operation and maintenance entity (e.g. O&M, OAM, and/or the like).

In an example, the first base station may transmit, to the second base station, a second message to confirm that the first base station received the first message. The second message may comprise a second neighbor information of a second serving cell and/or a second serving beam of the first base station. In an example, the second message may be a direct interface setup response message (e.g. Xn setup response), a base station configuration update message (e.g. gNB configuration update), a base station configuration update acknowledge/failure message (e.g. gNB configuration update acknowledge/failure), and/or the like.

In an example, the first base station may update a neighbor relation table at least based on one or more elements of the first message. The neighbor relation table may comprise one or more cell identifiers of one or more cells, one or more beam identifiers of one or more beams, and/or an indication indicating that the one or more cells are an LTE (4G) cell. The neighbor relation table may further comprise a neighbor relation: between one or more cells and one or more another cells, between one or more cells and one or more beams, between one or more beams and one or more cells, between one or more beams and one or more another beams, and/or the like. In an example, the neighbor relation table may be defined for a cell of the first base station. The neighbor relation table defined for a cell may comprise one or more target cell identifiers of one or more target cells with an indication indicating that the one or more target cells are an LTE (4G) cell, and/or one or more target beam identifiers of one or more target beams. In an example, the neighbor relation table may be defined for a beam of a serving cell of the first base station. The neighbor relation table defined for a beam may comprise one or more target cell identifiers of one or more target cells with an indication indicating that the one or more target cells are an LTE (4G) cell, and/or one or more target beam identifiers of one or more target beams.

In an example, the neighbor relation table may further comprise no remove attribute, no handover attribute, no Xn attribute for a neighbor cell and/or a neighbor beam. If the no remove attribute is checked, the first base station may not remove the neighbor relation for the neighbor relation table. If the no handover attribute is checked, the neighbor relation may not be used by the first base station for handover reasons, and/or the first base station may not initiate handover the neighbor cell and/or the neighbor beam. If the no Xn attribute is checked, the first base station may not use, for the neighbor relation, an Xn interface to initiate procedures towards a base station parenting the neighbor cell and/or the neighbor beam.

In an example, the first base station may transmit, to an operation and maintenance entity (OAM, O&M), one or more elements of the neighbor relation table. The operation and maintenance entity may employ the one or more elements of the neighbor relation table to manage one or more network configurations. The operation and maintenance entity may update one or more elements of the neighbor relation table at least based on a second neighbor relation table received from one or more another base stations and/or one or more updates of network configurations. The operation and maintenance entity may transmit the updated one or more elements of the neighbor relation table to the first base station.

Figure 40:
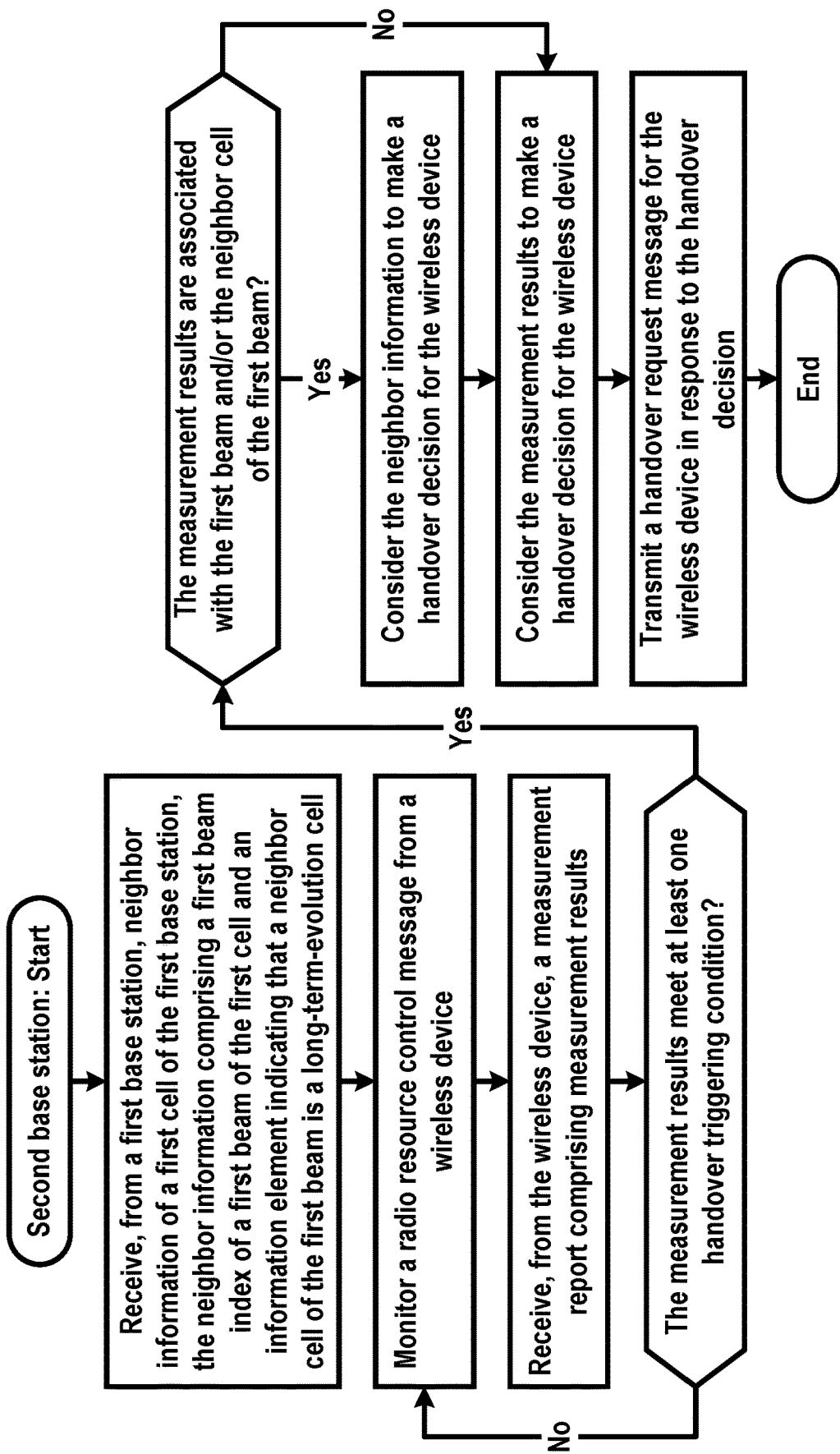
FIG. 40 is an example diagram as per an aspect of an embodiment of the present disclosure.

In an example, as shown in FIG. 40, the first base station (e.g. the second base station in FIG. 40) may transmit, to a third base station, a third message at least based on or more elements of the first message. The third message may be configured to request at least one of a handover towards a cell and/or a beam of the third base station, a multi connectivity initiation (e.g. dual connectivity initiation), a direct interface setup/modification (e.g. Xn interface setup/modification), a dual connectivity change initiation (e.g. SgNB initiated SgNB change procedure), a mobility setting change request for a cell and/or a beam of the third base station, an interference management (e.g. by transmitting a load information message and/or an interference information message), a load-balancing (e.g. by transmitting a resource status request/response/update message), and/or the like. In an example, the third message may be based on measurement results received from a wireless device. The measurement result may comprise cell or beam quality information (e.g. RSRP, RSRQ, combined RSRP, combined RSRQ) of one or more cells or one or more beams of the third base station, the first base station, the second base station, and/or other base stations. In an example, the first base station may employ the one or more elements of the neighbor relation table to manage one or more network configurations. In an example, the third base station may be the second base station.

In an example, the first base station may configure one or more network configurations at least based on the indication indicating that a neighboring cell is an LTE (4G) cell. In an example, the first base station may configure different mobility parameters for an LTE (4G) target cell from mobility parameters for a 5G (NR) target cell. In an example, the first base station may configure different multi connectivity initiation/modification policies for an LTE (4G) target cell from multi connectivity initiation/modification policies for a 5G (NR) target cells. In an example, the first base station may configure different interference management policies and/or different load balancing policies for a LTE (4G) neighboring cell from interference management policies and/or load balancing policies for a 5G (NR) target cells.

In an example, the one or more cell identifiers may comprise a global cell identifier (e.g. ECGI, CGI, 5G global cell identifier, and/or the like) and/or a physical cell identifier. In an example, the one or more beam identifiers may comprise a synchronization signal block index, a synchronization signal scheduling information (e.g. synchronization signal frequency and/or timing information, and/or synchronization signal frequency and/or timing offset information), a synchronization signal sequence information, a reference signal index, a reference signal scheduling information (e.g. reference signal frequency and/or timing information, and/or reference signal frequency and/or timing offset information), a reference signal sequence information, and/or a beam configuration information. In an example, the reference signal may comprise a CSI-RS, a DM-RS, and/or the like.

Example

In an example, a first base station may receive, from a second base station, a first message comprising a neighbor information of at least one of a first serving cell and/or a first serving beam of the second base station, wherein the neighbor information may comprise at least one of: one or more cell identifiers of one or more cells neighboring with the first serving cell; one or more cell identifiers of one or more cells neighboring with the first serving beam; one or more beam identifiers of one or more beams neighboring with the first serving cell; one or more beam identifiers of one or more beams neighboring with the first serving beam; an indication indicating that one or more cells neighboring with the first serving cell are a long term evolution cell; and/or an indication indicating that one or more cells neighboring with the first serving beam are a long term evolution cell. The first base station may transmit, to the second base station, a second message confirming a receipt of the first messages. The first base station may update a neighbor relation table at least based on one or more elements of the first message. The neighbor relation table may comprise at least one of: one or more neighbor cell identifiers of one or more neighbor cells; an indication indicating that the one or more neighbor cells are a long term evolution cell; and/or one or more neighbor beam identifiers of one or more neighbor beams.

In an example, the second base station may receive one or more elements of the neighbor information from at least one of: one or more wireless devices; one or more base stations; a core network entity; and/or an operation and maintenance entity. The first base station may transmit, to an operation and maintenance entity, one or more elements of the neighbor relation table. The first base station may transmit, to a third base station, a third message at least based on one or more elements of the first message. The third message may be configured to request at least one of: a handover towards a cell of the third base station; a multi connectivity initiation; a secondary base station change initiation; a direct interface setup/modification; and/or a mobility setting change.

In an example, the third base station may be the second base station. The one or more cell identifiers may comprise at least one of a global cell identifier and/or a physical cell identifier. The one or more beam identifiers may comprise at least one of a synchronization signal block index, a synchronization signal scheduling information, a synchronization signal sequence information, a reference signal index, a reference signal scheduling information, a reference signal sequence information, and/or a beam configuration information.

Two-Step Random Access

Figure 41:
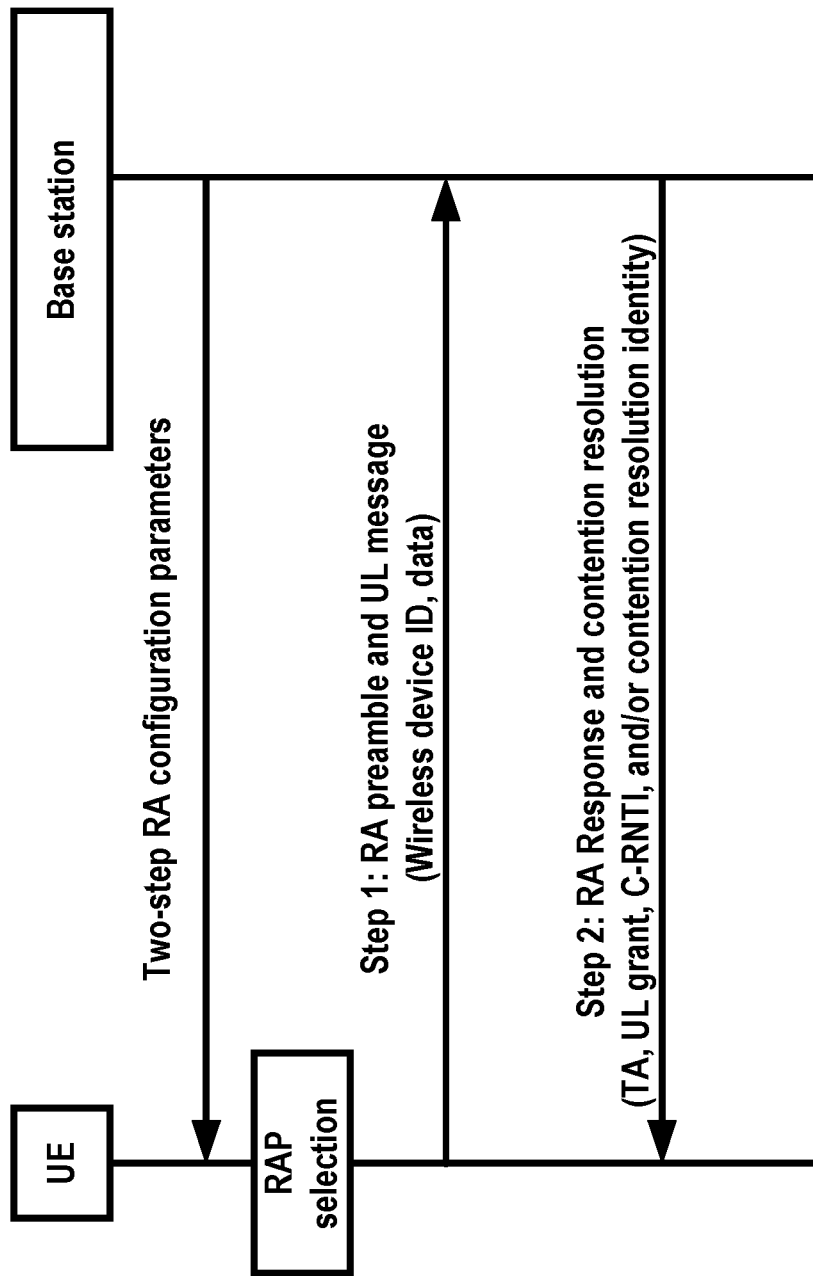
FIG. 41 is an example diagram as per an aspect of an embodiment of the present disclosure.

In an example embodiment, as illustrated in FIG. 41, a two-step RA procedure that may comprise uplink (UL) transmission of RAP and data followed by downlink transmission of RAR may reduce RA latency by integrating the process to obtain the TA value with the data transmission in the four-step RA procedure. In an example, in the UL transmission of a two-step RA procedure, a wireless device may transmit a RAP for UL time alignment and/or one or more TBs that may comprise an UL grant, a wireless device ID, one or more TBs, C-RNTI and/or other parameters to a base station via a cell. In the DL transmission, in response to the UL transmission, a base station may transmit a RAR that may comprise an acknowledgement of a reception and decoding success of the one or more transport blocks.

In an example embodiment, in the UL transmission of a two-step RA procedure, a wireless device, as the first step of the two-step RA procedure, may transmit a RAP and one or more TBs in parallel via a cell to a base station. A wireless device may acquire one or more configuration parameters for the UL transmission before the wireless device starts two-step RA procedure. A wireless device may transmit the selected RAP via RACH resource and transmits the TBs via the UL resource associated with the selected RAP. The UL transmission may occur in the same subframe or possibly in consecutive subframes (at least in the same burst). Two step RA procedure may be on a contention basis. The contention may occur the RAP and/or data transmission.

In an example embodiment, in the UL transmission, the RAP may be used for a cell to adjust UL time alignment and/or to aid the channel estimation for one or more TBs. The TB part in the UL transmission may comprise a wireless device ID, C-RNTI, service request, e.g., buffer state reporting (BSR), one or more user data packets, and other parameters. A wireless device in RRC connected may use C-RNTI as the wireless device ID. A wireless device in RRC inactive may use C-RNTI (if available), resume ID, or short MAC-ID as the wireless device ID. In an example, a wireless device in RRC idle may use C-RNTI (if available), resume ID, or short MAC-ID, IMSI, T-IMSI, and/or a random number as the wireless device ID.

In an example embodiment, for the one or more TBs transmission in UL, there may be one or more options for transmitting one or more TBs using the two-step RA procedure. One option may be to multiplex the user data packet(s) in the first step of two-step RA procedure. In this case, a base station may configure one or more resources reserved for the UL transmission that may be informed to a wireless device before the UL transmission. In case that a wireless device transmits one or more TBs in the first step of the two-step RA procedure, a base station may in response to the UL transmission transmit a RAR that may comprise a contention resolution message and an acknowledgement/non-acknowledgement message of the UL data transmission. A wireless device may transmit one or more TBs after the reception of a RAR. In this case, the wireless device may transmit an indicator, e.g., buffer state reporting (BSR), in the UL transmission to inform a base station of the amount of data the wireless device wishes to transmit. The base station may assign a UL grant based on the indicator and transmit the UL grant to the wireless device via a RAR. In case that UL data transmission based on the UL grant via a RAR takes place after the reception of RAR, the UL data transmission may take place on a contention-based channel. The transmission may take place after receiving the RAR, e.g., in subframe x+5.

In an example embodiment, a wireless device may inform or indicate to a base station of required UL grant size via choosing a RAP selection other than transmitting a BSR. A base station may partition RAPs available to the base station into one or more RAP groups such that each partition indicates a particular UL grant size. A wireless device may inform a base station of a request of a small or large grant by selecting a RAP from the designated group. The base station may know the requested grant size upon reception of the RAP. A base station may configure an association between RAP groups and UL grant size and broadcast one or more parameters via system information to inform the association.

In an example embodiment, a wireless device may inform or indicate to a base station of required UL grant size via transmitting a RAP on a partitioned radio resource. A base station may partition radio resources used for RAP transmission into one or more groups such that resource(s) in a group carrying a RAP indicates a UL grant size that a wireless device requests. The base station may know the requested grant size upon reception of the RAP on resources in a group. When a high granularity is required, a base station may configure a large number of radio resources for the RAP transmission. A base station may configure an association between radio resource groups and UL grant size and broadcast one or more parameters via system information to inform the association.

In an example embodiment, in the second step of the two-step RA procedure, a base station may transmit a RA response (RAR) to a wireless device in response to reception of the RAP and data that the wireless device transmits. The RAR may comprise a TA, a contention resolution identity, UL grant, C-RNTI. MAC PDU may comprise a RAR MAC subheader and a corresponding RAR. The TA may be for the case that a wireless device performs a two-step RA procedure, e.g., when TA timer is expired.

A base station may or may not transmit the contention resolution identity to a wireless device. If a wireless device transmits C-RNTI (e.g. as a wireless device ID) in an UL transmission, the wireless device may complete contention resolution based on C-RNTI in a RAR. If a wireless device transmits a shared RNTI that may be monitored by more than one wireless device as a wireless device ID in a UL transmission, a wireless device may complete contention resolution based on a contention resolution identity in a RAR. In an example, other wireless ids, such as a random number, resume ID, T-IMSI, IMSI may be used to complete contention resolution.

The UL grant may be for the case that a wireless device may have subsequent UL data to transmit. BSR may be transmitted by a wireless device in the UL transmission. A base station may use the BSR for calculating a UL grant.

In an example embodiment, for a wireless device that may not have C-RNTI such as a wireless device in RRC inactive, if a two-step RA procedure is used for state transition from inactive to connected, a base station may assign a C-RNTI to the wireless device.

In an example embodiment, a wireless device may acquire one or more two-step RA configuration parameters from one or more messages broadcast and/or unicast by a cell. In an example, a base station may broadcast or multicast one or more two-step RA configuration parameters comprised in one or more system information blocks via a cell. In an example, the base station may transmit to a wireless device through dedicated resource(s) and signaling, e.g., unicast to a wireless device in RRC connected state.

In an example embodiment, a base station may configure or restrict the usage of the two-step RA procedure to one or more cases based procedures, services, or radio conditions.

For example, a small cell where there may be no need for a TA may use broadcast signaling to configure all wireless devices under its coverage to use a two-step RA procedure. In this case, a wireless device may acquire the configuration via one or more the system information blocks or via L1 control signaling used to initiate a two-step RA procedure for downlink data arrival.

For example, for the case of a base station with macro coverage, a wireless device having a stored/persisted TA value, e.g. stationary or near stationary wireless device such as a sensor-type wireless device, may perform a two-step RA procedure. In this case, a base station may use dedicated signaling to configure two-step RA procedure with one or more wireless devices having stored/persisted TA values under the coverage.

In an example, a wireless device in RRC connected may perform a two-step RA procedure, e.g. when performing a network initiated handover, or when the wireless device needs an UL grant within a required delay and there are no physical-layer uplink control channel resources available to transmit a scheduling request. A wireless device in RRC inactive may perform a two-step RA procedure, e.g. for small data transmission while remaining in the inactive state or for resuming a connection. A wireless device may initiate a two-step RA procedure, for example, for initial access (e.g. for establishing a radio link), re-establishment of a radio link, handover, establishment of UL synchronization, a scheduling request when there is no UL grant.

In an example, since a two-step RA procedure may reduce latency of UL data transfer compared with the four-step RA procedure, the usage of two-step RA procedure may cover the case of UL data transfer such as cases of UL data arrival for a wireless device in RRC connected or UL data arrival for a wireless device in RRC inactive. For the case of UL data arrival for a wireless device in RRC connected, using two-step RA procedure for scheduling request may improve the latency of delivering the SR for UL data arrival. The case of scheduling request via two-step RA procedure may apply when a TA timer expires or physical-layer uplink control channel resource for SR is not configured for a wireless device. For the case of UL data arrival for a wireless device in RRC inactive, the wireless device may transmit data using the two-step RA procedure without state transition from the inactive state to be fully connected by using two-step RA procedure in order to fulfil the latency requirement.

In an example embodiment, for the case a base station configures four-step and two-step RA procedures, the base station may use separate preamble signature groups and/or use separate time-frequency resources for four-step and two-step RA preamble transmissions, to facilitate for the base station to determine if a wireless device is asking for a two-step RA or a four-step RA. A base station may broadcast and/or unicast one or more configuration parameters employed for informing the separate preamble signature groups and/or use separate time-frequency resources for four-step and two-step RA preamble transmissions.

In an example embodiment, there may be one or more RAP groups configured for the two-step RA procedure informed by broadcast system information. If a base station configures one or more groups in the two-step RA procedure, a wireless device may use a size of the message transmitted by the wireless device in the third step and the pathloss to determine which group the wireless device selects a RAP. A base station may use a group type to which a RAP belongs as an indication of the message size in the third step and the radio conditions at a wireless device. A base station may broadcast the RAP grouping information along with one or more thresholds on system information.

In an example embodiment, a process for generating a RAP may be predetermined or defined employing two-step RA configuration parameters. In an example, a type of sequence for RAP generation, e.g., Zadoff-Chu sequence, the number of samples in a sequence, sub-carrier spacing for RAP transmission, and a format of RAP transmission in a subframe (e.g., guard time/frequency, cyclic prefix length for RAP transmission, and resource block size allocated for RAP and data transmission) may be predetermined. A cell may broadcast one or more parameters such as a root sequence index and cyclic shift interval, e.g., rootSequenceindex, highspeedflag, and zeroCorrelationZoneConfig in LTE, required for a wireless device to generate a set of RAPs.

The resources used for the RAP and data transmission may be pre-determined or indicated employing a set of RA configuration parameters. For example, a table that indicates possible pairs of system frame number (SFN) and subframe number where a wireless device can attempt the first step of two-step RA procedure, e.g., transmission of RAP and data, to a cell may be pre-determined. In an example, a base station may broadcast one or more pairs of SFN and subframe employed in the cell for the RAP and data transmission of two-step RA procedure. A frequency offset with which a wireless device transmits RAP and data within a subframe may be configured by two-step RA configuration parameters. A resource over which a data part is transmitted during the UL transmission may be pre-determined or configured by a two-step RA configuration parameters in a way to be associated with a selected RAP ID such that wireless devices that select different RAP transmit data on different resources in the UL transmission.

Figure 42:
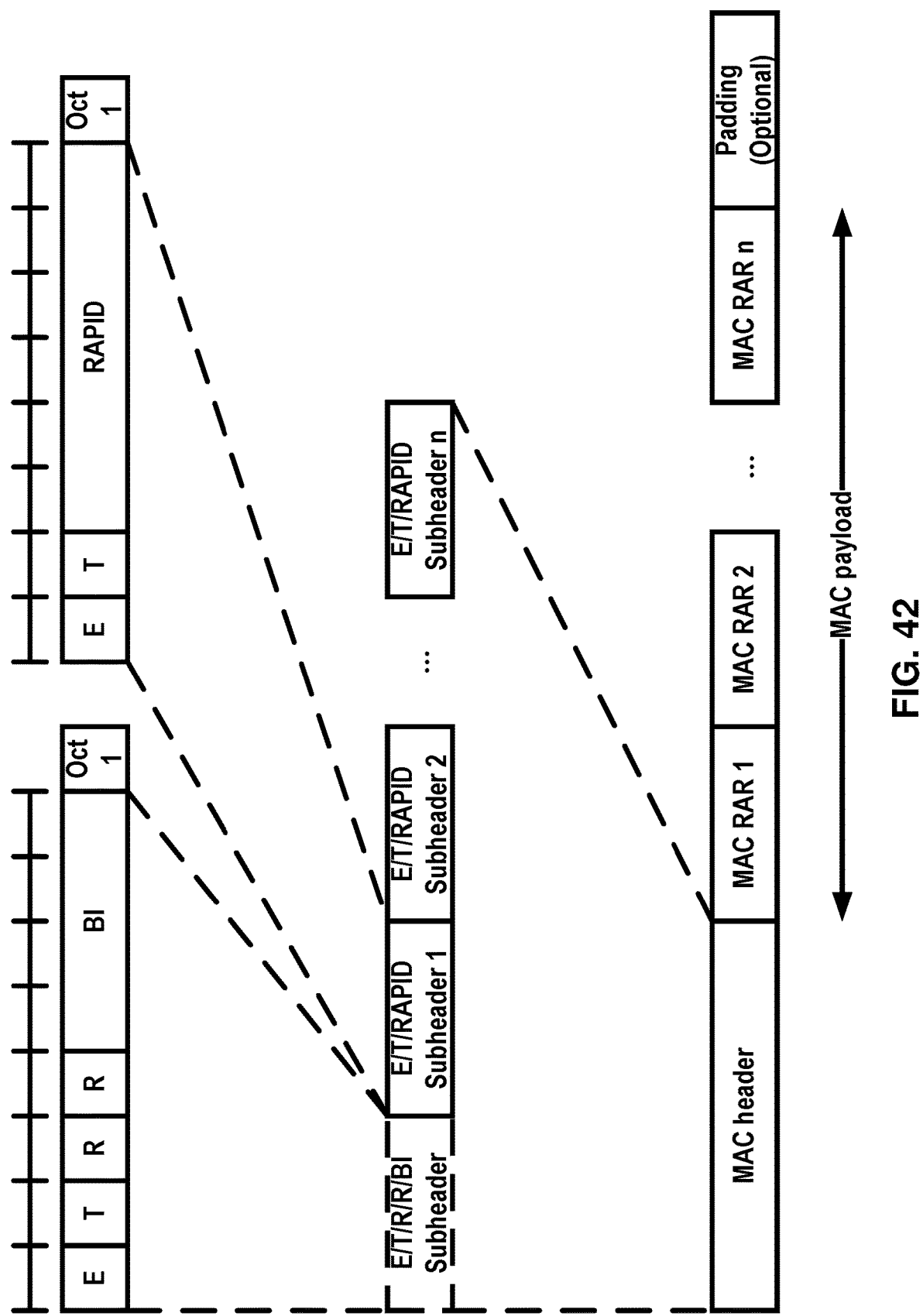
FIG. 42 is an example diagram as per an aspect of an embodiment of the present disclosure.

In an example embodiment, there may be one or more wireless devices that perform the first step of two-step RA procedure with the same cell in the same subframe. The cell thus may respond to one or more wireless devices' UL transmissions by multiplexing one or more RARs into a single MAC PDU as illustrated in FIG. 42. FIG. 42 is an example MAC PDU format. Other fields may be added to the subheader and/or RAR as described in example embodiments.

A MAC PDU may comprise of a MAC subheader having a BI and one or more pairs of a MAC subheader and a RAR. The MAC subheader may comprise a RAP ID that indicates an index number of one of available RAPs in a cell. The RAR may comprise a wireless device ID, C-RNTI, a TA command, an UL grant, and/or other parameters. A wireless device may identify a RAR corresponding to the wireless device in a MAC PDU by first identifying a subheader having a RAP ID that matches to the RAP that the wireless device transmitted during the UL transmission. The wireless device decodes a RAR that is a pair of the identified subheader.

In an example embodiment, a MAC PDU may comprise a subheader that comprises a special bit string, e.g., including zeros, pre-defined to indicate the failure of RAP detection but success of data decoding at a cell. The bit string may be informed through a field of RAP ID or a subheader may have a dedicated field for the bit string. A RAR that is a pair of the subheader having the special bit string may have the wireless device ID (and/or other ids described in the specifications) that a wireless device transmits in the UL transmission. The wireless device may decode the RAR whose corresponding subheader has the special bit string to check if the RAR is for the wireless device or not.

In an example embodiment, a wireless device may transmit, to a base station, a random access preamble (RAP) and one or more transport blocks. The wireless device may receive, a MAC PDU, comprising: one or more MAC PDU sub-headers, a MAC PDU sub-header comprises a first field;

one or more RARs, each RAR corresponds to a MAC PDU subheader in the one or more MAC PDU sub-headers. In an example, the first field may be a RAP identifier associated with the RAP if the RAP is detected. When the RAP is not detected: the first field may comprise a pre-defined format; or a second field in the MAC PDU sub-header may indicate that RAP is not detected.

In an example embodiment, a RAR response timer may be configured employing two-step RA configuration parameters. The wireless device may reset and start the RAR response timer in response to wireless device transmitting UL RAP and data transmission. Wireless device may monitor a downlink channel for a RAR on a cell until the RAR response timer is expired. A base station may transmit a MAC PDU that comprises one or more RARs one or multiple times in a DL transmission before the RAR response timer expires. The presence of a RAR may be indicated employing a specific channel, e.g., PDCCH in LTE, using an identity, e.g., RA-RNTI in LTE, created based on UL transmission time (as a combination of SFN and/or subframe number) and frequency offset. A wireless device may stop a RAR response timer when at least one of the following conditions are met. The wireless device detects a MAC PDU that comprises the RAP ID matched to the RAP that the wireless device transmits, the wireless device find a RAR having a wireless device ID that the wireless device transmits, and/or the RAR response timer is expired.

Figure 43:
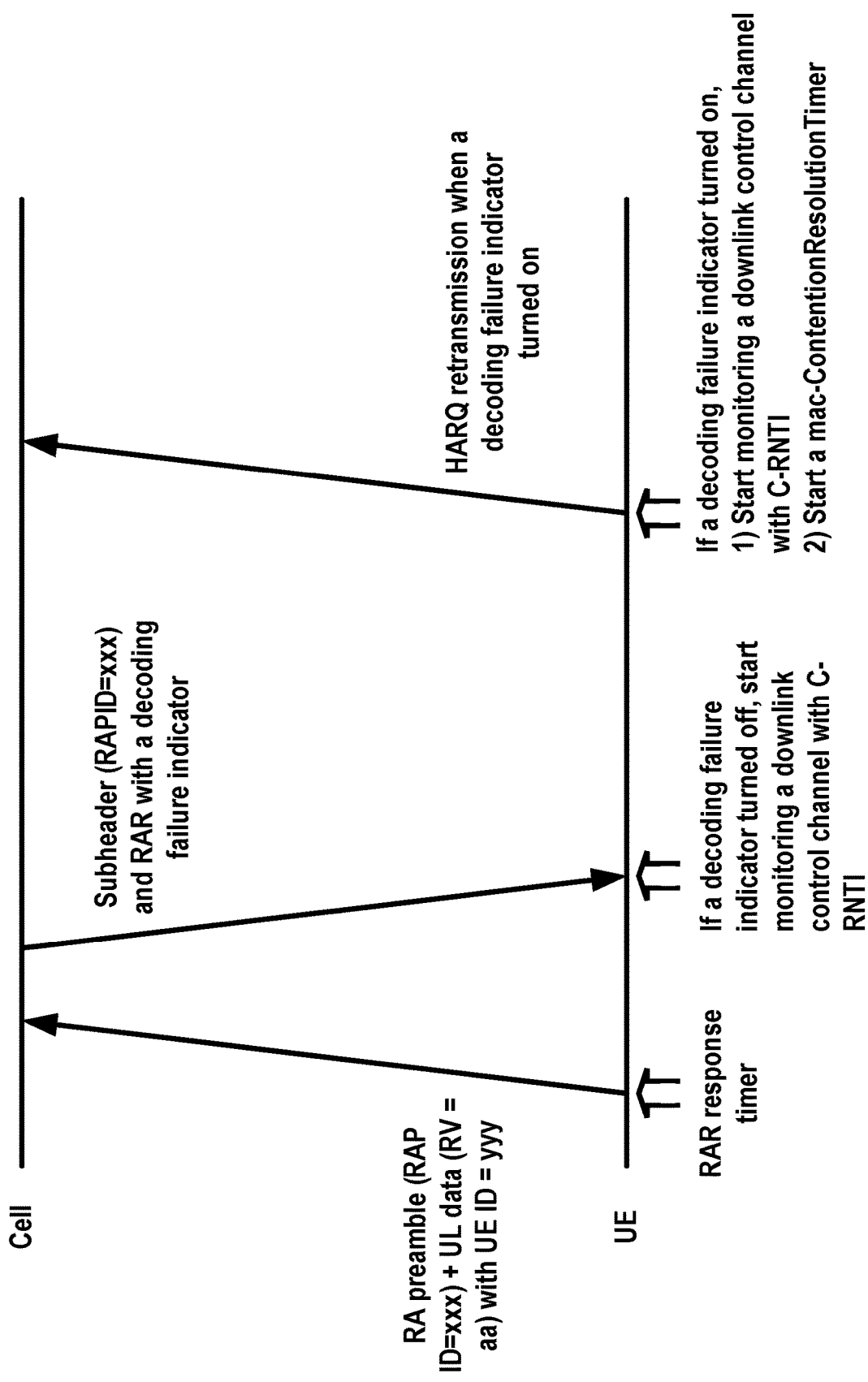
FIG. 43 is an example diagram as per an aspect of an embodiment of the present disclosure.

In an example embodiment, a contention resolution may be completed based on either C-RNTI or UE Contention Resolution Identity on a RAR. For the case that a base station detects a RAP and decode a TB part that a wireless device transmits, the base station may respond with a RAR that comprise the C-RNTI and/or other UE identifiers (described in the specification) that the wireless device transmits in the first step of two-step RA procedure. By detecting the C-RNTI and/or other UE identifiers (described in the specification) in the received RAR, the wireless device may determine the success of the two-step RA procedure. the wireless device may start monitoring the downlink control channel associated with the C-RNTI (or Temporary C-RNTI) from the time when the wireless device detects the C-RNTI (or Temporary C-RNTI) in the RAR as illustrated in FIG. 43.

In an example embodiment, there may be a case that a base station detects a RAP but fails to decode a TB part that a wireless device transmits in the UL transmission of the two-step RA procedure. In this case, the base may transmit a MAC PDU that comprise a TC-RNTI and an indicator in a MAC subheader or in a RAR that informs the wireless device of the RAP detection with data decoding failure. A wireless device may identify the case based on the indicator. The wireless device may re-transmit the one or more transport blocks (e.g. by performing HARQ retransmission). The wireless device may start a mac-ContentionResolutionTimer when the wireless device retransmits the one or more transport blocks based on uplink grant in the RAR. The wireless device may not start a mac-ContentionResolutionTimer when it transmits one or more transport blocks based on uplink grant in the RAR when RAR indicates that one or more transport blocks are received and decoded successfully by the base station.

A wireless device may restart mac-ContentionResolutionTimer at a HARQ retransmission. In response to (e.g. from subframe/time or within an time offset) a wireless device starting or restarting mac-ContentionResolutionTimer, the wireless device may start monitoring a downlink control channel using the C-RNTI or TC-RNTI. In an example, when RAR indicates that one or more transport blocks are received successfully, the wireless device may monitor the C-RNTI or TC-RNTI in response to receiving RAR (e.g. from the subframe RAR is received, or from an offset subframe from when RAR is received).

For the case that a wireless device transmits a C-RNTI in the first step of two-step RA procedure, the wireless device may monitor a downlink control channel using the C-RNTI. For the case that a wireless device does not transmit a C-RNTI in the first step of two-step RA procedure, the wireless device may monitor a downlink control channel using the TC-RNTI. If mac-ContentionResolutionTimer expires, a wireless device may determine the failure of two-step RA procedure.

In an example embodiment, a wireless device may transmit, to a base station, a random access preamble (RAP) and data. The data may comprise an identifier of the wireless device. The wireless device may receive, a MAC PDU, comprising: a subheader comprising a RAP identifier of the RAP; a RAR corresponds to the subheader comprising an uplink grant. The wireless device may transmit one or more transport blocks in a first subframe and in radio resources indicated in uplink grant. The wireless device may start a contention resolution timer in the first subframe depending on whether the RAR comprises the identifier of the wireless device.

In an example embodiment, a wireless device may transmit, to a base station, a random access preamble (RAP) and data. The data may comprise an identifier of the wireless device. The wireless device may receive, a MAC PDU, comprising: a subheader comprising a RAP identifier of the RAP; and a RAR corresponds to the subheader comprising an uplink grant for a first subframe. The wireless device may start monitoring of a downlink control channel from a second subframe. The second subframe depends on: a third subframe in which RAR is received, if RAR comprises the wireless device identifier; or the first subframe when the wireless device transmits uplink resources based on the uplink grant. The wireless device may monitor: a C-RNTI comprised in the data, if the C-RNTI is comprised in the data; or a Temporary C-RNTI comprised in the RAR, if the data does not comprise a C-RNTI.

Figure 44:
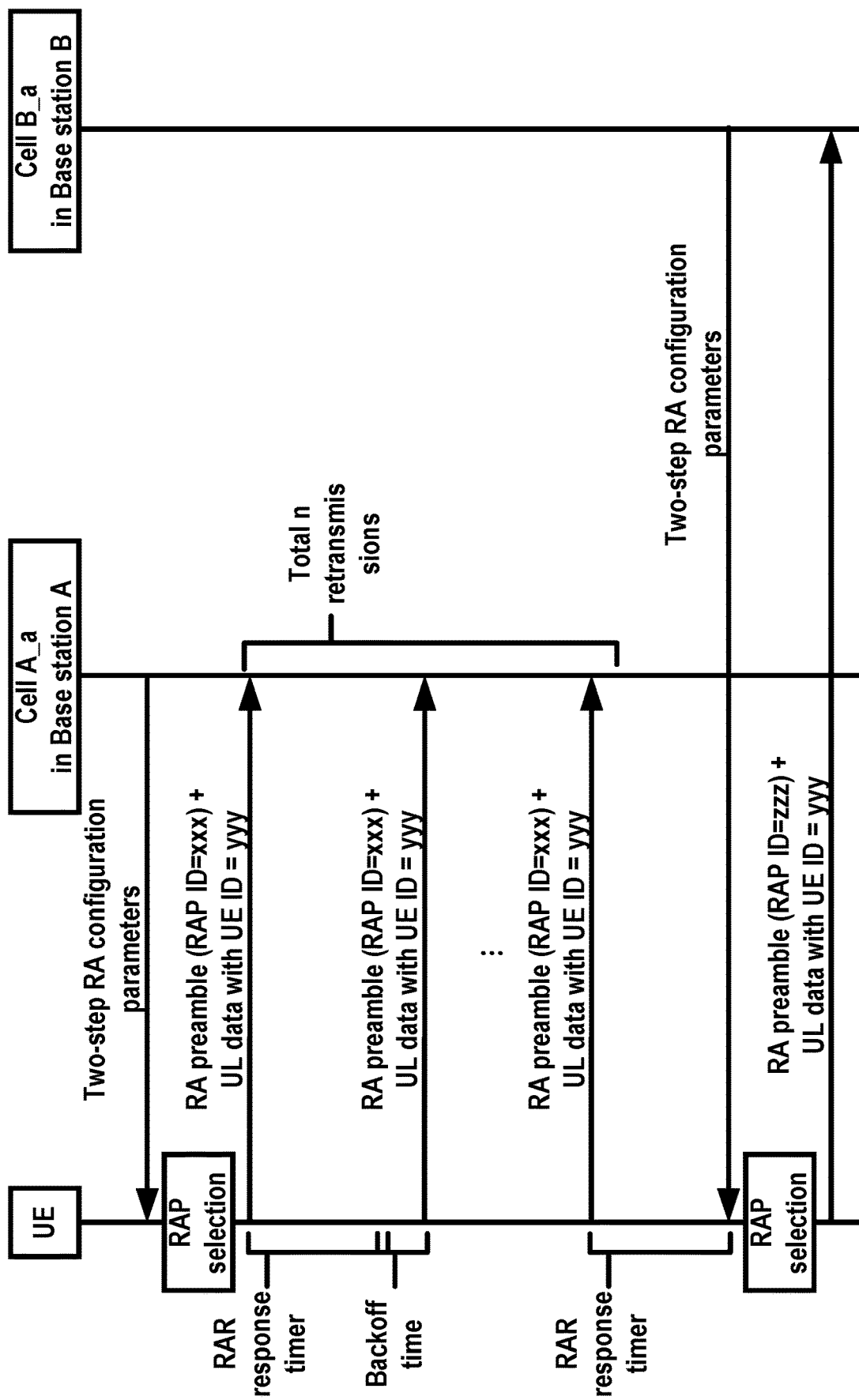
FIG. 44 is an example diagram as per an aspect of an embodiment of the present disclosure.

In an example embodiment, if a wireless device does not receive any MAC PDU that comprises the RAP ID and/or the wireless device ID matched to the RAP and wireless device ID that the wireless device transmitted until a RAR response timer is expired, the wireless device may retry the first step of two-step RA procedure, e.g., re-transmits a RAP and data on the same cell as shown in FIG. 44.

If the wireless device receives a MAC PDU that comprises a BI, the wireless device may select a random backoff time, e.g. according to a uniform distribution, between 0 and the backoff indicator value. The wireless device may delay the subsequent re-transmission of a RAP and data by the selected backoff time. In an example, if the wireless device receives a MAC PDU that does not comprise any backoff indicator until a RAR response timer is expired, the backoff time may set to zero. The wireless device may have a counter counting the number of retransmissions of RAP and data. The wireless device may set the counter to zero (or 1) in the initial RAP transmission and increase the counter by one whenever the wireless device re-tries the first step of two-step RA procedure. The wireless device may reset the counter to zero (or 1) when the wireless device receives any MAC PDU that comprises the RAP ID or the wireless device ID matched to the RAP and wireless device ID that the wireless device transmitted until a RAR response timer.

Two-step RA configuration parameters may have a parameter limiting an allowed maximum number of the retransmissions of RAP and data. If the counter reaches the maximum number, the wireless device may stop retransmission. The wireless device may perform a new RA on another cell with two-step or four-step RA procedure depending on two-step RA configuration parameters of a cell associated with the another cell.

In an example embodiment, a wireless device may transmit a RAP and data (e.g. one or more transport blocks) of a two-step RA procedure to a base station. The base station may decode/identify a RAP ID associated with the RAP but fails to decode the data (e.g. because of collision or low signal quality).

A wireless device may identify the case by receiving a MAC PDU in which a subheader comprises a RAP ID that the wireless device transmitted, but a decoding failure indicator in the subheader or in the RAR associated with the subheader that a cell uses to inform of data decoding failure indicates the data decoding failure.

The indicator may be implemented in different ways depending on a MAC PDU format. For the case that RARs for data decoding failure and success have the same size, a MAC PDU may have a dedicated field inserted in a subheader or in a RAR to inform of the data decoding success of failure, e.g., a field with one bit; zero and one indicate data decoding success and failure, respectively.

A special bit string may be also used in an existing field in a RAR to inform of the data decoding success of failure, e.g., all zeros in the field of wireless device ID in a RAR may indicate the data decoding failure. In both cases, since RARs for data decoding failure and success have the same size, a wireless device may identify the boundary of a RAR comprised in a MAC PDU based on a pre-determined RAR size information. For the case that RARs for data decoding failure and success have different sizes, a field to inform of RAR size information may be inserted in a MAC subheader or a RAR, and a wireless device may identify the boundary of a RAR in a MAC PDU based on the field. In this case, the RARs for data decoding success and failure may have different formats. For example, a RAR for data decoding failure may comprise a field of Temporary Cell Radio Network Temporary Identity (TC-RNTI) instead of a field of contention resolution wireless device ID, while a RAR for data decoding success case may comprise a contention resolution wireless device ID instead of TC-RNTI.

In an example embodiment, a wireless device may transmit, to a base station and as a part of a 2-step RA process, a random access preamble (RAP) and one or more transport blocks. The wireless device may receive a MAC PDU, comprising: one or more MAC PDU sub-headers, a sub-header comprises a RAP identifier; one or more RARs, each RAR corresponds to a MAC PDU subheader in the one or more MAC PDU sub-headers. The wireless device may determine whether the one or more transport blocks are received successfully based on at least one of the following: a first field in the subheader (e.g. a bit in the subheader indicates a fall back to four-step); a second field in a RAR associated with a first sub-header comprising an RAR identifier associated with the RAR (e.g. a bit in the RAR indicates a fall back to four-step). The wireless device may transmit one or more transport blocks in response to the one or more transport blocks not being received successfully.

The wireless device may determine a size of the RAR based on determining whether the field or the second field. The wireless device may determine whether the wireless device falls back to a four-step RACH based on the first field or the second field.

Figure 45:
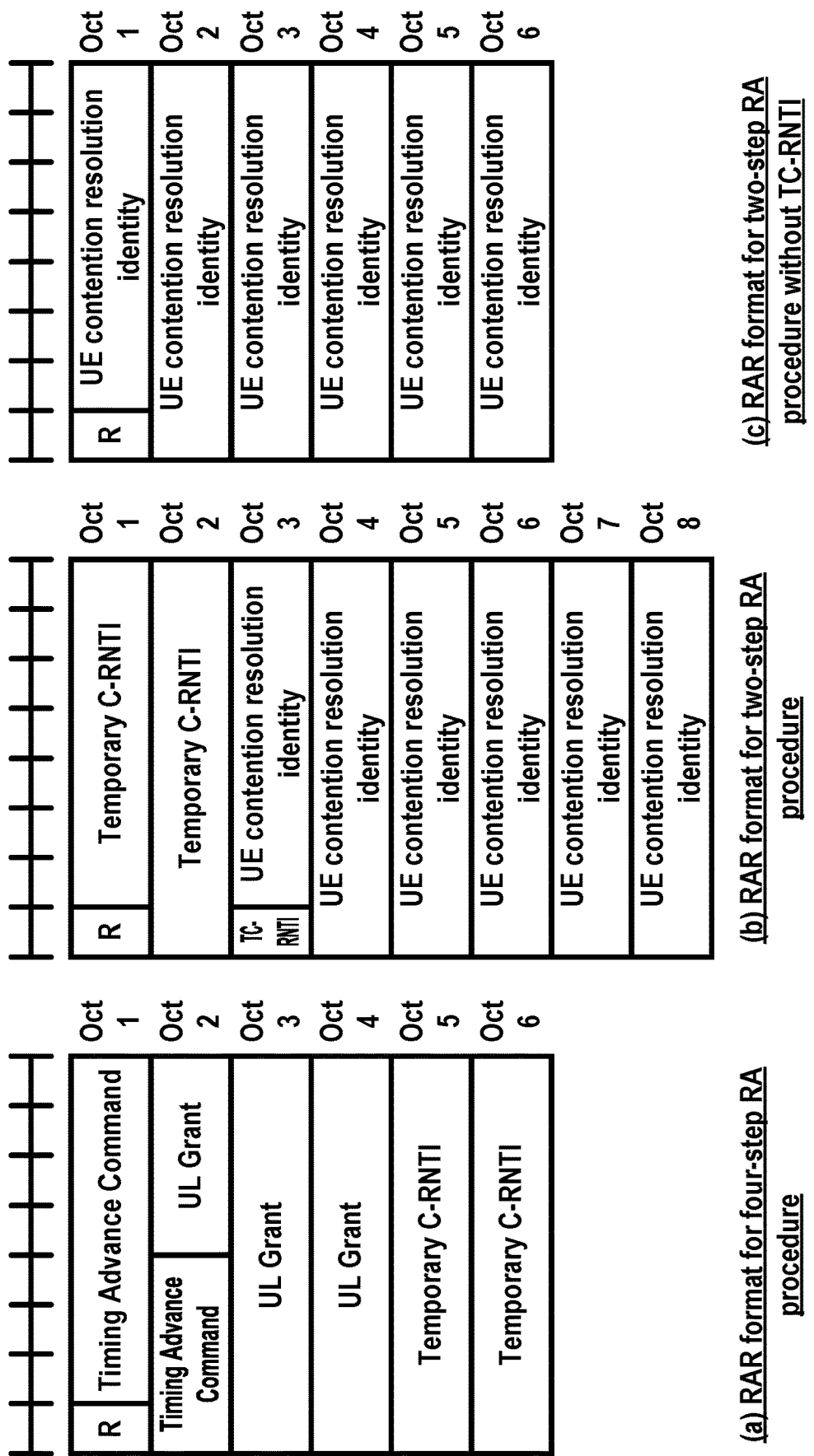
FIG. 45 is an example diagram as per an aspect of an embodiment of the present disclosure.
Figure 46:
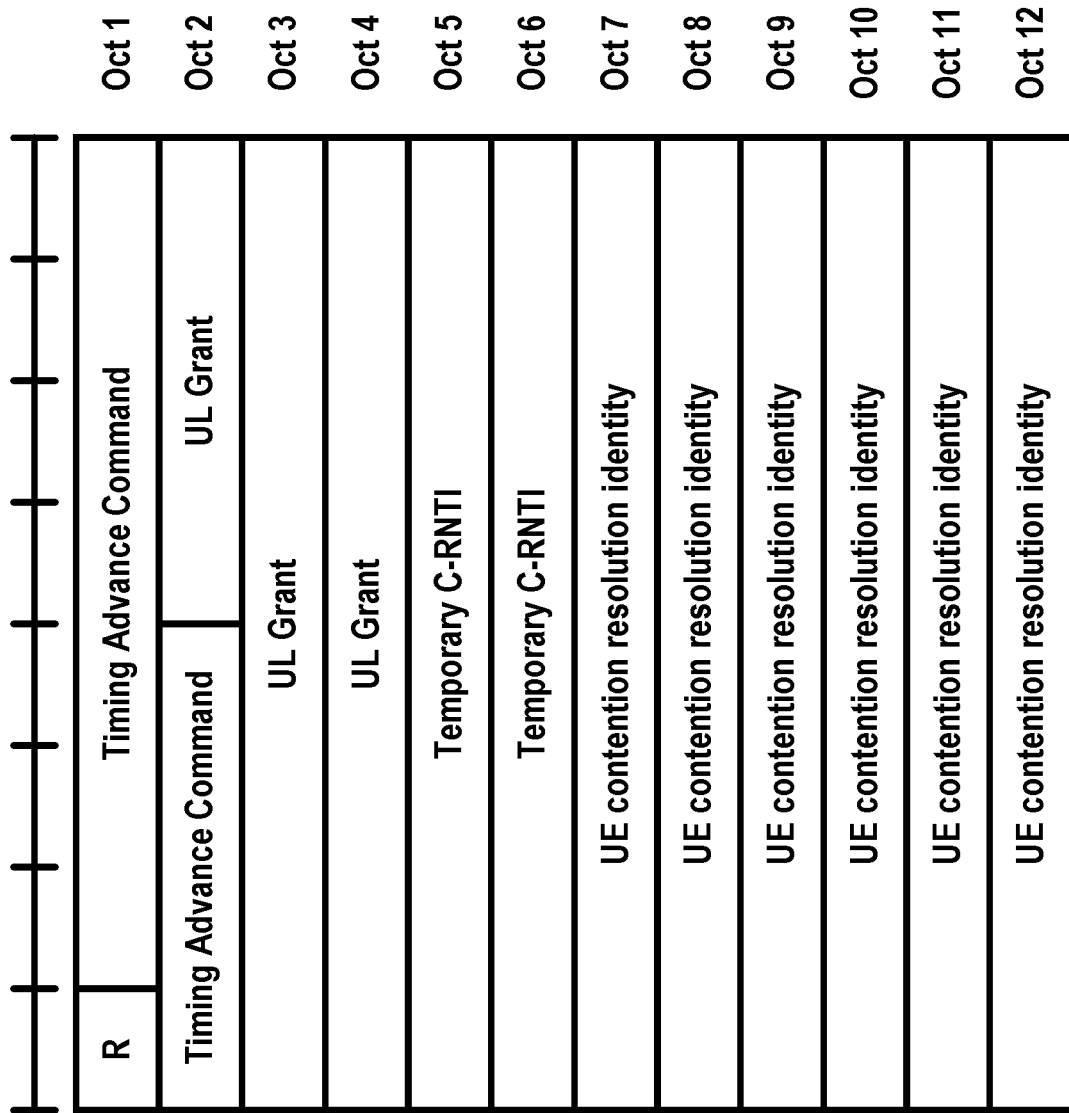
FIG. 46 is an example diagram as per an aspect of an embodiment of the present disclosure.

In an example embodiment, there may exist a MAC PDU that multiplexed RARs for two-step and four-step RA procedures together. In an example, for the case that RARs for two-step and four-step RA procedure have the same size, a wireless device may not require an RAR length indicator field and identify the boundary of each RAR based on a pre-determined RAR size information. In an example, the RAR may have a field to indicate a type of RAR (e.g., R as illustrated in FIG. 45) and may define different formats for two-step and four-step RARs with a fixed size. This may reduce the size of the sub-header or make additional bits available for other fields. This encoding may reduce downlink signaling overhead. In an example, the RAR may not have the field to indicate a type of RAR as illustrated in FIG. 46, and may define the same formats for two-step and four-step RARs with a fixed size. For the case that RARs for two-step and four-step RA procedures have the different size, a field to indicate a RAR type may be inserted in a MAC subheader or in a RAR. A RAR may comprise different types of fields according to the indicator in a MAC subheader or in a RAR. A wireless device may identify the boundary of one or more RARs in a MAC PDU based on the indicator.

A wireless device may transmit, to a base station, a random access preamble (RAP). The wireless device may receive, a MAC PDU, comprising: one or more MAC PDU sub-headers, wherein a subheader comprises a RAP identifier; one or more RARs, each RAR corresponds to a MAC PDU subheader in the one or more MAC PDU sub-headers. The wireless device may determine whether a RAR is a 2-step RAR or a four-step RAR, at least based on the RAP identifier in the corresponding MAC PDU sub-header. In an example, two-step and four-step RACH preamble IDs may be selected from two different preamble groups. The wireless device may determine whether a RAR is a two-step RAR or a four-step RAR, at least based on a field indicating a RAR type comprised in a corresponding MAC PDU subheader. In an example, the field in the MAC PDU may be one-bit field indicating a two-step or four-step RAR type. The RAR length may be predetermined for each RAR type. A wireless device may determine a size of RAR based on determining whether the RAR is a 2-step RAR or a four-step RAR.

In an example embodiment, a wireless device may transmit, to a base station, a random access preamble (RAP) in random access channel in a subframe and using a frequency offset. A wireless device may determine a RA-RNTI at least based on a subframe number and a frequency index. A wireless device may monitor a control channel for a control packet associated with RA-RNTI. A wireless device may receive, a MAC PDU associated with RA-RNTI, comprising: one or more MAC PDU sub-headers, wherein a sub-header comprises a RAP identifier; one or more RARs, each RAR in the one or more RARs: corresponds to a MAC PDU subheader in the one or more MAC PDU sub-headers; and comprises an uplink grant. The wireless device may transmit one or more transport blocks employing the uplink grant.

Example RAR formats are shown in the following figures. As described in example embodiments, RAR may include one or more fields, for example, timing advance command, uplink grant, T-CRNTI, CRNTI, UE contention resolution identity, and/or other parameters. A RAR format may be transmitted depending on the fields that are needed in the RAR. A Present bit may be used for a field to indicate whether the field is included in the RAR. For example, a presence field may indicate whether RAR includes an uplink grant or not. In an example, other fields may be associated with a presence field. In an example embodiment, multiple pre-defined RAR types including different fields may be defined. A field in the MAC subheader or in a RAR may determine the RAR type and corresponding RAR length. For example, a two bit field may indicate which of the four or three RAR types are transmitted.

Figure 47:
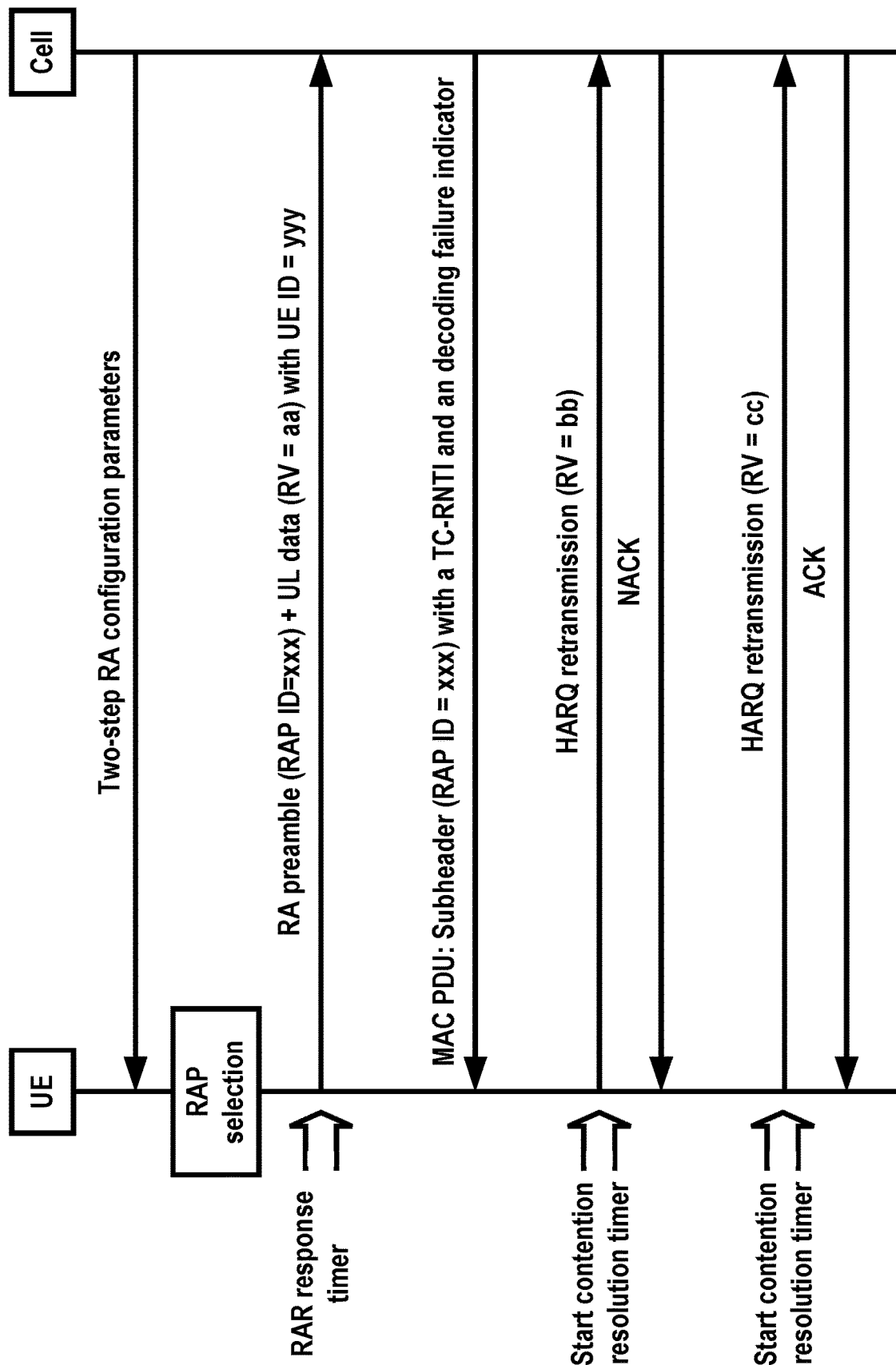
FIG. 47 is an example diagram as per an aspect of an embodiment of the present disclosure.

In an example embodiment, a two-step RA procedure may employ hybrid automatic repeat request (HARQ) with soft combining for the failure of data decoding. When a wireless device receives a MAC PDU that comprises a subheader with the RAP ID matched to the RAP transmitted by the wireless device, but the decoding failure indicator says the failure, the wireless device may perform HARQ by transmitting another redundancy version (RV) to the cell from which the wireless device received the MAC PDU. The HARQ transmission may occur at an a priori known subframe, e.g., HARQ transmission may occur every eight subframes after the prior HARQ transmission in the same HARQ process. The HARQ may predetermine a sequence of redundancy version (RV) numbers that the wireless device has to transmit in a HARQ transmission in the same process. For example, a RV number may start from zero in the initial UL data transmission, and the next RV in the sequence may be transmitted when a wireless device identifies the indicator requesting a next RV in a RAR. FIG. 47 shows an example HARQ retransmission when a cell detects a RAPID but fails to decode data In an example embodiment, each RV may be transmitted in an adaptive or non-adaptive manner, a cell may inform a wireless device of the HARQ transmission type by transmitting one or more indicators to the wireless device. For example, a cell may transmit a new data indicator (NDI) with downlink control information (DCI) through a downlink control channel and/or one-bit HARQ acknowledgement (ACK) or non-acknowledgement (NACK) through a downlink HARQ indicator channel to the wireless device required for transmitting another RV to the cell. If the wireless device detects a NDI toggled, the wireless device may, regardless of a HARQ ACK/NACK message, transmit another RV specified in the DCI with a resource and MCS specified in the same DCI. If the wireless device detects a NDI non-toggled but receives a HARQ NACK message, the wireless device may transmit a predefined RV with the same resource and MCS as the previous HARQ transmission.

Figure 48:
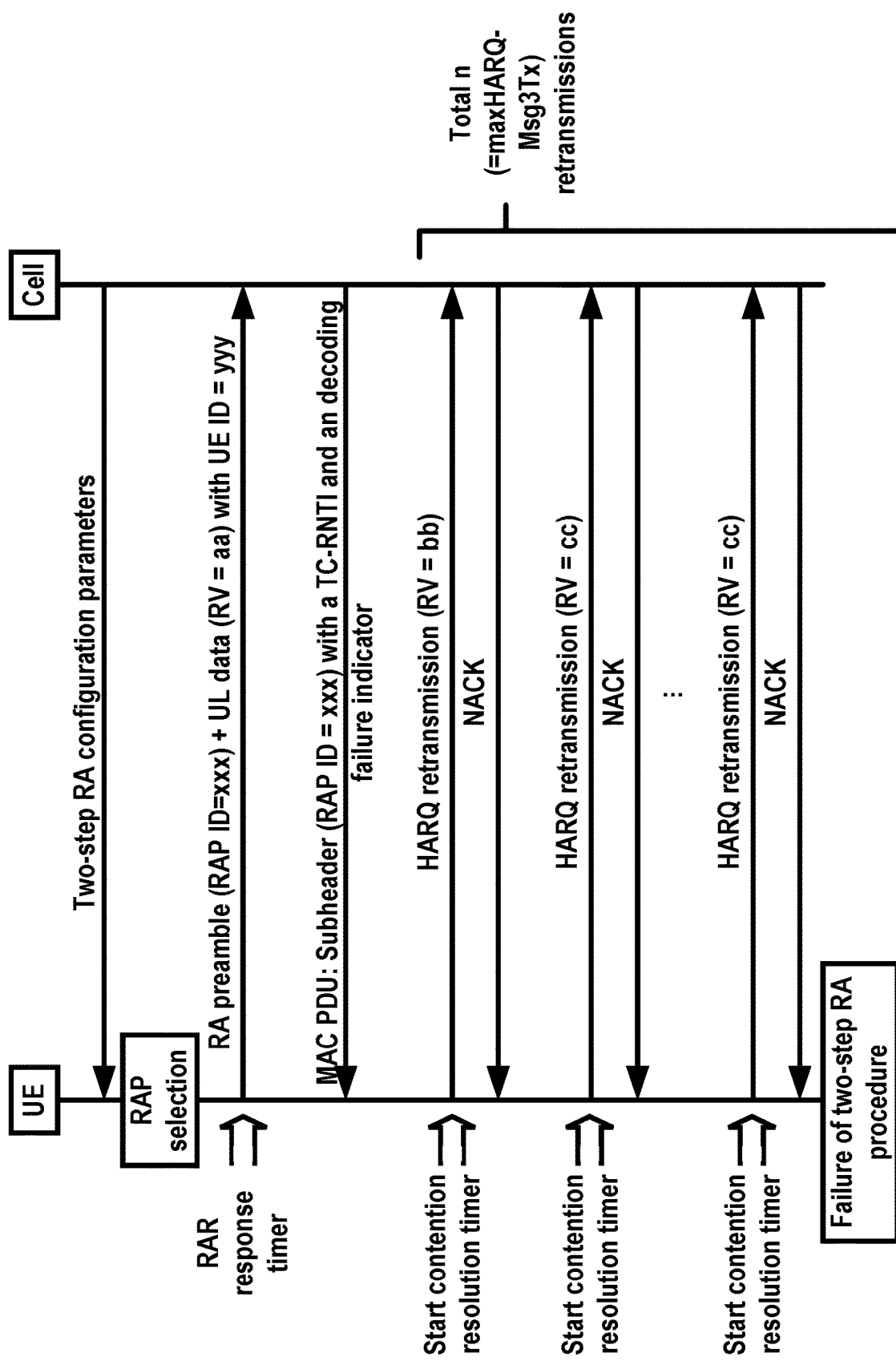
FIG. 48 is an example diagram as per an aspect of an embodiment of the present disclosure.
Figure 49:
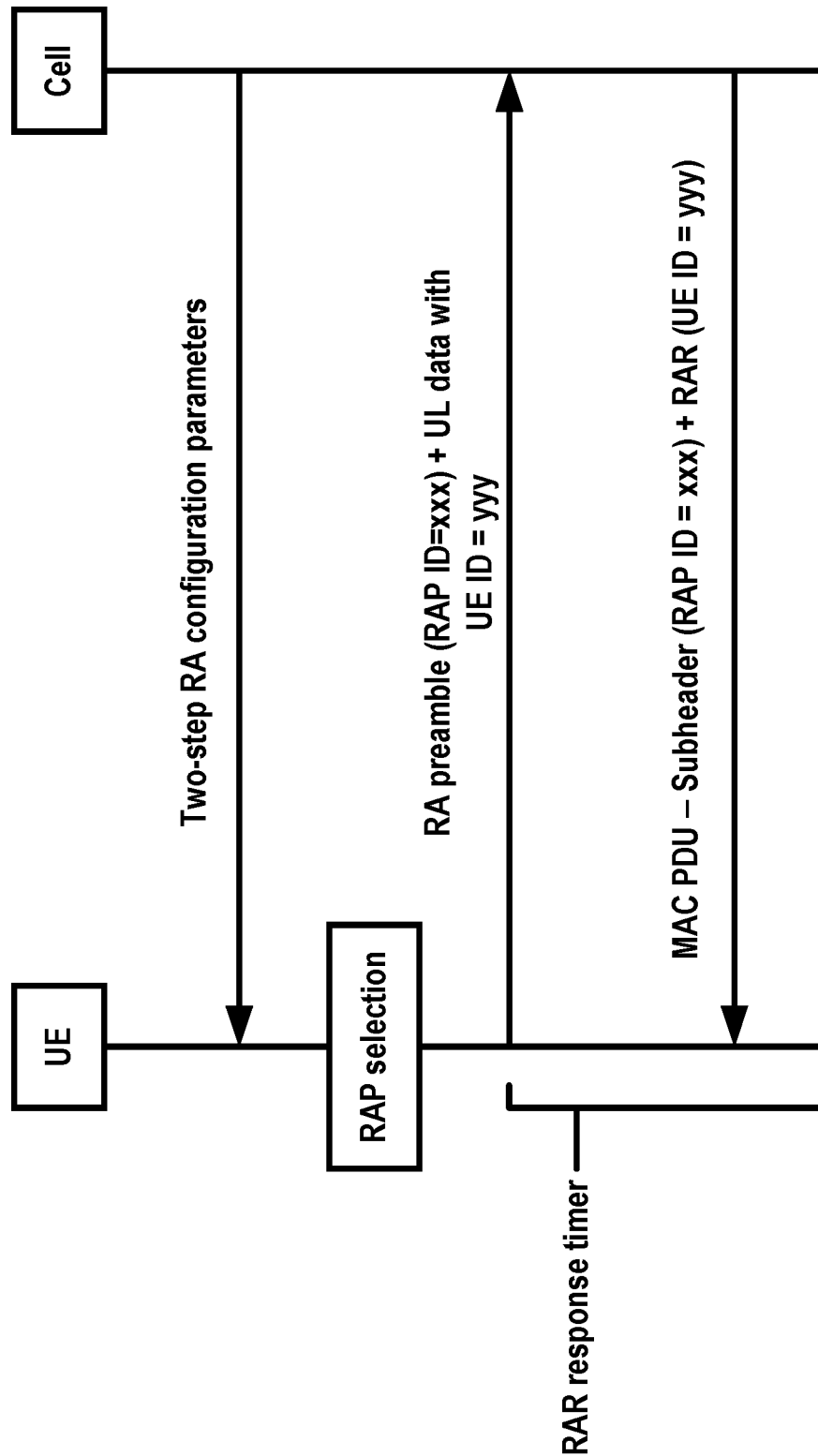
FIG. 49 is an example diagram as per an aspect of an embodiment of the present disclosure.

In an example embodiment, the maximum number of HARQ transmissions may be configured in a set of two-step RA procedure, e.g., maxHARQ-Msg3Tx in LTE. A wireless device may have a counter counting the number of HARQ transmission. A wireless device may set the counter to one when transmitting the first RV and increase by one whenever a next RV is transmitted to a cell. When the counter reaches the maximum number of HARQ transmission configured in a cell, a wireless device may determine the failure of the two-step RA procedure and may perform a new RA on another cell. FIG. 48. shows an example of two-step RA procedure failure as the number of HARQ retransmission reaches a threshold In an example embodiment, a wireless device may determine that the two-step RA procedure is completed if, prior to the expiration of a RAR response timer, the wireless device receives a MAC PDU that comprises the same RAP ID and wireless device ID that a wireless device transmitted in the UL transmission. This may be the case that a cell identifies the wireless device's transmitted RAP, decodes wireless device's transmitted data, and transmit a MAC PDU having the RAP ID and wireless device ID to a wireless device before a wireless device's RAR timer is expired. In an example, a cell may identify a RAP ID based on a peak detector that detects a peak from correlation outputs between a received signal and a set of RAPs available to a cell. If the resource block over which the data part is transmitted during the UL transmission is associated with a RAP, a RAP ID may also be detectable based on an energy detector that measures an energy level of the resource block for UL data transmission. FIG. 49. shows an example of two-Step RA procedure when a base station decodes RAP and UL data and responds with a RAR to a wireless device In an example embodiment, a wireless device may transmit in parallel on the first cell, to a base station, a random-access preamble; and one or more transport blocks (TBs) with a first RV associated with a HARQ process, the one or more TBs comprising a wireless device ID. The wireless device may receive a RAR MAC PDU comprising at least one of: a preamble identifier; an uplink grant; a field indicating whether the one or more TBs are received successfully; and/or an RNTI. The wireless device may transmit employing uplink resources, the one or more TBs with a second RV different from the first RV associated with the HARQ process. The uplink resources may be identified in the uplink grant. The wireless device may receive a downlink packet comprising the wireless device ID, when the one or more TBs are decoded successfully. The wireless device may receive one or more messages comprising configuration parameters of RACH of a first cell.

Four-Step Random Access

Example RA Procedure

Figure 50:
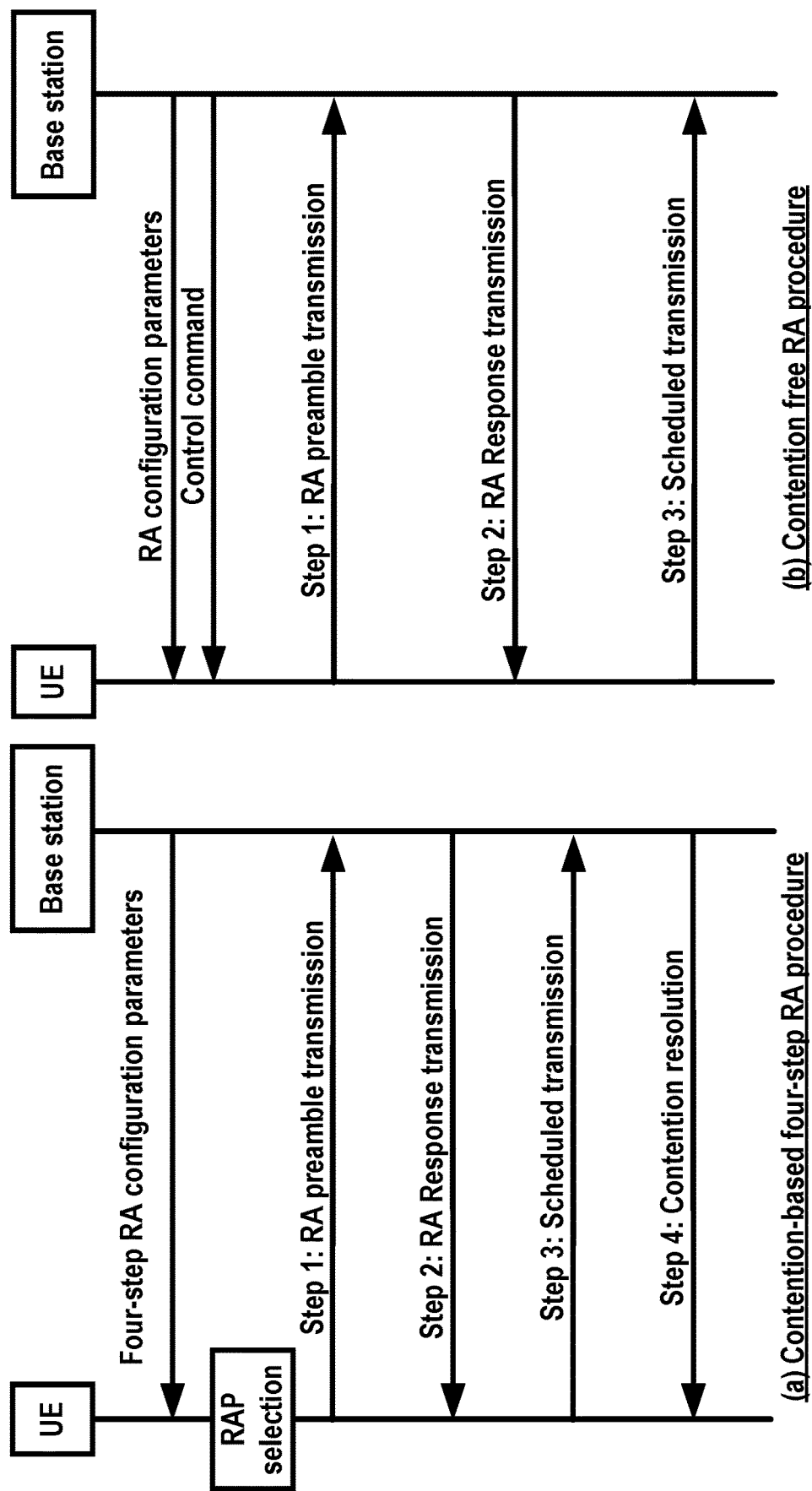
FIG. 50 is an example diagram as per an aspect of an embodiment of the present disclosure.

A four-step random access (RA) procedure may comprise RA preamble (RAP) transmission in the first step, random access response (RAR) transmission in the second step, scheduled transmission of one or more transport blocks (TBs) in the third step, and contention resolution in the fourth step as illustrated in FIG. 50(a). For contention-free RA, the first two steps, the RAP and RAR transmissions, may be implemented. Contention resolution may not be implemented due to a dedicated RA preamble as illustrated in FIG. 50(b)

In the first step, a wireless device may transmit a RAP using a configured RA preamble format with a single particular Tx beam. RA channel (RACH) resource may be defined as a time-frequency resource to transmit a RAP. Broadcast system information may inform whether a wireless device needs to transmit one or multiple/repeated preamble within a subset of RACH resources.

A base station may configure an association between DL signal/channel, and a subset of RACH resources and/or a subset of RAP indices, for determining the downlink (DL) transmission in the second step. Based on the DL measurement and the corresponding association, a wireless device may select the subset of RACH resources and/or the subset of RAP indices. In an example, there may be two RAP groups informed by broadcast system information and one may be optional. If a base station configures the two groups in the four-step RA procedure, a wireless device may use a size of the message transmitted by the wireless device in the third step and the pathloss to determine which group the wireless device selects a RAP. A base station may use a group type to which a RAP belongs as an indication of the message size in the third step and the radio conditions at a wireless device. A base station may broadcast the RAP grouping information along with one or more thresholds on system information.

If a UE has been requested to perform a contention-free RA, for example for handover to a new cell, the preamble to use may be explicitly indicated from the base station. To avoid collisions, the base station may select the contention-free preamble from sequences outside the two subsets used for contention-based random access.

In the second step of the four-step RA procedure, a base station may transmit a RA response (RAR) to the wireless device in response to reception of a RAP that the wireless device transmits. A wireless device may monitor the physical-layer downlink control channel for RARs identified by the RA-RNTI in a RA Response window which may starts at the subframe that contains the end of a RAP transmission plus three subframes and has length ra-ResponseWindow-Size. A wireless device may compute the RA-RNTI associated with the PRACH in which the wireless device transmits a RAP as:

$$RA\text{-}RNTI=1+t\_id+10*f\_id$$

where t_id is the index of the first subframe of the specified PRACH (0≤t_id<10), and f_id is the index of the specified PRACH within that subframe, in ascending order of frequency domain (0≤f_id<6) except for NB-IoT UEs, BL UEs or UEs in enhanced coverage. In an example, different types of UEs, e.g. NB-IoT, BL-UE, and/or a UE in enhanced coverage may employ different formulas for RA-RNTI calculations.

For BL UEs and UEs in enhanced coverage, RA-RNTI associated with the PRACH in which the Random Access Preamble is transmitted, may be computed as:

$$RA\text{-}RNTI=1+t\_id+10*f\_id+60*(SFN\_id \bmod(W\max/10))$$

where t_id is the index of the first subframe of the specified PRACH (0≤t_id<10), f_id is the index of the specified PRACH within that subframe, in ascending order of frequency domain (0≤f_id<6), SFN_id is the index of the first radio frame of the specified PRACH, and Wmax is 400, maximum possible RAR window size in subframes for BL UEs or UEs in enhanced coverage.

For NB-IoT UEs, the RA-RNTI associated with the PRACH in which the Random Access Preamble is transmitted, may be computed as:

$$RA\text{-}RNTI=1+\text{floor}(SFN\_id/4)$$

where SFN_id is the index of the first radio frame of the specified PRACH.

Figure 51:
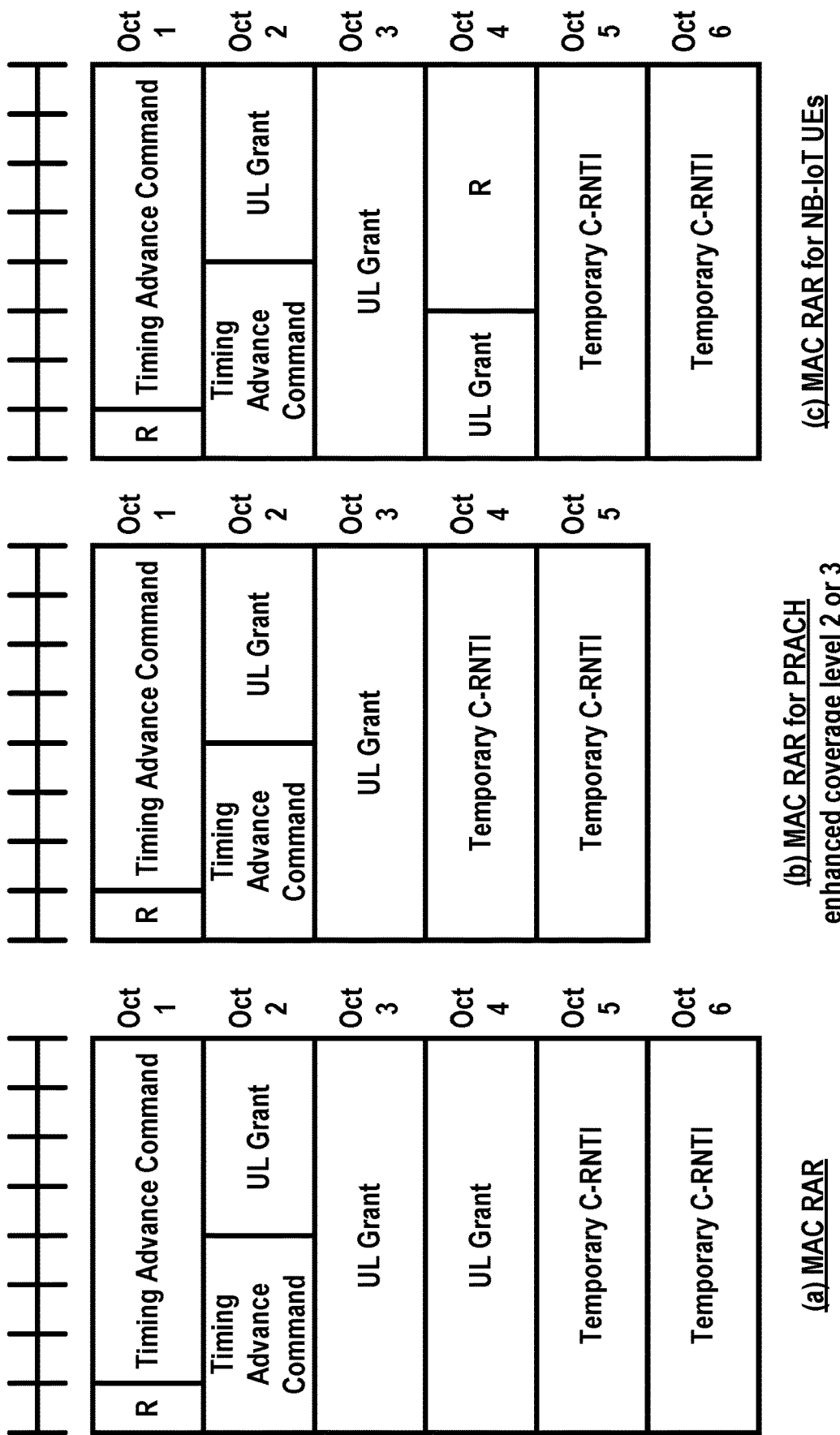
FIG. 51 is an example diagram as per an aspect of an embodiment of the present disclosure.

A wireless device may stop monitoring for RAR(s) after decoding of a MAC packet data unit (PDU) for RAR comprising a RAP identifier (RAPID) that matches the RAP transmitted by the wireless device. The MAC PDU may comprise one or more MAC RARs and a MAC header that may comprise a subheader having a backoff indicator (BI) and one or more subheader that comprises RAPIDs. FIG. 42 illustrates an example of a MAC PDU comprising a MAC header and MAC RARs for four-step RA procedure. If a RAR comprises a RAPID corresponding to a RAP that a wireless device transmits, the wireless device may process the data, such as a timing advance (TA) command, a UL grant, and a Temporary C-RNTI (TC-RNTI), in the RAR. FIG. 51 illustrates examples of MAC RAR comprising a timining advanced command, a UL grant, and a TC-RNTI.

If contention-free random access using a dedicated preamble is used, then this second step may be the last step of RA procedure. There may be no need to handle contention and/or the UE already may have a unique identity allocated in the form of a C-RNTI.

In the third step of the four-step RA procedure, a wireless may adjust UL time alignment by using the TA value corresponding to the TA command in the received RAR in the second step and may transmit the one or more TBs to a base station using the UL resources assigned in the UL grant in the received RAR. The TBs that a wireless device transmits in the third step may comprise RRC signaling, such as RRC connection request, RRC connection Re-establishment request, or RRC connection resume request, and a wireless device identity, as the identity is used as part of the contention-resolution mechanism in the fourth step.

The fourth step in the four-step RA procedure may comprise a DL message for contention resolution. From the second step, one or more wireless devices may perform simultaneous RA attempts using the same RAP in the first step, receive the same RAR with the same TC-RNTI in the second step. The contention resolution in the fourth step may be to ensure that a wireless device does not incorrectly use another wireless device Identity. The contention resolution mechanism may be based on either C-RNTI on PDCCH or Contention Resolution Identity on DL-SCH depending on whether a wireless device has a C-RNTI or not. If a wireless device has C-RNTI, upon detection of C-RNTI on the PDCCH, the wireless device may determine the success of RA procedure. If a wireless device does not have C-RNTI pre-assigned, the wireless device may monitor DL-SCH associated with TC-RNTI that a base station transmits in a RAR of the second step and compare the identity in the data transmitted by the base station on DL-SCH in the fourth step with the identity that the wireless device transmits in the third step. If the two identities are identical, the wireless device may determine the success of RA procedure and promote the TC-RNTI to the C-RNTI. The forth step in the four-step RA procedure may allow HARQ retransmission. A wireless device may start mac-ContentionResolutionTimer when the wireless device transmits one or more TBs to a base station in the third step and may restart mac-ContentionResolutionTimer at a HARQ retransmission. When a wireless device receives data on the DL resources identified by C-RNTI or TC-RNTI in the fourth step, the wireless device may stop the mac-ContentionResolutionTimer. If the wireless device does not detect the contention resolution identity that matches to the identity transmitted by the wireless device in the third step, the wireless device may determine the failure of RA procedure and discard the TC-RNTI. If mac-ContentionResolutionTimer expires, the wireless device may determine the failure of RA procedure and discard the TC-RNTI. If the contention resolution is failed, a wireless device may flush the HARQ buffer used for transmission of the MAC PDU and may restart the four-step RA procedure from the first step. The wireless device may delay the subsequent RAP transmission by the backoff time randomly selected according to a uniform distribution between 0 and the backoff parameter value corresponding the BI in the MAC PDU for RAR.

In a four-step RA procedure, the usage of the first two steps may be to obtain UL time alignment for a wireless device and obtain an uplink grant. The UL time alignment may not be necessary in one or more scenarios. For example, in small cells or for stationary wireless devices, the process for acquiring the UL time alignment may not be necessary if either a TA equal to zero may be sufficient (e.g., small cells) or a stored TA value from the last RA may serve for the current RA (stationary wireless device). For the case that a wireless device may be in RRC connected with a valid TA value and no resource configured for UL transmission, the UL time alignment may not be necessary when the wireless device needs to obtain an UL grant.

RACH with Multi-Beam Operations

SS Burst

A NR (New Radio) may support both single beam and multi-beam operations. In a multi-beam system, gNB may need a downlink beam sweep to provide coverage for DL synchronization signals (SSs) and common control channels. To enable UEs to access the cell, the UEs may need the similar sweep for UL direction as well.

In the single beam scenarios, the network may configure time-repetition within one synchronization signal (SS) block, which may comprise at least PSS (Primary synchronization signal), SSS (Secondary synchronization signal), and PBCH (Physical broadcast channel), in a wide beam. In multi-beam scenarios, the network may configure at least some of these signals and physical channels (e.g. SS Block) in multiple beams such that a UE identifies at least OFDM symbol index, slot index in a radio frame and radio frame number from an SS block.

An RRC_INACTIVE or RRC_IDLE UE may need to assume that an SS Block may form an SS Block Set and, an SS Block Set Burst, having a given periodicity. In multi-beam scenarios, the SS Block may be transmitted in multiple beams, together forming an SS Burst. If multiple SS Bursts are needed to transmit beams, these SS Bursts together may form an SS Burst Set as illustrated in FIG. 52.

Figure 52:
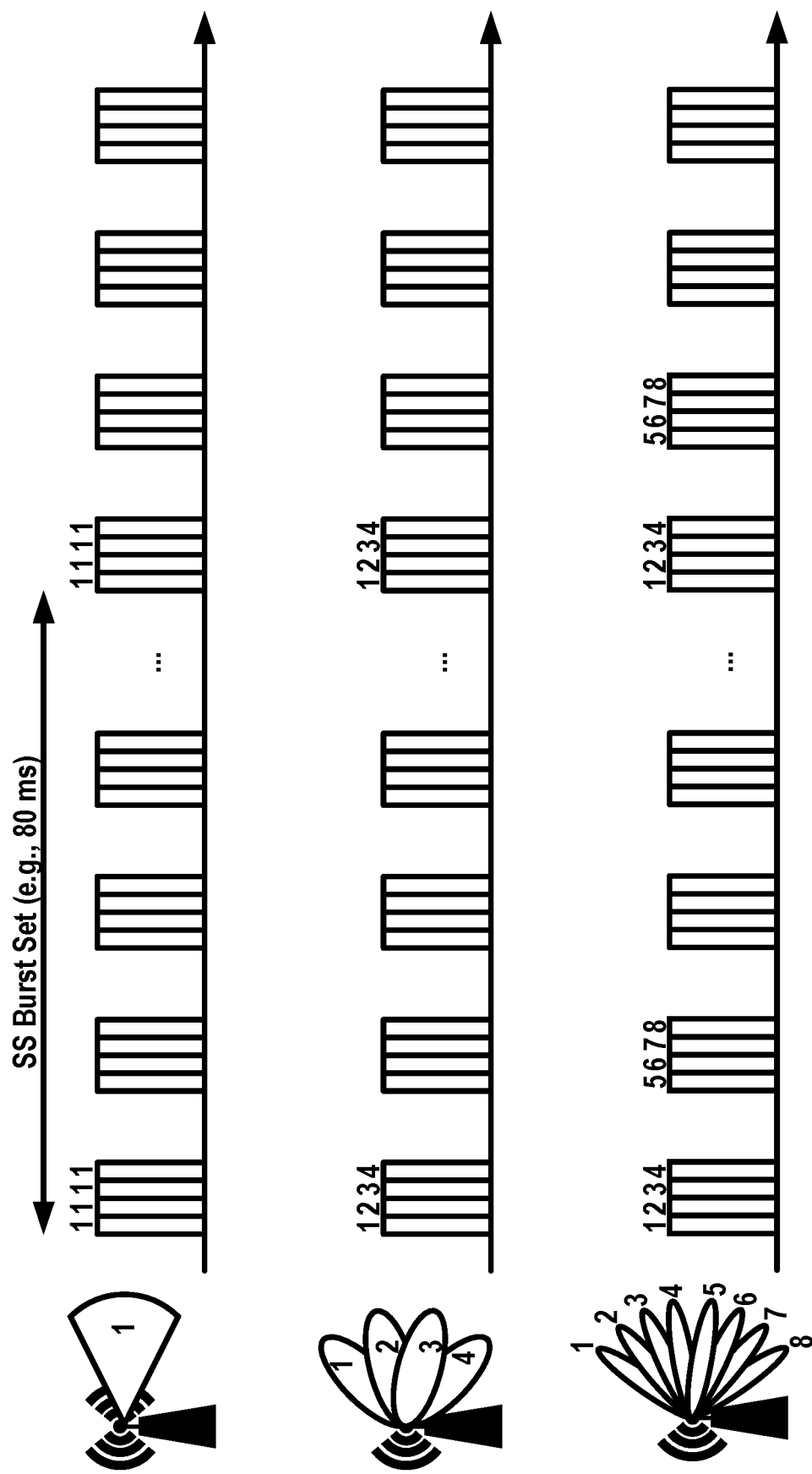
FIG. 52 is an example diagram as per an aspect of an embodiment of the present disclosure.

FIG. 52 shows examples of different configurations of an SS Burst Set (Top: Time-repetition within one SS Burst in a wide beam. Middle: Beam-sweeping of a small number of beams using one SS Burst in the SS Burst Set. Bottom: Beam-sweeping of a larger number of beams using more than one SS Burst in the SS Burst Set to form a complete sweep).

Figure 53:
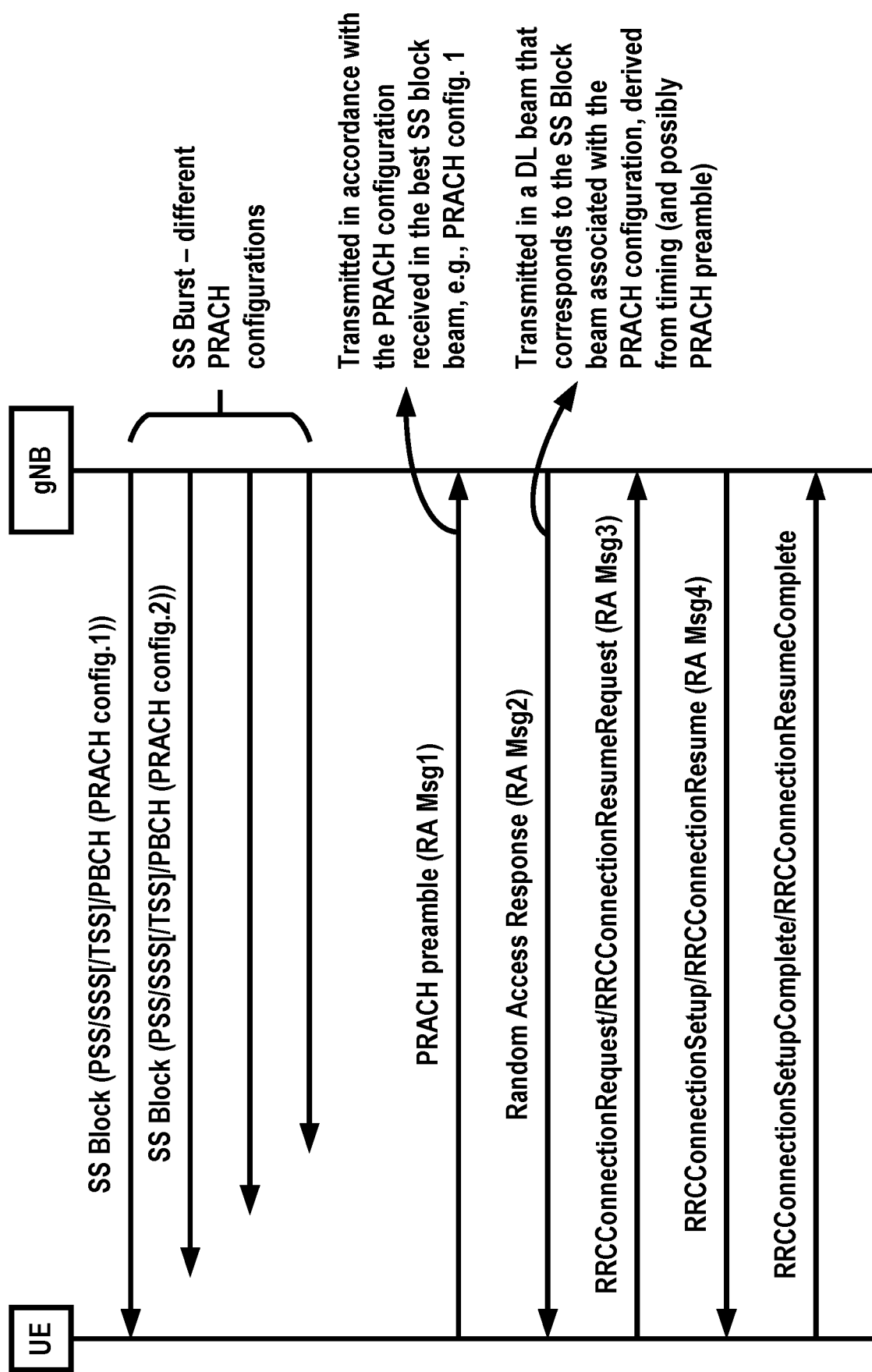
FIG. 53 is an example diagram as per an aspect of an embodiment of the present disclosure.

In the multi-beam scenario, for the same cell, PSS/SSS/PBCH may be repeated to support cell selection/reselection and initial access procedures. There may be some differences in the conveyed PRACH configuration implied by the TSS (Tertiary synchronization signal) on a beam basis within an SS Burst. Under the assumption that PBCH carries the PRACH configuration, a gNB may broadcast PRACH configurations possibly per beam where the TSS may be utilized to imply the PRACH configuration differences. FIG. 53 shows an example of the RA procedure comprising broadcasting multiple SS blocks.

In an example, the base station may transmit to a wireless device one or more messages comprising configuration parameters of one or more cells. The configuration parameters may comprise parameters of a plurality of CSI-RS signal format and/or resources. Configuration parameters of a CSI-RS may comprise one or more parameters indicating CSI-RS periodicity, one or more parameters indicating CSI-RS subcarriers (e.g. resource elements), one or more parameters indicating CSI-RS sequence, and/or other parameters. Some of the parameters may be combined into one or more parameters. A plurality of CSI-RS signals may be configured. In an example, the one or more message may indicate the correspondence between SS blocks and CSI-RS signals. The one or more messages may be RRC connection setup message, RRC connection resume message, and/or RRC connection reconfiguration message. In an example, a UE in RRC-Idle mode may not be configured with CSI-RS signals and may receive SS blocks and may measure a pathloss based on SS signals. A UE in RRC-connected mode, may be configured with CSI-RS signals and may be measure pathloss based on CSI-RS signals. In an example, a UE in RRC inactive mode may measure the pathloss based on SS blocks, e.g. when the UE moves to a different base station that has a different CSI-RS configuration compared with the anchor base station.

Example PRACH Burst/RACH Resource Partitioning

Figure 54:
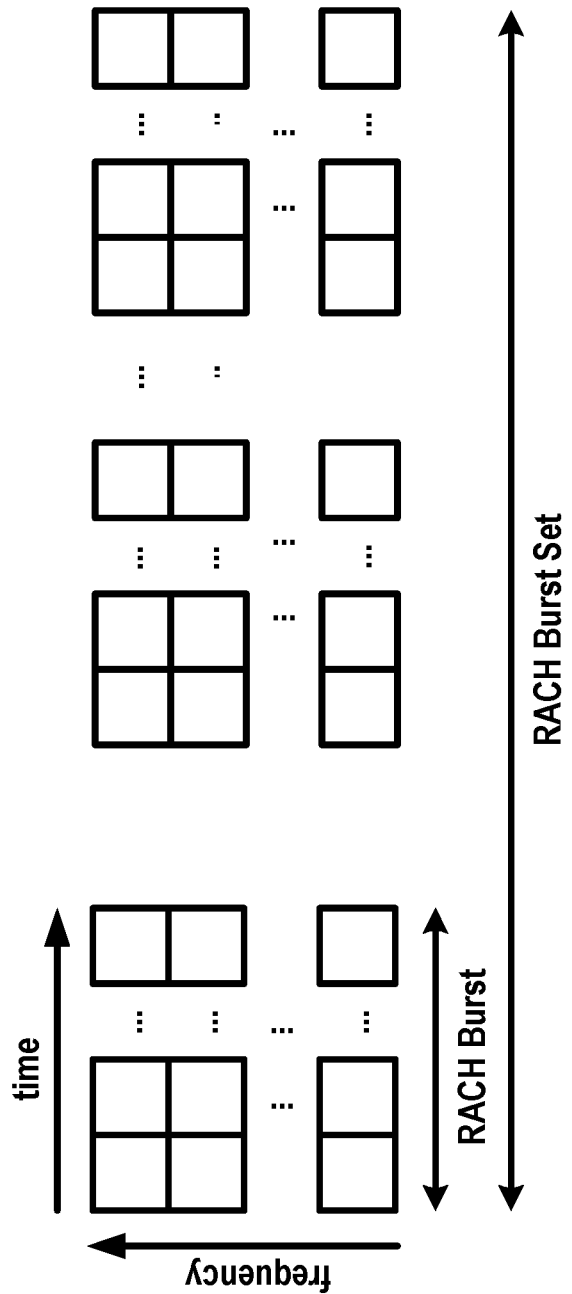
FIG. 54 is an example diagram as per an aspect of an embodiment of the present disclosure.

In a multi-beam system, a NR may configure different types of PRACH resources that may be associated with SS blocks and/or DL beams. In NR, a PRACH transmission occasion may be defined as the time-frequency resource on which a UE transmits a preamble using the configured PRACH preamble format with a single particular Tx beam and for which gNB performs PRACH preamble detection. One PRACH occasion may be used to cover the beam non-correspondence case. gNB may perform RX sweep during PRACH occasion as UE TX beam alignment is fixed during single occasion. A PRACH burst may mean a set of PRACH occasions allocated consecutively in time domain, and a PRACH burst set may mean a set of PRACH bursts to enable full RX sweep. FIG. 54 illustrates an example of configured PRACH occasion, PRACH burst, and PRACH burst set.

There may be an association between SS blocks (DL signal/channel) and PRACH occasion and a subset of PRACH preamble resources. One PRACH occasion may comprise a set of preambles. In multi beam operation, the gNB may need to know which beam or set of beams it may use to send RAR and the preambles may be used to indicate that. NR may configure following partitioning and mappings in multi beam operation:

The timing from SS block to the PRACH resource may be indicated in the MIB. In an example, different TSS may be used for different timings such that the detected sequence within TSS indicates the PRACH resource. This PRACH configuration may be specified as a timing relative to the SS block, and may be given as a combination of the payload in the MIB and another broadcasted system information.

Association between SS block and a subset of RACH resources and/or a subset of preamble indices may be configured so that TRP may identify the best DL beam for a UE according to resource location or preamble index of received preamble. An association may be independent and at least either a subset of RACH resources or subset of preamble indices may not be allowed to be associated with multiple SS blocks.

Figure 55:
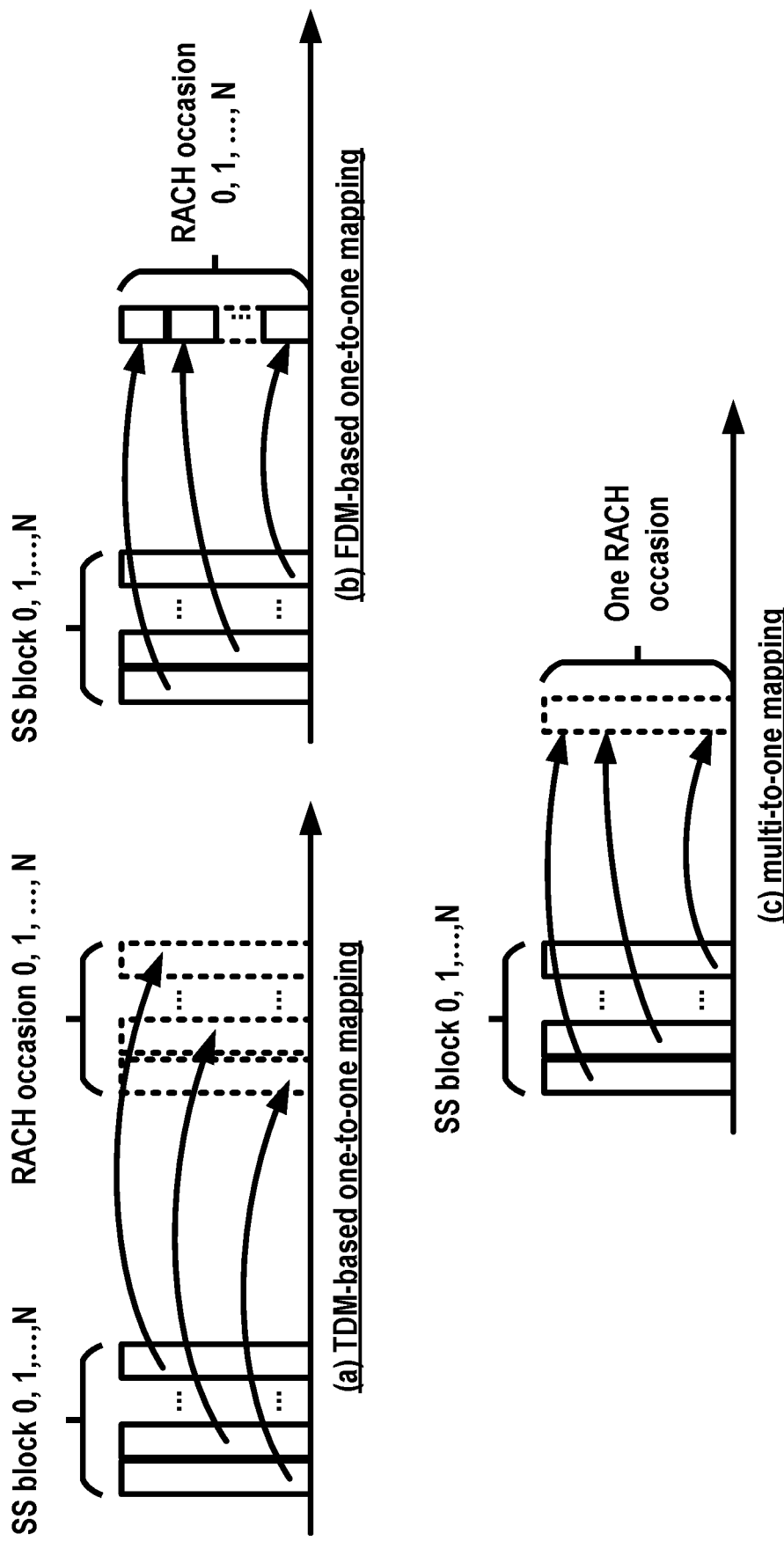
FIG. 55 is an example diagram as per an aspect of an embodiment of the present disclosure.

Example SS-block specific PRACH preamble resources: PRACH resources may be partitioned on SS-blocks basis in multiple beams operation. There may be one to one and/or many to one mapping between SS-blocks and PRACH occasions. FIG. 55 illustrates an example of TDD (FIG. 55(a))/FDD (FIG. 55(b)) based one to one mapping and multi-to-one mapping (FIG. 55(c)) between SS-blocks and PRACH occasions.

UE may detect SS-block based on DL synchronization signals and differentiate SS-blocks based on the time index. With one-to-one mapping of beam or beams used to transmit SS-block and a specific PRACH occasion, the transmission of PRACH preamble resource may be an indication informed by a UE to gNB of the preferred SS-block. This way the PRACH preamble resources of single PRACH occasion may correspond to specific SS-block and mapping may be done based on the SS-block index. There may be one to one mapping between an SS-block beam and a PRACH occasion. There may not be such mapping for the SS-block periodicity and RACH occasion periodicity.

Depending on the gNB capability (e.g. the used beamforming architecture), there may not be one to one mapping between single SS-block and single RACH occasion. In case beam or beams used for transmitting SS-block and receiving during RACH occasion do not correspond directly, e.g., gNB may form receive beams that cover multiple SS-blocks beams, the preambles of PRACH occasion may be divided between the different SS-blocks in a manner that a subset of PRACH preambles map to specific SS-block. FIG. 55 shows an example of TDM and FDM mapping of PRACH resources Example beam-specific PRACH resources: With beam-specific PRACH resources, a gNB DL TX beam may be associated with a subset of preambles. The beam specific PRACH preambles resources may be associated with DL TX beams that are identified by periodical beam and cell specific CSI-RS for L3 Mobility (same signals may be used for L2 beam management/intra-cell mobility as well). A UE may detect the beams without RRC configuration, e.g., reading the beam configuration from minimum SI (MIB/SIB).

Figure 56:
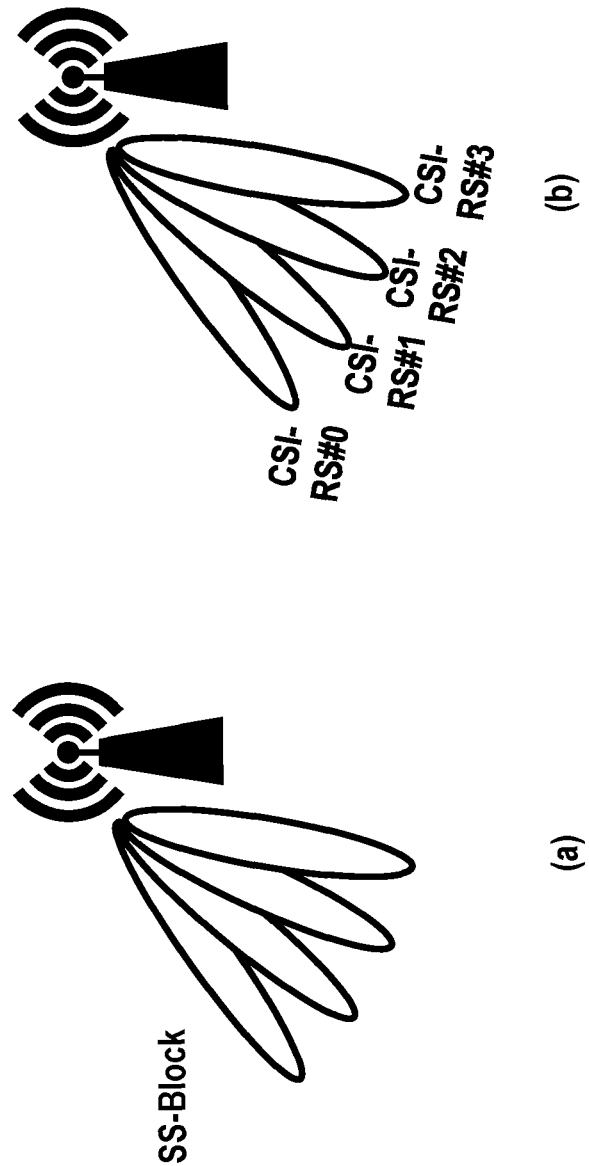
FIG. 56 is an example diagram as per an aspect of an embodiment of the present disclosure.

The PRACH resource mapping to specific beams may use SS-block association. Specific beams may be associated with the beams used for transmitting SS-block as illustrated in FIG. 56. In FIG. 56(a), gNB may transmit SS-block using one or multiple beams (in case of analogue/hybrid beamforming), but individual beams may not be detected. From the UE perspective, this is a single beam transmission. In FIG. 56(b), gNB may transmit CSI-RS (for Mobility) using individual beams associated with specific SS-block. A UE may detect individual beams based on the CSI-RS.

Figure 57:
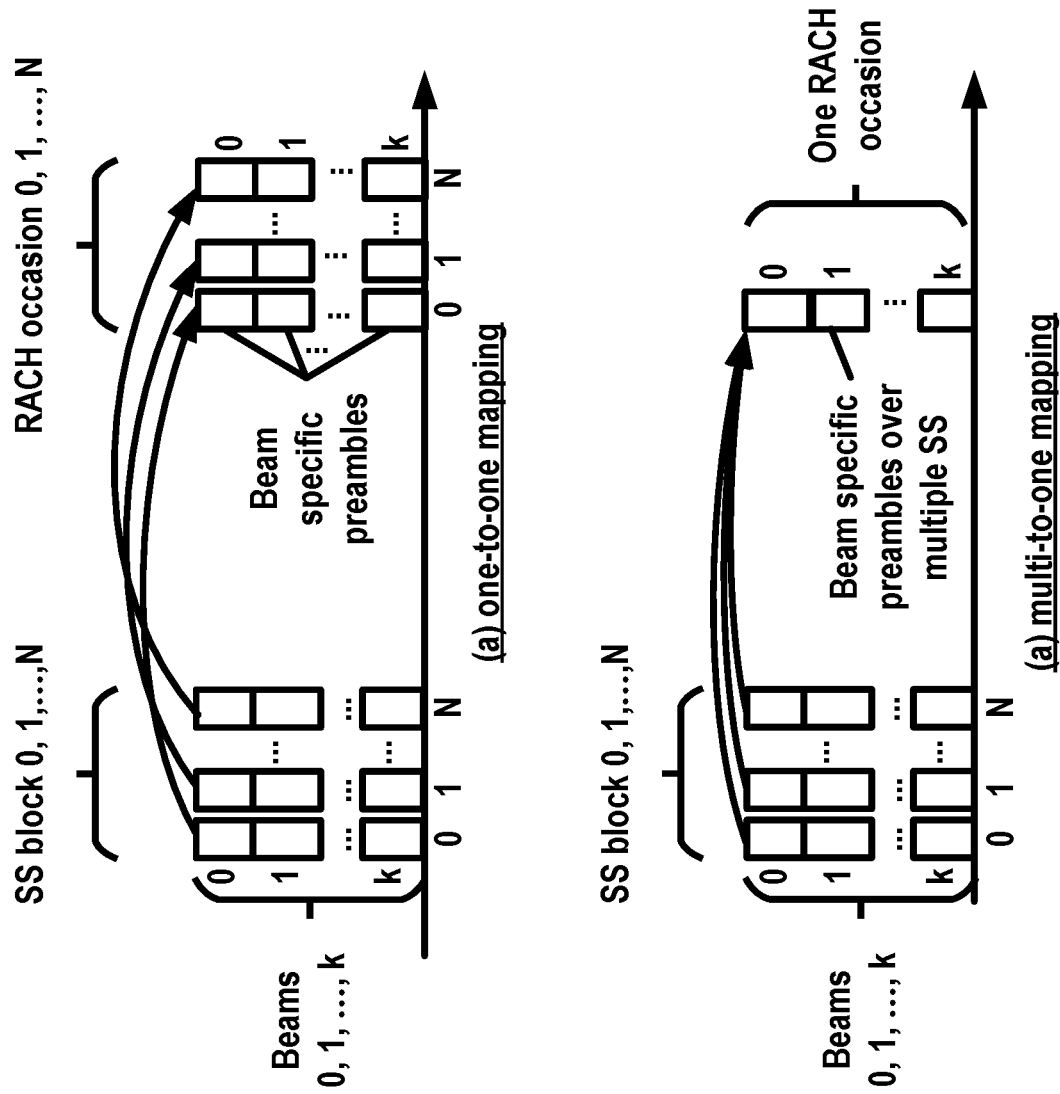
FIG. 57 is an example diagram as per an aspect of an embodiment of the present disclosure.

PRACH occasion may be mapped to corresponding SS-block, and a set of PRACH preambles may be divided between beams as illustrated in FIG. 57(a). Similar to mapping of multiple SS-blocks to single PRACH occasion, multiple beams of an SS-block may be mapped to at least one PRACH occasion as illustrated in FIG. 57(b).

If a PRACH occasion is configured with k preambles, and a PRACH occasion is configured to be SS-block specific, the whole set of preambles may be used to indicate the specific SS-block. In this case, there may be N PRACH occasions corresponding to N SS-blocks.

If multiple SS-blocks are mapped to single PRACH occasion, then the preambles may be divided between SS-blocks and depending on the number of SS-blocks, the available preambles per SS-block may be K/N (K preambles, N SS-blocks).

If K SS-block specific preambles are divided between CSI-RS beams in the corresponding PRACH occasions, the number of available preambles per beam may be determined by the K preambles/number of beams.

If the preambles are partitioned in SS-block specific manner, the UE may indicate preferred SS-block but not the preferred individual DL TX beam to gNB.

The network may configure mapping/partitioning PRACH preamble resources to SS-blocks and/or to individual beams. A UE may determine the used partitioning of PRACH preambles, as much as possible, e.g. based on the PRACH configuration.

Beam-specific PRACH configurations may be configurable when a gNB uses analog RX beamforming. In that case, when a UE sends, for example, a preamble in a beam-specific time/frequency slot associated with one or multiple SS Block transmissions, then the gNB may use the appropriate RX beamforming when receiving the preamble in that time/frequency slot and use the corresponding DL beam when transmitting the RAR. Hence, beam-specific PRACH configurations may allow the gNB to direct its Rx beamforming in the direction of the same beam when monitoring the associated PRACH resources.

Example Subsequent Transmissions

In the multi-beam RACH scenario, thanks to the mapping between DL SS beams and PRACH configuration, e.g. time/frequency slot and possibly preamble partitioning, a UE may be under the coverage of a given DL beam or at least a subset of them in a cell. That may enable the network to send a RAR in this best DL beam and/or perform a more optimized beam sweeping procedure e.g. not transmitting the same RAR message in possible beams (e.g. transmitting the RAR in a single beam as in the figure below) as illustrated in FIG. 58.

Figure 58:
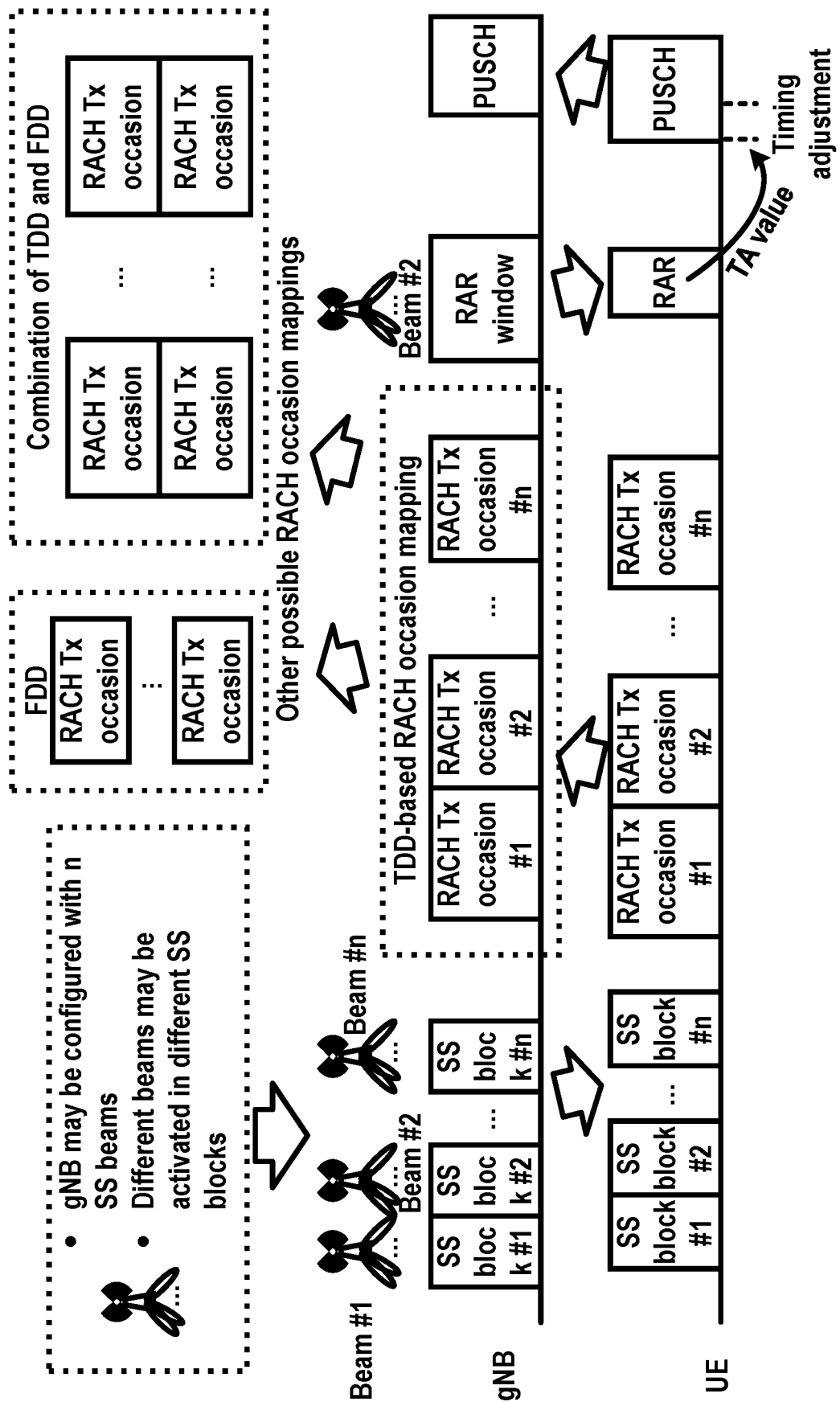
FIG. 58 is an example diagram as per an aspect of an embodiment of the present disclosure.

FIG. 58 shows an example of RA procedure with multi-beam; a UE detects the second SS blocks and thereby transmits a preamble on a RACH resource corresponding to the second SS block to inform gNB of the preferred beam. gNB responds with a RAR using the beam that the UE prefers.

Example Contention-Free RACH with Multi-Beam Operations

NR may support the contention-free scenarios in a way to provide a dedicated RACH resource for the preamble transmission as in LTE for handover, DL data arrival, positioning and obtaining timing advance alignment for a secondary TAG. For the handover case, a UE may be configured to measure on one or more SS blocks or other RS in a neighboring cell. If one of the neighboring cell SS-block measurements triggers a handover request, the source gNB may signal a preferred beam index in a handover request to the target gNB. The target gNB in turn may provide a beam-specific dedicated RACH resource (including preamble) in the handover command. In an example, the target gNB may provide a set of dedicated resources e.g. one for at least one SS-block in the handover command. The UE then may transmit Msg1 using the dedicated preamble corresponding to the preferred DL beam in the target cell.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 59:
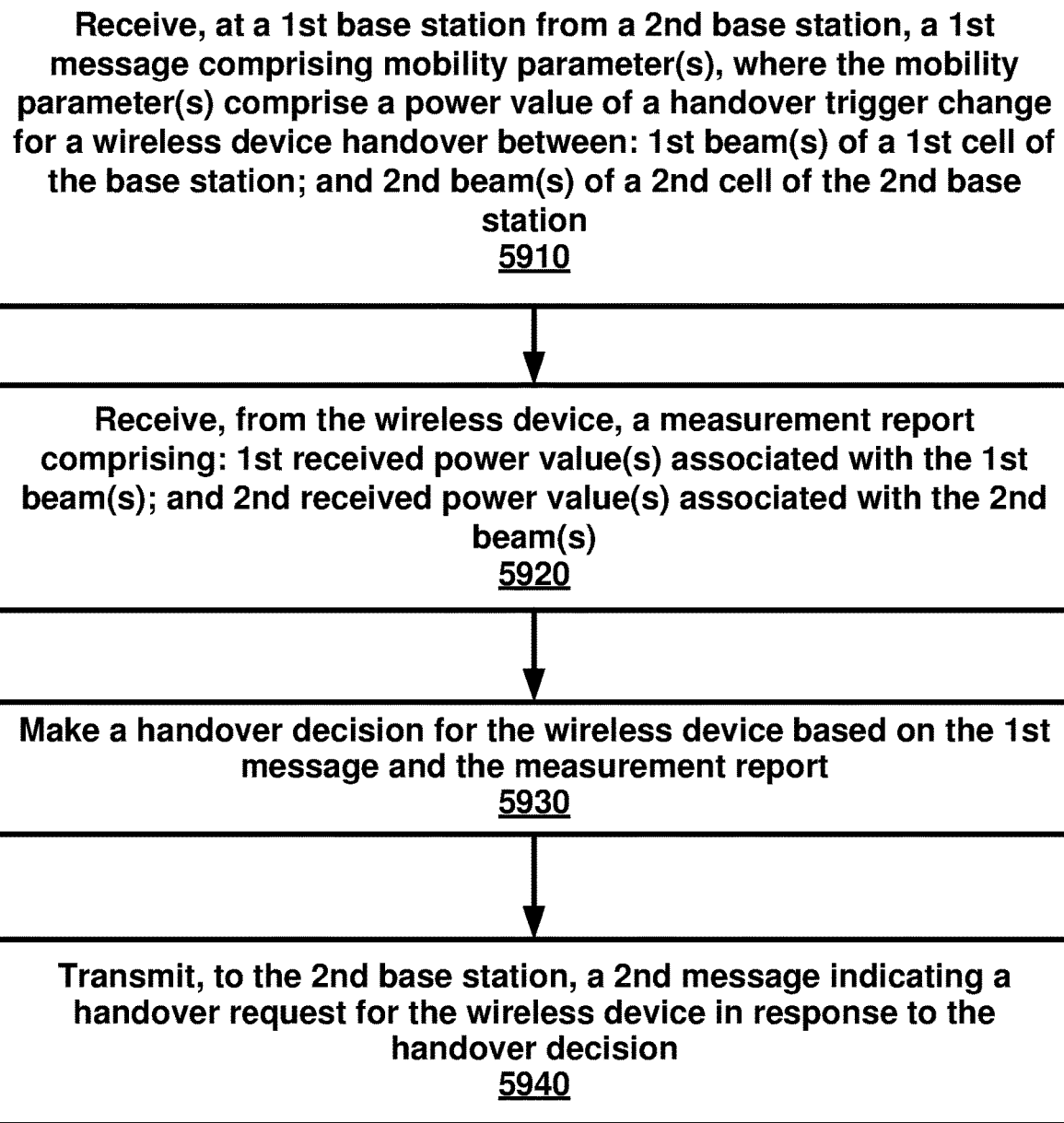
FIG. 59 is a flow diagram of an aspect of an embodiment of the present disclosure.

FIG. 59 is an example flow diagram as per an aspect of an embodiment of the present disclosure. At 5910, a base station receives a first message from a second base station. The first message may comprise one or more mobility parameters. The one or more mobility parameters may comprise a power value of a handover trigger change for a wireless device handover between: at least one first beam of a first cell of the base station; and at least one second beam of a second cell of the second base station. At 5920, a measurement report may be received from the wireless device. The measurement report may comprise: at least one first received power value associated with the at least one first beam; and at least one second received power value associated with the at least one second beam. At 5930, a handover decision may be made for the wireless device based on the first message and the measurement report. At 5940, a second message may be transmitted to the second base station. The second message may indicate a handover request for the wireless device in response to the handover decision.

According to an embodiment, the first message may further comprise at least one of: a first cell identifier of the first cell; a second cell identifier of the second cell; at least one first beam index of the at least one first beam; or at least one second beam index of the at least one second beam. According to an embodiment, the power value may be associated with at least one of: a reference signal received power; or a reference signal received quality. According to an embodiment, the base station may further transmit to the wireless device, a radio resource control message comprising a measurement configuration based on the one or more mobility parameters. According to an embodiment, the one or more mobility parameters may further comprise one or more beam parameters of the at least one first beam or the at least one second beam. The one or more beam parameters may further comprise at least one of: a beam index; synchronization signal scheduling information; synchronization signal sequence information; reference signal scheduling information; reference signal sequence information; or beam configuration information. According to an embodiment, the base station may transmit to the second base station, a third message indicating an acknowledgement of the first message. The acknowledgement may indicate whether the base station complies the one or more mobility parameters. According to an embodiment, the second base station may configure the one or more mobility parameters of the first message based on information elements received from the base station. According to an embodiment, the handover request may be for a handover of the wireless device towards the second cell of the second base station.

Figure 60:
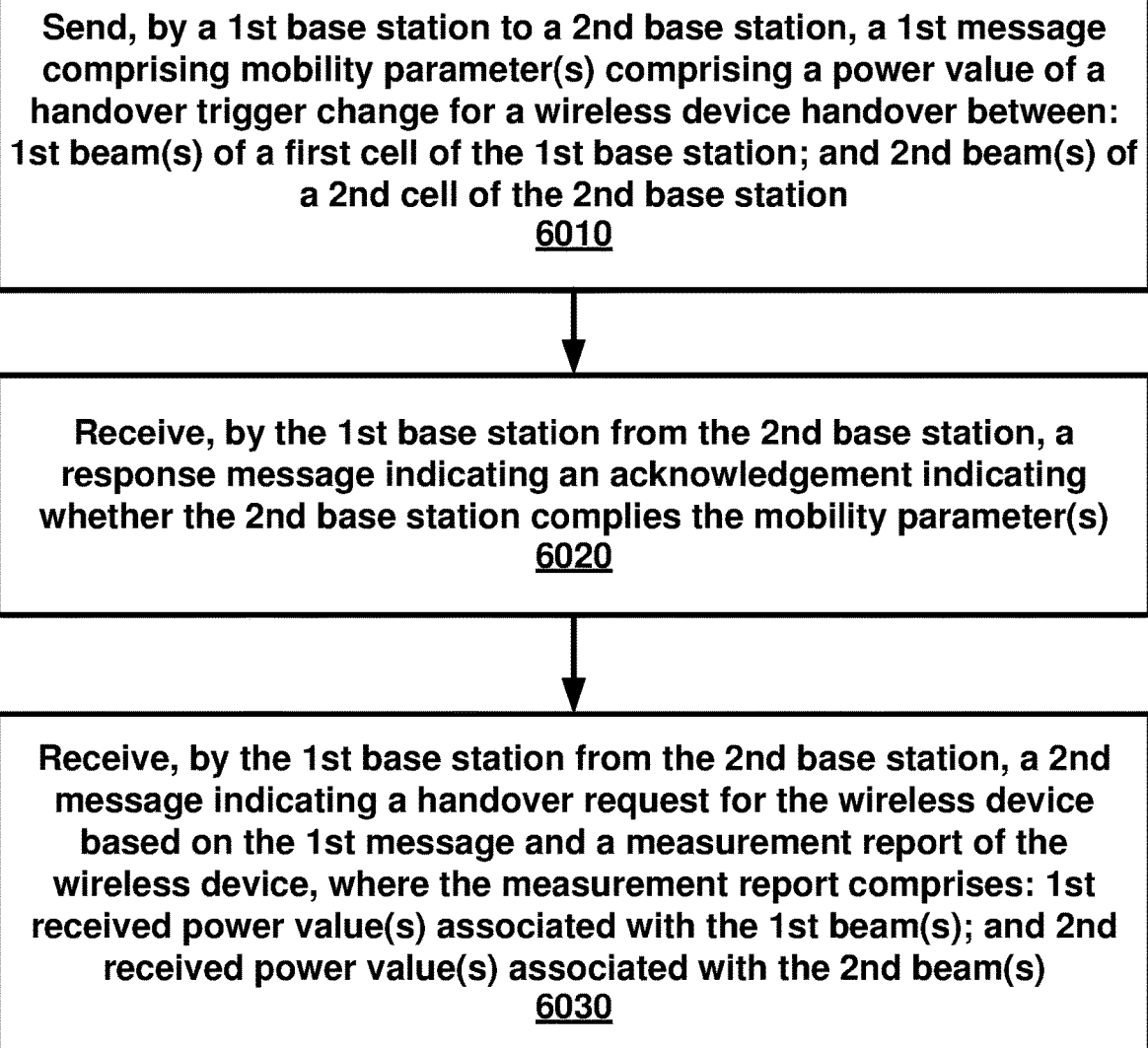
FIG. 60 is a flow diagram of an aspect of an embodiment of the present disclosure.

FIG. 60 is an example flow diagram as per an aspect of an embodiment of the present disclosure. At 6010, a first base station may send to a second base station, a first message comprising one or more mobility parameters. The one or more mobility parameters may comprise a power value of a handover trigger change for a wireless device handover between: at least one first beam of a first cell of the first base station; and at least one second beam of a second cell of the second base station. At 2600, the first base station may receive from the second base station, a response message. The response message may indicate an acknowledgement indicating whether the second base station complies the one or more mobility parameters. At 6030, the first base station may receive a second message from the second base station. The second message may indicate a handover request for the wireless device based on the first message and a measurement report of the wireless device. The measurement report may comprise: at least one first received power value associated with the at least one first beam; and at least one second received power value associated with the at least one second beam.

According to an embodiment, the first message may further comprise at least one of: a first cell identifier of the first cell; a second cell identifier of the second cell; at least one first beam index of the at least one first beam; or at least one second beam index of the at least one second beam. According to an embodiment, the power value may be associated with at least one of: a reference signal received power; or a reference signal received quality. According to an embodiment, the second base station may further transmit to the wireless device, a radio resource control message. The radio resource control message may comprise a measurement configuration based on the one or more mobility parameters.

FIG. 61 is an example flow diagram as per an aspect of an embodiment of the present disclosure. At 6110, a first base station may receive a first message from a second base station. The first message may comprise configuration information indicating a first number of a first quantity of beams for measuring a quality of a first cell of the second base station. At 6120, the first base station may transmit a second message to a wireless device. The second message may comprise measurement configuration parameters indicating the first number of the first quantity of beams for measuring the quality of the first cell by the wireless device. At 6130, the first base station may receive a measurement report from the wireless device. The measurement report may indicate the quality of the first cell measured based on the first number of beams.

According to an embodiment, the configuration information may further comprise a second number of a second quantity of beams for measuring a quality of a second cell of the first base station. According to an embodiment, the wireless device may determine the quality of the first cell by averaging beam qualities of the first number of beams. The beam qualities may comprise at least one of: a reference signal received power; or a reference signal received quality. According to an embodiment, the first base station may further transmit a third message to the second base station. The third message may indicate an acceptance of the configuration information. According to an embodiment the first base station may further transmit a fourth message to the second base station. The fourth message may indicate a rejection of the configuration information. The fourth message may further comprise at least one of: a range of a number of beams to calculate a cell quality of the first cell or the second cell; a cause of the rejection of the configuration information; or one or more information elements updated from the configuration information. According to an embodiment the first base station may further transmit, based on the measurement report, a fifth message to the second base station. The fifth message may indicate a request for the wireless device of: a handover towards the first cell; an initiation of a multi-connectivity employing the first cell; a modification of a multi-connectivity employing the first cell; or a secondary base station change initiation for a multi-connectivity employing the first cell.

FIG. 62 is an example flow diagram as per an aspect of an embodiment of the present disclosure. At 6210, a wireless device may receive from a first base station, measurement configuration parameters of a measurement of the wireless device. The measurement configuration parameters may comprise first beam identifiers, second beam identifiers, and a first measurement event. The first beam identifiers may be of a first plurality of beams. The second beam identifiers may be of a second plurality of beams. The first measurement event may indicate that a second combined reference signal measurement value of the second plurality of beams exceeds a first combined reference signal measurement value of the first plurality of beams by more than a first offset value. At 6220, the wireless device may monitor the first plurality of beams and the second plurality of beams to determine an occurrence of the first measurement event. At 6230, the wireless device may transmit to the first base station, a measurement report in response to the occurrence of the first measurement event. The measurement report may comprise: the first combined reference signal measurement value of the first plurality of beams; and the second combined reference signal measurement value of the second plurality of beams.

According to an embodiment, the first combined reference signal measurement value may comprise at least one of: a first combined reference signal received power; or a first combined reference signal received quality. According to an embodiment, the second combined reference signal measurement value may comprise at least one of: a second combined reference signal received power; or a second combined reference signal received quality. According to an embodiment, the first plurality of beams may serve beams of the wireless device. According to an embodiment, the measurement configuration parameters may further comprise at least one of: a beam individual offset value at least one of the first plurality of beams or the second plurality of beams for a measurement report; one or more cell identifiers associated with the first plurality of beams or the second plurality of beams; beam information of the first plurality of beams or the second plurality of beams; or the first offset value. According to an embodiment, the measurement configuration parameters may further comprise at least one of: a first number of a quantity of the first plurality of beams; and a second number of a quantity of the second plurality of beams. According to an embodiment, the measurement configuration parameters may further comprise at least one of: a second measurement event indicating that a combined reference signal measurement value of the first plurality of beams is smaller than a first power value; or a third measurement event indicating that a combined reference signal measurement value of the third multiple beams exceeds a second power value. According to an embodiment, the measurement configuration parameters may further comprise one or more measurement events indicating at least one of: a reference signal measurement value of a first serving beam is smaller than a reference signal measurement value of a second serving beam by more than a second offset value; a reference signal measurement value of a third serving beam is smaller than a reference signal measurement value of a first non-serving beam by more than a third offset value; a reference signal measurement value of a fourth serving beam is smaller than a third power value; and a reference signal measurement value of a second non-serving beam is larger than a fourth power value. According to an embodiment, the first plurality of beams may be beams of a serving cell of the wireless device; and the second plurality of beams may be beams of a non-serving cell of the wireless device. According to an embodiment, the measurement result may further comprise at least one of: a first information element indicating whether the first combined reference signal measurement value of the first plurality of beams is based on a synchronization signal or based on a reference signal; or a second information element indicating whether the second combined reference signal measurement value of the second plurality of beams is based on a synchronization signal or based on a reference signal.

FIG. 63 is an example flow diagram as per an aspect of an embodiment of the present disclosure. At 6310, a first base station may transmit to a wireless device, measurement configuration parameters of a measurement of the wireless device. The measurement configuration parameters may comprise: first beam identifiers, second beam identifiers, and a first measurement event. The first beam identifiers may be of a first plurality of beams. The second beam identifiers may be of a second plurality of beams. The first measurement event may indicate that a second combined reference signal measurement value of the second plurality of beams exceeds a first combined reference signal measurement value of the first plurality of beams by more than a first offset value. At 6320, the first base station may receive from the wireless device, a measurement report in response to an occurrence of the first measurement event based on monitoring, by the wireless device, the first plurality of beams and the second plurality of beams. The measurement report may comprise: the first combined reference signal measurement value of the first plurality of beams; and the second combined reference signal measurement value of the second plurality of beams.

According to an embodiment, the first combined reference signal measurement value may comprise at least one of: a first combined reference signal received power; or a first combined reference signal received quality. According to an embodiment, the second combined reference signal measurement value may comprise at least one of: a second combined reference signal received power; or a second combined reference signal received quality.

Figure 64:
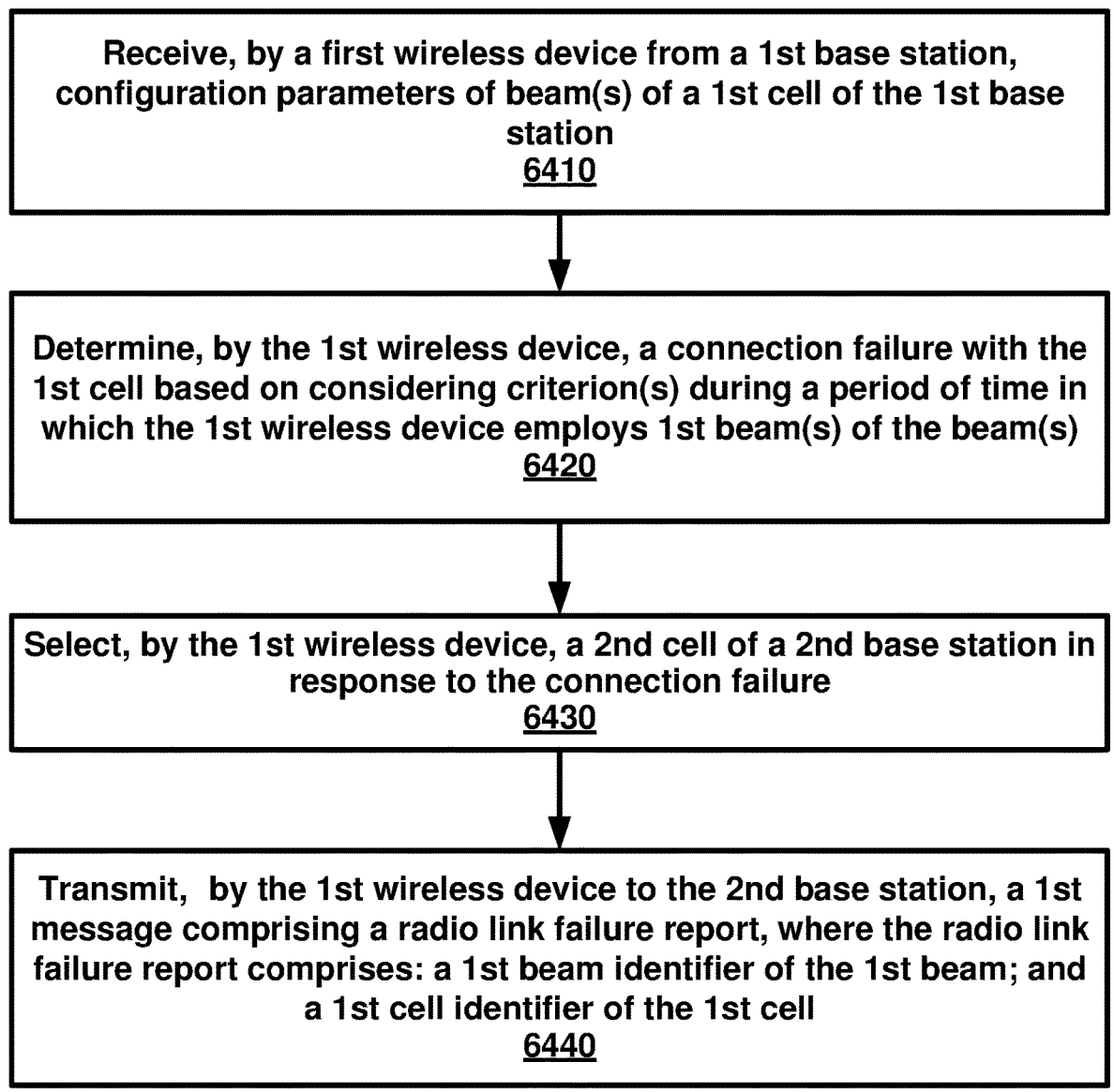
FIG. 64 is a flow diagram of an aspect of an embodiment of the present disclosure.

FIG. 64 is an example flow diagram as per an aspect of an embodiment of the present disclosure. At 6410, a first wireless device may receive from a first base station, configuration parameters of one or more beams of a first cell of the first base station. At 6420, the first wireless device may determine a connection failure with the first cell based on considering at least one criterion during a period of time in which the first wireless device employs at least a first beam of the one or more beams. At 6430, the first wireless device may select a second cell of a second base station in response to the connection failure. At 6440, the first wireless device may transmit to the second base station, a first message comprising a radio link failure report. The radio link failure report may comprise: a first beam identifier of the first beam; and a first cell identifier of the first cell.

According to an embodiment, the first wireless device may further receive from the first base station, transport blocks via the one or more beams of the first cell based on the configuration parameters. According to an embodiment, the first base station may be the second base station. According to an embodiment, the first cell may be the second cell. According to an embodiment, the configuration parameters may comprise at least one of: a first cell identifier of the first cell; or at least one beam configuration parameter of the one or more beams. The at least one beam configuration parameter comprising at least one of: one or more beam indexes; synchronization signal scheduling information; synchronization signal sequence information; reference signal scheduling information; reference signal sequence information; beam scheduling information; or random access preamble configuration information. According to an embodiment, the at least one criterion associated with the connection failure comprises at least one of: a plurality of out-of-sync detections; one or more random access failures; or a plurality of retransmissions. According to an embodiment, the radio link failure report may further comprises one or more beam identifiers and measurement results of at least one beam. The measurement results may comprise at least one of: a reference signal received power; a reference signal received quality; a combined reference signal received power; or a combined reference signal received quality. The at least one beam may comprise at least one of: the first beam; one or more second beams that the first wireless device established a beam pair link with; one or more third beams that the wireless device attempted a beam failure recovery to; or one or more neighboring beams of the first beam.

According to an embodiment, the radio link failure report may further comprise at least one of: one or more elements of the configuration parameters; a first information element indicating whether a failed random access attempt associated with the connection failure was a 2-stage random access or a 4-stage random access; or a second information element indicating whether a failed random access attempt associated with the connection failure was a contention free random access or a contention based random access. According to an embodiment, the first base station may receive from the second base station, one or more elements of the radio link failure report. According to an embodiment, the first base station may determine one or more radio resource configuration parameters based on the one or more elements of the radio link failure report. According to an embodiment, the one or more radio resource configuration parameters may comprise at least one of: at least one handover initiation threshold comprising a radio signal received quality threshold or a radio signal received power threshold; or at least one beam configuration parameter of the one or more beams.

Figure 65:
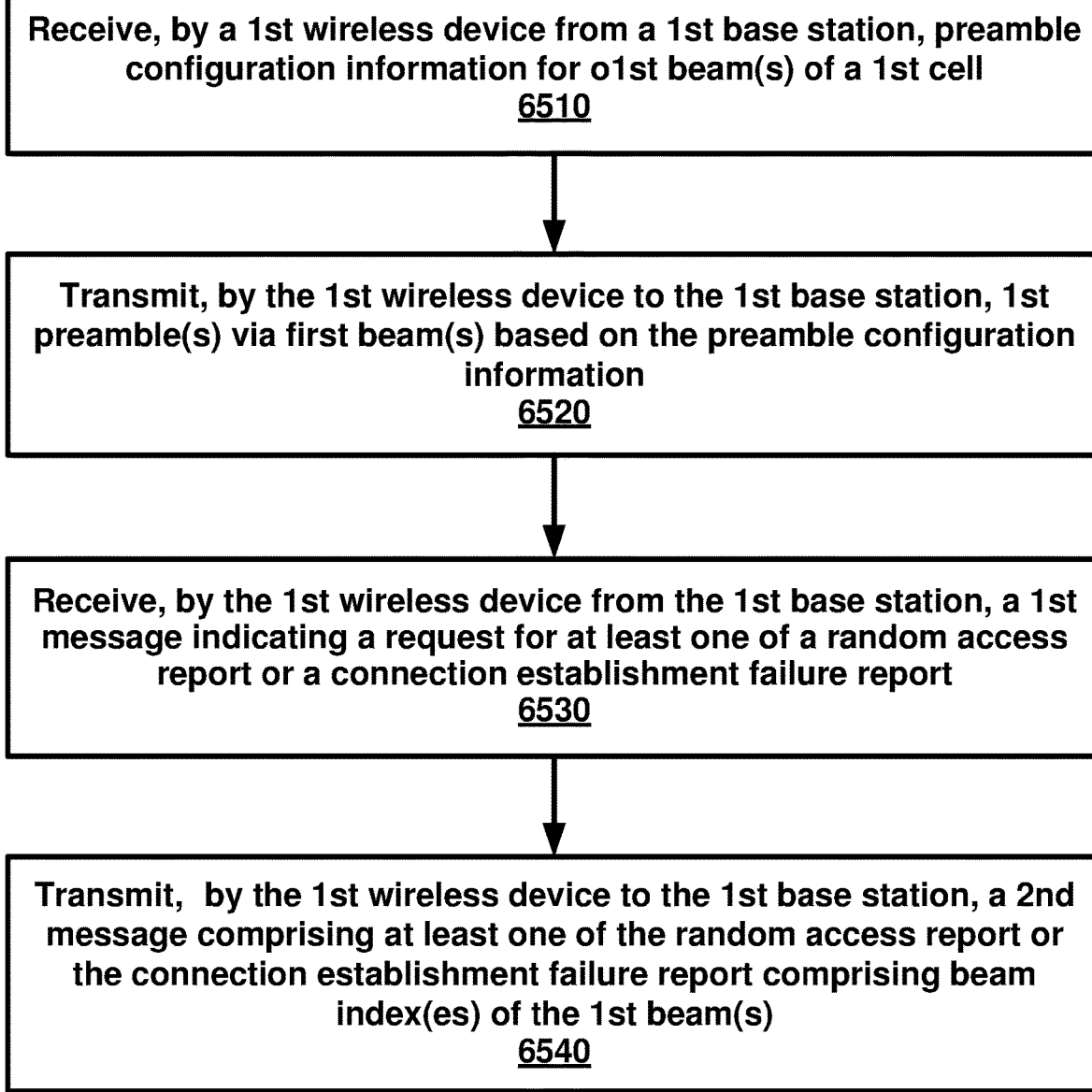
FIG. 65 is a flow diagram of an aspect of an embodiment of the present disclosure.

FIG. 65 is an example flow diagram as per an aspect of an embodiment of the present disclosure. At 6510, a first wireless device may receive from a first base station, preamble configuration information for one or more first beams of a first cell. At 6520, the first wireless device may transmit to the first base station, one or more first preambles via at least one of the one or more first beams based on the preamble configuration information. At 6530, the first wireless device may receive from the first base station, a first message indicating a request for at least one of a random access report or a connection establishment failure report. At 6540, the first wireless device may transmit to the first base station, a second message comprising at least one of the random access report or the connection establishment failure report comprising at least one beam index of the at least one of the one or more first beams. According to an embodiment, the preamble configuration information may comprise an information element indicating at least one of: a synchronization signal configured to identify a preamble information; or a reference signal configured to identify a preamble information. According to an embodiment, the random access report may comprise one or more information elements of the at least one of the one or more first beams. The one or more first information elements may indicate at least one of: the preamble configuration information; a number of preambles sent; an indication of whether a contention was detected; or a maximum transmission power reached for a random access preamble transmission. According to an embodiment, the connection establishment failure report may comprise one or more second information elements of one or more beams. The one or more second information elements may indicate at least one of: the preamble configuration information; a number of preambles sent; an indication of whether a contention was detected; a maximum transmission power reached for a random access preamble transmission; a reference signal received power; a reference signal received quality; a combined reference signal received power; a combined reference signal received quality; or a reference signal received quality type. The one or more beams may comprise at least one of: at least one of one or more second beams of the first cell; at least one of one or more third beams of a second cell where the wireless devices failed in a connection establishment; or at least one of one or more fourth beams of a neighboring cell.

FIG. 66 is an example flow diagram as per an aspect of an embodiment of the present disclosure. At 6610, a second base station may receive from a first base station, a first message comprising neighbor beam information of a first cell of the first base station. The neighbor beam information may comprise: a neighbor cell identifier of a neighbor cell of the first cell; a first beam index of a first beam of the first cell; and at least one neighbor beam index of at least one neighbor beam of the first beam of the first cell. The at least one neighbor beam may be associated with a third base station. At 6620, the second base station may make a handover decision for a wireless device towards the first cell based on the neighbor beam information. At 6630, the second base station may transmit to the first base station, a handover request for the wireless device in response to the handover decision.

According to an embodiment, the second base station may transmit to the first base station, a second message indicating a response to the first message. According to an embodiment, the first base station may receive one or more elements of the neighbor beam information from at least one of: one or more wireless devices; one or more base stations; a core network entity; or an operation and maintenance entity. According to an embodiment, the neighbor beam information may further comprises at least one of: one or more first neighbor beam indexes of one or more first neighbor beams of the first cell; one or more first neighbor cell identifiers of one or more first neighbor cells of the first beam of the first cell; a frequency offset of at least one of the neighbor cell or the one or more first neighbor cells; or beam parameters of at least one of the first beam, the at least one neighbor beam, or the one or more first neighbor beams. The beam parameters may indicate at least one of: a synchronization signal block index; a synchronization signal scheduling information; a synchronization signal sequence information; a reference signal index; a reference signal scheduling information; a reference signal sequence information; or beam configuration parameters.

According to an embodiment, the first message may comprise one of: an Xn setup request message; or a gNB configuration update message. According to an embodiment, the second base station may determine neighbor relation information based on the neighbor beam information of the first cell. The neighbor relation information may comprise neighboring relations of a plurality of beams and a plurality of cells. According to an embodiment, the second base station may transmit the neighbor relation information to an operation and maintenance entity. According to an embodiment, the second base station may transmit to a fourth base station, a third message based on the neighbor relation information. The third message may indicate a request of at least one of: a handover towards a cell of the third base station; a multi connectivity initiation; a secondary base station modification; a direct interface setup; or a mobility setting change. According to an embodiment, the fourth base station may be the first base station.

FIG. 67 is an example flow diagram as per an aspect of an embodiment of the present disclosure. At 6710, a first base station may send to a second base station, a first message comprising neighbor beam information of a first cell of the first base station. The neighbor beam information may comprise: a neighbor cell identifier of a neighbor cell of the first cell; a first beam index of a first beam of the first cell; and at least one neighbor beam index of at least one neighbor beam of the first beam of the first cell. The at least one neighbor beam may be associated with a third base station. At 6720, the first base station may receive from the second base station, a second message indicating a response to the first message. At 6730, the first base station may receive from the second base station, a handover request for a handover of a wireless device towards the first cell based on the neighbor beam information. According to an embodiment, the first base station may receive one or more elements of the neighbor beam information from at least one of: one or more wireless devices; one or more base stations; a core network entity; or an operation and maintenance entity.

FIG. 68 is an example flow diagram as per an aspect of an embodiment of the present disclosure. At 6810, a second base station may receive from a first base station, a first message comprising neighbor beam information of a first cell of the first base station. The neighbor beam information may comprise: a neighbor cell identifier of a neighbor cell of the first cell; a first beam index of a first beam of the first cell; and at least one neighbor beam index of at least one neighbor beam of the first beam of the first cell. The at least one neighbor beam may be associated with a third base station. At 6820, the second base station may make a handover decision for a wireless device towards the first cell based on the first message. At 6830, the second base station may transmit to the first base station, a handover request for the wireless device in response to the handover decision.

FIG. 69 is an example flow diagram as per an aspect of an embodiment of the present disclosure. At 6910, a second base station may receive from a first base station, a first message comprising neighbor beam information of a first cell of the first base station. The neighbor beam information may comprise: a neighbor cell identifier of a neighbor cell of the first cell; a first beam index of a first beam of the first cell; and at least one neighbor beam index of at least one neighbor beam of the first beam of the first cell. At 6920, the second base station may make a handover decision for a wireless device towards the first cell based on the neighbor beam information. At 6930, the second base station may transmit to the first base station, a handover request for the wireless device in response to the handover decision.

Figure 70:
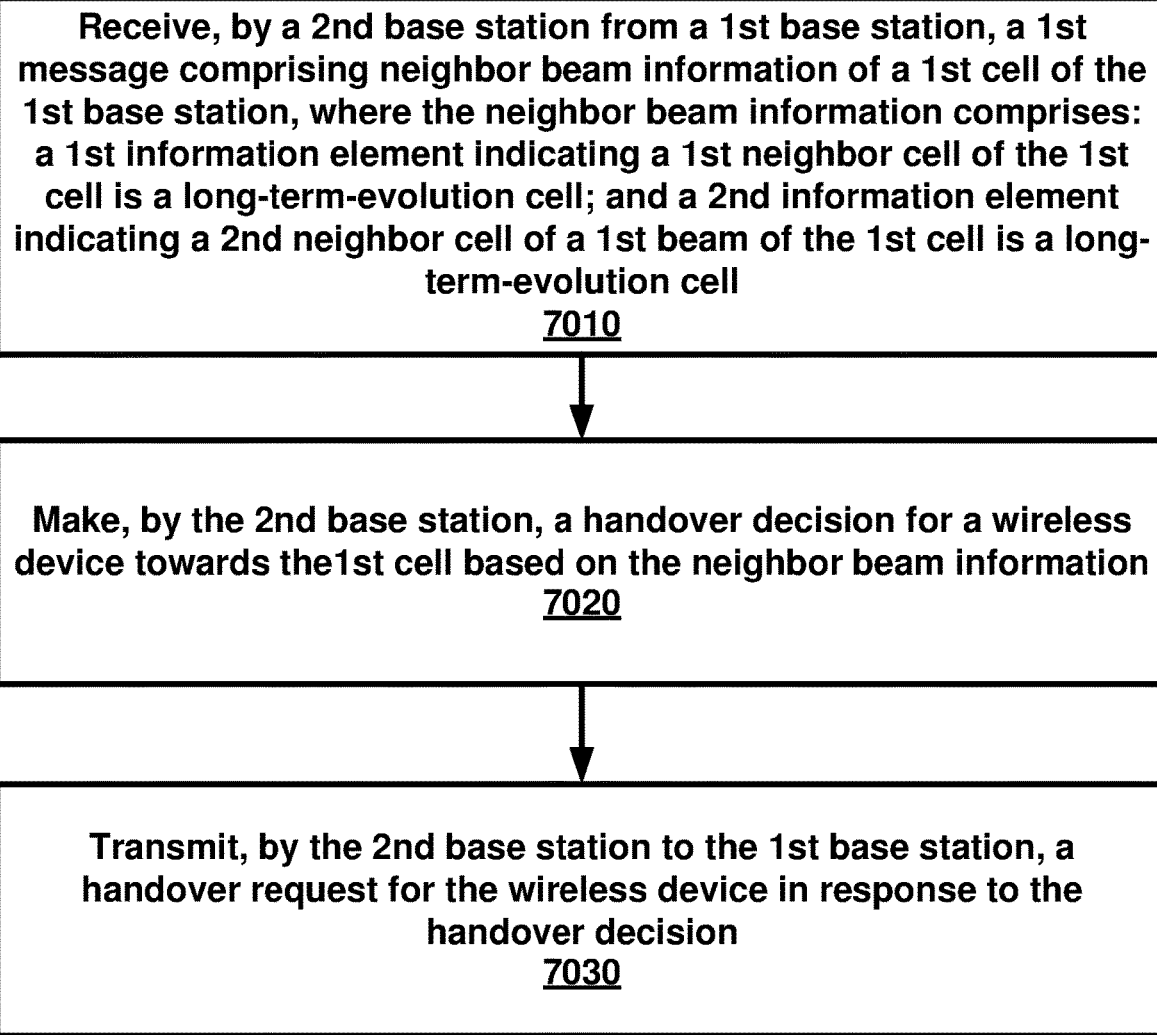
FIG. 70 is a flow diagram of an aspect of an embodiment of the present disclosure.

FIG. 70 is an example flow diagram as per an aspect of an embodiment of the present disclosure. At 7010, a second base station may receive from a first base station, a first message comprising neighbor information of a first cell of the first base station. The neighbor information may comprise: a first information element indicating a first neighbor cell of the first cell is a long-term-evolution cell; and a second information element indicating a second neighbor cell of a first beam of the first cell is a long-term-evolution cell. At 7020, the second base station may make a handover decision for a wireless device towards the first cell based on the neighbor information. At 7030, the second base station may transmit to the first base station, a handover request for the wireless device in response to the handover decision.

According to an embodiment, the second base may transmit to the first base station, a second message indicating a response to the first message. According to an embodiment, the first base station may receive one or more elements of the neighbor information from at least one of: one or more wireless devices; one or more base stations; a core network entity; or an operation and maintenance entity. According to an embodiment, the first message comprises one of: an Xn setup request message; or a gNB configuration update message. According to an embodiment, the second base station may determine neighbor relation information based on the neighbor information of the first cell. The neighbor relation information may comprise neighboring relations of a plurality of beams and a plurality of cells. According to an embodiment, the second base station may transmit the neighbor relation information to an operation and maintenance entity. According to an embodiment, the second base station may transmit to a fourth base station, a third message based on the neighbor relation information. The third message may indicate a request of at least one of: a handover towards a cell of the third base station; a multi connectivity initiation; a secondary base station modification; a direct interface setup; or a mobility setting change. According to an embodiment, the fourth base station may be the first base station.

In this disclosure, "a" and "an" and similar phrases are to be interpreted as "at least one" or "one or more." Similarly, any term that ends with the suffix "(s)" is to be interpreted as "at least one" or "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" is indicative that the phrase following the term "based on" is an example of one of a multitude of suitable possibilities that may, or may not, be employed to one or more of the various embodiments. The phrase "in response to" is indicative that the phrase following the phrase "in response to" is an example of one of a multitude of suitable possibilities that may, or may not, be employed to one or more of the various embodiments. The terms "including" and "comprising" should be interpreted as meaning "including, but not limited to".

In this disclosure, various embodiments are disclosed. Limitations, features, and/or elements from the disclosed example embodiments may be combined to create further embodiments within the scope of the disclosure.

In this disclosure, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method, performed by a wireless device, comprising:
   receiving, from a first base station, configuration parameters comprising one or more beam identifiers of one or more beams of a first cell;
   transmitting, to the first base station, one or more random access preambles via resources associated with a first beam of the one or more beams of the first cell;
   receiving, at the wireless device, a message from a second base station requesting a random access report; and
   transmitting, from the wireless device to the second base station, the random access report comprising:
   a cell identifier of the first cell; and
   a first beam identifier of the first beam,
   wherein the random access report indicates a number of preambles that the wireless device sent via the resources associated with the first beam, wherein the number of preambles comprise multiple failed preamble transmissions for a random-access procedure that cause the second base station to configure beam parameters and beam-based random-access parameters to increase random-access reliability.

2. The method of claim 1, further comprising receiving, by the wireless device from the first base station, transport blocks via the one or more beams of the first cell based on the configuration parameters.

3. The method of claim 1, wherein the first base station is the second base station.

4. The method of claim 1, wherein the first cell is a cell that the wireless device uses for the transmitting the random access report.

5. The method of claim 1, wherein the configuration parameters comprise at least one of:
   the cell identifier of the first cell; or
   at least one beam configuration parameter of the one or more beams, the at least one beam configuration parameter comprising at least one of:
   one or more beam indexes;
   synchronization signal scheduling information;
   synchronization signal sequence information;
   reference signal scheduling information;
   reference signal sequence information;
   beam scheduling information; or
   random access preamble configuration information.

6. The method of claim 1, further comprising determining a connection failure with the first cell based on at least one criterion associated with the connection failure, wherein the at least one criterion comprises at least one of:
   a plurality of out-of-sync detections;
   one or more random access failures; or
   a plurality of retransmissions.

7. The method of claim 6, further comprising selecting a second cell of the second base station based on the connection failure and transmitting measurement results of the first beam, wherein the measurement results comprise at least one of:
   a reference signal received power;
   a reference signal received quality;
   a combined reference signal received power; or
   a combined reference signal received quality.

8. The method of claim 1, further comprising transmitting, to the second base station, at least one of:
   one or more elements of the configuration parameters;
   a first information element indicating whether a random access attempt was a 2-stage random access or a 4-stage random access; or
   a second information element indicating whether a random access attempt was a contention free random access or a contention based random access.

9. The method of claim 1, wherein the random access report further indicates a transmission power reached for the transmitting the one or more random access preambles.

10. A wireless device comprising:
    one or more processors; and
    memory storing instructions that, when executed by the one or more processors, cause the wireless device to:
    receive, from a first base station, configuration parameters comprising one or more beam identifiers of one or more beams of a first cell;
    transmit, to the first base station, one or more random access preambles via resources associated with a first beam of the one or more beams of the first cell;
    receive, at the wireless device, a message from a second base station requesting a random access report; and transmit, from the wireless device to the second base station, the random access report comprising:
a cell identifier of the first cell; and
a first beam identifier of the first beam,
wherein the random access report indicates a number of preambles that the wireless device sent via the resources associated with the first beam, wherein the number of preambles comprise multiple failed preamble transmissions for a random-access procedure that cause the second base station to configure beam parameters and beam-based random-access parameters to increase random-access reliability.

11. The wireless device of claim 10, wherein the instructions, when executed by the one or more processors, further cause the wireless device to receive, from the first base station, transport blocks via the one or more beams of the first cell based on the configuration parameters.

12. The wireless device of claim 10, wherein the first base station is the second base station.

13. The wireless device of claim 10, wherein the first cell is a cell that the wireless device uses for the transmitting the random access report.

14. The wireless device of claim 10, wherein the configuration parameters comprise at least one of:
the cell identifier of the first cell; or
at least one beam configuration parameter of the one or more beams, the at least one beam configuration parameter comprising at least one of:
one or more beam indexes;
synchronization signal scheduling information;
synchronization signal sequence information;
reference signal scheduling information;
reference signal sequence information;
beam scheduling information; or
random access preamble configuration information.

15. The wireless device of claim 10, wherein the instructions, when executed by the one or more processors, further cause the wireless device to determine a connection failure with the first cell based on at least one criterion associated with the connection failure comprising at least one of:
a plurality of out-of-sync detections;
one or more random access failures; or
a plurality of retransmissions.

16. The wireless device of claim 15, wherein the instructions, when executed by the one or more processors, further cause the wireless device to select a second cell of the second base station based on the connection failure and transmit measurement results of the first beam, wherein the measurement results comprise at least one of:
a reference signal received power;
a reference signal received quality;
a combined reference signal received power; or
a combined reference signal received quality.

17. The wireless device of claim 10, further comprising transmitting, to the second base station at least one of:
one or more elements of the configuration parameters;
a first information element indicating whether a random access attempt was a 2-stage random access or a 4-stage random access; or
a second information element indicating whether a random access attempt was a contention free random access or a contention based random access.

18. The wireless device of claim 10, wherein the random access report further indicates a transmission power reached for the transmitting the one or more random access preambles.

* * * * *